US008084074B2

(12) United States Patent
Kinney et al.

(10) Patent No.: US 8,084,074 B2
(45) Date of Patent: Dec. 27, 2011

(54) PRODUCTION OF VERY LONG CHAIN POLYUNSATURATED FATTY ACIDS IN OIL SEED PLANTS

(75) Inventors: Anthony J. Kinney, Wilmington, DE (US); Edgar Benjamin Cahoon, Lincoln, NE (US); Howard Glenn Damude, Hockessin, DE (US); William D. Hitz, Wilmington, DE (US); Zhan-Bin Liu, West Chester, PA (US); Charles W. Kolar, Jr., St. Louis, MO (US)

(73) Assignee: E. I. Du Pont De Nemours and Company, Wilmington, DE (US)

( * ) Notice: Subject to any disclaimer, the term of this patent is extended or adjusted under 35 U.S.C. 154(b) by 1104 days.

(21) Appl. No.: 11/673,843

(22) Filed: Feb. 12, 2007

(65) Prior Publication Data

US 2008/0220143 A1 Sep. 11, 2008

Related U.S. Application Data

(63) Continuation-in-part of application No. 11/624,777, filed on Jan. 19, 2007, now abandoned, which is a continuation-in-part of application No. 10/776,311, filed on Feb. 11, 2004, now abandoned.

(60) Provisional application No. 60/446,941, filed on Feb. 12, 2003.

(51) Int. Cl.
*A23D 9/00* (2006.01)

(52) U.S. Cl. ........................................ 426/601; 800/281

(58) Field of Classification Search .................. 426/601
See application file for complete search history.

(56) References Cited

U.S. PATENT DOCUMENTS

| | | | | |
|---|---|---|---|---|
| 3,925,566 | A | 12/1975 | Reinhart et al. | |
| 3,950,564 | A | 4/1976 | Puski et al. | |
| 3,988,485 | A | 10/1976 | Hibbert et al. | |
| 4,284,656 | A | 8/1981 | Hwa | |
| 5,206,050 | A | 4/1993 | Jennings | |
| 5,494,684 | A | 2/1996 | Cohen | |
| 5,968,809 | A | 10/1999 | Knutzon et al. | |
| 5,972,664 | A | 10/1999 | Knutzon et al. | |
| 6,051,754 | A | 4/2000 | Knutzon | |
| 6,075,183 | A | 6/2000 | Knutzon et al. | |
| 6,136,574 | A | 10/2000 | Knutzon et al. | |
| 6,177,613 | B1 | 1/2001 | Coughlan et al. | |
| 6,187,367 | B1 | 2/2001 | Cho et al. | |
| 6,355,296 | B1 | 3/2002 | Altemueller et al. | |
| 6,410,288 | B1 | 6/2002 | Knutzon et al. | |
| 6,459,018 | B1 | 10/2002 | Knutzon | |
| 7,714,185 | B2 | 5/2010 | Napier et al. | |
| 2008/0194685 | A1* | 8/2008 | Damude et al. | 514/560 |
| 2009/0222951 | A1* | 9/2009 | Cirpus et al. | 800/281 |

FOREIGN PATENT DOCUMENTS

| | | | |
|---|---|---|---|
| WO | WO92/12711 | * | 8/1992 |
| WO | 9846763 | A1 | 10/1998 |
| WO | 9846764 | | 10/1998 |
| WO | 9855625 | A1 | 12/1998 |
| WO | 0012720 | A2 | 3/2000 |
| WO | 0040705 | A2 | 7/2000 |
| WO | 0112800 | A2 | 2/2001 |
| WO | 0208269 | A2 | 1/2002 |
| WO | 0208401 | A2 | 1/2002 |
| WO | 0226946 | A2 | 4/2002 |
| WO | 2004057001 | A2 | 7/2004 |

OTHER PUBLICATIONS

Hui,Y. 1996. Bailey's Industiral Oil and Fat Products, 5$^{th}$ edition, vol. 1. John Wiley & Sons, Inc., New York, p. 24-25.*

Swern, D. 1979. Bailey's Industiral Oil and Fat Products, vol. 1, 4$^{th}$ edition. John Wiley & Sons. New York. p. x, 311, 317, 322, 352, 363, 368, 374, 389, 413, 429.*

U.S. Appl. No. 10/776,889, filed Feb. 11, 2004, Entitled Annexin and P34 Promoters and Use in Expression of Transgenic Genes in Plants.

John J. Harada et al., Soybean Beta-Conglycinin Genes are Clustered in Several DNA Regions and are Regulated by Transcriptions and Posttranscriptions Processes, The Plant Cell, vol. 1:415-425, 1989.

Kathrin Fritsche et al., Isolation and Characterization of a Calendic Acid Producing (8,11)-Linoleoyl Desaturase, FEBS Letters, vol. 462:249-253, 1999.

Andrew Kalinski et al., A Soybean Vacuolar Protein (P34) Related to Thiol Proteases is Synthesized as a Glycoprotein Precursor During Seed Maturation, Journ. of Biol. Chem., vol. 267(17):12068-12076, 1992.

Andrew Kalinski et al., Molecular Cloning of A Protein Associated With Soybean Seed Oil Bodies That is Similar to Thiol Proteases of the Papain Family, Journ. of Biol. Chem., vol. 265 (23):13843-13848, 1990.

Niceprot View of Swiss-Prot Primary Accession No. P48620, Feb. 1996, Omega-3 Fatty Acid Desaturase, Chloroplast, K. Shoji.

Niceprot View of Swiss-Prot Primary Accession No. P48621, Feb. 1996, Omega-3 Fatty Acid Desaturase, Chloroplast, N. S. Yadav et al.

Niceprot View of Swiss-Prot Primary Accession No. P46310, Nov. 1995, Omega-3 Fatty Acid Desaturase, Chloroplast, N. S. Yadav et al.

Niceprot View of Swiss-Prot Primary Accession No. P48619, Feb. 1996, Omega-3 Fatty Acid Desaturase, Chloroplast, Van De Loo, F. et al.

James .G Wallis et al., Polyunsaturated Fatty Acid Synthesis:What Will They Think of Next?, Trends in Biochem. Sci., vol. 27(9):467-473, 2002.

Narendra S. Yadav et al., Cloning of Higher Plant Omega-3 Fatty Acid Desaturases, Plant Phys., vol. 103:467-476, 1993.

Joachim Messing, New M13 Vectors for Cloning, Methods in Enzymol., vol. 101:20-78, 1983.

Mats Ellerstrom et al., Functional Dissection of a Napin Gene Promoter:Identification of Promoter Elements Required for Embryo and Endosperm-Specific Transcription, Plant Mol. Biol., vol. 32:1019-1027, 1996.

(Continued)

*Primary Examiner* — Carolyn Paden

(57) ABSTRACT

Oilseed plants which have been transformed to produce at least 8.0% arachidonic acid (ARA) as well as uses of oils and seeds obtained from such transformed plants in a variety of food and feed applications are described.

12 Claims, 15 Drawing Sheets

OTHER PUBLICATIONS

Aine L. Plant et al, Regulation of an Arabidopsis Oleosin Gene Promoter in Transgenic *Brassica napus*, Plant Mol. Biol., vol. 25:193-205, 1994.

James S. Keddie et al., A Seed-Specific *Brassica napus* Oleosin Promoter Interacts With a G-box-Specific Protein and May Be Bi-Directional, Plant Mol. Biol., vol. 24:327-340, 1994.

Zhang-Liang Chen et al., Regulated Expression of Genes Encoding Soybean Beta-Conglycinins in Transgenic Plants, Developmental Gen., vol. 10:112-122, 1989.

Toshio Sakamoto et al., Cloning of Omega3 Desaturase From Cyanobacteria and Its Use in Altering the Degree of Membrane-Lipid Unsaturation.

Tatsurou Hamada et al., CDNA Cloning of a Wounding-Inducible Gene Encoding a Plastid Omega-3 Fatty Acid Desaturase From Tobacco, Plant Cell Phys., vol. 37(5):606-611, 1996.

John Shanklin et al., Eight Histidine Residues are Catalytically Essential in a Membrane-Associated Iron Enzyme, Stearoyl-COA Desaturase, and are Conserved in Alkane Hydroxylase and Xylene Monooxygenase, Biochem., vol. 33:12787-12794, 1994.

Johnathan A. Napier, Plumbing the Depths of PUFA Biosynthesis:a Novel Polyketide Synthase-like Pathway From Marine Organisms, Trends in Plant Sci., vol. 7(2):51-54.

James P. Spychalla et al., Identification of an Animal Omega-3 Fatty Acid Desaturase by Heterologous Expression in Arabidopsis, PNAS, vol. 94:1142-1147, 1997.

Deluca et al., 1993, Molecular Characterization of Secondary Metabolic Pathways, AG. Biotech News and Information 5(6):225N-229N.

Topfer et al., (1995), Modification of Plant Lipid Synthesis, Science, vol. 268:681-686.

Robert SS., Production of Eicosapentaenoic and Docosahexaenoic Acid-Containing Oils in Transgenic Land Plants for Human and Aquaculture Nutrition, Mar. Biotechnol (NY), Mar.-Apr. 2006; 8(2):103-109.

Drexler et al., 2003, Metabolic Engineering of Fatty Acids for Breeding of New Oilseed Crops:Strategies, Problems and First Results, J. Plant Physiol., vol. 160:779-802.

Voelker et al., 2001, Variations in the Biosynthesis of Seed-Storage Lipids, Annu. Rev. Plant Physiol, Plant Mol Biol., vol. 52:335-361.

Herbers et al., Manipulating Metabolic Partitioning in Transgenic Plants, Trends in Biotechnology, vol. 14(6):198-205, 1996.

Olga V. Sayanova et al., Eicosapentaenoic Acid: Biosynthetic Routes and the Potential for Synthesis in Transgenic Plants, Phytochemistry, vol. 65:147-158, 2004.

Howard G. Damude et al., Engineering Oilseed Plants for a Sustainable, Land-Based Source of Long Chain Polyunsaturated Fatty Acids, DOI 10. 1007/S17745-007-3049-1, 2006.

Johnathan A. Napier et al., Progress Towards the Production of Very Long-Chain Polyunsaturated Fatty Acid in Transgenic Plants: Plant Metabolic Engineering Comes of Age, Physiol. Plant, vol. 126:398-406, 2006.

Guohai Wu et al., Stepwise Engineering to Produce High Yields of Very Long-Chain Polyunsaturated Fatty Acid Plants, Nature Biotechnology, vol. 23(8):1013-1017, Aug. 2005.

Great Britain Patent Application No. GB0229578.0, University of Bristol, Filed December 19, 2002.

Great Britain Patent Application No. GB0316989.3, University of Bristol, Filed July 21, 2003.

Qi et al., Production of Very Long Chain Polyunsaturated Omega-3 and Omega-6 Fatty Acids in Plants, Nature Biotechnology, vol. 22, No. 6 (2004), pp. 739-745.

Vali et al., an Efficient Method for the Purification of Arachidonic Acid From Fungal Single-Cell Oil (ARASCO), JAOCS, vol. 80, No. 7 (2003), pp. 725-730.

Somerville, Future Prospects for Genetic Modification of the Composition of Edible Oils From Higher Plants, Am. J. Clin. Nutr., vol. 58 (Suppl.) (1993), pp. 270S-275S.

Bhella et al., Nucleotide Sequence of a CDNA From *Limnanthes douglassii* L. Encoding a Delta-15 Linoleic Acid Desaturase, Plant Phys., vol. 108 (1995), p. 861.

Berberich et al., Two Maize Genes Encoding Omega-3 Fatty Acid Desaturase and Their Differential Expression to Temperature, Plant. Mol. Biol., vol. 36 (1998), pp. 297-306.

Abbadi et al., Biosynthesis of Very Long Chain Polunsatured Fatty Acids in Transgenic Oil Seeds: Constraints on Their Accumulation, The Plant Cell, vol. 16 (2004) pp. 2734-2748.

Pereira et al., A Novel Omega-3 Fatty Acid Desaturase Involved in the Biosynthesis of Eicosspertanoic Acid, Biochem J., vol. 378 (2004), pp. 665-671.

National Center for Biotechnology Information General Identifier No. 6752906, Accession No. AF222989, Jan. 26, 2000, J. Kwon et al., Structure of two omega-3 fatty acid desaturase cDNA clones from *Capsicum annuum* and their expression patterns.

National Center for Biotechnology Information General Identifier No. 687594, Accession No. U17063, Feb. 3, 1996, R. S. Bhella et al., Nucleotide sequence of a cDNA from *Limnanthes douglasii* L. encoding a delta-15 lineoleic acid desaturase.

National Center for Biotechnology Information General Identifier No. 784869, Accession No. L41807, May 24, 1995, J. P. Spychalla et al., The fat-1 gene of *Caenorhabditis elegans* encodes an omega-3 fatty acid desaturase.

National Center for Biotechnology General Identifier No. 600596, Accession No. D13780, Feb. 3, 1999, T. Sakamoto et al., Cloning of omega 3 desaturase from cyanobacteria and its use in altering the degree of membrane-lipid unsaturation.

National Center for Biotechnology Information General Identifier No. 11691869, Accession No. AJ302017, Dec. 11, 2000, S.A. Richmond, Thesis (2000) Department of Biological Sciences, University of Lancaster, Lancaster, United Kingdom.

National Center for Biotechnology Information General Identifier No. 2446995, Accession No. D63953, Mar. 4, 1998, T. Berberich et al., Two maize genes encoding omega-3 fatty acid desaturase and their differential expression to temperature.

National Center for Biotechnology Information General Identifier No. 6634079, Accession No. AJ245938, Dec. 22, 1999, K. Fritsche et al., Isolation and characterization of a calendic acid producing (8,11)-linoleoyl desaturase.

National Center for Biotechnology Information General Identifier No. 1199562, Accession No. J05560, Sep. 30, 1996, A. Kalinski et al., Molecular cloning of a protein associated with soybean seed oil bodies that is similar to thiol proteases of the papain family.

National Center for Biotechnology Information General Identifier No. 256426, Accession No. S44893, May 8, 1993, J. J. Harada et al., Soybean beta-conglycinin genes are clustered in several DNA regions and are regulated by transcriptional and posttranscriptional processes.

National Center for Biotechnology Information General Identifier No. 1754794, Accession No. U59477, Dec. 28, 1996, S. -K. Lee et al., Cloning of plant omega-3 fatty acid desaturase gene from *Perilla frutescens*.

National Center for Biotechnology Information General Identifier No. 1694624, Accession No. D79979, Feb. 5, 1999, T. Hamada et al., cDNA cloning of a wounding-inducible gene encoding a plastid omega-3 fatty acid desaturase from tobacco.

S. S. Robert, Production of Eicosapentaenoic and Docosahexaenoic Acid-Containing Oils in Transgenic Land Plants for Human and Aquaculture Nutrition, Marine Biotechnology, vol. 8 (2006), pp. 103-109.

* cited by examiner

| Event No. | 16:0 | 18:0 | 18:1 | LA | GLA | ALA | 20:1 (11) | EDA | DGLA |
|---|---|---|---|---|---|---|---|---|---|
| 3338-3-4-6-4 | 9.6 | 7.7 | 9.2 | 4.4 | 7.7 | 1.7 | 1.4 | 1.2 | 14.1 |
| 3338-3-4-2-5 | 15.4 | 9.6 | 5.6 | 4.6 | 12.2 | 2.7 | 1.7 | 1.4 | 16.1 |
| 3338-3-4-1-1 | 12.6 | 8.9 | 9.1 | 6.2 | 16.1 | 4.2 | 2.2 | 1.5 | 14.3 |
| 3338-3-4-2-3 | 13.5 | 9.0 | 7.8 | 4.1 | 15.2 | 4.4 | 2.1 | 0.9 | 13.9 |
| 3343-6-3-6-4 | 11.2 | 6.5 | 10.7 | 4.9 | 16.5 | 3.4 | 0.0 | 0.7 | 17.4 |
| 3343-6-3-3-4 | 14.0 | 6.8 | 7.2 | 5.4 | 19.9 | 3.5 | 0.0 | 1.1 | 14.7 |
| 3343-6-3-6-5 | 14.2 | 6.0 | 8.8 | 6.5 | 21.7 | 3.2 | 0.1 | 1.1 | 15.6 |
| 3343-6-3-2-3 | 14.1 | 7.1 | 12.7 | 7.9 | 18.2 | 4.0 | 0.0 | 1.5 | 12.6 |

Continued from Fig. 9A

| Event No. | ARA | ERA | JUN | ETA | EPA | DPA | Other | Ave. ARA |
|---|---|---|---|---|---|---|---|---|
| 3338-3-4-6-4 | 25.7 | 0.0 | 1.4 | 0.0 | 5.7 | 1.3 | 0.0 | 20.5 |
| 3338-3-4-2-5 | 21.9 | 0.8 | 09 | 0.0 | 3.2 | 0.7 | 1.1 | |
| 3338-3-4-1-1 | 17.6 | 1.4 | 0.7 | 0.0 | 2.7 | 0.5 | 1.2 | |
| 3338-3-4-2-3 | 17.0 | 0.0 | 1.5 | 0.0 | 4.7 | 0.0 | 0.9 | |
| 3343-6-3-6-4 | 22.1 | 0.0 | 0.5 | 0.0 | 2.6 | 0.0 | 0.7 | 19.5 |
| 3343-6-3-3-4 | 20.8 | 0.0 | 0.5 | 0.0 | 2.5 | 1.0 | 0.5 | |
| 3343-6-3-6-5 | 18.6 | 0.0 | 0.4 | 0.0 | 1.7 | 0.2 | 0.5 | |
| 3343-6-3-2-3 | 16.7 | 0.0 | 0.4 | 0.0 | 1.8 | 0.7 | 0.6 | |

FIG. 9B

| Event No. | 16:0 | 18:0 | 18:1 | LA | GLA | ALA | STA | 20:0 |
|---|---|---|---|---|---|---|---|---|
| wild-type (wt) | 8.3 | 2.9 | 15.4 | 30.8 | 0.0 | 20.3 | 0.1 | 1.8 |
| wt pKR451-1 | 8.8 | 2.6 | 15.1 | 25.7 | 8.4 | 15.9 | 2.3 | 1.7 |
| wt pKR451-2 | 9.8 | 3.9 | 13.9 | 13.8 | 14.5 | 9.7 | 3.6 | 1.6 |
| wt pKR451-3 | 10.4 | 3.4 | 13.7 | 20.5 | 7.6 | 14.0 | 2.3 | 1.7 |
| wt pKR451-4 | 11.4 | 4.4 | 12.6 | 8.7 | 18.4 | 7.2 | 5.0 | 1.6 |
| wt pKR451-5 | 11.9 | 3.7 | 14.0 | 15.1 | 14.7 | 8.8 | 3.3 | 1.4 |
| wt pKR451-6 | 10.2 | 3.3 | 14.9 | 19.0 | 12.4 | 11.8 | 2.9 | 1.3 |
| wt pKR451-7 | 10.1 | 3.7 | 14.5 | 19.0 | 11.9 | 10.9 | 2.9 | 1.5 |
| wt pKR451-8 | 10.7 | 3.5 | 16.1 | 12.8 | 18.8 | 9.0 | 4.0 | 1.3 |
| wt pKR451-9 | 9.7 | 3.1 | 14.7 | 23.0 | 6.9 | 15.4 | 2.0 | 1.4 |
| wt pKR451-10 | 12.5 | 4.3 | 15.1 | 8.3 | 17.3 | 6.2 | 4.2 | 1.4 |
| wt pKR451-11 | 9.9 | 3.2 | 17.1 | 26.6 | 2.3 | 16.7 | 0.6 | 1.5 |
| wt pKR451-12 | 8.2 | 3.3 | 18.9 | 21.6 | 7.6 | 10.5 | 1.9 | 1.6 |
| wt pKR451-13 | 8.4 | 4.1 | 13.7 | 14.8 | 13.4 | 10.3 | 3.9 | 2.1 |
| wt pKR451-14 | 8.5 | 3.7 | 14.2 | 17.7 | 10.1 | 11.7 | 3.1 | 2.0 |
| wt pKR451-15 | 8.2 | 3.6 | 14.6 | 23.9 | 5.2 | 16.2 | 1.8 | 2.1 |
| wt pKR451-16 | 7.5 | 3.2 | 16.9 | 28.4 | 0.5 | 18.9 | 0.2 | 2.1 |
| wt pKR451-17 | 8.3 | 3.4 | 13.3 | 16.6 | 13.7 | 12.9 | 4.3 | 1.9 |
| wt pKR451-18 | 8.7 | 3.4 | 11.9 | 22.4 | 7.0 | 15.7 | 2.1 | 2.1 |
| wt pKR451-19 | 9.0 | 3.3 | 12.3 | 18.5 | 11.3 | 10.9 | 3.0 | 2.0 |
| wt pKR451-20 | 8.1 | 2.8 | 13.5 | 30.6 | 0.5 | 20.6 | 0.1 | 2.1 |

Continued from Fig. 11A

| Event No. | 20:1 (11) | EDA | DGLA | ARA | ERA | ETA | EPA |
|---|---|---|---|---|---|---|---|
| wild-type (wt) | 18.1 | 1.8 | 0.0 | 0.0 | 0.5 | 0.0 | 0.0 |
| wt pKR451-1 | 17.1 | 1.8 | 0.0 | 0.0 | 0.5 | 0.0 | 0.0 |
| wt pKR451-2 | 14.1 | 2.1 | 7.0 | 2.6 | 1.2 | 1.7 | 0.5 |
| wt pKR451-3 | 14.4 | 2.2 | 3.7 | 3.1 | 1.2 | 1.1 | 0.6 |
| wt pKR451-4 | 13.2 | 2.2 | 9.2 | 2.2 | 1.4 | 2.1 | 0.4 |
| wt pKR451-5 | 13.0 | 1.6 | 7.7 | 2.1 | 0.8 | 1.7 | 0.3 |
| wt pKR451-6 | 13.5 | 1.5 | 4.9 | 2.2 | 0.7 | 1.1 | 0.4 |
| wt pKR451-7 | 13.4 | 1.9 | 5.2 | 2.2 | 1.0 | 1.3 | 0.4 |
| wt pKR451-8 | 12.9 | 1.2 | 6.7 | 0.8 | 0.5 | 1.4 | 0.1 |
| wt pKR451-9 | 14.1 | 2.1 | 3.0 | 2.1 | 1.2 | 0.8 | 0.4 |
| wt pKR451-10 | 11.4 | 2.0 | 9.4 | 3.8 | 1.3 | 2.1 | 0.6 |
| wt pKR451-11 | 15.5 | 1.8 | 2.8 | 0.9 | 0.6 | 0.5 | 0.1 |
| wt pKR451-12 | 14.7 | 2.6 | 4.2 | 2.4 | 1.0 | 1.0 | 0.3 |
| wt pKR451-13 | 15.6 | 2.8 | 5.0 | 2.4 | 1.6 | 1.4 | 0.5 |
| wt pKR451-14 | 15.3 | 2.9 | 4.6 | 2.7 | 1.5 | 1.4 | 0.5 |
| wt pKR451-15 | 17.5 | 2.2 | 2.1 | 0.9 | 0.9 | 0.7 | 0.2 |
| wt pKR451-16 | 19.5 | 1.9 | 0.2 | 0.1 | 0.5 | 0.1 | 0.0 |
| wt pKR451-17 | 16.7 | 2.3 | 3.2 | 1.2 | 1.2 | 0.9 | 0.2 |
| wt pKR451-18 | 15.1 | 3.2 | 3.2 | 2.2 | 1.8 | 0.9 | 0.4 |
| wt pKR451-19 | 14.5 | 3.1 | 4.9 | 3.8 | 1.5 | 1.3 | 0.6 |
| wt pKR451-20 | 18.2 | 2.3 | 0.3 | 0.3 | 0.7 | 0.1 | 0.0 |

| Event No. | 16:0 | 18:0 | 18:1 | LA | GLA | ALA | STA | 20:0 |
|---|---|---|---|---|---|---|---|---|
| fad3/fae1 (ff) | 9.8 | 3.0 | 28.5 | 55.4 | 0.0 | 1.6 | 0.2 | 0.7 |
| ff pKR451-1 | 8.5 | 4.9 | 21.4 | 20.4 | 19.4 | 0.7 | 0.4 | 0.9 |
| ff pKR451-2 | 8.7 | 4.3 | 22.4 | 31.8 | 13.0 | 0.9 | 0.3 | 0.9 |
| ff pKR451-3 | 8.8 | 4.2 | 23.9 | 34.5 | 11.4 | 1.1 | 0.3 | 0.9 |
| ff pKR451-4 | 9.9 | 4.4 | 18.6 | 21.3 | 15.6 | 1.2 | 0.6 | 1.0 |
| ff pKR451-5 | 8.1 | 4.1 | 27.2 | 32.0 | 12.7 | 0.7 | 0.2 | 0.8 |
| ff pKR451-6 | 8.0 | 3.3 | 32.6 | 49.7 | 1.5 | 1.2 | 0.0 | 0.8 |

Continued from Fig. 11C

| Event No. | 20:1 (11) | EDA | DGLA | ARA | ERA | ETA | EPA |
|---|---|---|---|---|---|---|---|
| fad3/fae1 (ff) | 0.4 | 0.2 | 0.0 | 0.0 | 0.0 | 0.0 | 0.2 |
| ff pKR451-1 | 4.0 | 4.0 | 9.1 | 5.8 | 0.2 | 0.2 | 0.0 |
| ff pKR451-2 | 2.5 | 3.1 | 6.9 | 4.7 | 0.2 | 0.1 | 0.0 |
| ff pKR451-3 | 2.5 | 3.7 | 5.7 | 2.6 | 0.2 | 0.2 | 0.0 |
| ff pKR451-4 | 2.8 | 4.7 | 11.9 | 7.0 | 0.4 | 0.4 | 0.1 |
| ff pKR451-5 | 2.5 | 2.4 | 6.1 | 3.0 | 0.1 | 0.1 | 0.0 |
| ff pKR451-6 | 0.7 | 0.6 | 0.9 | 0.4 | 0.0 | 0.0 | 0.2 |

FIG. 11D

| Event No. | 16:0 | 18:0 | 18:1 | LA | GLA | ALA | STA | 20:0 |
|---|---|---|---|---|---|---|---|---|
| wild-type (wt) | 8.3 | 2.9 | 15.4 | 30.8 | 0.0 | 20.3 | 0.1 | 1.8 |
| wt pKR451-1-6-1 | 11.3 | 5.3 | 8.5 | 2.9 | 20.7 | 2.2 | 5.5 | 1.8 |
| wt pKR451-1-6-2 | 9.7 | 4.0 | 13.5 | 10.9 | 18.9 | 8.5 | 4.3 | 1.6 |
| wt pKR451-1-6-3 | 9.3 | 3.9 | 13.7 | 14.2 | 15.6 | 10.7 | 3.8 | 1.7 |
| wt pKR451-1-6-4 | 9.1 | 3.7 | 13.1 | 13.5 | 16.7 | 11.1 | 4.3 | 1.6 |
| wt pKR451-1-6-5 | 10.6 | 4.7 | 11.0 | 5.2 | 22.3 | 4.2 | 5.6 | 1.5 |
| wt pKR451-1-6-6 | 9.2 | 4.0 | 13.5 | 11.8 | 18.2 | 8.9 | 4.0 | 1.7 |
| wt pKR451-1-6-7 | 10.4 | 5.4 | 10.5 | 4.6 | 20.5 | 3.4 | 5.4 | 1.8 |
| wt pKR451-1-6-8 | 9.4 | 4.1 | 12.7 | 10.9 | 19.7 | 9.1 | 4.8 | 1.7 |
| wt pKR451-1-6-9 | 10.9 | 5.2 | 11.4 | 5.3 | 21.0 | 3.7 | 5.1 | 1.7 |

Continued from Fig. 12A

| Event No. | 20:1 (11) | EDA | DGLA | ARA | ERA | ETA | EPA |
|---|---|---|---|---|---|---|---|
| wild-type (wt) | 18.1 | 1.8 | 0.0 | 0.0 | 0.5 | 0.0 | 0.0 |
| wt pKR451-1-6-1 | 10.1 | 3.5 | 13.1 | 8.0 | 2.5 | 3.3 | 1.3 |
| wt pKR451-1-6-2 | 13.3 | 1.9 | 7.9 | 2.1 | 1.1 | 1.8 | 0.4 |
| wt pKR451-1-6-3 | 14.4 | 2.0 | 6.0 | 1.9 | 1.0 | 1.5 | 0.4 |
| wt pKR451-1-6-4 | 14.5 | 1.8 | 6.0 | 1.6 | 0.9 | 1.5 | 0.3 |
| wt pKR451-1-6-5 | 10.9 | 2.8 | 12.6 | 3.1 | 1.9 | 3.0 | 0.5 |
| wt pKR451-1-6-6 | 14.5 | 2.0 | 7.5 | 1.7 | 1.1 | 1.7 | 0.3 |
| wt pKR451-1-6-7 | 11.0 | 3.5 | 12.5 | 4.7 | 2.5 | 3.1 | 0.8 |
| wt pKR451-1-6-8 | 13.8 | 1.9 | 6.9 | 1.9 | 1.0 | 1.7 | 0.4 |
| wt pKR451-1-6-9 | 9.6 | 3.4 | 13.6 | 3.5 | 2.2 | 3.0 | 0.5 |

FIG. 12B

Omega-3 Fatty Acids

| Common Name | Lipid Name | Chemical Name |
|---|---|---|
| a-linolenic acid (ALA) | 18:3 (n-3) | octadeca-9, 12, 15-trienoic acid |
| stearidonic acid | 18:4 (n-3) | octadeca-6, 9, 12, 15-tetraenoic acid |
| eicosatetraenoic acid | 20:4 (n-3) | eicosa-8, 11, 14, 17-tetraenoic acid |
| eicosapentaenoic acid (EPA) | 20:5 (n-3) | eicosa-5, 8, 11, 14, 17-pentaenoic acid |
| docosapentaenoic acid | 22:5 (n-3) | docosa-7, 10, 13, 16, 19-pentaenoic acid |
| docosahexaenoic acid (DHA) | 22:6 (n-3) | docosa-4, 7, 10, 13, 16, 19-hexaenoic acid |

Omega-6 Fatty Acids

| Common Name | Lipid Name | Chemical Name |
|---|---|---|
| linoleic acid | 18:2 (n-6) | 9, 12-octadecadienoic acid |
| gamma-linolenic acid (GLA) | 18:3 (n-6) | 6, 9, 12-octadecatrienoic acid |
| eicosadienoic acid | 20:2 (n-6) | 11, 14-eicosadienoic acid |
| dihomo-gamma-linolenic acid | 20:3 (n-6) | 8, 11, 14-eicosatrienoic acid |
| arachidonic acid (ARA) | 20:4 (n-6) | 5, 8, 11, 14-eicosatetraenoic acid |
| docosadienoic acid | 22:2 (n-6) | 13, 16-docosadienoic acid |
| adrenic acid | 22:4 (n-6) | 7, 10, 13, 16-docosatetraenoic acid |
| docosapentaenoic acid | 22:5 (n-6) | 4, 7, 10, 13, 16-docosapentaenoic acid |

FIG. 13

PRODUCTION OF VERY LONG CHAIN POLYUNSATURATED FATTY ACIDS IN OIL SEED PLANTS

This application is a continuation-in part-of application Ser. No. 11/624,777 filed Jan. 19, 2007, pending, which is a continuation of application Ser. No. 10/776,311 filed Feb. 11, 2004 which claims the priority benefit of Provisional Application No. 60/446,941, filed Feb. 12, 2003, now abandoned, the contents of which are hereby incorporated in their entirety.

FIELD OF THE INVENTION

This invention is in the field of biotechnology. More specifically, his invention pertains to oilseed plants which have been transformed to produce high levels of arachidonic acid (an omega-6 fatty acid).

BACKGROUND OF THE INVENTION

Lipids/fatty acids are water-insoluble organic biomolecules that can be extracted from cells and tissues by nonpolar solvents such as chloroform, ether or benzene. Lipids have several important biological functions, serving (1) as structural components of membranes, (2) as storage and transport forms of metabolic fuel, (3) as a protective coating on the surface of many organisms, and (4) as cell-surface components concerned in cell recognition, species specificity and tissue immunity.

The human body is capable of producing most of the fatty acids which it requires to function. Two long chain polyunsaturated fatty acids, eicosapentaenoic acid (EPA) and docosahexaenoic acid (DHA), however, cannot be synthesized efficiently by the human body and, thus, have to be supplied through the diet. Since the human body cannot produce adequate quantities of these polyunsaturated fatty acids, they are called essential fatty acids.

PUFAs are important components of the plasma membrane of the cell, where they may be found in such forms as phospholipids and also can be found in triglycerides. PUFAs also serve as precursors to other molecules of importance in human beings and animals, including the prostacyclins, leukotrienes and prostaglandins. There are two main families of polyunsaturated fatty acids (PUFAs), specifically, the omega-3 fatty acids and the omega-6 fatty acids.

DHA is a fatty acid of the omega-3 series according to the location of the last double bond in the methyl end. It is synthesized via alternating steps of desaturation and elongation. Production of DHA is important because of its beneficial effect on human health. Currently the major sources of DHA are oils from fish and algae.

EPA and arachidonic acid (AA) are both delta-5 essential fatty acids. EPA belongs to the omega-3 series with five double bonds in the acyl chain, is found in marine food, and is abundant in oily fish from the North Atlantic. AA belongs to the omega-6 series with four double bonds. The lack of a double bond in the omega-3 position confers on AA different properties than those found in EPA. The eicosanoids produced from AA have strong inflammatory and platelet aggregating properties, whereas those derived from EPA have anti-inflammatory and anti-platelet aggregating properties. AA can be obtained from some foods such as meat, fish, and eggs, but the concentration is low.

Gamma-linolenic acid (GLA) is another essential fatty acid found in mammals. GLA is the metabolic intermediate for very long chain omega-6 fatty acids and for various active molecules. In mammals, formation of long chain PUFAs is rate-limited by delta-6 desaturation. Many physiological and pathological conditions such as aging, stress, diabetes, eczema, and some infections have been shown to depress the delta-6 desaturation step. In addition, GLA is readily catabolized from the oxidation and rapid cell division associated with certain disorders, e.g., cancer or inflammation.

Arachidonic acid (ARA; cis-5,8,11,14-eicosatetraenoic; an omega-6 fatty acid) is an important precursor in the production of eicosanoids (e.g., prostaglandins, thromboxanes, prostacyclin and leukotrienes). Additionally, ARA is recognized as: (1) an essential long-chain polyunsaturated fatty acid (PUFA); (2) the principal omega-6 fatty acid found in the human brain; and, (3) an important component of breast milk and many infant formulas, based on its role in early neurological and visual development. Adults obtain ARA readily from the diet in foods such as meat, eggs and milk and can also inefficiently synthesize ARA from dietary gamma-linolenic acid. Commercial sources of ARA oil are typically produced from highly refined and purified fish oil or fermentation (e.g., using microorganisms in the genera *Mortierella* (filamentous fungus), *Entomophthora, Pythium* and *Porphyridium* (red alga)). Most notably, Martek Biosciences Corporation (Columbia, Md.) produces an ARA-containing fungal oil (ARASCO®; see U.S. Pat. No. 5,658,767) which is substantially free of EPA and which is derived from either *Mortierella alpina* or *Pythium insidiuosum*. One of the primary markets for this oil is infant formula.

Research has shown that omega-3 fatty acids reduce the risk of heart disease as well as having a positive effect on children's development. Results have been disclosed indicating the positive effect of these fatty acids on certain mental illnesses, autoimmune diseases and joint complaints. Thus, there are many health benefits associated with a diet supplemented with these fatty acids.

Unfortunately, there are several disadvantages associated with commercial production of PUFAs from natural sources. Natural sources of PUFAs, such as animals and plants, tend to have highly heterogeneous oil compositions. The oils obtained from these sources can require extensive purification to separate out one or more desired PUFAs or to produce an oil which is enriched in one or more PUFAs. Natural sources also are subject to uncontrollable fluctuations in availability. Fish stocks may undergo natural variation or may be depleted by overfishing. Fish oils have unpleasant tastes and odors which may be difficult, if not impossible, to economically separate from the desired product, and can render such products unacceptable as food supplements. Animal oils and, in particular, fish oils, can accumulate environmental pollutants. Weather and disease can cause fluctuation in yields from both fish and plant sources.

An expansive supply of polyunsaturated fatty acids from natural sources and from chemical synthesis are not sufficient for commercial needs. Therefore, it is of interest to find alternative means to allow production of commercial quantities of PUFAs. Biotechnology offers an attractive route for producing LCPUFAs in a safe, cost efficient manner.

WO 02/26946, published Apr. 4, 2002, describes isolated nucleic acid molecules encoding FAD4, FAD5, FAD5-2 and FAD6 fatty acid desaturase family members which are expressed in LCPUFA-producing organisms, e.g., *Thraustochytrium, Pythium irregulare, Schizichytrium* and *Crypthecodinium*. It is indicated that constructs containing the desaturase genes can be used in any expression system including plants, animals, and microorganisms for the production of cells capable of producing LCPUFAs.

WO 02/26946, published Apr. 4, 2002, describes FAD4, FAD5, FAD5-2, and FAD6 fatty acid desaturase members and uses thereof to produce long chain polyunsaturated fatty acids.

WO 98/55625, published Dec. 19, 1998, describes the production of polyunsaturated fatty acids by expression of polyketide-like synthesis genes in plants.

WO 98/46764, published Oct. 22, 1998, describes compositions and methods for preparing long chain fatty acids in plants, plant parts and plant cells which utilize nucleic acid sequences and constructs encoding fatty acid desaturases, including delta-5 desaturases, delta-6 desaturases and delta-12 desaturases.

U.S. Pat. No. 6,075,183, issued to Knutzon et al. on Jun. 13, 2000, describes methods and compositions for synthesis of long chain polyunsaturated fatty acids in plants.

U.S. Pat. No. 6,459,018, issued to Knutzon on Oct. 1, 2002, describes a method for producing stearidonic acid in plant seed utilizing a construct comprising a DNA sequence encoding a delta-six desaturase.

Spychalla et al., *Proc. Natl. Acad. Sci. USA*, Vol. 94, 1142-1147 (Feb. 1997), describes the isolation and characterization of a cDNA from *C. elegans* that, when expressed in *Arabidopsis*, encodes a fatty acid desaturase which can catalyze the introduction of an omega-3 double bond into a range of 18- and 20-carbon fatty acids.

SUMMARY OF THE INVENTION

The invention includes an oilseed plant that produces mature seeds in which the total seed fatty acid profile comprises at least 8.0% arachidonic acid.

Also of interest are seeds obtained from such plants and oil obtained from the seeds of such plants.

In a another embodiment, the present invention concerns a food product, beverage, infant formula, nutritional supplement, pet food, aquaculture feed, or animal feed which has incorporated therein the oil of the invention as well as pet food, animal feed, and aquaculture feed which has incorporated therein the seed of the invention. Also of interest are whole bean products made from or incorporating the seed of the invention.

In a still further aspect, the present invention concerns products obtained from the hydrogenation, fractionation, interesterification or hydrolysis of the oil of the invention as well as by-products or partially processed products obtained during the production of this oil.

BIOLOGICAL DEPOSITS

The following plasmids have been deposited with the American Type Culture Collection (ATCC), 10801 University Boulevard, Manassas, Va. 20110-2209, and bears the following designation, accession number and date of deposit.

| Plasmid | Accession Number | Date of Deposit |
|---|---|---|
| pKR274 | ATCC PTA-4988 | Jan. 30, 2003 |
| pKR275 | ATCC PTA-4989 | Jan. 30, 2003 |
| pKR357 | ATCC PTA-4990 | Jan. 30, 2003 |
| pKR365 | ATCC PTA-4991 | Jan. 30, 2003 |
| pKKE2 | ATCC PTA-4987 | Jan. 30, 2003 |

BRIEF DESCRIPTION OF THE DRAWINGS AND SEQUENCE LISTINGS

The invention can be more fully understood from the following detailed description and the accompanying drawings and Sequence Listing, which form a part of this application.

The sequence descriptions summarize the Sequences Listing attached hereto. The Sequence Listing contains one letter codes for nucleotide sequence characters and the single and three letter codes for amino acids as defined in the IUPAC-IUB standards described in *Nucleic Acids Research* 13:3021-3030 (1985) and in the *Biochemical Journal* 219 (No. 2):345-373 (1984).

FIG. 9 shows the fatty acid profiles for seed from events 3338-3-4 and 3343-6-3 which have the highest levels of arachidonic acid.

FIG. 11 shows the lipid profiles of T2 bulk seed for the 20 wild-type-transformed events, 6 fad3/fae1-transformed events as well as for a representative untransformed wt and fad3/fae1 event.

FIG. 12 shows the bulk T3 seed fatty acid profiles for *Arabidopsis* wild-type seed transformed with *Arabidopsis* expression vector pKR451.

FIG. 13 shows a table listing omega-3 fatty acids and a table listing omega-6 fatty acids.

Figure 1:
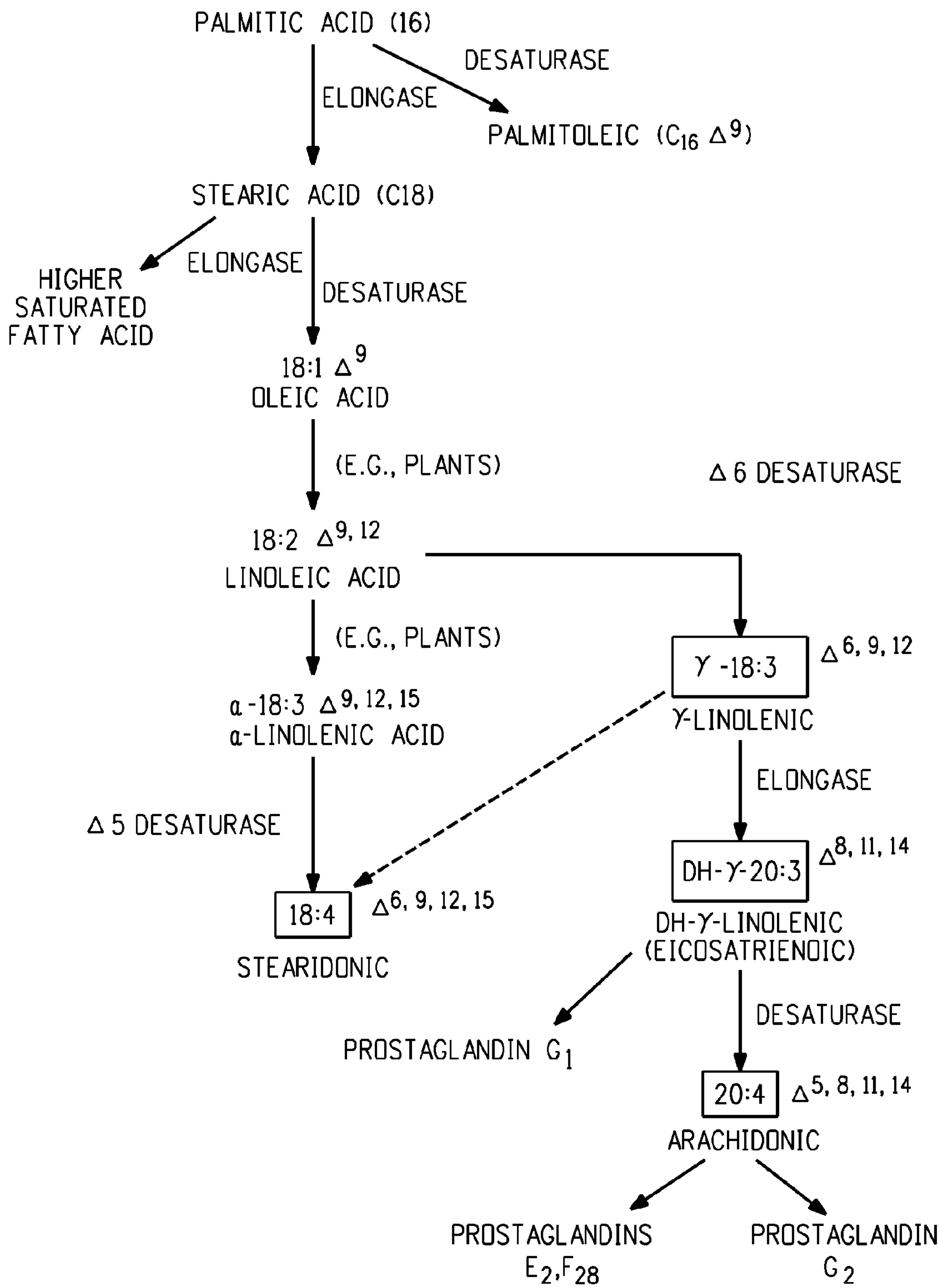
FIG. 1 shows possible biosynthetic pathways for PUFAs.
Figure 2:
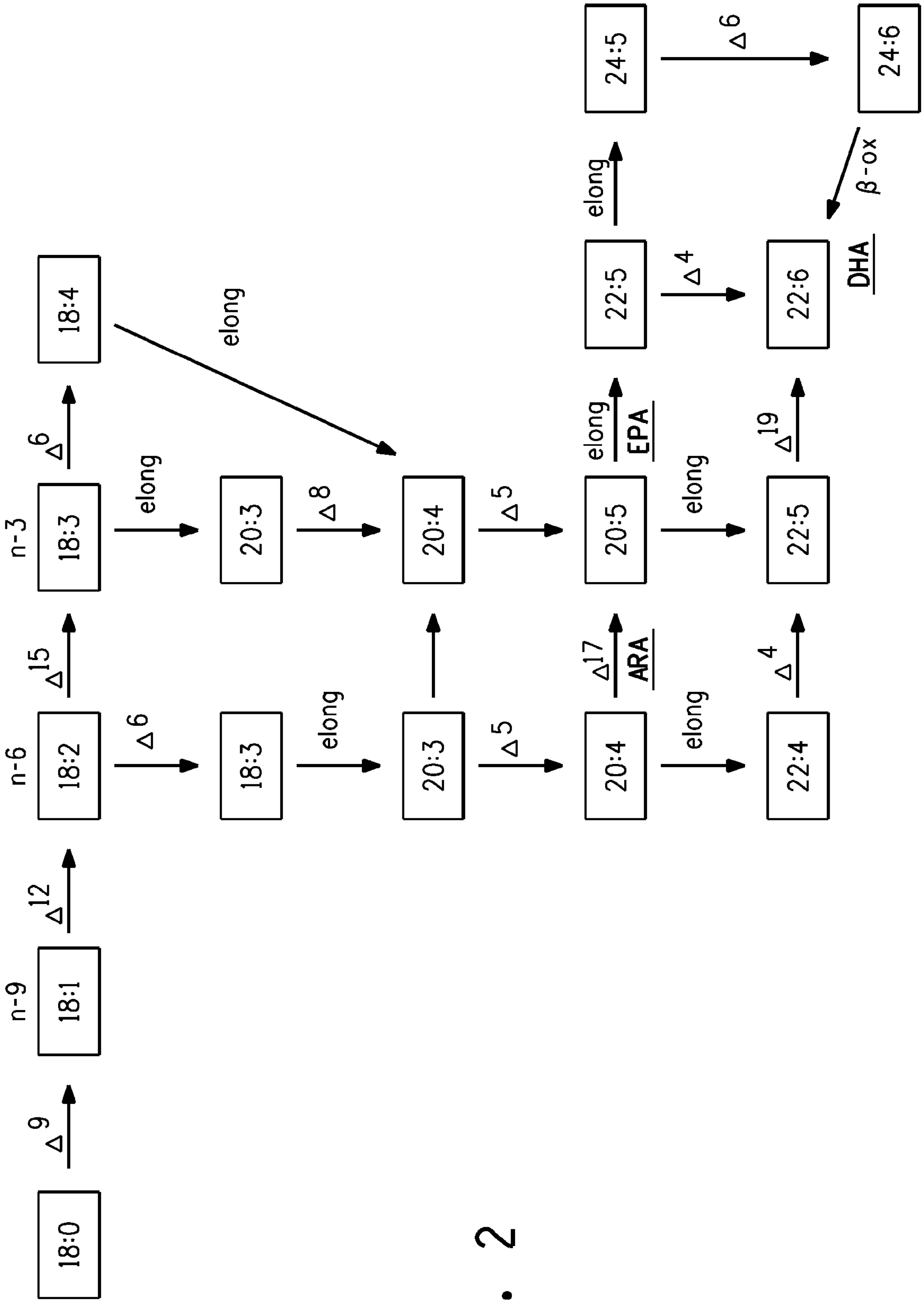
FIG. 2 shows possible pathways for production of LC-PUFAs included EPA and DHA compiled from a variety of organisms.

SEQ. ID NO:1 sets forth oligonucleotide primer GSP1 used to amplify the soybean annexin promoter.

SEQ. ID NO:2 sets forth oligonucleotide primer GSP2 used to amplify the soybean annexin promoter.

SEQ. ID NO:3 sets forth the sequence of the annexin promoter.

SEQ. ID NO:4 sets forth oligonucleotide primer GSP3 used to amplify the soybean BD30 promoter.

SEQ. ID NO:5 sets forth oligonucleotide primer GSP4 used to amplify the soybean BD30 promoter.

SEQ. ID NO:6 sets forth the sequence of the soybean BD30 promoter.

SEQ. ID NO:7 sets forth the sequence of the soybean β-conglycinin β-subunit promoter.

SEQ. ID NO:8 sets forth oligonucleotide primer β-con oligo Bam used to amplify the promoter for soybean β-conglycinin β-subunit.

SEQ. ID NO:9 sets forth oligonucleotide primer β-con oligo Not used to amplify the promoter for soybean β-conglycinin β-subunit.

SEQ. ID NO:10 sets forth the sequence of the soybean glycinin Gly-1 promoter.

SEQ. ID NO:11 sets forth oligonucleotide primer glyoligo Bam used to amplify the Gly-1 promoter.

SEQ. ID NO:12 sets forth oligonucleotide primer glyoligo Not used to amplify the Gly-1 promoter.

SEQ. ID NO:13 sets forth oligonucleotide primer oCGR5-1.

SEQ. ID NO:14 sets forth oligonucleotide primer oCGR5-2.

SEQ. ID NO:15 sets forth oligonucleotide primer oSAlb-9.

SEQ. ID NO:16 sets forth oligonucleotide primer oSAlb-3.

SEQ. ID NO:17 sets forth oligonucleotide primer oSAlb-4.

SEQ. ID NO:18 sets forth oligonucleotide primer oSAlb-2.

SEQ. ID NO:19 sets forth oligonucleotide primer Leg-Pro5'.

SEQ. ID NO:20 sets forth oligonucleotide primer Leg-Pro3'.

SEQ. ID NO:21 sets forth oligonucleotide primer Leg-Term5'.

SEQ. ID NO:22 sets forth oligonucleotide primer Leg-Term3'.

SEQ. ID NO:23 sets forth oligonucleotide primer oKTi5.

SEQ. ID NO:24 sets forth oligonucleotide primer oKTi6.

SEQ. ID NO:25 sets forth oligonucleotide primer LegA1Pro5'.

SEQ. ID NO:26 sets forth oligonucleotide primer LegA1Pro3'.

SEQ. ID NO:27 sets forth oligonucleotide primer LegA1Term5'.

SEQ. ID NO:28 sets forth oligonucleotide primer LegA1Term3'.

SEQ. ID NO:29 sets forth oligonucleotide primer annreamp5'.

SEQ. ID NO:30 sets forth oligonucleotide primer annreamp3'.

SEQ. ID NO:31 sets forth oligonucleotide primer BD30 reamp5'.

SEQ. ID NO:32 sets forth oligonucleotide primer BD30 reamp3'.

SEQ. ID NO:33 sets forth the sequence of the gene for *Mortierella alpina* delta-6 desaturase.

SEQ. ID NO:34 sets forth the protein sequence of the *Mortierella alpina* delta-6 desaturase.

SEQ. ID NO:35 sets forth the sequence of the gene for *Saprolegnia diclina* delta-6 desaturase.

SEQ. ID NO:36 sets forth the protein sequence of the *Saprolegnia diclina* delta-6 desaturase.

SEQ. ID NO:37 sets forth the sequence of the gene for *Saprolegnia diclina* delta-5 desaturase.

SEQ. ID NO:38 sets forth the protein sequence of the *Saprolegnia diclina* delta-5 desaturase.

SEQ. ID NO:39 sets forth the sequence of the gene for *Thraustochytrium aureum* elongase.

SEQ. ID NO:40 sets forth the protein sequence of the *Thraustochytrium aureum* elongase.

SEQ. ID NO:41 sets forth the sequence of the gene for *Saprolegnia diclina* delta-17 desaturase.

SEQ. ID NO:42 sets forth the protein sequence of the *Saprolegnia diclina* delta-17 desaturase.

SEQ. ID NO:43 sets forth the sequence of the gene for *Mortierella alpina* elongase.

SEQ. ID NO:44 sets forth the protein sequence of the *Mortierella alpina* elongase.

SEQ. ID NO:45 sets forth the sequence of the gene for *Mortierella alpina* delta-5 desaturase.

SEQ. ID NO:46 sets forth the protein sequence of the *Mortierella alpina* delta-5 desaturase.

SEQ. ID NO:47 sets forth the sequence of At FAD3, the gene for *Arabidopsis thaliana* delta-15 desaturase.

SEQ. ID NO:48 sets forth the protein sequence of the *Arabidopsis thaliana* delta-15 desaturase.

SEQ. ID NO:49 sets forth the sequence of the gene for *Pavlova* sp. elongase.

SEQ. ID NO:50 sets forth the protein sequence of the *Pavlova* sp. elongase.

SEQ. ID NO:51 sets forth the sequence of the gene for *Schizochytrium aggregatum* delta-4 desaturase.

SEQ. ID NO:52 sets forth the protein sequence of the *Schizochytrium aggregatum* delta-4 desaturase.

SEQ. ID NO:53 sets forth oligonucleotide primer RSP19F.

SEQ. ID NO:54 sets forth oligonucleotide primer RSP19R.

SEQ. ID NO:55 sets forth oligonucleotide primer RBP2F.

SEQ. ID NO:56 sets forth oligonucleotide primer RBP2R.

SEQ. ID NO:57 sets forth oligonucleotide primer CGR4F.

SEQ. ID NO:58 sets forth oligonucleotide primer CGR4R.

SEQ. ID NO:59 sets forth oligonucleotide primer oSGly-1.

SEQ. ID NO:60 sets forth oligonucleotide primer oSGly-2.

SEQ. ID NO:61 sets forth consensus desaturase Protein Motif 1.

SEQ. ID NO:62 sets forth oligonucleotide primer RO1144.

SEQ. ID NO:63 sets forth consensus desaturase Protein Motif 2.

SEQ. ID NO:64 sets forth oligonucleotide primer RO1119.

SEQ. ID NO:65 sets forth oligonucleotide primer RO1118.

SEQ. ID NO:66 sets forth consensus desaturase Protein Motif 3.

SEQ. ID NO:67 sets forth oligonucleotide primer RO1121.

SEQ. ID NO:68 sets forth oligonucleotide primer RO1122.

SEQ. ID NO:69 sets forth consensus desaturase Protein Motif 4.

SEQ. ID NO:70 sets forth oligonucleotide primer RO1146.

SEQ. ID NO:71 sets forth oligonucleotide primer RO1147.

SEQ. ID NO:72 sets forth consensus desaturase Protein Motif 5.

SEQ. ID NO:73 sets forth oligonucleotide primer RO1148.

SEQ. ID NO:74 sets forth consensus desaturase Protein Motif 6.

SEQ. ID NO:75 sets forth oligonucleotide primer RO1114.

SEQ. ID NO:76 sets forth consensus desaturase Protein Motif 7.

SEQ. ID NO:77 sets forth oligonucleotide primer RO1116.

SEQ. ID NO:78 sets forth consensus desaturase Protein Motif 8.

SEQ. ID NO:80 sets forth oligonucleotide primer RO1189.

SEQ. ID NO:81 sets forth oligonucleotide primer RO1190.

SEQ. ID NO:82 sets forth oligonucleotide primer RO1191.

SEQ. ID NO:83 sets forth oligonucleotide primer RO898.

SEQ. ID NO:84 sets forth oligonucleotide primer RO899.

SEQ. ID NO:85 sets forth oligonucleotide primer RO1185.

SEQ. ID NO:86 sets forth oligonucleotide primer RO1186.

SEQ. ID NO:87 sets forth oligonucleotide primer RO1187.

SEQ. ID NO:88 sets forth oligonucleotide primer RO1212.

SEQ. ID NO:89 sets forth oligonucleotide primer RO1213.

SEQ. ID NO:90 sets forth the sequence of the expression cassette that comprises the constitutive soybean S-adenosylmethionine synthetase (SAMS) promoter operably linked to a gene for a form of soybean acetolactate synthase (ALS) that is capable of conferring resistance to sulfonylurea herbicides.

SEQ. ID NO:91 sets forth oligonucleotide primer oSBD30-1.

SEQ. ID NO:92 sets forth oligonucleotide primer oSBD30-2.

SEQ. ID NO:93 sets forth oligonucleotide primer T7pro.

SEQ. ID NO:94 sets forth oligonucleotide primer RO1327.

SEQ. ID NO:95 sets forth oligonucleotide primer GenRacer3'.

SEQ. ID NO:96 sets forth oligonucleotide primer oCal-26.

SEQ. ID NO:97 sets forth oligonucleotide primer oCal-27.

SEQ. ID NO:98 sets forth oligonucleotide primer oKTi7.

SEQ. ID NO:99 sets forth the sequence of plasmid pK275.

SEQ. ID NO:100 sets forth the sequence of plasmid pKKE2.

SEQ. ID NO:101 sets forth the sequence of plasmid KS123.

SEQ. ID NO:102 sets forth the sequence of the DNA fragment cal a24-4.

SEQ. ID NO:103 sets forth oligonucleotide primer oCal-15.

SEQ. ID NO:104 sets forth oligonucleotide primer oCal-6.

SEQ. ID NO:105 sets forth the sequence of plasmid pKR53B.

SEQ. ID NO:106 sets forth the sequence of plasmid pKR85.

SEQ. ID NO:107 sets forth oligonucleotide primer oKR85-1.

SEQ. ID NO:108 sets forth oligonucleotide primer oKR85-2.

SEQ. ID NO:109 sets forth the sequence of plasmid pPCR85.

SEQ. ID NO:110 sets forth the sequence of plasmid pKR91.

SEQ. ID NO:111 sets forth the sequence of plasmid pKR92.

SEQ. ID NO:112 sets forth the sequence of plasmid pKR274.

SEQ. ID NO:113 sets forth the sequence of plasmid pKR451.

SEQ. ID NO:114 sets forth the sequence of plasmid pKR72.

DETAILED DESCRIPTION OF THE INVENTION

All patents, patent applications, and publications cited are incorporated herein by reference in their entirety.

As used herein and in the appended claims, the singular forms “a”, “an”, and “the” include plural reference unless the context clearly dictates otherwise. Thus, for example, reference to “a plant” includes a plurality of such plants, reference to “a cell” includes one or more cells and equivalents thereof known to those skilled in the art, and so forth.

In the context of this disclosure, a number of terms shall be utilized.

Fatty acids are described herein by a numbering system in which the number before the colon indicates the number of carbon atoms in the fatty acid, whereas the number after the colon is the number of double bonds that are present. The number following the fatty acid designation indicates the position of the double bond from the carboxyl end of the fatty acid with the “c” affix for the cis-configuration of the double bond, e.g., palmitic acid (16:0), stearic acid (18:0), oleic acid (18:1, 9c), petroselinic acid (18:1, 6c), linoleic acid (18:2, 9c, 12c), γ-linolenic acid (18:3, 6c, 9c, 12c) and α-linolenic acid (18:3, 9c, 12c, 15c). Unless otherwise specified 18:1, 18:2 and 18:3 refer to oleic, linoleic and linolenic fatty acids.

“Omega-3 fatty acid” (also referred to as an n-3 fatty acid) includes the essential fatty acid α-linolenic acid (18:3n-3) (ALA) and its long-chain metabolites. In n-3 fatty acids, the first double bond is located at the third carbon from the methyl end of the hydrocarbon chain. For n-6 fatty acids, it is located at the sixth carbon. Eicosapentaneoic acid (EPA), docosapentaenoic acid (DPA), and docosahexanenoic acid (DHA) are examples of omega-3 fatty acids.

Omega-3 fatty acids are a family of polyunsaturated fatty acids which have in common a carbon-carbon double bond in the omega-3 position. The term omega-3 (“n-3, “ω-3) signifies that the first double bond exists as the third carbon-carbon bond from the terminal methyl end (omega) of the carbon chain. Important omega-3 fatty acids in nutrition are the following: alpha-linlenic acid (ALA), eicosapentaenoic acid (EPA) and docosahexaenoic acid (DHA). The human body cannot synthesize omega-3 fatty acids de novo, but can synthesize all the other necessary omega-3 fatty acids from the simpler omega-3 fatty acid ALA. Therefore, ALA is an essential nutrient which must be obtained from food, and the other omega-3 fatty acids which can be either synthesized from it within the body or obtained from food are sometimes also referred to as essential nutrients. FIG. 13 lists omega-3 fatty acids.

Omega-6 fatty acids are fatty acids where the term “omega-6” signifies that the first double bond in the carbon backbone of the fatty acid, occurs in the omega minus 6 position; that is, the sixth carbon from the end of the fatty acid. Linoleic acid (18:2), the shortest chain omega-6 fatty acid is an essential fatty acid. Arachidonic acid (20:4) is a physiologically significant n-6 fatty acid and is the precursor for prostaglandins and other physiologically active molecules. FIG. 13 sets forth omega-6 fatty acids.

The term “arachidonic acid” (“ARA”) refers to an omega-6 fatty acid having the chemical formula $C_{20}H_{32}O_2$. It is also given the name 20:4 (n-6). Its systematic chemical name is cis-5,8,11,14-eicosatetraenoic. It is an essential dietary component for mammals. The free acid is the precursor for biosynthesis of prostaglandins, thromboxanes, hydroxyeicosatetraenoic acid derivatives including leucotrienes. Within cells the acid is found in the esterified form as a major acyl component of membrane phospholipids. Little or no ARA is found in plants. The term ARA as used herein encompasses both the free acid and derivatives thereof, e.g., its esterified form.

The term “high-level ARA production” refers to a transgenic oilseed plant that produces mature seeds in which the total seed fatty acid profile comprises at least 8% ARA, or at least 10% ARA, or at least 15% ARA, or at least 20% ARA, or at least 25% ARA. The structural form of the ARA is not limiting; thus, for example, the ARA may exist in the seed fatty acid profile as free fatty acids or in esterified forms such as acylglycerols, phospholipids, sulfolipids or glycolipids.

“Desaturase” is a polypeptide which can desaturate one or more fatty acids to produce a mono- or poly-unsaturated fatty acid or precursor which is of interest.

A “food analog” is a food-like product manufactured to resemble its food counterpart, whether meat, cheese, milk or the like, and is intended to have the appearance, taste, and texture of its counterpart.

“Aquaculture feed” refers to feed used in aquafarming which concerns the propagation, cultivation or farming of aquatic organisms, animals and/or plants in fresh or marine waters.

The terms “polynucleotide”, “polynucleotide sequence”, “nucleic acid sequence”, and “nucleic acid fragment”/“isolated nucleic acid fragment” are used interchangeably herein. These terms encompass nucleotide sequences and the like. A polynucleotide may be a polymer of RNA or DNA that is single- or double-stranded, that optionally contains synthetic, non-natural or altered nucleotide bases. A polynucleotide in the form of a polymer of DNA may be comprised of one or more segments of cDNA, genomic DNA, synthetic DNA, or mixtures thereof. Nucleotides (usually found in their 5'-monophosphate form) are referred to by a single letter designation as follows: “A” for adenylate or deoxyadenylate (for RNA or DNA, respectively), “C” for cytidylate or deoxycytidylate, “G” for guanylate or deoxyguanylate, “U” for uridylate, “T” for deoxythymidylate, “R” for purines (A or G), “Y” for pyrimidines (C or T), “K” for G or T, “H” for A or C or T, “I” for inosine, and “N”for any nucleotide.

The terms “subfragment that is functionally equivalent” and “functionally equivalent subfragment” are used interchangeably herein. These terms refer to a portion or subsequence of an isolated nucleic acid fragment in which the ability to alter gene expression or produce a certain phenotype is retained whether or not the fragment or subfragment encodes an active enzyme. For example, the fragment or subfragment can be used in the design of chimeric genes to produce the desired phenotype in a transformed plant. Chimeric genes can be designed for use in suppression by linking a nucleic acid fragment or subfragment thereof, whether or not it encodes an active enzyme, in the sense or antisense orientation relative to a plant promoter sequence.

The terms "homology", "homologous", "substantially similar" and "corresponding substantially" are used interchangeably herein. They refer to nucleic acid fragments wherein changes in one or more nucleotide bases do not affect the ability of the nucleic acid fragment to mediate gene expression or produce a certain phenotype. These terms also refer to modifications of the nucleic acid fragments of the instant invention such as deletion or insertion of one or more nucleotides that do not substantially alter the functional properties of the resulting nucleic acid fragment relative to the initial, unmodified fragment. It is therefore understood, as those skilled in the art will appreciate, that the invention encompasses more than the specific exemplary sequences.

Moreover, the skilled artisan recognizes that substantially similar nucleic acid sequences encompassed by this invention are also defined by their ability to hybridize, under moderately stringent conditions (for example, 0.5×SSC, 0.1% SDS, 60° C.) with the sequences exemplified herein, or to any portion of the nucleotide sequences disclosed herein and which are functionally equivalent to any of the nucleic acid sequences disclosed herein. Stringency conditions can be adjusted to screen for moderately similar fragments, such as homologous sequences from distantly related organisms, to highly similar fragments, such as genes that duplicate functional enzymes from closely related organisms. Post-hybridization washes determine stringency conditions. One set of preferred conditions involves a series of washes starting with 6×SSC, 0.5% SDS at room temperature for 15 min, then repeated with 2×SSC, 0.5% SDS at 45° C. for 30 min, and then repeated twice with 0.2×SSC, 0.5% SDS at 50° C. for 30 min. A more preferred set of stringent conditions involves the use of higher temperatures in which the washes are identical to those above except for the temperature of the final two 30 min washes in 0.2×SSC, 0.5% SDS was increased to 60° C. Another preferred set of highly stringent conditions involves the use of two final washes in 0.1×SSC, 0.1% SDS at 65° C.

"Gene" refers to a nucleic acid fragment that expresses a specific protein, including regulatory sequences preceding (5' non-coding sequences) and following (3' non-coding sequences) the coding sequence. "Native gene" refers to a gene as found in nature with its own regulatory sequences. "Chimeric gene" refers any gene that is not a native gene, comprising regulatory and coding sequences that are not found together in nature. Accordingly, a chimeric gene may comprise regulatory sequences and coding sequences that are derived from different sources, or regulatory sequences and coding sequences derived from the same source, but arranged in a manner different than that found in nature. A "foreign" gene refers to a gene not normally found in the host organism, but that is introduced into the host organism by gene transfer. Foreign genes can comprise native genes inserted into a non-native organism, or chimeric genes. A "transgene" is a gene that has been introduced into the genome by a transformation procedure. An "allele" is one of several alternative forms of a gene occupying a given locus on a chromosome. When all the alleles present at a given locus on a chromosome are the same that plant is homozygous at that locus. If the alleles present at a given locus on a chromosome differ that plant is heterozygous at that locus.

"Coding sequence" refers to a DNA sequence that codes for a specific amino acid sequence. "Regulatory sequences" refer to nucleotide sequences located upstream (5' non-coding sequences), within, or downstream (3' non-coding sequences) of a coding sequence, and which influence the transcription, RNA processing or stability, or translation of the associated coding sequence. Regulatory sequences may include, but are not limited to, promoters, translation leader sequences, introns, and polyadenylation recognition sequences.

"Promoter" refers to a DNA sequence capable of controlling the expression of a coding sequence or functional RNA. The promoter sequence consists of proximal and more distal upstream elements, the latter elements often referred to as enhancers. Accordingly, an "enhancer" is a DNA sequence that can stimulate promoter activity, and may be an innate element of the promoter or a heterologous element inserted to enhance the level or tissue-specificity of a promoter. Promoters may be derived in their entirety from a native gene, or be composed of different elements derived from different promoters found in nature, or even comprise synthetic DNA segments. It is understood by those skilled in the art that different promoters may direct the expression of a gene in different tissues or cell types, or at different stages of development, or in response to different environmental conditions. It is further recognized that since in most cases the exact boundaries of regulatory sequences have not been completely defined, DNA fragments of some variation may have identical promoter activity. Promoters that cause a gene to be expressed in most cell types at most times are commonly referred to as "constitutive promoters". New promoters of various types useful in plant cells are constantly being discovered; numerous examples may be found in the compilation by Okamuro, J. K., and Goldberg, R. B. (1989) *Biochemistry of Plants* 15:1-82.

The "translation leader sequence" refers to a polynucleotide sequence located between the promoter sequence of a gene and the coding sequence. The translation leader sequence is present in the fully processed mRNA upstream of the translation start sequence. The translation leader sequence may affect processing of the primary transcript to mRNA, mRNA stability or translation efficiency. Examples of translation leader sequences have been described (Turner, R. and Foster, G. D. (1995) *Mol. Biotechnol.* 3:225-236).

The "3' non-coding sequences" or "transcription terminator/termination sequences" refer to DNA sequences located downstream of a coding sequence and include polyadenylation recognition sequences and other sequences encoding regulatory signals capable of affecting mRNA processing or gene expression. The polyadenylation signal is usually characterized by affecting the addition of polyadenylic acid tracts to the 3' end of the mRNA precursor. The use of different 3' non-coding sequences is exemplified by Ingelbrecht, I. L., et al. (1989) *Plant Cell* 1:671-680.

"RNA transcript" refers to the product resulting from RNA polymerase-catalyzed transcription of a DNA sequence. When the RNA transcript is a perfect complementary copy of the DNA sequence, it is referred to as the primary transcript. An RNA transcript is referred to as the mature RNA when it is an RNA sequence derived from post-transcriptional processing of the primary transcript. "Messenger RNA (mRNA)" refers to the RNA that is without introns and that can be translated into protein by the cell. "cDNA" refers to a DNA that is complementary to and synthesized from a mRNA template using the enzyme reverse transcriptase. The cDNA can be single-stranded or converted into the double-stranded form using the Klenow fragment of DNA polymerase I. "Sense" RNA refers to RNA transcript that includes the mRNA and can be translated into protein within a cell or in vitro. "Antisense RNA" refers to an RNA transcript that is complementary to all or part of a target primary transcript or mRNA, and that blocks the expression of a target gene (U.S. Pat. No. 5,107,065). The complementarity of an antisense RNA may be with any part of the specific gene transcript, i.e., at the 5' non-coding sequence, 3' non-coding sequence, introns, or the coding sequence. "Functional RNA" refers to antisense RNA, ribozyme RNA, or other RNA that may not be translated but yet has an effect on cellular processes. The terms "complement" and "reverse complement" are used interchangeably herein with respect to mRNA transcripts, and are meant to define the antisense RNA of the message.

The term "operably linked" refers to the association of nucleic acid sequences on a single nucleic acid fragment so that the function of one is regulated by the other. For example, a promoter is operably linked with a coding sequence when it is capable of regulating the expression of that coding sequence (i.e., that the coding sequence is under the transcriptional control of the promoter). Coding sequences can be operably linked to regulatory sequences in a sense or antisense orientation. In another example, the complementary RNA regions of the invention can be operably linked, either directly or indirectly, 5' to the target mRNA, or 3' to the target mRNA, or within the target mRNA, or a first complementary region is 5' and its complement is 3' to the target mRNA.

Standard recombinant DNA and molecular cloning techniques used herein are well known in the art and are described more fully in Sambrook, J., Fritsch, E. F. and Maniatis, T. Molecular Cloning: A Laboratory Manual; Cold Spring Harbor Laboratory Press: Cold Spring Harbor, 1989. Transformation methods are well known to those skilled in the art and are described below.

"PCR" or "Polymerase Chain Reaction" is a technique for the synthesis of large quantities of specific DNA segments, consists of a series of repetitive cycles (Perkin Elmer Cetus Instruments, Norwalk, Conn.). Typically, the double stranded DNA is heat denatured, the two primers complementary to the 3' boundaries of the target segment are annealed at low temperature and then extended at an intermediate temperature. One set of these three consecutive steps is referred to as a cycle.

The term "recombinant" refers to an artificial combination of two otherwise separated segments of sequence, e.g., by chemical synthesis or by the manipulation of isolated segments of nucleic acids by genetic engineering techniques.

The terms "recombinant construct", "expression construct", "chimeric construct", "construct", and "recombinant DNA construct" are used interchangeably herein. A recombinant construct comprises an artificial combination of nucleic acid fragments, e.g., regulatory and coding sequences that are not found together in nature. For example, a chimeric construct may comprise regulatory sequences and coding sequences that are derived from different sources, or regulatory sequences and coding sequences derived from the same source, but arranged in a manner different than that found in nature. Such construct may be used by itself or may be used in conjunction with a vector. If a vector is used then the choice of vector is dependent upon the method that will be used to transform host cells as is well known to those skilled in the art. For example, a plasmid vector can be used. The skilled artisan is well aware of the genetic elements that must be present on the vector in order to successfully transform, select and propagate host cells comprising any of the isolated nucleic acid fragments of the invention. The skilled artisan will also recognize that different independent transformation events will result in different levels and patterns of expression (Jones et al., (1985) *EMBO J.* 4:2411-2418; De Almeida et al., (1989) *Mol. Gen. Genetics* 218:78-86), and thus that multiple events must be screened in order to obtain lines displaying the desired expression level and pattern. Such screening may be accomplished by Southern analysis of DNA, Northern analysis of mRNA expression, immunoblotting analysis of protein expression, or phenotypic analysis, among others.

The term "expression", as used herein, refers to the production of a functional end-product e.g., a mRNA or a protein (precursor or mature).

The term "expression cassette" as used herein, refers to a discrete nucleic acid fragment into which a nucleic acid sequence or fragment can be moved.

"Mature" protein refers to a post-translationally processed polypeptide; i.e., one from which any pre- or propeptides present in the primary translation product have been removed. "Precursor" protein refers to the primary product of translation of mRNA; i.e., with pre- and propeptides still present. Pre- and propeptides may be but are not limited to intracellular localization signals.

"Stable transformation" refers to the transfer of a nucleic acid fragment into a genome of a host organism, including both nuclear and organellar genomes, resulting in genetically stable inheritance. In contrast, "transient transformation" refers to the transfer of a nucleic acid fragment into the nucleus, or DNA-containing organelle, of a host organism resulting in gene expression without integration or stable inheritance. Host organisms containing the transformed nucleic acid fragments are referred to as "transgenic" organisms.

"Antisense inhibition" refers to the production of antisense RNA transcripts capable of suppressing the expression of the target protein. "Co-suppression" refers to the production of sense RNA transcripts capable of suppressing the expression of identical or substantially similar foreign or endogenous genes (U.S. Pat. No. 5,231,020). Co-suppression constructs in plants previously have been designed by focusing on overexpression of a nucleic acid sequence having homology to an endogenous mRNA, in the sense orientation, which results in the reduction of all RNA having homology to the overexpressed sequence (see Vaucheret et al. (1998) *Plant J.* 16:651-659; and Gura (2000) *Nature* 404:804-808). The overall efficiency of this phenomenon is low, and the extent of the RNA reduction is widely variable. Recent work has described the use of "hairpin" structures that incorporate all, or part, of an mRNA encoding sequence in a complementary orientation that results in a potential "stem-loop" structure for the expressed RNA (PCT Publication WO 99/53050 published on Oct. 21, 1999 and more recently, Applicants' assignee's PCT Application having international publication number WO 02/00904 published on Jan. 3, 2002). This increases the frequency of co-suppression in the recovered transgenic plants. Another variation describes the use of plant viral sequences to direct the suppression, or "silencing", of proximal mRNA encoding sequences (PCT Publication WO 98/36083 published on Aug. 20, 1998). Both of these co-suppressing phenomena have not been elucidated mechanistically, although genetic evidence has begun to unravel this complex situation (Elmayan et al. (1998) *Plant Cell* 10:1747-1757).

The polynucleotide sequences used for suppression do not necessarily have to be 100% complementary to the polynucleotide sequences found in the gene to be suppressed. For example, suppression of all the subunits of the soybean seed storage protein β-conglycinin has been accomplished using a polynucleotide derived from a portion of the gene encoding the α subunit (U.S. Pat. No. 6,362,399). β-conglycinin is a heterogeneous glycoprotein composed of varying combinations of three highly negatively charged subunits identified as α, α' and β. The polynucleotide sequences encoding the α and α' subunits are 85% identical to each other while the polynucleotide sequences encoding the β subunit are 75 to 80% identical to the α and α' subunits. Thus, polynucleotides that are at least 75% identical to a region of the polynucleotide that is target for suppression have been shown to be effective in suppressing the desired target. The polynucleotide should be at least 80% identical, preferably at least 90% identical, most preferably at least 95% identical, or the polynucleotide may be 100% identical to the desired target.

The present invention concerns an oilseed plant that produces mature seeds in which the total seed fatty acid profile comprises at least 1.0% of at least one polyunsaturated fatty acid having at least twenty carbon atoms and five or more carbon-carbon double bonds.

In a second embodiment, this invention concerns an oilseed plant that produces mature seeds in which the total seed fatty acid profile comprises at least 5.0% of at least one polyunsaturated fatty acid having at least twenty carbon atoms and five or more carbon-carbon double bonds.

In a third embodiment, this invention concerns an oilseed plant that produces mature seeds in which the total seed fatty acid profile comprises at least 10.0% of at least one polyunsaturated fatty acid having at least twenty carbon atoms and five or more carbon-carbon double bonds.

Additional embodiments of this invention include an oilseed plant that produces mature seeds in which the total seed fatty acid profile comprises at least 15.0%, 20%, 25%, 30%, 40%, 50%, or 60% of at least one polyunsaturated fatty acid having at least twenty carbon atoms and five or more carbon-carbon double bonds. Indeed, one might expect that any integer level of accumulation of at least one polyunsaturated fatty acid from about 1% to about 60% of the total seed fatty acid profile could be obtained.

In a fourth embodiment, this invention concerns an oilseed plant that produces mature seeds in which the total seed fatty acid profile comprises at least 10.0% of at least one polyunsaturated fatty acid having at least twenty carbon atoms and five or more carbon-carbon double bonds and less than 2.0% arachidonic acid.

Again additional embodiments would include an oilseed plant that produces mature seeds in which the total seed fatty acid profile comprises at least 15.0%, 20%, 25%, 30%, 40%, 50%, or 60% of at least one polyunsaturated fatty acid having at least twenty carbon atoms and five or more carbon-carbon double bonds and less than 2.0% arachidonic acid. Indeed, one might expect that any integer level of accumulation of at least one polyunsaturated fatty acid from about 1% to about 60% of the total seed fatty acid profile could be obtained while accumulating less than 2% arachidonic acid.

Examples of oilseed plants include, but are not limited to, soybean, *Brassica* species, sunflower, maize, cotton, flax, and safflower.

Examples of polyunsaturated fatty acids having at least twenty carbon atoms and five or more carbon-carbon double bonds include, but are not limited to, omega-3 fatty acids such as EPA, DPA and DHA. Seeds obtained from such plants are also within the scope of this invention as well as oil obtained from such seeds.

In a fifth embodiment this invention concerns a recombinant construct for altering the total fatty acid profile of mature seeds of an oilseed plant, said construct comprising at least two promoters wherein each promoter is operably linked to a nucleic acid sequence encoding a polypeptide required for making at least one polyunsaturated fatty acid having at least twenty carbon atoms and four or more carbon-carbon double bonds and further wherein the total fatty acid profile comprises at least 2% of at least one polyunsaturated fatty acid having at least twenty carbon atoms and four or more carbon-carbon double bonds and further wherein said polypeptide is an enzyme selected from the group consisting of a Δ4 desaturase, a Δ5 desaturase, Δ6 desaturase, a Δ15 desaturase, a Δ17 desaturase, a C18 to C22 elongase and a C20 to C24 elongase.

Such desaturases are discussed in U.S. Pat. Nos. 6,075,183, 5,968,809, 6,136,574, 5,972,664, 6,051,754, 6,410,288 and WO 98/46763, WO 98/46764, WO 00/12720, WO 00/40705.

The choice of combination of cassettes used depends in part on the PUFA profile and/or desaturase profile of the oilseed plant cells to be transformed and the LC-PUFA which is to be expressed.

A number of enzymes are involved in PUFA biosynthesis. Linoleic acid (LA, 18:2 Δ9, 12) is produced from oleic acid (18:1 Δ9) by a delta-12 desaturase. GLA (18:3 Δ6, 9, 12) is produced from linoleic acid (18:2 Δ9, 12) by a delta-6 desaturase. ARA(20:4 Δ5, 8, 11, 14) production from dihomo-gamma-linolenic acid (DGLA 20:3 Δ8, 11, 14) is catalyzed by a delta-5 desaturase. However, animals cannot desaturate beyond the delta-9 position and therefore cannot convert oleic acid (18:1 Δ9) into linoleic acid (LA, 18:2 Δ9, 12). Likewise, alpha-linolenic acid (ALA 18:3 Δ9, 12, 15) cannot be synthesized by mammals. Other eukaryotes, including fungi and plants, have enzymes which desaturate at positions delta-12 and delta-5. The major poly-unsaturated fatty acids of animals therefore are either derived from diet and/or from desaturation and elongation of linoleic acid (LA, 18:2 Δ9, 12) or alpha-linolenic acid (ALA 18:3 Δ9, 12, 15).

The elongation process in plants involves a four-step process initiated by the crucial step of condensation of malonate and a fatty acid with release of a carbon dioxide molecule. The substrates in fatty acid elongation are CoA thioesters. The condensation step is mediated by a 3-ketoacyl synthase, which is generally rate limiting to the overall cycle of four reactions and provides some substrate specificity. The product of one elongation cycle regenerates a fatty acid that has been extended by two carbon atoms (Browse et al., *Trends in Biochemical Sciences* 27(9): 467-473 (September 2002); Napier, *Trends in Plant Sciences* 7(2): 51-54 (February 2002)).

As was noted above, a promoter is a DNA sequence that directs cellular machinery of a plant to produce RNA from the contiguous coding sequence downstream (3') of the promoter. The promoter region influences the rate, developmental stage, and cell type in which the RNA transcript of the gene is made. The RNA transcript is processed to produce messenger RNA (mRNA) which serves as a template for translation of the RNA sequence into the amino acid sequence of the encoded polypeptide. The 5' non-translated leader sequence is a region of the mRNA upstream of the protein coding region that may play a role in initiation and translation of the mRNA. The 3' transcription termination/polyadenylation signal is a non-translated region downstream of the protein coding region that functions in the plant cells to cause termination of the RNA transcript and the addition of polyadenylate nucleotides to the 3' end of the RNA.

The origin of the promoter chosen to drive expression of the coding sequence is not important as long as it has sufficient transcriptional activity to accomplish the invention by expressing translatable mRNA for the desired nucleic acid fragments in the desired host tissue at the right time. Either heterologous or non-heterologous (i.e., endogenous) promoters can be used to practice the invention.

Suitable promoters which can be used to practice the invention include, but are not limited to, the alpha prime subunit of beta conglycinin promoter, Kunitz trypsin inhibitor 3 promoter, annexin promoter, Gly1 promoter, beta subunit of beta conglycinin promoter, P34/Gly Bd m 30K promoter, albumin promoter, Leg A1 promoter and Leg A2 promoter. The level of activity of the annexin, or P34, promoter is comparable to that of many known strong promoters, such as the CaMV 35S promoter (Atanassova et al., (1998) *Plant Mol. Biol.* 37:275-285; Battraw and Hall, (1990) *Plant Mol. Biol.* 15:527-538; Holtorf et al., (1995) *Plant Mol. Biol.* 29:637-646; Jefferson et al., (1987) *EMBO J.* 6:3901-3907; Wilmink et al., (1995) *Plant Mol. Biol.* 28:949-955), the *Arabidopsis* oleosin promoters (Plant et al., (1994) *Plant Mol. Biol.* 25:193-205; Li, (1997) Texas A&M University Ph.D. dissertation, pp. 107-128), the *Arabidopsis* ubiquitin extension protein promoters (Callis et al., 1990), a tomato ubiquitin gene promoter (Rollfinke et al., 1998), a soybean heat shock protein promoter (Schoffl et al., 1989), and a maize H3 histone gene promoter (Atanassova et al., 1998).

Expression of chimeric genes in most plant cell makes the annexin, or P34, promoter, which constitutes the subject matter of Applicants' Assignee's copending application having Application No. 60/446,833 which is filed concurrently herewith, especially useful when seed specific expression of a target heterologous nucleic acid fragment is required. Another useful feature of the annexin promoter is its expression profile in developing seeds. The annexin promoter of the invention is most active in developing seeds at early stages (before 10 days after pollination) and is largely quiescent in later stages. The expression profile of the annexin promoter is different from that of many seed-specific promoters, e.g., seed storage protein promoters, which often provide highest activity in later stages of development (Chen et al., (1989) *Dev. Genet.* 10:112-122; Ellerstrom et al., (1996) *Plant Mol. Biol.* 32:1019-1027; Keddie et al., (1994) *Plant Mol. Biol.* 24:327-340; Plant et al., (1994) *Plant Mol. Biol.* 25:193-205; Li, (1997) Texas A&M University Ph.D. dissertation, pp. 107-128). The P34 promoter has a more conventional expression profile but remains distinct from other known seed specific promoters. Thus, the annexin, or P34, promoter will be a very attractive candidate when overexpression, or suppression, of a gene in embryos is desired at an early developing stage. For example, it may be desirable to overexpress a gene regulating early embryo development or a gene involved in the metabolism prior to seed maturation.

The promoter is then operably linked in a sense orientation using conventional means well known to those skilled in the art.

Once the recombinant construct has been made, it may then be introduced into the oilseed plant cell of choice by methods well known to those of ordinary skill in the art including, for example, transfection, transformation and electroporation as described above. The transformed plant cell is then cultured and regenerated under suitable conditions permitting expression of the LC-PUFA which is then recovered and purified.

The recombinant constructs of the invention may be introduced into one plant cell or, alternatively, each construct may be introduced into separate plant cells.

Expression in a plant cell may be accomplished in a transient or stable fashion as is described above.

The desired LC-PUFAs can be expressed in seed. Also within the scope of this invention are seeds or plant parts obtained from such transformed plants.

Plant parts include differentiated and undifferentiated tissues, including but not limited to, roots, stems, shoots, leaves, pollen, seeds, tumor tissue, and various forms of cells and culture such as single cells, protoplasts, embryos, and callus tissue. The plant tissue may be in plant or in organ, tissue or cell culture.

Methods for transforming dicots, primarily by use of *Agrobacterium tumefaciens*, and obtaining transgenic plants have been published, among others, for cotton (U.S. Pat. Nos. 5,004,863, 5,159,135); soybean (U.S. Pat. Nos. 5,569,834, 5,416,011); *Brassica* (U.S. Pat. No. 5,463,174); peanut (Cheng et al. (1996) *Plant Cell Rep.* 15:653-657, McKently et al. (1995) *Plant Cell Rep.* 14:699-703); papaya (Ling, K. et al. (1991) *Bio/technology* 9:752-758); and pea (Grant et al. (1995) *Plant Cell Rep.* 15:254-258). For a review of other commonly used methods of plant transformation see Newell, C. A. (2000) *Mol. Biotechnol.* 16:53-65. One of these methods of transformation uses *Agrobacterium rhizogenes* (Tepfler, M. and Casse-Delbart, F. (1987) *Microbiol. Sci.* 4:24-28). Transformation of soybeans using direct delivery of DNA has been published using PEG fusion (PCT publication WO 92/17598), electroporation (Chowrira, G. M. et al. (1995) *Mol. Biotechnol.* 3:17-23; Christou, P. et al. (1987) *Proc. Natl. Acad. Sci. U.S.A.* 84:3962-3966), microinjection, or particle bombardment (McCabe, D. E. et. al. (1988) *Bio/Technology* 6:923; Christou et al. (1988) *Plant Physiol.* 87:671-674).

There are a variety of methods for the regeneration of plants from plant tissue. The particular method of regeneration will depend on the starting plant tissue and the particular plant species to be regenerated. The regeneration, development and cultivation of plants from single plant protoplast transformants or from various transformed explants is well known in the art (Weissbach and Weissbach, (1988) In.: Methods for Plant Molecular Biology, (Eds.), Academic Press, Inc., San Diego, Calif.). This regeneration and growth process typically includes the steps of selection of transformed cells, culturing those individualized cells through the usual stages of embryonic development through the rooted plantlet stage. Transgenic embryos and seeds are similarly regenerated. The resulting transgenic rooted shoots are thereafter planted in an appropriate plant growth medium such as soil. Preferably, the regenerated plants are self-pollinated to provide homozygous transgenic plants. Otherwise, pollen obtained from the regenerated plants is crossed to seed-grown plants of agronomically important lines. Conversely, pollen from plants of these important lines is used to pollinate regenerated plants. A transgenic plant of the present invention containing a desired polypeptide is cultivated using methods well known to one skilled in the art.

In addition to the above discussed procedures, practitioners are familiar with the standard resource materials which describe specific conditions and procedures for the construction, manipulation and isolation of macromolecules (e.g., DNA molecules, plasmids, etc.), generation of recombinant DNA fragments and recombinant expression constructs and the screening and isolating of clones, (see for example, Sambrook et al. (1989) Molecular Cloning: A Laboratory Manual, Cold Spring Harbor Press; Maliga et al. (1995) Methods in Plant Molecular Biology, Cold Spring Harbor Press; Birren et al. (1998) Genome Analysis: Detecting Genes, 1, Cold Spring Harbor, N.Y.; Birren et al. (1998) Genome Analysis: Analyzing DNA, 2, Cold Spring Harbor, N.Y.; Plant Molecular Biology: A Laboratory Manual, eds. Clark, Springer, N.Y. (1997)).

In another aspect, this invention concerns a method for making an oilseed plant having an altered fatty acid profile which comprises:

a) transforming a plant with the recombinant construct of the invention;

b) growing the transformed plant of step (a); and c) selecting those plants wherein the total fatty acid profile comprises at least 1.0% of at least one polyunsaturated fatty acid having at least twenty carbon atoms and five or more carbon-carbon double bonds.

Methods of isolating seed oils are well known in the art: (Young et al, Processing of Fats and Oils, in "The Lipid Handbook" (Gunstone et al eds.) Chapter 5 pp 253-257; London, Chapman & Hall, 1994).

The altered seed oils can then be added to nutritional compositions such as a nutritional supplement, food products, infant formula, animal feed, pet food and the like.

Compared to other vegetable oils, the oils of the invention are believed to function similarly to other oils in food applications from a physical standpoint. Partially hydrogenated oils, such as soybean oil, are widely used as ingredients for soft spreads, margarine and shortenings for baking and frying.

Examples of food products or food analogs into which altered seed oils or altered seeds of the invention may be incorporated include a meat product such as a processed meat product, a cereal food product, a snack food product, a baked goods product, a fried food product, a health food product, an infant formula, a beverage, a nutritional supplement, a dairy product, a pet food product, animal feed or an aquaculture food product. Food analogs can be made use processes well known to those skilled in the art. U.S. Pat. Nos. 6,355,296 B1 and 6,187,367 B1 describe emulsified meat analogs and emulsified meat extenders. U.S. Pat. No. 5,206,050 B1 describes soy protein curd useful for cooked food analogs (also can be used as a process to form a curd useful to make food analogs). U.S. Pat. No. 4,284,656 to Hwa describes a soy protein curd useful for food analogs. U.S. Pat. No. 3,988,485 to Hibbert et al. describes a meat-like protein food formed from spun vegetable protein fibers. U.S. Pat. No. 3,950,564 to Puski et al. describes a process of making a soy based meat substitute and U.S. Pat. No. 3,925,566 to Reinhart et al. describes a simulated meat product. For example, soy protein that has been processed to impart a structure, chunk or fiber for use as a food ingredient is called "textured soy protein" (TSP). TSPs are frequently made to resemble meat, seafood, or poultry in structure and appearance when hydrated.

There can be mentioned meat analogs, cheese analogs, milk analogs and the like.

Meat analogs made from soybeans contain soy protein or tofu and other ingredients mixed together to simulate various kinds of meats. These meat alternatives are sold as frozen, canned or dried foods. Usually, they can be used the same way as the foods they replace. Meat alternatives made from soybeans are excellent sources of protein, iron and B vitamins. Examples of meat analogs include, but are not limited to, ham analogs, sausage analogs, bacon analogs, and the like.

Food analogs can be classified as imitation or substitutes depending on their functional and compositional characteristics. For example, an imitation cheese need only resemble the cheese it is designed to replace. However, a product can generally be called a substitute cheese only if it is nutritionally equivalent to the cheese it is replacing and meets the minimum compositional requirements for that cheese. Thus, substitute cheese will often have higher protein levels than imitation cheeses and be fortified with vitamins and minerals.

Milk analogs or nondairy food products include, but are not limited to, imitation milk, nondairy frozen desserts such as those made from soybeans and/or soy protein products.

Meat products encompass a broad variety of products. In the United States "meat" includes "red meats" produced from cattle, hogs and sheep. In addition to the red meats there are poultry items which include chickens, turkeys, geese, guineas, ducks and the fish and shellfish. There is a wide assortment of seasoned and processes meat products: fresh, cured and fried, and cured and cooked. Sausages and hot dogs are examples of processed meat products. Thus, the term "meat products" as used herein includes, but is not limited to, processed meat products.

A cereal food product is a food product derived from the processing of a cereal grain. A cereal grain includes any plant from the grass family that yields an edible grain (seed). The most popular grains are barley, corn, millet, oats, quinoa, rice, rye, sorghum, triticale, wheat and wild rice. Examples of a cereal food product include, but are not limited to, whole grain, crushed grain, grits, flour, bran, germ, breakfast cereals, extruded foods, pastas, and the like.

A baked goods product comprises any of the cereal food products mentioned above and has been baked or processed in a manner comparable to baking, i.e., to dry or harden by subjecting to heat. Examples of a baked good product include, but are not limited to bread, cakes, doughnuts, bread crumbs, baked snacks, mini-biscuits, mini-crackers, mini-cookies, and mini-pretzels. As was mentioned above, oils of the invention can be used as an ingredient.

In general, soybean oil is produced using a series of steps involving the extraction and purification of an edible oil product from the oil bearing seed. Soybean oils and soybean byproducts are produced using the generalized steps shown in the diagram below.

| Process | | Impurities Removed/ Byproducts Obtained |
|---|---|---|
| Soybean | | |
| ↓ | | |
| Oil Extraction | → | Meal |
| ↓ | | |
| Degumming | → | Lecithin |
| ↓ | | |
| Alkali or Physical Refining | → | Gums, Free Fatty Acids, Pigments |
| ↓ | | |
| Water Washing | → | Soap |
| ↓ | | |

-continued

| Process | Impurities Removed/ Byproducts Obtained |
|---|---|
| Bleaching → | Color, Soap, Metal |
| ↓ | |
| (Hydrogenation) | |
| ↓ | |
| (Winterization) → | Stearine |
| ↓ | |
| Deodorization → | FFA, Tocopherols, Sterols, Volatiles |
| ↓ | |
| Oil Products | |

Soybean seeds are cleaned, tempered, dehulled, and flaked which increases the efficiency of oil extraction. Oil extraction is usually accomplished by solvent (hexane) extraction but can also be achieved by a combination of physical pressure and/or solvent extraction. The resulting oil is called crude oil. The crude oil may be degummed by hydrating phospholipids and other polar and neutral lipid complexes that facilitate their separation from the nonhydrating, triglyceride fraction (soybean oil). The resulting lecithin gums may be further processed to make commercially important lecithin products used in a variety of food and industrial products as emulsification and release (antisticking) agents. Degummed oil may be further refined for the removal of impurities; primarily free fatty acids, pigments, and residual gums. Refining is accomplished by the addition of a caustic agent that reacts with free fatty acid to form soap and hydrates phosphatides and proteins in the crude oil. Water is used to wash out traces of soap formed during refining. The soapstock byproduct may be used directly in animal feeds or acidulated to recover the free fatty acids. Color is removed through adsorption with a bleaching earth that removes most of the chlorophyll and carotenoid compounds. The refined oil can be hydrogenated resulting in fats with various melting properties and textures. Winterization (fractionation) may be used to remove stearine from the hydrogenated oil through crystallization under carefully controlled cooling conditions. Deodorization which is principally steam distillation under vacuum, is the last step and is designed to remove compounds which impart odor or flavor to the oil. Other valuable byproducts such as tocopherols and sterols may be removed during the deodorization process. Deodorized distillate containing these byproducts may be sold for production of natural vitamin E and other high-value pharmaceutical products. Refined, bleached, (hydrogenated, fractionated) and deodorized oils and fats may be packaged and sold directly or further processed into more specialized products. A more detailed reference to soybean seed processing, soybean oil production and byproduct utilization can be found in Erickson, 1995, Practical Handbook of Soybean Processing and Utilization, The American Oil Chemists' Society and United Soybean Board.

Soybean oil is liquid at room temperature because it is relatively low in saturated fatty acids when compared with oils such as coconut, palm, palm kernel and cocoa butter. Many processed fats, including spreads, confectionary fats, hard butters, margarines, baking shortenings, etc., require varying degrees of solidity at room temperature and can only be produced from soybean oil through alteration of its physical properties. This is most commonly achieved through catalytic hydrogenation.

Hydrogenation is a chemical reaction in which hydrogen is added to the unsaturated fatty acid double bonds with the aid of a catalyst such as nickel. High oleic soybean oil contains unsaturated oleic, linoleic, and linolenic fatty acids and each of these can be hydrogenated. Hydrogenation has two primary effects. First, the oxidative stability of the oil is increased as a result of the reduction of the unsaturated fatty acid content. Second, the physical properties of the oil are changed because the fatty acid modifications increase the melting point resulting in a semi-liquid or solid fat at room temperature.

There are many variables which affect the hydrogenation reaction which in turn alter the composition of the final product. Operating conditions including pressure, temperature, catalyst type and concentration, agitation and reactor design are among the more important parameters which can be controlled. Selective hydrogenation conditions can be used to hydrogenate the more unsaturated fatty acids in preference to the less unsaturated ones. Very light or brush hydrogenation is often employed to increase stability of liquid oils. Further hydrogenation converts a liquid oil to a physically solid fat. The degree of hydrogenation depends on the desired performance and melting characteristics designed for the particular end product. Liquid shortenings, used in the manufacture of baking products, solid fats and shortenings used for commercial frying and roasting operations, and base stocks for margarine manufacture are among the myriad of possible oil and fat products achieved through hydrogenation. A more detailed description of hydrogenation and hydrogenated products can be found in Patterson, H. B. W., 1994, Hydrogenation of Fats and Oils: Theory and Practice. The American Oil Chemists' Society.

Hydrogenated oils have also become controversial due to the presence of trans fatty acid isomers that result from the hydrogenation process. Ingestion of large amounts of trans isomers has been linked with detrimental health effects including increased ratios of low density to high density lipoproteins in the blood plasma and increased risk of coronary heart disease.

A snack food product comprises any of the above or below described food products.

A fried food product comprises any of the above or below described food products that has been fried.

A health food product is any food product that imparts a health benefit. Many oilseed-derived food products may be considered as health foods.

The beverage can be in a liquid or in a dry powdered form.

For example, there can be mentioned non-carbonated drinks; fruit juices, fresh, frozen, canned or concentrate; flavored or plain milk drinks, etc. Adult and infant nutritional formulas are well known in the art and commercially available (e.g., Similac®, Ensure®, Jevity®, and Alimentum® from Ross Products Division, Abbott Laboratories).

Infant formulas are liquids or reconstituted powders fed to infants and young children. They serve as substitutes for human milk. Infant formulas have a special role to play in the diets of infants because they are often the only source of nutrients for infants. Although breast-feeding is still the best nourishment for infants, infant formula is a close enough second that babies not only survive but thrive. Infant formula is becoming more and more increasingly close to breast milk.

A dairy product is a product derived from milk. A milk analog or nondairy product is derived from a source other than milk, for example, soymilk as was discussed above. These products include, but are not limited to, whole milk, skim milk, fermented milk products such as yoghurt or sour milk, cream, butter, condensed milk, dehydrated milk, coffee whitener, coffee creamer, ice cream, cheese, etc.

A pet food product is a product intended to be fed to a pet such as a dog, cat, bird, reptile, fish, rodent and the like. These products can include the cereal and health food products above, as well as meat and meat byproducts, soy protein products, grass and hay products, including but not limited to alfalfa, timothy, oat or brome grass, vegetables and the like.

Animal feed is a product intended to be fed to animals such as turkeys, chickens, cattle and swine and the like. As with the pet foods above, these products can include cereal and health food products, soy protein products, meat and meat byproducts, and grass and hay products as listed above.

Aqualculture feed is a product intended to be used in aquafarming which concerns the propagation, cultivation or farming of aquatic organisms, animals and/or plants in fresh or marine waters.

In yet another embodiment, this invention includes an oilseed plant that produces mature seeds in which the total seed fatty acid profile comprises polyunsaturated fatty acids having at least twenty carbon atoms and five or more carbon-carbon double bonds wherein the ratio of EPA:DHA is in the range from 1:100 to 860:100. The oilseed plant may further have a total seed fatty acid profile comprising less than 2.0% arachidonic acid. Also of interest are seeds obtained from such plants and oil obtained from the seeds of such plants.

In still yet another embodiment, this invention includes an oilseed plant that produces mature seeds in which the total seed fatty acid profile comprises polyunsaturated fatty acids having at least twenty carbon atoms and five or more carbon-carbon double bonds wherein the ratio of DHA:EPA is in the range from 1:100 to 110:100. The oilseed plant may further have a total seed fatty acid profile comprising less than 2.0% arachidonic acid. Also of interest are seeds obtained from such plants and oil obtained from the seeds of such plants.

It is reasonable to believe that any integer ratio of EPA:DHA from 1:100 through 860:100, or DHA:EPA from 1:100 through 110:100, might be obtainable in plants described or envisioned within the scope and spirit of the present invention.

PUFA-Containing Oils for Use in Health Food Products, Medical Foods and Pharmaceuticals A health food product is any food product that imparts a health benefit and include functional foods, medical foods, medical nutritionals and dietary supplements.

A "medical food" is a food administered under the supervision of a physician and intended for the specific dietary management of a disease for which distinctive nutritional requirements are established.

Additionally, the plant/seed oils and altered seed oils of the invention may be used in standard pharmaceutical compositions (e.g., the long-chain PUFA containing oils could readily be incorporated into the any of the above mentioned food products, to thereby produce a functional or medical food). More concentrated formulations comprising PUFAs include capsules, powders, tablets, softgels, gelcaps, liquid concentrates and emulsions which can be used as a dietary supplement in humans or animals other than humans.

Thus, a pharmaceutical composition could comprise one or more of the fatty acids and/or resulting oils as well as a standard, well-known, non-toxic pharmaceutically acceptable carrier, adjuvant or vehicle such as phosphate buffered slaine, water, ethanol, polyols, vegetable oils, a wetting agent or an emulsion such as a water/oil emulsion. The composition may be in either a liquid or solid form.

Possible routes of administration include oral, rectal, parenteral, topical, etc. The route of administration will depend upon the desired effect.

Dosage to administered to a patient may be determined by one of ordinary skill in the art. Factors to consider include, but are not limited to, patient weight, patient age, immune status of patient, etc.

The composition can be in a variety of forms such as a solution, a dispersion, a suspension, an emulsion or a sterile powder which is then reconstituted. Thus suspensions, in addition to the active compounds, may contain suspending agents such as ethoxylated isostearyl alcohols, polyoxyethylene sorbiot and sorbitan esters, microcrystalline cellulose, aluminum metahydroxide, bentonite, agar-agar and tragacanth or mixtures of substances, and the like.

Solid dosage forms such as tablets and capsules can be prepared using techniques well known in the art. For example, fatty acids/oils of the invention can be tableted with conventional tablet bases such as lactose, sucrose, and cornstarch in combination with binders such as acacia, cornstarch or gelatin, disintegrating or magnesium stearate. Capsules can be prepared by incorporating these excipients into a gelatin capsule along with antioxidants and desired fatty acid/oil. The terms "dose" and "serving" are used interchangeable herein and refer to the amount of a nutritional or pharmaceutical composition ingested by a patient in a single setting and designed to deliver effective amounts of the desired components.

It is possible that such as composition may be utilized for cosmetic purposes. It may be added to pre-existing cosmetic compositions such that a mixture is formed or may be used as a sole composition.

PUFA-Containing Oils for Use in Animal Feeds and in Veterinary Applications

Animal feeds are generically defined herein as products intended for use as feed or for mixing in feed for animals other than humans. The plant/seed oils and altered seed oils of the invention can be used as an ingredient in various animal feeds.

More specifically, although not limited therein, it is expected that the oils of the invention can be used within pet food products, ruminant and poultry food products and aquacultural food products. Pet food products are those products intended to be fed to a pet (e.g., dog, cat, bird, reptile, rodent). These products can include the cereal and health food products above, as well as meat and meat byproducts, soy protein products, grass and hay products (e.g., alfalfa, timothy, oat or brome grass, vegetables). Ruminant and poultry food products are those wherein the product is intended to be fed to an animal (e.g., turkeys, chickens, cattle, swine). As with the pet foods above, these products can include cereal and health food products, soy protein products, meat and meat byproducts, and grass and hay products as listed above. Aquacultural food products (or "aquafeeds") are those products intended to be used in aquafarming, i.e., which concerns the propagation, cultivation or farming of aquatic organisms and/or animals in fresh or marine waters.

It should be appreciated that the above-described nutritional and pharmaceutical compositions may be utilized in connection with animals since animals may experience may of the same needs and conditions as humans.

EXAMPLES

The present invention is further defined in the following Examples, in which all parts and percentages are given as weight to volume, and degrees are Celsius, unless otherwise stated. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions. Thus, various modifications of the invention in addition to those shown and described herein will be apparent to those skilled in the art from the foregoing description. Such modifications are also intended to fall within the scope of the appended claims.

The disclosures contained within the references used herein are hereby incorporated by reference.

General Materials and Methods

Procedures for nucleic acid phosphorylation, restriction enzyme digests, ligation and transformation are well known in the art. Techniques suitable for use in the following examples may be found in Sambrook, J., Fritsch, E. F. and Maniatis, T., *Molecular Cloning: A Laboratory Manual*, Second Edition, Cold Spring Harbor Laboratory Press, Cold Spring Harbor, N.Y. (1989) (hereinafter "Maniatis").

Materials and Methods suitable for the maintenance and growth of bacterial cultures are well known in the art. Techniques suitable for use in the following examples may be found as set out in *Manual of Methods for General Bacteriology* (Phillipp Gerhardt, R. G. E. Murray, Ralph N. Costilow, Eugene W. Nester, Willis A. Wood, Noel R. Krieg and G. Briggs Phillips, eds), American Society for Microbiology, Washington, D.C. (1994)) or by Thomas D. Brock in *Biotechnology: A Textbook of Industrial Microbiology*, Second Edition, Sinauer Associates, Inc., Sunderland, Mass. (1989). All reagents, restriction enzymes and materials used for the growth and maintenance of bacterial and plant cells were obtained from Aldrich Chemicals (Milwaukee, Wis.), DIFCO Laboratories (Detroit, Mich.), GIBCO/BRL (Gaithersburg, Md.), or Sigma Chemical Company (St. Louis, Mo.) unless otherwise specified.

The meaning of abbreviations is as follows: "h" or "hr" means hour(s), "min"or "min." means minute(s), "sec" or "s" means second(s), "d" or "day" means day(s), "mL" means milliliters, "L" means liters.

Bacterial Strains and Plasmids:

*E. coli* TOP10 cells and *E. coli* electromax DH10B cells were obtained from Invitrogen (Carlsbad, Calif.). Max Efficiency competent cells of *E. Coli* DH5αwere obtained from GIBCO/BRL (Gaithersburg, Md.). Plasmids containing EPA or DHA biosynthetic pathway genes were obtained from Ross Products Division, Abbott Laboratories, Columbus Ohio. The genes and the source plasmids are listed in Table 1.

TABLE 1

EPA BIOSYNTHETIC PATHWAY GENES

| Gene | Organism | Plasmid Name | Reference |
|---|---|---|---|
| Delta-6 desaturase | *S. diclina* | pRSP1 | WO 02/081668 |
| Delta-6 desaturase | *M. alpina* | pCGR5 | U.S. Pat. No. 5,968,809 |
| Elongase | *M. alpina* | pRPB2 | WO 00/12720 |
| Delta-5 desaturase | *M. alpina* | pCGR4 | U.S. Pat. No. 6,075,183 |
| Delta-5 desaturase | *S. diclina* | pRSP3 | WO 02/081668 |
| Delta-17 desaturase | *S. diclina* | pRSP19 | Example 6 |
| Elongase | *T. aureum* | pRAT-4-A7 | WO 02/08401 |
| Elongase | *Pavlova* sp. | pRPL-6-B2 | Example 13 |
| Delta-4 desaturase | *S. aggregatum* | pRSA1 | WO 02/090493 |

Plasmids pKS102 and pKS121 are described in WO 02/00904. Plasmid pKS123 is described in WO 02/08269. Plasmid pCF3 is described in [Yadav, N. S. et al (1993) *Plant Physiol.* 103:467-76]. Cloning vector pCR-Script AMP SK(+) was from Stratagene (La Jolla, Calif.). Cloning vector pUC19 [Messing, J. (1983) *Meth. Enzymol.* 101:20] was from New England Biolabs (Beverly, Mass.). Cloning vector pGEM-T easy was from Promega (Madison, Wis.).

Growth Conditions:

Bacterial cells were usually grown in Luria-Bertani (LB) medium containing 1% of bacto-tryptone, 0.5% of bacto-yeast extract and 1% of NaCl. Occasionally, bacterial cells were grown in SOC medium containing 2% of bacto-tryptone, 0.5% of bacto-yeast extract, 0.5% of NaCl and 20 mM glucose or in Superbroth (SB) containing 3.5% of bacto-tryptone, 2% of bacto-yeast extract, 0.05% of NaCl and 0.005 M NaOH.

Antibiotics were often added to liquid or solid media in order to select for plasmids or insertions with appropriate antibiotic resistance genes. Kanamycin, ampicillin and hygromycin were routinely used at final concentrations of 50 μg/mL (Kan50), 100 μg/mL (Amp100) or 50 μg/mL (Hyg50), respectively.

Example 1

Isolation of Soybean Seed-specific Promoters

The soybean annexin and BD30 promoters were isolated with the Universal GenomeWalker system (Clontech) according to its user manual (PT3042-1). To make soybean GenomeWalker libraries, samples of soybean genomic DNA were digested with DraI, EcoRV, PvuII and StuI separately for two hours. After DNA purification, the digested genomic DNAs were ligated to the GenomeWalker adaptors AP1 and AP2.

Two gene specific primers (GSP1 and GSP2) were designed for soybean annexin gene based on the 5' coding sequences in annexin cDNA in DuPont EST database. The sequences of GSP1 and GSP2 are set forth in SEQ ID NOS:1 and 2.

```
GCCCCCCATCCTTTGAAAGCCTGT              SEQ ID NO: 1

CGCGGATCCGAGAGCCTCAGCATCTTGAGCAGAA    SEQ ID NO: 2
```

The AP1 and the GSP1 primers were used in the first round PCR using the conditions defined in the GenomeWalker system protocol. Cycle conditions were 94° C. for 4 minutes; 94° C. for 2 second and 72° C. for 3 minutes, 7 cycles; 94° C. for 2 second and 67° C. for 3 minutes, 32 cycles; 67° C. for 4 minutes. The products from the first run PCR were diluted 50-fold. One microliter of the diluted products were used as templates for the second PCR with the AP2 and GSP2 as primers. Cycle conditions were 94° C. for 4 minutes; 94° C. for 2 second and 72° C. for 3 min, 5 cycles; 94° C. for 2 second and 67° C. for 3 minutes, 20 cycles; 67° C. for 3 minutes. A 2.1 kb genomic fragment was amplified and isolated from the EcoRV-digested GenomeWalker library. The genomic fragment was digested with BamH I and Sal I and cloned into Bluescript $KS^+$ vector for sequencing. The DNA sequence of this 2012 bp soybean annexin promoter fragment is set forth in SEQ ID NO:3.

Two gene specific primers (GSP3 and GSP4) were designed for soybean BD30 based on the 5' coding sequences in BD30 cDNA in NCBI GenBank (J05560). The oligonucleotide sequences of the GSP3 and GSP4 primers have the sequences set forth in SEQ ID NOS:4 and 5.

```
GGTCCAATATGGAACGATGAGTTGATA              SEQ ID NO: 4

CGCGGATCCGCTGGAACTAGAAGAGAGACCTAAGA      SEQ ID NO: 5
```

The AP1 and the GSP3 primers were used in the first round PCR using the same conditions defined in the GenomeWalker system protocol. The cycle conditions used for soybean annexin promoter do not work well for the soybean BD30 promoter in GenomeWalker experiment. A modified touch-down PCR protocol was used. Cycle conditions were: 94° C. for 4 minutes; 94° C. for 2 second and 74° C. for 3 minutes, 6 cycles in which annealing temperature drops 1° C. every cycle; 94° C. for 2 second and 69° C. for 3 minutes, 32 cycles; 69° C. for 4 minutes. The products from the 1$^{st}$ run PCR were diluted 50-fold. One microliter of the diluted products were used as templates for the 2$^{nd}$ PCR with the AP2 and GSP4 as primers. Cycle conditions were: 94° C. for 4 minutes; 94° C. for 2 second and 74° C. for 3 min, 6 cycles in which annealing temperature drops 1° C. every cycle; 94° C. for 2 second and 69° C. for 3 minutes, 20 cycles; 69° C. for 3 minutes. A 1.5 kb genomic fragment was amplified and isolated from the PvuII-digested GenomeWalker library. The genomic fragment was digested with BamHI and SalI and cloned into Bluescript KS$^+$ vector for sequencing. DNA sequencing determined that this genomic fragment contained a 1408 bp soybean BD30 promoter sequence (SEQ ID NO:6).

Based on the sequences of the soybean β-conglycinin β-subunit promoter sequence in NCBI database (S44893), two oligos with either BamHI or NotI sites at the 5' ends were designed to amplify the soybean β-conglycinin β-subunit promoter (SEQ ID NO:7). The oligonucleotide sequences of these two oligos are set forth in SEQ ID NOS: 8 and 9.

```
                                             SEQ ID NO: 8
CGCGGATCCTATATATGTGAGGGTAGAGGGTATCAC

                                             SEQ ID NO: 9
GAATTCGCGGCCGCAGTATATATATTATTGGACGATGAAACATG
```

Based on the sequences of the soybean Glycinin Gy1 promoter sequence in the NCBI GenBank database (X15121), two oligos with either BamHI or NotI sites at the 5' ends were designed to amplify the soybean Glycinin Gy1 promoter (SEQ ID NO:10). The oligonucleotide sequences of these two oligos are set forth in SEQ ID NOS:11 and 12.

```
                                             SEQ ID NO: 11
CGCGGATCCTAGCCTAAGTACGTACTCAAAATGCCA

                                             SEQ ID NO: 12
GAATTCGCGGCCGCGGTGATGACTGATGAGTGTTTAAGGAC
```

Example 2

Vector Construction for Characterizing Strong Seed-specific Promoters

EPA can be produced at high levels in the seeds of important oil crops, such as soy, by strongly expressing each of the individual biosynthetic genes together, in a seed specific manner. To reduce the chance of co-suppression, each individual gene can be operably linked to a different, strong, seed-specific promoter. Because the biosynthetic pathway leading to EPA involves the concerted action of a large number of different genes, it was necessary to first identify and characterize many different promoters that could then be used to express each EPA biosynthetic gene. Promoters were identified and tested for their relative seed-specific strengths by linking them to the *M. alpina* delta-6 desaturase which, in these experiments, acted as a reporter gene. The *M. alpina* delta-6 desaturase can introduce a double bond between the C6 and C7 carbon atoms of linoleic acid (LA) and α-linolenic acid (ALA) to form γ-linolenic acid (GLA) and stearidonic acid (STA), respectively. Because GLA and STA are not normally found in the lipids of soybean, their presence and concentration in soy was indicative of the relative strength of the promoter behind which the delta-6 desaturase had been placed. Promoters tested in this way are listed in Table 2 and the plasmid construction for each is described below.

TABLE 2

SEED-SPECIFIC PROMOTERS AND VECTORS

| Promoter | Organism | Vector Name | Promoter Reference |
|---|---|---|---|
| β-conglycinin α'-subunit | Soy | pKR162 | Beachy et al., (1985) EMBO J. 4: 3047-3053 |
| Kunitz Trypsin Inhibitor | Soy | pKR124 | Jofuku et al., (1989) Plant Cell 1: 1079-1093 |
| annexin | Soy | pJS92 | this report[1] |
| Glycinin Gy1 | Soy | pZBL119 | this report |
| Albumin 2S | Soy | pKR188 | U.S. Pat. No. 6,177,613 |
| Legumin A1 | Pea | pKR189 | Rerie et al. (1991) Mol. Gen. Genet. 225: 148-157 |
| β-conglycinin β-subunit | Soy | ZBL118 | this report |
| BD30 (also called P34) | Soy | pJS93 | this report[1] |
| Legumin A2 | Pea | pKR187 | Rerie et al. (1991) Mol. Gen. Genet. 225: 148-157 |

[1]This also constitutes the subject matter of Applicant's Assignees's application having Application No. 60/446,833 (Attorney Docket No. BB1531PRV) filed concurrently herewith.

The gene for the *M. alpina* delta-6 desaturase was PCR-amplified from pCGR5 using primers oCGR5-1 (SEQ ID NO:13) and oCGR5-2 (SEQ ID NO:14), which were designed to introduce NotI restriction enzyme sites at both ends of the delta-6 desaturase and an NcoI site at the start codon of the reading frame for the enzyme.

```
TTGCGGCCGCAAACCATGGCTGCTGCTCCCAG     (SEQ ID NO: 13)

AAGCGGCCGCTTACTGCGCCTTAC             (SEQ ID NO: 14)
```

The resulting PCR fragment was subcloned into the intermediate cloning vector pCR-Script AMP SK(+) (Stratagene) according the manufacturer's protocol to give plasmid pKR159. Plasmid pKR159 was then digested with NotI to release the *M. alpina* delta-6 desaturase, which was, in turn, cloned into the NotI site of a selected soybean expression vector. Each expression vector tested contained a NotI site flanked by a suitable promoter and transcription terminator. Each vector also contained the hygromycin B phosphotransferase gene [Gritz, L. and Davies, J. (1983) *Gene* 25:179-188], flanked by the T7 promoter and transcription terminator (T7prom/hpt/T7term cassette), and a bacterial origin of replication (ori) for selection and replication in *E. coli*. In addition, each vector also contained the hygromycin B phosphotransferase gene, flanked by the 35S promoter [Odell et al., (1985) *Nature* 313:810-812] and NOS 3' transcription terminator [Depicker et al., (1982) *J. Mol. Appl. Genet.* 1:561:570] (35S/hpt/NOS3' cassette) for selection in soybean.

Vector pKR162 was constructed by cloning the NotI fragment of pKR159, containing the delta-6 desaturase, into the NotI site of vector KS123. Vector KS123 contains a NotI site flanked by the promoter for the α' subunit of β-conglycinin and the phaseolin 3' transcription terminator elements (βcon/NotI/Phas3' cassette).

Vector pKR188 was constructed by cloning the NotI fragment of pKR159, containing the delta-6 desaturase, into the NotI site of vector pKR135. Vector pKR135 contains a NotI site flanked by the 2S albumin promoter and the 2S albumin 3' transcription terminator elements (SA/NotI/SA3' cassette). Plasmid pKR135 was constructed by cloning the BamHI/SalI fragment of pKR132, containing the SA/NotI/SA3' cassette, into the BamHI/SalI site of pKS120. Plasmid pKS120 is identical to pKS123 except the HindIII fragment containing the βcon/NotI/Phas3' cassette was removed. Plasmid pKR132, containing the SA/NotI/SA3' cassette flanked by BamHI and SalI sites, was constructed by cloning the XbaI fragment of the SA/NotI/SA3' cassette, made by PCR amplification, into the XbaI site of pUC19. The albumin promoter was amplified from plasmid AL3 promoter:pBI121 (U.S. Pat. No. 6,177,613) using PCR. Primer oSAlb-9 (SEQ ID NO:15) was designed to introduce an XbaI site at the 5' end of the promoter, and oSAlb-3 (SEQ ID NO:16) was designed to introduce a NotI site at the 3' end of the promoter.

(SEQ ID NO: 15)
ATCTAGACCTGCAGGCCAACTGCGTTTGGGGCTC (SEQ ID NO: 16)
CTTTTAACTTCGCGGCCGCTTGCTATTGATGGGTGAAGTG

The albumin transcription terminator was amplified from soy genomic DNA using primer oSAlb-4 (SEQ ID NO:17), designed to introduce a NotI site at the 5' end of the terminator, and primer oSAlb-2 (SEQ ID NO:18), designed to introduce BsiWI and XbaI sites at the 3' end of the terminator.

(SEQ ID NO: 17)
CAATAGCAAGCGGCCGCGAAGTTAAAAGCAATGTTGTC (SEQ ID NO: 18)
AATCTAGACGTACGCAAAGGCAAAGATTTAAACTC

The resulting PCR fragments were then combined and re-amplified using primers oSAlb-9 and oSAlb-2, thus forming the SA/NotI/SA3' cassette, which was subsequently cloned into pUC19 to give pKR132.

Vector pKR187 was constructed by cloning the NotI fragment of pKR159, containing the delta-6 desaturase, into the NotI site of vector pKR145. Vector pKR145 contains a NotI site flanked by the pea leguminA2 promoter and the pea leguminA2 3' transcription terminator (legA2/NotI/legA23' cassette). Plasmid pKR145 was constructed by cloning the BamHI/SalI fragment of pKR142, containing the legA2/NotI/legA23' cassette, into the BamHI/SalI fragment of KS120 (described above). The legA2/NotI/legA23' cassette of pKR142 was flanked by BsiWI sites and contained a PstI site at the extreme 5' end of legA2 promoter. In addition, this cassette was flanked by BamHI and SalI sites. Plasmid pKR142 was constructed by cloning the BsiWI fragment of pKR140, containing the legA2/NotI/legA23' cassette, into the BsiWI site of pKR124, containing a bacterial ori and ampicillin resistance gene. This cloning step introduced the SalI site and allowed further subcloning into pKS124. The legA2/NotI/legA23' cassette of pKR140 was made by PCR amplification from pea genomic DNA. The legA2 promoter was amplified from pea genomic DNA using primer LegPro5' (SEQ ID NO:19), designed to introduce XbaI and BsiWI sites at the 5' end of the promoter, and primer LegPro3' (SEQ ID NO:20), designed to introduce a NotI site at the 3'end of the promoter.

(SEQ ID NO: 19)
TTTCTAGACGTACGTCCCTTCTTATCTTTGATCTCC (SEQ ID NO: 20)
GCGGCCGCAGTTGGATAGAATATATGTTTGTGAC

The legA2 transcription terminator was amplified from pea genomic DNA using primer LegTerm5' (SEQ ID NO:21), designed to introduce NotI site at the 5' end of the terminator, and primer LegTerm3' (SEQ ID NO:22), designed to introduce BsiWI and XbaI sites at the 3' end of the terminator.

(SEQ ID NO: 21)
CTATCCAACTGCGGCCGCATTTCGCACCAAATCAATGAAAG (SEQ ID NO: 22)
AATCTAGACGTACGTGAAGGTTAAACATGGTGAATATG

The resulting PCR fragments were then combined and re-amplified using primers LegPro5' and LegTerm3', thus forming the legA2/NotI/legA23' cassette. The legA2/NotI/legA23' cassette PCR fragment was subcloned into the intermediate cloning vector pCR-Script AMP SK(+) (Stratagene) according the manufacturer's protocol to give plasmid pKR140. Plasmid pKR124 contains a NotI site flanked by the KTi promoter and the KTi transcription termination region (KTi/NotI/KTi3'cassette). In addition, the KTi/NotI/KTi3' cassette was flanked by BsiWI sites. The KTi/NotI/KTi3' cassette was PCR-amplified from pKS126 using primers oKTi5 (SEQ ID NO:23) and oKTi6 (SEQ ID NO:24), designed to introduce an XbaI and BsiWI site at both ends of the cassette.

ATCTAGACGTACGTCCTCGAAGAGAAGGG (SEQ ID NO: 23)

TTCTAGACGTACGGATATAATG (SEQ ID NO: 24)

The resulting PCR fragment was subcloned into the XbaI site of the cloning vector pUC19 to give plasmid pKR124. Plasmid pKS126 is similar to pKS121 (WO 02/00904), the former possessing a second hygromycin phosphotransferase gene that is operably linked to a 35S-CaMV promoter.

Vector pKR189 was constructed by cloning the NotI fragment of pKR159, containing the delta-6 desaturase, into the NotI site of vector pKR154. Vector pKR154 contains a NotI site flanked by the pea leguminA1 promoter and the pea leguminA2 3' transcription terminator (legA1/NotI/legA23' cassette). Vector pKR154 was made by cloning the HindIII/NotI fragment of pKR151, containing the legA13'promoter into the HindIII/NotI fragment of pKR150. Plasmid pKR151 contained a NotI site flanked by the leguminA1 promoter and the leguminA13' transcription terminator (legA1/NotI/legA13' cassette). In addition, the legA1/NotI/legA13'cassette was flanked by BsiWI site. The legA1/NotI/legA13' cassette was made by PCR amplification from pea genomic DNA. The legA1 promoter was PCR-amplified using primer LegA1 Pro5' (SEQ ID NO:25), designed to introduce XbaI and BsiWI sites at the 5' end of the promoter, and primer LegA1Pro3' (SEQ ID NO:26), designed to introduce a NotI site at the 3' end of the promoter.

TTTCTAGACGTACGGTCTCAATAGATTAAGAAGTTG (SEQ ID NO: 25)

GCGGCCGCGAAGAGAGATACTAAGAGAATGTTG (SEQ ID NO: 26)

The legA1 transcription terminator was amplified from pea genomic DNA using primer LegA1Term5' (SEQ ID NO:27), which was designed to introduce NotI site at the 5' end of the terminator, and primer LegA1Term3' (SEQ ID NO:28), which was designed to introduce BsiWI and XbaI sites at the 3' end of the terminator.

(SEQ ID NO: 27)
GTATCTCTCTTCGCGGCCGCATTTGGCACCAAATCAATG (SEQ ID NO: 28)
TTTCTAGACGTACGTCAAAAAATTTCATTGTAACTC

The resulting PCR fragments were then combined and re-amplified using primer LegA1Pro5' and LegA1Term3', thus forming the legA1/NotI/legA13' cassette. The legA1/NotI/legA13' cassette PCR fragment was subcloned into the intermediate cloning vector pCR-Script AMP SK(+) (Stratagene) according the manufacturer's protocol to give plasmid pPL1A. The legA1/NotI/legA13' cassette was subsequently excised from pPL1A by digestion with BsiWI and cloned into the BsiWI site of pKR145 (described above) to give pKR151. Plasmid pKR150 was constructed by cloning the BamHI/HindIII fragment of pKR142 (described above), containing the legA2/NotI/legA23' cassette into the BamHI/HindIII site of KS120 (described above).

The amplified soybean β-conglycinin β-subunit promoter fragment (as described in Example 1) was digested with BamH I and NotI, purified and cloned into the BamHI and NotI sites of plasmid pZBL115 to make pZBL116. The pZBL115 plasmid contains the origin of replication from pBR322, the bacterial HPT hygromycin resistance gene driven by T7 promoter and T7 terminator, and a 35S promoter-HPT-Nos3' gene to serve as a hygromycin resistant plant selection marker. The NotI fragment of pKR159, containing the *M. alpina* delta-6 desaturase gene, was cloned into NotI site of pZBL116 in the sense orientation to make plant expression cassettes pZBL118.

The amplified soybean glycinin Gy1 promoter fragment (described in Example 1) was digested with BamH I and NotI, purified and cloned into the BamHI and NotI sites of plasmid pZBL115 to make pZBL117. The NotI fragment of pKR159, containing the *M. alpina* delta-6 desaturase gene, was cloned into NotI site of pZBL117 in the sense orientation to make plant expression cassettes pZBL119.

Based on the sequence of the soybean annexin promoter (SEQ ID NO:3), as described in Example 1, two oligos with either BamH I or NotI sites at the 5' ends were designed to re-amplify the promoter. The oligonucleotide sequences of these two oligos are shown in SEQ ID NO:29 and SEQ ID NO:30.

(SEQ ID NO: 29)
CGCGGATCCATCTTAGGCCCTTGATTATATGGTGTTT (SEQ ID NO: 30)
GAATTCGCGGCCGCTGAAGTATTGCTTCTTAGTTAACCTTTCC

Based on the sequences of cloned soybean BD30 promoter (SEQ ID NO:6), as described in Example 1, two oligos with either BamHI or NotI sites at the 5'ends were designed to re-amplify the BD30 promoter. The oligonucleotide sequences of these two oligos are shown in SEQ ID NO:31 and SEQ ID NO:32.

(SEQ ID NO: 31)
CGCGGATCCAACTAAAAAAAGCTCTCAAATTACATTTTGAG (SEQ ID NO: 32)
GAATTCGCGGCCGCAACTTGGTGGAAGAATTTTATGATTTGAAA

The re-amplified annexin and BD30 promoter fragments were digested with BamH I and NotI, purified and cloned into the BamH I and NotI sites of plasmid pZBL115 to make pJS88 and pJS89, respectively. The pZBL115 plasmid contains the origin of replication from pBR322, the bacterial HPT hygromycin resistance gene driven by T7 promoter and T7 terminator, and a 35S promoter-HPT-Nos3'gene to serve as a hygromycin resistant plant selection marker. The *M. alpina* delta-6 desaturase gene was cloned into NotI site of pJS88 and pJS89, in the sense orientation, to make plant expression cassettes pJS92 and pJS93, respectively.

Example 3

Cloning of Individual EPA Biosynthetic Pathway Genes for Expression in Somatic Soybean Embryos Each of the EPA biosynthetic genes was tested individually in order to assess their activities in somatic soybean embryos before combining for large-scale production transformation into soybean. Each gene was cloned into an appropriate expression cassette as described below. For the *M. alpina* delta-5 desaturase and elongase, both genes were combined together on one plasmid. The genes and promoters used, and the corresponding vector names are listed in Table 3.

TABLE 3

EPA BIOSYNTHETIC GENES EXPRESSED IN SOYBEAN SOMATIC EMBRYOS

| Activity | Source Organism | Sequence (DNA) | Sequence (Protein) | Vector |
|---|---|---|---|---|
| Delta-6 desaturase | *M. alpina* | SEQ ID NO: 33 | SEQ ID NO: 34 | pKR162 |
| Delta-6 desaturase | *S. diclina* | SEQ ID NO: 35 | SEQ ID NO: 36 | pKS208 |
| Delta-5 desaturase | *S. diclina* | SEQ ID NO: 37 | SEQ ID NO: 38 | pKR305 |
| elongase | *T. aureum* | SEQ ID NO: 39 | SEQ ID NO: 40 | pKS209 |
| Delta-17 desaturase | *S. diclina* | SEQ ID NO: 41 | SEQ ID NO: 42 | pKS203 |
| elongase | *M. alpina* | SEQ ID NO: 43 | SEQ ID NO: 44 | pKS134 |
| Delta-5 desaturase | *M. alpina* | SEQ ID NO: 45 | SEQ ID NO: 46 | pKS134 |

Construction of pKR162, for soy expression studies with the *M. alpina* delta-6 desaturase, was described in Example 2.

The *S. diclina* delta-6 desaturase was cloned into the NotI site of the βcon/NotI/Phas3' cassette of vector pKS123. The gene for the *S. diclina* delta-6 desaturase was removed from pRSP1 by digestion with EcoRI and HindIII. The ends of the resulting DNA fragment were filled and the fragment was cloned into the filled NotI site of pKS123 to give pKS208.

To release the *S. diclina* delta-5 desaturase from plasmid pRSP3, it was first digested with Xhol, the XhoI ends were filled, and the plasmid was then digested with EcoRI. The delta-5 desaturase-containing fragment was then cloned into pKR288 that had been digested with MfeI and EcoRV to give pKR305. Plasmid pKR288 was identical to pKS123 except that a linker containing the MfeI (on the promoter side) and EcoRV (on the 3' terminal side) sites had been inserted into the NotI site of the βcon/NotI/Phas3' cassette. This allowed for directional cloning of the delta-5 desaturase, which contained internal NotI sites, into pKS123. Construction of pKR288 is more thoroughly described in Example 13.

The *T. aureum* elongase was cloned into the NotI site of the βcon/NotI/Phas3' cassette of vector pKS123. The gene for the *T. aureum* elongase was removed from pRAT-4-A7 by digestion with EcoRI. The ends of the resulting DNA fragment were filled and the fragment was cloned into the filled NotI site of pKS123 to give pKS209.

The gene for the *S. diclina* delta-17 desaturase (Example 6) was amplified from pRSP19 using primers RSP19forward (SEQ ID NO:53) and RSP19reverse (SEQ ID NO:54) which were designed to introduce NotI restriction enzyme sites at both ends of the delta-17 desaturase.

```
GCGGCCGCATGACTGAGGATAAGACGA    (SEQ ID NO: 53)

GCGGCCGCTTAGTCCGACTTGGCCTTG    (SEQ ID NO: 54)
```

The resulting PCR fragment was subcloned into the intermediate cloning vector pGEM-T easy (Promega) according the manufacturer's protocol to give plasmid pRSP19/pGEM. The gene for the *S. diclina* delta-17 desaturase was released from pRSP19/pGEM by partial digestion with NotI and cloned into the NotI site of pKS123 to give pKS203.

In plasmid pKS134, both the *M. alpina* elongase and *M. alpina* delta-5 desaturase were cloned behind the β-conglycinin promoter followed by the phaseolin 3' transcription terminator (βcon/Maelo/Phas3' cassette, βcon/Mad5/Phas3' cassette). Plasmid pKS134 was constructed by cloning the HindIII fragment of pKS129, containing the βcon/Mad5/Phas3' cassette, into a HindIII site of partially digested pKS128, containing the βcon/Maelo/Phas3'cassette, the T7prom/hpt/T7term cassette and the bacterial ori region. The gene for the *M. alpina* elongase was amplified from pRPB2 using primers RPB2forward (SEQ ID NO:55) and RPB2reverse (SEQ ID NO:56) which were designed to introduce NotI restriction enzyme sites at both ends of the elongase.

```
GCGGCCGCATGGAGTCGATTGCGC       (SEQ ID NO: 55)

GCGGCCGCTTACTGCAACTTCCTT       (SEQ ID NO: 56)
```

The resulting PCR fragment was digested with NotI and cloned into the NotI site of pKS119, containing a βcon/NotI/Phas3' cassette, the T7prom/hpt/T7term cassette and the bacterial ori region, to give pKS1 28. Plasmid pKS119 is identical to pKS123, except that the 35S/HPT/NOS3' cassette had been removed. The gene for the *M. alpina* delta-5 desaturase was amplified from pCGR4 using primers CGR4forward (SEQ ID NO:57) and CGR4reverse (SEQ ID NO:58) which were designed to introduce NotI restriction enzyme sites at both ends of the desaturase.

```
GCGGCCGCATGGGAACGGACCAAG       (SEQ ID NO: 57)

GCGGCCGCCTACTCTTCCTTGGGA       (SEQ ID NO: 58)
```

The resulting PCR fragment was digested with NotI and cloned into the NotI site of pKS119, containing a βcon/NotI/Phas3' cassette flanked by HindIII sites, to give pKS129.

Example 4

Assembling EPA Biosynthetic Pathway Genes for Expression in Somatic Soybean Embryos and Soybean Seeds (pKR274)

The *M. alpina* delta-6 desaturase, *M. alpina* elongase and *M. alpina* delta-5 desaturase were cloned into plasmid pKR274 (FIG. 3) behind strong, seed-specific promoters allowing for high expression of these genes in somatic soybean embryos and soybean seeds. The delta-6 desaturase was cloned behind the promoter for the α' subunit of β-conglycinin [Beachy et al., (1985) *EMBO J.* 4:3047-3053]followed by the 3' transcription termination region of the phaseolin gene [Doyle, J. J. et al. (1986) *J. Biol. Chem.* 261:9228-9238] (βcon/Mad6/Phas3' cassette). The delta-5 desaturase was cloned behind the Kunitz soybean Trypsin Inhibitor (KTi) promoter [Jofuku et al., (1989) *Plant Cell* 1:1079-1093], followed by the KTi 3' termination region, the isolation of which is described in U.S. Pat. No. 6,372,965 (KTi/Mad5/KTi3' cassette). The elongase was cloned behind the glycinin Gy1 promoter followed by the pea leguminA23' termination region (Gy1/Maelo/legA2 cassette). All of these promoters exhibit strong tissue specific expression in the seeds of soybean. Plasmid pKR274 also contains the hygromycin B phosphotransferase gene [Gritz, L. and Davies, J. (1983) *Gene* 25:179-188] cloned behind the T7 RNA polymerase promoter and followed by the T7 terminator (T7prom/HPT/T7term cassette) for selection of the plasmid on hygromycin B in certain strains of *E. coli*, such as NovaBlue(DE3) (Novagen, Madison, Wis.), which is lysogenic for lambda DE3 (and carries the T7 RNA polymerase gene under lacUV5 control). In addition, plasmid pKR274 contains a bacterial origin of replication (ori) functional in *E. coli* from the vector pSP72 (Stratagene).

Plasmid pKR274 was constructed in many steps from a number of different intermediate cloning vectors. The Gy1/Maelo/legA2 cassette was released from plasmid pKR270 by digestion with BsiWI and SbfI and was cloned into the BsiWI/SbfI sites of plasmid pKR269, containing the delta-6 desaturase, the T7prom/hpt/T7term cassette and the bacterial ori region. This was designated as plasmid pKR272. The KTi/Mad5/KTi3' cassette, released from pKR136 by digestion with BsiWI, was then cloned into the BsiWI site of pKR272 to give pKR274. A description for plasmid construction for pKR269, pKR270 and pKR136 is provided below.

Plasmid pKR159 (described in Example 2) was digested with NotI to release the *M. alpina* delta-6 desaturase, which was, in turn, cloned into the NotI site of the soybean expression vector pKR197 to give pKR269. Vector pKR197 contains a βcon/NotI/Phas3' cassette, the T7prom/hpt/T7term cassette and the bacterial ori region. Vector pKR197 was constructed by combining the AscI fragment from plasmid pKS102 (WO 02/00905), containing the T7prom/hpt/T7term cassette and bacterial ori, with the AscI fragment of plasmid pKR72, containing the βcon/NotI/Phas cassette. Vector pKR72 is identical to the previously described vector pKS123 (WO 02/08269), except that SbfI, FseI and BsiWI restriction enzyme sites were introduced between the HindIII and BamHI sites in front of the β-conglycinin promoter.

The gene for the *M. alpina* elongase was PCR-amplified (described in Example 3) digested with NotI and cloned into the NotI site of vector pKR263 to give pKR270. Vector pKR263 contains a NotI site flanked by the promoter for the glycininGy1 gene and the leguminA23' transcription termination region (Gy1/NotI/legA2 cassette). In addition, the Gy1/NotI/legA2 cassette was flanked by SbfI and BsiWI sites. Vector pKR263 was constructed by combining the PstI/NotI fragment from plasmid pKR142, containing the leguminA23' transcription termination region, an ampicillin resistance gene and bacterial ori with the PstI/NotI fragment of plasmid pSGly12, containing the glycininGy1 promoter. The glycininGy1 promoter was amplified from pZBL119 (described in Example 2) using primer oSGly-1 (SEQ ID NO:59), designed to introduce an SbfI/PstI site at the 5'end of the promoter, and primer oSGly-2 (SEQ ID NO:60), designed to introduce a NotI site at the 3' end of the promoter.

```
TTCCTGCAGGCTAGCCTAAGTACGTACTC   (SEQ ID NO: 59)

AAGCGGCCGCGGTGATGACTG           (SEQ ID NO: 60)
```

The resulting PCR fragment was subcloned into the intermediate cloning vector pCR-Script AMP SK(+) (Stratagene) according the manufacturer's protocol to give plasmid pSGly12. Construction of pKR142, containing the legA2/NotI/legA23' cassette is described in Example 2. The gene for the *M. alpina* delta-5 desaturase was PCR-amplified as described in Example 3, digested with NotI and cloned into the NotI site of vector pKR124 (described in Example 2) to give pKR136.

Example 5

Assembling EPA Biosynthetic Pathway Genes for Expression in Somatic Soybean Embryos and Soybean Seeds (pKKE2)

The *S. diclina* delta-6 desaturase, *M. alpina* elongase and *M. alpina* delta-5 desaturase were cloned into plasmid pKKE2 (FIG. 4) behind strong, seed-specific promoters allowing for high expression of these genes in somatic soybean embryos and soybean seeds. Plasmid pKKE2 was identical to pKR274, described in Example 4, except that in pKKE2 the *M. alpina* delta-6 desaturase was replaced with the *S. diclina* delta-6 desaturase. As in pKR274, the *S. diclina* delta-6 desaturase was cloned behind the promoter for the α' subunit of β-conglycinin followed by the 3' transcription termination region of the phaseolin gene (βcon/Sdd6/Phas3' cassette).

Plasmid pKKE2 was constructed from a number of different intermediate cloning vectors as follows: The βcon/Sdd6/Phas3' cassette was released from plasmid pKS208 (described in Example 2) by digestion with HindIII and was cloned into the HindIII site of plasmid pKR272 (Example 3) to give pKR301. The KTi/Mad5/KTi3' cassette, released from pKR136, (Example 4) by digestion with BsiWI, was then cloned into the BsiWI site of pKR301 to give pKKE2.

Example 6

Cloning of *S. diclina* (ATCC 56851) Delta-17 Desaturase Construction of *Saprolegnia diclina* (ATCC 56851) cDNA Library To isolate genes encoding for functional desaturase enzymes, a cDNA library was constructed. *Saprolegnia diclina* cultures were grown in potato dextrose media (Difco # 336, BD Diagnostic Systems, Sparks, Md.) at room temperature for four days with constant agitation. The mycelia were harvested by filtration through several layers of cheesecloth, and the cultures were crushed in liquid nitrogen using a mortar and pestle. The cell lysates were resuspended in RT buffer (Qiagen, Valencia, Calif.) containing β-mercaptoethanol and incubated at 55° C. for three minutes. These lysates were homogenized either by repeated aspirations through a syringe or over a "Qiashredder"-brand column (Qiagen). The total RNA was finally purified using the "RNeasy Maxi"-brand kit (Qiagen), as per the manufacturer's protocol.

mRNA was isolated from total RNA from each organism using an oligo dT cellulose resin. The "pBluescript II XR"-brand library construction kit (Stratagene, La Jolla, Calif.) was used to synthesize double-stranded cDNA. The double-stranded cDNA was then directionally cloned (5' EcoRI/3' XhoI) into pBluescript II SK(+) vector (Stratagene). The *S. diclina* library contained approximately $2.5\times10^6$ clones, each with an average insert size of approximately 700 bp. Genomic DNA of *S. diclina* was isolated by crushing the culture in liquid nitrogen followed by purification using the "Genomic DNA Extraction"-brand kit (Qiagen), as per the manufacturer's protocol.

Determination of Codon Usage in *Saprolegnia diclina*

The 5' ends of 350 random cDNA clones were sequenced from the *Saprolegnia diclina* cDNA library described above. The sequences were translated into six reading frames using GCG program (Genetics Computer Group, Madison, Wis.) with the "FastA"-brand algorithm to search for similarity between a query sequence and a group of sequences of the same type, specifically within the GenBank database. Many of the clones were identified as putative housekeeping genes based on protein homology to known genes. Eight *S. diclina* cDNA sequences were thus selected. Additionally, the full-length *S. diclina* delta 5-desaturase and delta 6-desaturase sequences were also used (see Table 4 below). These sequences were then used to generate the *S. diclina* codon bias table shown in Table 2 below by employing the "CodonFrequency" program from GCG (Madison, Wis.).

TABLE 4

GENES FROM *Saprolegnia diclina* USED IN CODON BIAS TABLE

| Clone | Database Match | # bases | # amino acids |
|---|---|---|---|
| 3 | Actin gene | 615 | 205 |
| 20 | Ribosomal protein L23 | 420 | 140 |
| 55 | Heat Shock protein 70 gene | 468 | 156 |
| 83 | Glyceraldehyde-3-P-dehydrogenase gene | 588 | 196 |
| 138 | Ribosomal protein S13 gene | 329 | 110 |
| 179 | Alpha-tubulin 3 gene | 591 | 197 |
| 190 | Casein kinase II alpha subunit gene | 627 | 209 |
| 250 | Cyclophilin gene | 489 | 163 |
| | Delta 6-desaturase | 1362 | 453 |
| | Delta 5-desaturase | 1413 | 471 |
| | Total | 6573 | 2191 |

TABLE 5

CODON BIAS TABLE FOR *Saprolegnia diclina*

| Amino acid | Codon Bias | % used |
|---|---|---|
| Ala | GCC | 55% |
| Arg | CGC | 50% |
| Asn | AAC | 94% |
| Asp | GAC | 85% |
| Cys | TGC | 77% |
| Gln | CAG | 90% |
| Glu | GAG | 80% |
| Gly | GGC | 67% |
| His | CAC | 86% |
| Ile | ATC | 82% |
| Leu | CTC | 52% |

TABLE 5-continued

| CODON BIAS TABLE FOR *Saprolegnia diclina* | | |
|---|---|---|
| Amino acid | Codon Bias | % used |
| Lys | AAG | 87% |
| Met | ATG | 100% |
| Phe | TTC | 72% |
| Pro | CCG | 55% |
| Ser | TCG | 47% |
| Thr | ACG | 46% |
| Trp | TGG | 100% |
| Tyr | TAC | 90% |
| Val | GTC | 73% |
| Stop | TGA | 67% |

Design of Degenerate Oligonucleotides for the Isolation of an Omega-3 Desaturase from *Saprolegnia diclina* (ATCC 56851)

The method for identification of a delta-17 desaturase (an omega-3 desaturase) gene from *S. diclina* involved PCR amplification of a region of the putative desaturase gene using degenerate oligonucleotides (primers) that contained conserved motifs present in other known omega-3 desaturases. Omega-3 desaturases from the following organisms were used for the design of these degenerate primers: *Arabidopsis thaliana* (Swissprot # P46310), *Ricunus communis* (Swissprot # P48619), *Glycine max* (Swissprot # P48621), *Sesamum indicum* (Swissprot # P48620), *Nicotiana tabacum* (GenBank # D79979), *Perilla frutescens* (GenBank # U59477), *Capsicum annuum* (GenBank # AF222989), *Limnanthes douglassi* (GenBank # U17063), and *Caenorhabditis elegans* (GenBank # L41807). Some primers were designed to contain the conserved histidine-box motifs that are important components of the active site of the enzymes. See Shanklin, J. E., McDonough, V. M., and Martin, C. E. (1994) Biochemistry 33, 12787-12794.

Alignment of sequences was carried out using the CLUSTALW Multiple Sequence Alignment Program (Thompson, J. D. et al. (1994) *Nucl. Acids Res.* 22:4673-4680).

The following degenerate primers were designed and used in various combinations:

Protein Motif 1:
$NH_3$-TRAAIPKHCWVK-COOH (SEQ ID NO: 61)

Primer RO 1144 (Forward):
ATCCGCGCCGCCATCCCCAAGCACTGCTGGGTCAAG (SEQ ID NO: 62)

Protein Motif 2:
$NH_3$-ALFVLGHDCGHGSFS-COOH (SEQ ID NO: 63)

This primer contains the histidine-box 1 (underlined).

Primer RO 1119 (Forward):
(SEQ ID NO: 64)
GCCCTCTTCGTCCTCGGCCAYGACTGCGGCCAYGGCTCGTTCTCG.

Primer RO 1118 (Reverse):
(SEQ ID NO: 65)
GAGRTGGTARTGGGGGATCTGGGGGAAGARRTGRTGGRYGACRTG.

Protein Motif 3:
(SEQ ID NO: 66)
$NH_3$-PYHGWRISHRTHHQN-COOH

This primer contains the histidine-box 2 (underlined).

Primer RO 1121 (Forward):
(SEQ ID NO: 67)
CCCTACCAYGGCTGGCGCATCTCGCAYCGCACCCAYCAYCAGAAC.

Primer RO 1122 (Reverse):
(SEQ ID NO: 68)
GTTCTGRTGRTGGGTCCGRTGCGAGATGCGCCAGCCRTGGTAGGG.

Protein Motif 4:
(SEQ ID NO: 69)
$NH_3$-GSHF D/H P D/Y SDLFV-COOH

Primer RO 1146 (Forward):
(SEQ ID NO: 70)
GGCTCGCACTTCSACCCCKACTCGGACCTCTTCGTC.

Primer RO 1147 (Reverse):
(SEQ ID NO: 71)
GACGAAGAGGTCCGAGTMGGGGTWGAAGTGCGAGCC.

Protein Motif 5:
(SEQ ID NO: 72)
$NH_3$-WS Y/F L/V RGGLTT L/I DR-COOH

Primer RO 1148 (Reverse):
(SEQ ID NO: 73)
GCGCTGGAKGGTGGTGAGGCCGCCGCGGAWGSACGACCA Protein Motif 6:
(SEQ ID NO: 74)
$NH_3$-HHDIGTHVIHHLFPQ-COOH This sequence contains the third histidine-box (underlined).

Primer RO 1114 (Reverse):
(SEQ ID NO: 75)
CTGGGGGAAGAGRTGRTGGATGACRTGGGTGCCGATGTCRTGRTG.

Protein Motif 7:
(SEQ ID NO: 76)
$NH_3$- H L/F FP Q/K IPHYHL V/I EAT-COOH

Primer RO 1116 (Reverse):
(SEQ ID NO: 77)
GGTGGCCTCGAYGAGRTGGTARTGGGGGATCTKGGGGAAGARRTG.

Protein Motif 8:
(SEQ ID NO: 78)
$NH_3$-HV A/I HH L/F FPQIPHYHL-COOH

This primer contains the third histidine-box (underlined) and accounts for differences between the plant omega-3 desaturases and the *C. elegans* omega-3-desaturase. The nucleic acid degeneracy code used for SEQ. ID NOs: 62 through 77 was as follows. R=A/G; Y=C/T; M=A/C; K=G/T; W=A/T; S=C/G; B=C/G/T; D=A/G/T; H=A/C/T; V=A/C/G; and N=A/C/G/T.

Identification and Isolation of Delta-17 Desaturase Gene from *Saprolegnia diclina* (ATCC 56851)

Various sets of the degenerate primers above were used in PCR amplification reactions, using as a template either the *S. diclina* cDNA library plasmid DNA, or *S. diclina* genomic DNA. Also various different DNA polymerases and reaction conditions were used for the PCR amplifications. These reactions variously involved using "Platinum Taq"-brand DNA polymerase (Life Technologies Inc., Rockville, Md.), or cDNA polymerase (Clontech, Palo Alto, Calif.), or Taq PCR-mix (Qiagen), at differing annealing temperatures.

PCR amplification using the primers RO 1121 (Forward) (SEQ. ID NO:67) and RO 1116 (Reverse) (SEQ. ID NO:77) resulted in the amplification of a fragment homologous to a known omega-3 desaturase. The RO 1121 (Forward) primer corresponds to the protein motif 3; the RO 1116 (Reverse) primer corresponds to the protein motif 7.

PCR amplification was carried out in a 50 μl total volume containing: 3 μl of the cDNA library template, PCR buffer containing 40 mM Tricine-KOH (pH 9.2), 15 mM KOAc, 3.5 mM $Mg(OAc)_2$, 3.75 μg/ml BSA (final concentration), 200 μM each deoxyribonucleotide triphosphate, 10 pmole of each primer and 0.5 μl of "Advantage"-brand cDNA polymerase (Clontech). Amplification was carried out as follows: initial denaturation at 94° C. for 3 minutes, followed by 35 cycles of the following: 94° C. for 1 min, 60° C. for 30 sec, 72° C. for 1 min. A final extension cycle of 72° C. for 7 min was carried out, followed by reaction termination at 4° C.

A single ~480 bp PCR band was generated which was resolved on a 1% "SeaKem Gold"-brand agarose gel (FMC BioProducts, Rockland, Me.), and gel-purified using the Qiagen Gel Extraction Kit. The staggered ends on the fragment were "filled-in" using T4 DNA polymerase (Life Technologies, Rockville, Md.) as per the manufacturer's instructions, and the DNA fragments were cloned into the PCR-Blunt vector (Invitrogen, Carlsbad, Calif.). The recombinant plasmids were transformed into TOP10 supercompetent cells (Invitrogen), and eight clones were sequenced and a database search (Gen-EMBL) was carried out.

Clones "sdd17-7-1" to "sdd17-7-8" were all found to contain and ~483 bp insert. The deduced amino acid sequence from this fragment showed highest identity to the following proteins (based on a "tFastA" search):

1. 37.9% identity in 161 amino acid overlap with an omega-3 (delta-15) desaturase from *Synechocystis* sp. (Accession # D13780).

2. 40.7% identity in 113 amino acid overlap with *Picea abies* plastidic omega-3 desaturase (Accession # AJ302017).

3. 35.9% identity in 128 amino acid overlap with *Zea mays* FAD8 fatty acid desaturase (Accession # D63953).

Based on its sequence homology to known omega-3 fatty acid desaturases, it seemed likely that this DNA fragment was part of a delta-17 desaturase gene present in *S. diclina*.

The DNA sequence identified above was used in the design oligonucleotides to isolate the 3' and the 5' ends of this gene from the *S. diclina* cDNA library. To isolate the 3' end of the gene, the following oligonucleotides were designed:

```
                                         (SEQ ID NO: 79)
RO 1188 (For-      5'-TACGCGTACCTCACGTACTCGCTCG-3'
ward):

                                         (SEQ ID NO: 80)
RO 1189 (For-      TTCTTGCACCACAACGACGAAGCGACG
ward):

                                         (SEQ ID NO: 81)
RO 1190 (For-      GGAGTGGACGTACGTCAAGGGCAAC
ward):

                                         (SEQ ID NO: 82)
RO 1191 (For-      TCAAGGGCAACCTCTCGAGCGTCGAC
ward):
```

These primers (SEQ ID NOS: 79-82) were used in combinations with the pBluescript SK(+) vector oligonucleotide:

```
                                         (SEQ ID NO: 83)
   RO 898:   5'-CCCAGTCACGACGTGTAAAACGACGGCCAG-3'.
```

PCR amplifications were carried out using either the "Taq PCR Master Mix"brand polymerase (Qiagen) or "Advantage"-brand cDNA polymerase (Clontech) or "Platinum"-brand Taq DNA polymerase (Life Technologies), as follows:

For the "Taq PCR Master Mix" polymerase, 10 pmoles of each primer were used along with 1 μl of the cDNA library DNA from Example 1. Amplification was carried out as follows: initial denaturation at 94° C. for 3 min, followed by 35 cycles of the following: 94° C. for 1 min, 60° C. for 30 sec, 72° C. for 1 min. A final extension cycle of 72° C. for 7 min was carried out, followed by the reaction termination at 4° C. This amplification resulted in the most distinct bands as compared with the other two conditions tested.

For the "Advantage"-brand cDNA polymerase reaction, PCR amplification was carried out in a 50 μl total volume containing: 1 μl of the cDNA library template from Example 1, PCR buffer containing 40 mM Tricine-KOH (pH 9.2), 15 mM KOAc, 3.5 mM $Mg(OAc)_2$, 3.75 μg/ml BSA (final concentration), 200 μM each deoxyribonucleotide triphosphate, 10 pmole of each primer and 0.5 μl of cDNA polymerase (Clontech). Amplification was carried out as described for the Taq PCR Master Mix.

For the "Platinum"-brand Taq DNA polymerase reaction, PCR amplification was carried out in a 50 μl total volume containing: 1 μl of the cDNA library template from Example 1, PCR buffer containing 20 mM Tris-Cl, pH 8.4, 50 mM KCl (final concentration), 200 μM each deoxyribonucleotide triphosphate, 10 pmole of each primer, 1.5 mM $MgSO_4$, and 0.5 μl of Platinum Taq DNA polymerase. Amplification was carried out as follows: initial denaturation at 94° C. for 3 min, followed by 30 cycles of the following: 94° C. for 45 sec, 55° C. for 30 sec, 68° C. for 2 min. The reaction was terminated at 4° C.

All four sets of primers in combination with the vector primer generated distinct bands. PCR bands from the combination (RO 1188+RO 898) were >500 bp and this was gel-purified and cloned separately. The PCR bands generated from the other primer combinations were <500 bp. The bands were gel-purified, pooled together, and cloned into PCR-Blunt vector (Invitrogen) as described earlier. The recombinant plasmids were transformed into TOP10 supercompetent cells (Invitrogen) and clones were sequenced and analyzed.

Clone "sdd17-16-4" and "sdd16-6" containing the ~500 bp insert, and clones "sdd17-17-6," "sdd17-17-10," and "sdd17-20-3," containing the ~400 bp inserts, were all found to contain the 3'-end of the putative delta-17 desaturase. These sequences overlapped with each other, as well as with the originally identified fragment of this putative omega-3 desaturase gene. All of the sequences contained the 'TAA' stop codon and a poly-A tail typical of 3'-ends of eukaryotic genes. This 3'-end sequence was homologous to other known omega-3 desaturases, sharing the highest identity (41.5% in 130 amino acid overlap) with the *Synechocystis* delta-15 desaturase (Accession # D13780).

For the isolation of the 5'-end of the this gene, the following oligonucleotides were designed and used in combinations with the pBluescript SK(+) vector oligonucleotide:

```
RO 899:
                                         (SEQ ID NO: 84)
5'-AGCGGATAACAATTTCACACAGGAAACAGC-3'

RO 1185 (Reverse):
                                         (SEQ ID NO: 85)
GGTAAAAGATCTCGTCCTTGTCGATGTTGC.
```

-continued

RO 1186 (Reverse):

(SEQ ID NO: 86)

5'-GTCAAAGTGGCTCATCGTGC-3'

RO 1187 (Reverse):

(SEQ ID NO: 87)

CGAGCGAGTACGTGAGGTACGCGTAC

Amplifications were carried out using either the "Taq PCR Master Mix"-brand polymerase (Qiagen) or the "Advantage"-brand cDNA polymerase (Clontech) or the "Platinum"-brand Taq DNA polymerase (Life Technologies), as described hereinabove for the 3' end isolation.

PCR bands generated from primer combinations (RO 1185 or RO 1186+RO 899) were between ~580 to ~440 bp and these were pooled and cloned into PCR-Blunt vector as described above. Clones thus generated included "sdd17-14-1,""sdd17-14-10," "sdd17-18-2," and "sdd17-18-8," all of which showed homology with known omega-3 desaturases.

Additionally, bands generated from (RO 1187+RO 899) were ~680 bp, and these were cloned separately to generate clones "sdd17-22-2" and "sdd17-22-5"which also showed homology with known omega-3 desaturases. All these clones overlapped with each other, as well as with the original fragment of the unknown putative delta-17 desaturase. These sequences contained an 'ATG' site followed by an open reading frame, indicating that it is the start site of this gene. These fragments showed highest identity (39.7% in 146 amino acid overlap) with the delta-15 desaturase from *Calendula officinalis* (Accession # AJ245938).

The full-length reading frame for this delta-17 desaturase was obtained by PCR amplification of the *S. diclina* cDNA library using the following oligonucleotides:

RO 1212 (Forward):

(SEQ ID NO: 88)

5'-TCAACAGAATTCATGACCGAGGATAAGACGAAGGTCGAGTTCCC

G-3'

This primer contains the 'ATG' start site (single underline) followed by the 5'sequence of the omega-3 desaturase. In addition, an EcoRI site (double underline) was introduced upstream of the start site to facilitate cloning into the yeast expression vector pYX242.

RO 1213 (Reverse):

(SEQ ID NO: 89)

5'-AAAAGAAAGCTTCGCTTCCTAGTCTTAGTCCGACTTGGCCTTGG

C-3'

This primer contains the 'TAA' stop codon (single underline) of the gene as well as sequence downstream from the stop codon. This sequence was included because regions within the gene were very G+C rich, and thus could not be included in the design of oligonucleotides for PCR amplification. In addition, a HindIII site (double underline) was included for convenient cloning into a yeast expression vector pYX242.

PCR amplification was carried out using the "Taq PCR Master Mix"-brand polymerase (Qiagen), 10 pmoles of each primer, and 1 μl of the cDNA library DNA from Example 1. Amplification was carried out as follows: initial denaturation at 94° C. for 3 min, followed by 35 cycles of the following: 94° C. for 1 min, 60° C. for 30 sec, 72° C. for 1 min. A final extension cycle of 72° C. for 7 min was carried out, followed by the reaction termination at 4° C.

A PCR band of ~1 kb was thus obtained and this band was isolated, purified, cloned into PCR-Blunt vector (Invitrogen), and transformed into TOP10 cells. The inserts were sequenced to verify the gene sequence. Clone "sdd17-27-2" was digested with EcoRI/HindIII to release the full-length insert, and this insert was cloned into yeast expression vector pYX242, previously digested with EcoRI/HindIII. This construct contained 1077 bp of sdd17 cloned into pYX242. This construct was labeled pRSP19.

Example 7

Assembly of EPA Biosynthetic Pathway Genes for Expression in Somatic Soybean Embryos and Soybean Seeds (pKR275)

The *Arabidopsis* Fad3 gene [Yadav, N. S. et al. (1993), Plant Physiol. 103:467-76] and *S. diclina* delta-17 desaturase were cloned into plasmid pKR275 (FIG. 5) behind strong, seed-specific promoters allowing for high expression of these genes in somatic soybean embryos and soybean seeds. The Fad3 gene SEQ ID NO:47, and its protein translation product in SEQ ID NO:48, was cloned behind the KTi promoter, and upstream of the KTi 3' termination region (KTi/Fad3/KTi3' cassette). The *S. diclina* delta-17 desaturase was cloned behind the soybean annexin promoter followed by the soy BD30 3' termination region (Ann/Sdd17/BD30 cassette). Plasmid pKR275 also contains a mutated form of the soy acetolactate synthase (ALS) that is resistant to sulfonylurea herbicides. ALS catalyzes the first common step in the biosynthesis of the branched chain amino acids isoleucine, leucine, and valine (Keeler et al, *Plant Physiol* 1993 102: 1009-18). Inhibition of native plant ALS by several classes of structurally unrelated herbicides including sulfonylureas, imidazolinones, and triazolopyrimidines, is lethal (Chong C K, Choi J D *Biochem Biophys Res Commun* 2000 279:462-7). Overexpression of the mutated sulfonylurea-resistant ALS gene allows for selection of transformed plant cells on sulfonylurea herbicides. The ALS gene is cloned behind the SAMS promoter (described in WO 00/37662). This expression cassette is set forth in SEQ ID NO:90. In addition, plasmid pKR275 contains a bacterial ori region and the T7prom/HPT/T7term cassette for replication and selection of the plasmid on hygromycin B in bacteria.

Plasmid pKR275 was constructed from a number of different intermediate cloning vectors as follows: The KTi/Fad3/KTi3' cassette was released from plasmid pKR201 by digestion with BsiWI and was cloned into the BsiWI site of plasmid pKR226, containing the ALS gene for selection, the T7prom/hpt/T7term cassette and the bacterial ori region. This was designated plasmid pKR273. The Ann/Sdd17/BD30 cassette, released from pKR271 by digestion with PstI, was then cloned into the SbfI site of pKR273 to give pKR275. A detailed description for plasmid construction for pKR226, pKR201 and pKR271 is provided below.

Plasmid pKR226 was constructed by digesting pKR218 with BsiWI to remove the legA2/NotI/legA3' cassette. Plasmid pKR218 was made by combining the filled HindIII/SbfI fragment of pKR217, containing the legA2/NotI/legA23' cassette, the bacterial ori and the T7prom/HPT/T7term cassette, with the PstI/SmaI fragment of pZSL13leuB, containing the SAMS/ALS/ALS3' cassette. Plasmid pKR217 was constructed by cloning the BamHI/HindIII fragment of pKR142 (described in Example 2), containing the legA2/NotI/legA23' cassette, into the BamHI/HindIII site of KS102. The *Arabidopsis* Fad3 gene was released from vector pKS131 as a NotI fragment and cloned into the NotI site of pKR124 (described in Example 2) to form pKR201. The NotI fragment from pKS131 is identical to that from pCF3 [Yadav, N. S. et al (1993) *Plant Physiol.* 103:467-76])

The gene for the *S. diclina* delta-17 desaturase was released from pRSP19/pGEM (described in Example 2) by partial digestion with NotI, and it was then cloned into the NotI site of pKR268 to give pKR271. Vector pKR268 contains a NotI site flanked by the annexin promoter and the BD30 3' transcription termination region (Ann/NotI/BD30 cassette). In addition, the Ann/NotI/BD30 cassette was flanked by PstI sites.

To construct pKR268, the annexin promoter from pJS92 was released by BamHI digestion and the ends were filled. The resulting fragment was ligated into the filled BsiWI fragment of pKR124 (described in Example 2), containing the bacterial ori and ampicillin resistance gene, to give pKR265. This cloning step added SbfI, PstI and BsiWI sites to the 5' end of the annexin promoter. The annexin promoter was released from pKR265 by digestion with SbfI and NotI and was cloned into the SbfI/NotI fragment of pKR256, containing the BD30 3' transcription terminator, an ampicillin resistance gene and a bacterial ori region, to give pKR268. Vector pKR256 was constructed by cloning an EcoRI/NotI fragment from pKR251r, containing the BD30 3' transcription terminator, into the EcoRI/NotI fragment of intermediate cloning vector pKR227. This step also added a PstI site to the 3' end the BD30 3' transcription terminator. Plasmid pKR227 was derived by ligating the Sa/I fragment of pJS93 containing soy BD30 promoter (WO 01/68887) with the SalI fragment of pUC19. The BD30 3' transcription terminator was PCR-amplified from soy genomic DNA using primer oSBD30-1 (SEQ ID NO:91), designed to introduce an NotI site at the 5' end of the terminator, and primer oSBD30-2 (SEQ ID NO:92), designed to introduce a BsiWI site at the 3' end of the terminator.

```
TGCGGCCGCATGAGCCG                    (SEQ ID NO: 91)

ACGTACGGTACCATCTGCTAATATTTTAAATC     (SEQ ID NO: 92)
```

The resulting PCR fragment was subcloned into the intermediate cloning vector pCR-Script AMP SK(+) (Stratagene) according the manufacturer's protocol to give plasmid pKR251r.

Example 8

Assembling EPA Biosynthetic Pathway Genes for Expression in Somatic Soybean Embryos-pKR328 & pKR329

The EPA biosynthetic genes were tested in combination in order to assess their combined activities in somatic soybean embryos before large-scale production transformation into soybean. Each gene was cloned into an appropriate expression cassette as described below.

Plasmid pKR329 was similar to pKR275, described in detail in Example 4, in that it contained the same KTi/Fad3/KTi3' and Ann/Sdd17/BD30 cassettes allowing for strong, seed specific expression of the *Arabidopsis* Fad3 and *S. diclina* delta17 desaturase genes. It also contained the T7prom/HPT/T7term cassette and a bacterial ori. Plasmid pKR329 differed from pKR275 in that it contained the hygromycin phosphotransferase gene cloned behind the 35S promoter followed by the NOS 3' untranslated region (35S/HPT/NOS3' cassette) instead of the SAMS/ALS/ALS3' cassette. The 35S/HPT/NOS3' cassette allowed for selection of transformed plant cells on hygromycin-containing media.

Plasmid pKR329 was constructed in many steps from a number of different intermediate cloning vectors. The KTi/Fad3/KTi3' cassette was released from plasmid pKR201 (Example 7) by digestion with BsiWI and was cloned into the BsiWI site of plasmid pKR325, containing the 35S/HPT/NOS3' cassette, the T7prom/hpt/T7term cassette and bacterial ori. This was called plasmid pKR327. The Ann/Sdd17/BD30 cassette, released from pKR271 (Example 3) by digestion with PstI, was then cloned into the SbfI site of pKR327 to give pKR329. Plasmid pKR325 was generated from pKR72 (Example 4) by digestion with HindIII to remove the βcon/NotI/Phas3' cassette.

Plasmid pKR328 was identical to pKR329, described above, except that it did not contain the KTi/Fad3/KTi3' cassette. The Ann/Sdd17/BD30 cassette, released from pKR271 (Example 3) by digestion with PstI, was cloned into the SbfI site of pKR325 (described above) to give pKR328.

Example 9

Transformation of Somatic Soybean Embryo Cultures

Culture Conditions

Soybean embryogenic suspension cultures (cv. Jack) were maintained in 35 ml liquid medium SB196 (see recipes below) on rotary shaker, 150 rpm, 26° C. with cool white fluorescent lights on 16:8 hr day/night photoperiod at light intensity of 60-85 μE/m2/s. Cultures are subcultured every 7 days to two weeks by inoculating approximately 35 mg of tissue into 35 ml of fresh liquid SB196 (the preferred subculture interval is every 7 days).

Soybean embryogenic suspension cultures were transformed with the plasmids and DNA fragments described in the following examples by the method of particle gun bombardment (Klein et al. 1987*; Nature,* 327:70). A DuPont Biolistic PDS1000/HE instrument (helium retrofit) was used for all transformations.

Soybean Embryogenic Suspension Culture Initiation

Soybean cultures were initiated twice each month with 5-7 days between each initiation.

Pods with immature seeds from available soybean plants 45-55 days after planting were picked, removed from their shells and placed into a sterilized magenta box. The soybean seeds were sterilized by shaking them for 15 minutes in a 5% Clorox solution with 1 drop of ivory soap (95 ml of autoclaved distilled water plus 5 ml Clorox and 1 drop of soap). Mix well. Seeds were rinsed using 2 1-liter bottles of sterile distilled water and those less than 4 mm were placed on individual microscope slides. The small end of the seed was cut and the cotyledons pressed out of the seed coat. Cotyledons were transferred to plates containing SB1 medium (25-30 cotyledons per plate). Plates were wrapped with fiber tape and stored for 8 weeks. After this time secondary embryos were cut and placed into SB196 liquid media for 7 days.

Preparation of DNA for Bombardment

Either an intact plasmid or a DNA plasmid fragment containing the genes of interest and the selectable marker gene was used for bombardment. Plasmid DNA for bombardment was routinely prepared and purified using the method described in the Promega™ Protocols and Applications Guide, Second Edition (page 106). Fragments of pKR274 (Example 4), pKKE2 (Example 5) and pKR275 (Example 7) were obtained by gel isolation of double digested plasmids. In each case, 100 ug of plasmid DNA was digested in 0.5 ml of the specific enzyme mix described below. Plasmid pKR274 (Example 4) and pKKE2 (Example 5) were digested with AscI (100 units) and EcoRI (100 units) in NEBuffer 4 (20 mM Tris-acetate, 10 mM magnesium acetate, 50 mM potassium acetate, 1 mM dithiothreitol, pH 7.9), 100 ug/ml BSA, and 5 mM beta-mercaptoethanol at 37° C. for 1.5 hr. Plasmid pKR275 (Example 7) was digested with AscI (100 units) and SgfI (50 units) in NEBuffer 2 (10 mM Tris-HCl, 10 mM $MgCl_2$, 50 mM NaCl, 1 mM dithiothreitol, pH 7.9), 100

μg/ml BSA, and 5 mM beta-mercaptoethanol at 37° C. for 1.5 hr. The resulting DNA fragments were separated by gel electrophoresis on 1% SeaPlaque GTG agarose (BioWhitaker Molecular Applications) and the DNA fragments containing EPA biosynthetic genes were cut from the agarose gel. DNA was purified from the agarose using the GELase digesting enzyme following the manufacturer's protocol.

A 50 μl aliquot of sterile distilled water containing 3 mg of gold particles (3 mg gold) was added to 5 μl of a 1 μg/μl DNA solution (either intact plasmid or DNA fragment prepared as described above), 50 μl 2.5M $CaCl_2$ and 20 μl of 0.1 M spermidine. The mixture was shaken 3 min on level 3 of a vortex shaker and spun for 10 sec in a bench microfuge. After a wash with 400 μl 100% ethanol the pellet was suspended by sonication in 40 μl of 100% ethanol. Five μl of DNA suspension was dispensed to each flying disk of the Biolistic PDS1000/HE instrument disk. Each 5 μl aliquot contained approximately 0.375 mg gold per bombardment (i.e. per disk).

Tissue Preparation and Bombardment with DNA

Approximately 150-200 mg of 7 day old embryonic suspension cultures were placed in an empty, sterile 60×15 mm petri dish and the dish covered with plastic mesh. Tissue was bombarded 1 or 2 shots per plate with membrane rupture pressure set at 1100 PSI and the chamber evacuated to a vacuum of 27-28 inches of mercury. Tissue was placed approximately 3.5 inches from the retaining/stopping screen.

Selection of Transformed Embryos

Transformed embryos were selected either using hygromycin (when the hygromycin phosphotransferase, HPT, gene was used as the selectable marker) or chlorsulfuron (when the acetolactate synthase, ALS, gene was used as the selectable marker).

Hygromycin (HPT) Selection

Following bombardment, the tissue was placed into fresh SB196 media and cultured as described above. Six days post-bombardment, the SB196 is exchanged with fresh SB196 containing a selection agent of 30 mg/L hygromycin. The selection media is refreshed weekly. Four to six weeks post selection, green, transformed tissue may be observed growing from untransformed, necrotic embryogenic clusters. Isolated, green tissue was removed and inoculated into multiwell plates to generate new, clonally propagated, transformed embryogenic suspension cultures.

Chlorsulfuron (ALS) Selection

Following bombardment, the tissue was divided between 2 flasks with fresh SB196 media and cultured as described above. Six to seven days post-bombardment, the SB196 was exchanged with fresh SB196 containing selection agent of 100 ng/ml Chlorsulfuron. The selection media was refreshed weekly. Four to six weeks post selection, green, transformed tissue may be observed growing from untransformed, necrotic embryogenic clusters. Isolated, green tissue was removed and inoculated into multiwell plates containing SB196 to generate new, clonally propagated, transformed embryogenic suspension cultures.

Regeneration of Soybean Somatic Embryos into Plants

In order to obtain whole plants from embryogenic suspension cultures, the tissue must be regenerated.

Embryo Maturation

Embryos were cultured for 4-6 weeks at 26° C. in SB196 under cool white fluorescent (Phillips cool white Econowatt F40/CW/RS/EW) and Agro (Phillips F40 Agro) bulbs (40 watt) on a 16:8 hr photoperiod with light intensity of 90-120 uE/m2s. After this time embryo clusters were removed to a solid agar media, SB166, for 1-2 weeks. Clusters were then subcultured to medium SB103 for 3 weeks. During this period, individual embryos can be removed from the clusters and screened for alterations in their fatty acid compositions as described in Example 11. It should be noted that any detectable phenotype, resulting from the expression of the genes of interest, could be screened at this stage. This would include, but not be limited to, alterations in fatty acid profile, protein profile and content, carbohydrate content, growth rate, viability, or the ability to develop normally into a soybean plant.

Embryo Desiccation and Germination

Matured individual embryos were desiccated by placing them into an empty, small petri dish (35×10 mm) for approximately 4-7 days. The plates were sealed with fiber tape (creating a small humidity chamber). Desiccated embryos were planted into SB71-4 medium where they were left to germinate under the same culture conditions described above. Germinated plantlets were removed from germination medium and rinsed thoroughly with water and then planted in Redi-Earth in 24-cell pack tray, covered with clear plastic dome. After 2 weeks the dome was removed and plants hardened off for a further week. If plantlets looked hardy they were transplanted to 10" pot of Redi-Earth with up to 3 plantlets per pot. After 10 to 16 weeks, mature seeds were harvested, chipped and analyzed for fatty acids as described in Examples 10 and 11.

Media Recipes

SB 196-FN Lite liquid proliferation medium (per liter) -

| | |
|---|---|
| MS FeEDTA - 100x Stock 1 | 10 ml |
| MS Sulfate - 100x Stock 2 | 10 ml |
| FN Lite Halides - 100x Stock 3 | 10 ml |
| FN Lite P, B, Mo - 100x Stock 4 | 10 ml |
| B5 vitamins (1 ml/L) | 1.0 ml |
| 2,4-D (10 mg/L final concentration) | 1.0 ml |
| KNO3 | 2.83 gm |
| (NH4)2 SO 4 | 0.463 gm |
| Asparagine | 1.0 gm |
| Sucrose (1%) | 10 gm |
| pH 5.8 | |

FN Lite Stock Solutions

| Stock # | | 1000 ml | 500 ml |
|---|---|---|---|
| 1 | MS Fe EDTA 100x Stock | | |
| | $Na_2$ EDTA* | 3.724 g | 1.862 g |
| | $FeSO_4—7H_2O$ | 2.784 g | 1.392 g |

* Add first, dissolve in dark bottle while stirring

| Stock # | | 1000 ml | 500 ml |
|---|---|---|---|
| 2 | MS Sulfate 100x stock | | |
| | $MgSO_4—7H_2O$ | 37.0 g | 18.5 g |
| | $MnSO_4—H_2O$ | 1.69 g | 0.845 g |
| | $ZnSO_4—7H_2O$ | 0.86 g | 0.43 g |
| | $CuSO_4—5H_2O$ | 0.0025 g | 0.00125 g |
| 3 | FN Lite Halides 100x Stock | | |
| | $CaCl_2—2H_2O$ | 30.0 g | 15.0 g |
| | KI | 0.083 g | 0.0715 g |
| | $CoCl_2—6H_2O$ | 0.0025 g | 0.00125 g |
| 4 | FN Lite P, B, Mo 100x Stock | | |
| | $KH_2PO_4$ | 18.5 g | 9.25 g |
| | $H_3BO_3$ | 0.62 g | 0.31 g |
| | $Na_2MoO_4—2H_2O$ | 0.025 g | 0.0125 g |

SB1 solid medium (per liter) -

1 pkg. MS salts (Gibco/BRL-Cat# 11117-066)
1 ml B5 vitamins 1000X stock
31.5 g sucrose
2 ml 2,4-D (20 mg/L final concentration)
pH 5.7
8 g TC agar SB 166 solid medium (per liter) -

1 pkg. MS salts (Gibco/BRL-Cat# 11117-066)
1 ml B5 vitamins 1000X stock
60 g maltose
750 mg MgCl2 hexahydrate
5 g activated charcoal
pH 5.7
2 g gelrite -continued

| |
|---|
| SB 103 solid medium (per liter) - |
| 1 pkg. MS salts (Gibco/BRL-Cat# 11117-066)<br>1 ml B5 vitamins 1000X stock<br>60 g maltose<br>750 mg MgCl2 hexahydrate<br>pH 5.7<br>2 g gelrite<br>SB 71-4 solid medium (per liter) - |
| 1 bottle Gamborg's B5 salts w/ sucrose (Gibco/BRL-Cat# 21153-036)<br>pH 5.7<br>5 g TC agar<br>2,4-D stock - |
| obtained premade from Phytotech cat# D 295-concentration is 1 mg/ml<br>B5 Vitamins Stock (per 100 ml) - store aliquots at −20 C. |
| 10 g myo-inositol<br>100 mg nicotinic acid<br>100 mg pyridoxine HCl<br>1 g thiamine<br>If the solution does not dissolve quickly enough, apply a low level of heat via the hot stir plate.<br>Chlorsulfuron Stock - |
| 1 mg/ml in 0.01 N Ammonium Hydroxide |

Example 10

Analysis of Somatic so Embryos Containing Various Promoters Driving *M. Alpina* Delta-6 Desaturase Mature somatic soybean embryos are a good model for zygotic embryos. While in the globular embryo state in liquid culture, somatic soybean embryos contain very low amounts of triacylglycerol or storage proteins typical of maturing, zygotic soybean embryos. At this developmental stage, the ratio of total triacylglyceride to total polar lipid (phospholipids and glycolipid) is about 1:4, as is typical of zygotic soybean embryos at the developmental stage from which the somatic embryo culture was initiated. At the globular stage as well, the mRNAs for the prominent seed proteins, α'-subunit of β-conglycinin, kunitz trypsin inhibitor 3, and seed lectin are essentially absent. Upon transfer to hormone-free media to allow differentiation to the maturing somatic embryo state, triacylglycerol becomes the most abundant lipid class. As well, mRNAs for α'-subunit of β-conglycinin, kunitz trypsin inhibitor 3 and seed lectin become very abundant messages in the total mRNA population. On this basis somatic soybean embryo system behaves very similarly to maturing zygotic soybean embryos in vivo, and is therefore a good and rapid model system for analyzing the phenotypic effects of modifying the expression of genes in the fatty acid biosynthesis pathway. Most importantly, the model system is also predictive of the fatty acid composition of seeds from plants derived from transgenic embryos.

Transgenic somatic soybean embryos containing the *M. alpina* delta-6 desaturase expression vectors described in Example 2 were prepared using the methods described In Example 9. Fatty acid methyl esters were prepared from single, matured, somatic soy embryos by transesterification. Embryos were placed in a vial containing 50 μL of trimethylsulfonium hydroxide (TMSH) and 0.5 mL of hexane and were incubated for 30 minutes at room temperature while shaking. Fatty acid methyl esters (5 μL injected from hexane layer) were separated and quantified using a Hewlett-Packard 6890 Gas Chromatograph fitted with an Omegawax 320 fused silica capillary column (Supelco Inc., Cat#24152). The oven temperature was programmed to hold at 220° C. for 2.7 min, increase to 240° C. at 20° C./min and then hold for an additional 2.3 min. Carrier gas was supplied by a Whatman hydrogen generator. Retention times were compared to those for methyl esters of standards commercially available (Nu-Chek Prep, Inc. catalog #U-99-A). The amount of GLA accumulated in embryo tissue was used as an indicator of the strength of each individual promoter. As indicated in Table 6, all of the promoters tested were capable of driving expression of the *M. alpina* delta-6 desaturase.

TABLE 6

GLA Accumulation in Soybean Somatic Embryos: *M. alpina* Delta-6 Desaturase Gene Linked to Various Promoters

| Promoter | GLA (% fatty acid) |
|---|---|
| Soy α'-subunit β-conglycinin | 40+ |
| Soy KTi 3 | 40+ |
| Soy Annexin | 40 |
| Soy Glycinin 1 | 35 |
| Soy 2S albumin | 22 |
| Pea Legumin A1 | 10 |
| Soy β'-subunit β-conglycinin | 9 |
| Soy BD30 | 8 |
| Pea Legumin A2 | 3 |

Example 11

Analysis of Transgenic Somatic Soy Embryos and Seed Chips containing EPA Biosynthetic Genes Transgenic somatic soybean embryos containing the expression vector pKR275 (Example 7) and either pKR274 (Example 4) or pKKE2 (Example 5) were prepared using the methods described in Example 9.

A portion of the somatic soy embryos from each line generated was harvested and analyzed for fatty acid composition by GC as described in Example 10. Approximately 10 embryos were analyzed for each individual transformation event. Fatty acids were identified by comparison of retention times to those for authentic standards. In this way, 471 events were analyzed for pKR274/pKR275 and 215 events were analyzed for pKKE/pKR275. From the 471 lines analyzed for pKR274/pKR275, 10 were identified that produced EPA (average of 10 individual embryos) at a relative abundance greater than 7% of the total fatty acids. The best line analyzed averaged 9% EPA with the best embryo of this line having 13% EPA. From the 215 lines analyzed for KKE/KR275, 11 lines were identified that produced EPA (average of 10 individual embryos) at a relative abundance greater than 9% of the total fatty acids. The best line analyzed averaged 13% EPA with the best embryo of this line having 16% EPA. The best EPA-producing events from each construct set are shown in Table 7. In Table 7, clones 3306-2-3 to 3324-1-3 are pKR274/pKR275 events and 3338-6-3 to 3338-6-24 are pKKE2 events. Fatty acids in Table 7 are defined as X:Y where X is the fatty acid chain length and Y is the number of double bonds. In addition, fatty acids from Table 7 are further defined as follows where the number in parentheses corresponds to the position of the double bonds from the carboxyl end of the fatty acid: 18:1=18:1(9), 18:2=18:2(9, 12), GLA=18:3(6, 9, 12), 18:3=18:3(9, 12, 15), STA=18:4(6, 9, 12, 15), HGLA=20:3(8, 11, 14), ARA=20:4 (5, 8, 11, 14), ETA=20:4(8, 11, 14, 17), EPA=20:5(5, 8, 11, 14, 17) and DPA=22:5(7, 10, 13, 16, 19). Fatty acids listed as "others" include: 20:0, 20:1(5), 20:2(11, 14), 20:3 (5, 11, 14), 20:3 (11, 14, 17), 20:4 (5, 11, 14, 17), and 22:0. For KKE2 events each of these fatty acids is present at relative abundance of less than 1% of the total fatty acids. For KR274/275 each of these fatty acids is present at relative abundance of less than 1% of total fatty acids except for events 3306-5-2, 3319-6-1, 3319-2-13 in which 20:3 (11, 14, 17) and 20:4 (5, 11, 14, 17) are both in the range of 1.1 to 2.2% of total fatty acids.

TABLE 7

| Fatty acid analyses of transgenic soybean somatic embryos producing C20 PUFAs | | | | | | | | | | | | | |
|---|---|---|---|---|---|---|---|---|---|---|---|---|---|
| Clone ID | 16:0 | 18:0 | 18:1 | 18:2 | GLA | 18:3 | STA | HGLA | ARA | ETA | EPA | DPA | Others |
| 3306-2-3 | 14.9 | 2.3 | 6.3 | 15.8 | 21.7 | 11.5 | 4.5 | 4.8 | 0.8 | 2.7 | 8.4 | 1.2 | 2 |
| 3306-5-2 | 14.2 | 4.4 | 11.7 | 19.4 | 4.6 | 20.8 | 1.5 | 1.5 | 0.2 | 1.5 | 7.7 | 4.2 | 5.3 |
| 3319-3-1 | 18.2 | 2.9 | 11.0 | 19.1 | 15.6 | 14.5 | 3.4 | 1.8 | 1.3 | 0.6 | 8.4 | 0.6 | 1.2 |
| 3319-6-1 | 11.1 | 3.7 | 16.6 | 12.9 | 10.7 | 12.1 | 3.3 | 5.0 | 0.8 | 2.8 | 9.3 | 2.0 | 4 |
| 3319-2-13 | 12.7 | 3.3 | 17.5 | 14.2 | 10.8 | 15.9 | 3.1 | 2.4 | 0.1 | 2.8 | 8.0 | 1.1 | 3.3 |
| 3319-2-16 | 12.7 | 2.5 | 8.5 | 18.1 | 10.3 | 12.1 | 2.3 | 3.4 | 4.0 | 1.0 | 7.3 | 2.5 | 2.3 |
| 3319-3-6 | 11.7 | 2.0 | 10.1 | 13.2 | 11.5 | 7.7 | 1.9 | 2.8 | 0.7 | 1.8 | 9.3 | 1.8 | 3.3 |
| 3320-6-1 | 15.3 | 3.7 | 13.5 | 10.7 | 14.8 | 12.4 | 4.5 | 6.6 | 1.4 | 2.4 | 8.0 | 1.2 | 2.4 |
| 3322-5-2 | 13.9 | 2.9 | 14.4 | 15.6 | 17.4 | 13.8 | 3.5 | 2.9 | 0.2 | 1.8 | 8.1 | 0.9 | 2.2 |
| 3324-1-3 | 12.0 | 4.4 | 18.6 | 17.6 | 13.9 | 7.8 | 1.8 | 4.8 | 0.3 | 3.4 | 8.1 | 0.8 | 2.9 |
| 3338-6-3 | 14.3 | 3.2 | 18.1 | 11.0 | 13.7 | 8.8 | 3.0 | 5.1 | 0.2 | 5.3 | 9.6 | 1.2 | 2.1 |
| 3338-7-11 | 20.5 | 2.9 | 9.9 | 10.6 | 8.9 | 17.3 | 3.8 | 2.0 | 0.4 | 3.0 | 12.8 | 1.8 | 1.9 |
| 3338-7-12 | 16.5 | 2.1 | 15.2 | 15.4 | 16.1 | 11.5 | 2.5 | 1.7 | 0.2 | 2.0 | 10.0 | 0.8 | 1.2 |
| 3338-3-4 | 20.2 | 3.9 | 6.7 | 11.9 | 9.9 | 10.5 | 3.9 | 4.6 | 1.8 | 3.1 | 12.0 | 3.2 | 2.1 |
| 3338-3-5 | 14.7 | 2.2 | 12.4 | 12.4 | 17.6 | 10.8 | 4.7 | 2.9 | 1.3 | 1.4 | 10.0 | 0.9 | 1.8 |
| 3338-6-10 | 13.7 | 1.8 | 12.4 | 8.3 | 16.4 | 14.0 | 5.8 | 3.2 | 0.3 | 4.0 | 12.1 | 1.2 | 2.2 |
| 3338-6-12 | 13.9 | 2.4 | 13.1 | 9.4 | 22.7 | 5.7 | 3.1 | 4.0 | 0.4 | 3.3 | 13.3 | 0.9 | 1.5 |
| 3338-7-21 | 14.8 | 1.7 | 8.4 | 13.1 | 20.2 | 12.5 | 4.8 | 3.9 | 0.4 | 3.6 | 11.6 | 0.6 | 2 |
| 3338-7-30 | 15.4 | 2.8 | 18.9 | 12.9 | 9.6 | 10.1 | 2.4 | 2.3 | 0.5 | 2.3 | 13.0 | 2.6 | 2.4 |
| 3338-1-4 | 14.1 | 2.1 | 10.8 | 26.3 | 13.8 | 9.6 | 1.9 | 3.3 | 1.1 | 1.9 | 10.1 | 1.0 | 1.3 |
| 3338-6-24 | 25.1 | 4.5 | 13.3 | 4.0 | 15.5 | 3.1 | 2.6 | 5.3 | 0.7 | 4.0 | 13.0 | 0.9 | 1.7 |

Mature plants were regenerated from the highest EPA-producing embryos as described in Example 10, and the fatty acid analyses were performed on chips of the seeds from the regenerated plants. The results for six seeds from three plants are presented in Table 8. Seeds of control plants possessed fatty aid profiles typical of normal soybean, in which linolenic acid (18:3) was the most highly unsaturated fatty acid that was detectable. Seeds produced from plants that had a reconstituted pathway for C20 PUFAs had as much as 25% of their total fatty acid in the form of C20 material. Combined levels of EPA and DPA were frequently greater than 15%, and were as high as 23.5% of the total.

TABLE 8

| Event | 16:0 | 18:0 | 18:1 | 18:2 | GLA | 18:3 | STA | HGLA | ARA | ETA | EPA | DPA | Other | EPA + DPA |
|---|---|---|---|---|---|---|---|---|---|---|---|---|---|---|
| 3338-3-4-7 | 14.4 | 8.5 | 19.7 | 9.1 | 9.1 | 3.1 | 1.2 | 6.6 | 1.0 | 2.4 | 18.8 | 4.1 | 2.0 | 22.9 |
| | 13.2 | 5.5 | 18.6 | 10.4 | 11.7 | 3.3 | 1.1 | 10.1 | 2.2 | 2.4 | 19.6 | 0.8 | 1.2 | 20.4 |
| | 15.6 | 9.0 | 13.9 | 16.6 | 6.6 | 7.1 | 0.0 | 3.9 | 0.0 | 1.8 | 15.5 | 4.2 | 5.8 | 19.7 |
| | 22.4 | 8.8 | 20.8 | 14.2 | 5.0 | 3.8 | 0.6 | 3.0 | 1.0 | 1.1 | 14.0 | 3.1 | 2.2 | 17.1 |
| | 13.2 | 7.5 | 27.0 | 12.8 | 9.0 | 2.8 | 0.9 | 5.7 | 1.8 | 1.2 | 11.2 | 4.0 | 2.9 | 15.2 |
| | 15.2 | 4.9 | 18.3 | 12.3 | 13.3 | 3.5 | 1.3 | 10.5 | 5.3 | 2.4 | 12.9 | 0.0 | 0.0 | 12.9 |
| 3338-7-11-11 | 13.0 | 7.1 | 13.6 | 13.1 | 13.0 | 5.9 | 1.7 | 5.2 | 0.5 | 0.4 | 16.4 | 4.3 | 5.8 | 20.7 |
| | 12.9 | 7.3 | 13.1 | 14.9 | 9.6 | 7.2 | 1.7 | 5.9 | 0.8 | 0.6 | 14.3 | 4.7 | 7.0 | 18.9 |
| | 12.4 | 7.6 | 15.9 | 12.6 | 13.6 | 5.4 | 1.8 | 6.0 | 0.5 | 0.0 | 15.2 | 3.7 | 5.2 | 18.9 |
| | 15.0 | 5.9 | 18.4 | 16.0 | 10.2 | 8.4 | 1.7 | 4.0 | 0.6 | 0.0 | 13.9 | 2.4 | 3.5 | 16.3 |
| | 13.8 | 5.9 | 19.6 | 18.0 | 7.2 | 10.8 | 1.5 | 3.4 | 0.4 | 0.0 | 10.8 | 3.2 | 5.5 | 14.0 |
| | 16.2 | 6.2 | 15.2 | 22.4 | 6.9 | 9.2 | 1.1 | 3.4 | 0.8 | 0.0 | 11.7 | 2.2 | 4.6 | 13.9 |
| 3339-5-3-7 | 13.7 | 8.1 | 6.9 | 8.1 | 16.5 | 4.7 | 1.8 | 7.1 | 0.7 | 2.2 | 19.5 | 4.0 | 6.7 | 23.5 |
| | 15.4 | 6.9 | 11.8 | 16.4 | 10.0 | 4.3 | 0.8 | 4.7 | 1.2 | 1.4 | 16.3 | 3.5 | 7.3 | 19.8 |
| | 14.7 | 6.3 | 13.6 | 18.1 | 8.1 | 3.1 | 0.9 | 4.3 | 2.1 | 0.1 | 14.9 | 4.2 | 9.6 | 19.1 |
| | 12.3 | 6.5 | 20.9 | 13.1 | 15.1 | 3.0 | 1.0 | 6.1 | 1.2 | 1.4 | 10.6 | 1.4 | 7.3 | 12.1 |
| | 12.2 | 6.4 | 22.9 | 13.7 | 12.0 | 2.9 | 0.9 | 5.7 | 1.3 | 1.3 | 9.9 | 1.7 | 9.1 | 11.7 |
| | 13.5 | 7.2 | 22.9 | 11.8 | 8.9 | 3.6 | 0.8 | 6.5 | 2.2 | 1.7 | 9.6 | 1.6 | 9.8 | 11.2 |
| Control | 17.3 | 4.3 | 13.4 | 51.6 | 0.0 | 12.9 | 0.0 | 0.0 | 0.0 | 0.0 | 0.0 | 0.0 | 0.0 | 0.0 |
| | 17.1 | 4.8 | 12.1 | 50.5 | 0.0 | 14.5 | 0.0 | 0.0 | 0.0 | 0.0 | 0.0 | 0.0 | 0.0 | 0.0 |

Others = sum of 20:0, 20:1 (d5), 20:1 (d11), 20:2 (d8, 11), 20:2 (d11, 14), 20:3 (d5, 11, 14), 20:3 (d11, 14, 17), 20:4 (d5, 11, 14, 17) each of which is present at less than 2% of TFA

Example 12

Isolation of a Novel Elongase Gene from the Algae *Pavlova* sp. (CCMP459)

The fatty acid composition of the algae *Pavlova* sp. (CCMP 459) (Pav459) was investigated to determine the polyunsaturated fatty acids (PUFAs) produced by this organism. This algae showed a substantial amount of long chain PUFAs including eicosapentaenoic acid (EPA, 20:5n-3) and docosahexaenoic acid (DHA, 22:6n-3). Thus, Pav459 was predicted to possess an elongase capable of converting EPA to ω3-docosapentaenoic acid (DPA, 22:5n-3), which a delta-4 desaturase can convert to DHA. The goal was therefore to isolate the predicted elongase gene from Pav459, and to verify the functionality of the enzyme by expression in an alternate host.

Frozen pellets of Pav459 were obtained from Provasoli-Guillard National Center for Culture of Marine Phytoplankton (CCMP, West Boothbay Harbor, Me.). These pellets were crushed in liquid nitrogen and total RNA was extracted from Pav459 by using the Qiagen RNeasy Maxi Kit (Qiagen, Valencia, Calif.), per manufacturers instructions. From this total RNA, mRNA was isolated using oligo dT cellulose resin, which was then used for the construction of a cDNA library using the pSport 1 vector (Invitrogen, Carlsbad, Calif.). The cDNA thus produced was directionally cloned (5'SalI/3'NotI) into pSport1 vector. The Pav459 library contained approximately $6.1\times10^5$ clones per ml, each with an average insert size of approximately 1200 bp. Two thousand five hundred primary clones from this library were sequenced from the 5' end using the T7 promoter primer (SEQ ID NO:93).

```
TAATACGACTCACTATTAGG          SEQ ID NO: 93
```

Sequencing was carried out using the ABI BigDye sequencing kit (Applied Biosystems, California) and the MegaBase Capillary DNA sequencer (Amersham biosciences, Piscataway, N.J.). Two clones, designated 'pav06-C06' and pav07-G01,' which aligned to give a 500 bp sequence containing the 5' end of this novel elongase, were obtained from sequencing of the 2,500 library clones. This fragment shared 33.3% amino acid sequence identity with the mouse elongase MELO4 and 32.7% amino acid sequence identity with *T. aureum* elongase TELO1 (WO 02/08401). To isolate the full-length gene, the EST clone pav06-C06 was used as a template for PCR reaction with 10 pmol of the 5' primer RO1327 (SEQ ID NO:94) and 10 pmol vector primer RO898 (SEQ ID NO:83).

```
TGCCCATGATGTTGGCCGCAGGCTATCTTCTAGTG  SEQ ID NO: 94
```

PCR amplification was carried out using Platinum Taq DNA polymerase (Invitrogen, Carlsbad, Calif.) in a 50 μl total volume containing: 1 μl of the cDNA clone pav06-C06, PCR buffer containing 20 mM Tris-Cl, pH 8.4, 50 mM KCl (final concentration), 200 μM each deoxyribonucleotide triphosphate, 10 pmole of each primer, 1.5 mM $MgSO_4$, and 0.5 μl of Platinum Taq (HF) DNA polymerase. Amplification was carried out as follows using the Perkin Elmer 9700 machine: initial denaturation at 94° C. for 3 minute, followed by 35 cycles of the following: 94° C. for 45 sec, 55° C. for 30 sec, 68° C. for 2 min. The reaction was terminated at 4° C. The PCR amplified mixture was run on a gel, an amplified fragment of approximately 1.3 Kb was gel purified, and the isolated fragment was cloned into the pCR-blunt vector (Invitrogen, Carlsbad, Calif.). The recombinant plasmid was transformed into TOP10 supercompetent cells (Invitrogen, Carlsbad, Calif.), and prepared. The prepared recombinant plasmid was digested with EcoRI, run on a gel, and the digested fragment of approximately 1.2 Kb was gel purified, and cloned into pYX242 (EcoRI) vector (Novagen, Madison, Wis.). The new plasmid was designated as pRPL-6-1.

The plasmid pRPL-6-1 was prepared and sequenced using ABI 373A Stretch DNA Sequencer (Perkin Elmer, Foster City, Calif.). The translated amino acid sequence of the cDNA in pRPL-6-1 had 33.7% identity in 261 amino acids with MELO4, 33.8% identity in 240 amino acids with GLELO, 28.1% identity in 274 amino acids with HSELO1, and 32.5% identity in 246 amino acids with TELO1 (WO 02/08401).

The construct pRPL-6-1 was transformed into *S. cerevisiae* 334 (Hoveland et al. (1989) *Gene* 83:57-64) and screened for elongase activity. *S. cerevisiae* 334 containing the unaltered pYX242 vector was used as a negative control. The cultures were grown for 44 hours at 24° C., in selective media (Ausubel et al., (1992) *Short Protocols in Molecular Biology*, Ch. 13, p. 3-5), in the presence of 25 μM of GLA or EPA. In this study, DGLA or ω3-docosapentaenoic acid (DPA, 22:5n-3), respectively, was the predicted product of the elongase activity. The lipid profiles of these yeast cultures indicated that while no conversion of GLA to DGLA was seen, EPA was elongated to DPA at a very low level (DPA was 0.34% of total fatty acids, while EPA was 32.28% of total fatty acids). This indicated that the expressed enzyme in this culture preferred the elongation of 20 carbon chain long PUFA, and not the 18 carbon chain long PUFA, GLA. It also indicated that a mutation might be present in the DNA sequence, which is inhibiting the full activity of the expressed enzyme.

To isolate the full-length gene without mutations, RACE (rapid amplification of cDNA ends) ready cDNA was used as a target for the reaction. To prepare this material, approximately 5 μg of total RNA was used according to the manufacturer's direction with the GeneRacer™ kit (Invitrogen, Carlsbad, Calif.) and Superscript II™ enzyme (Invitrogen, Carlsbad, Calif.) for reverse transcription to produce cDNA target. This cDNA was then used as a template for a PCR reaction with 50 pmols of the 5'primer RO1327 and 30 pmol GeneRacer™ 3' primer (SEQ ID NO:95).

```
GCTGTCAACGATACGCTACGTAACG       SEQ ID NO: 95
```

PCR amplification was carried out using Platinum Taq DNA polymerase (Invitrogen, Carlsbad, Calif.) in a 50 μl total volume containing: 2 μl of the RACE ready cDNA, PCR buffer containing 20 mM Tris-Cl, pH 8.4, 50 mM KCl (final concentration), 200 μM each deoxyribonucleotide triphosphate, 10 pmole of each primer, 1.5 mM $MgSO_4$, and 0.5 μl of Platinum Taq (HF) DNA polymerase. Amplification was carried out as follows using the Perkin Elmer 9600 machine: initial denaturation at 94° C. for 3 minute, followed by 35 cycles of the following: 94° C. for 45 sec, 55° C. for 30 sec, 68° C. for 2 min. The reaction was terminated at 4° C.

The PCR amplified mixture was run on a gel, an amplified fragment of approximately 1.2 Kb was gel purified, and the isolated fragment was cloned into the PCR-blunt vector (Invitrogen, Carlsbad, Calif.). The recombinant plasmids were transformed into TOP10 supercompetent cells (Invitrogen, Carlsbad, Calif.), and prepared. The prepared recombinant plasmid was digested with EcoRI, run on a gel, and the digested fragment of approximately 1.2 Kb was gel purified, and cloned into pYX242 (EcoRI) vector (Novagen, Madison, Wis.). The new plasmids were designated as pRPL-6-B2 and pRPL-6-A3.

The plasmids pRPL-6-B2 and pRPL-6-A3 were prepared and sequenced using ABI 373A Stretch DNA Sequencer (Perkin Elmer, Foster City, Calif.). The translated amino acid sequence of the cDNA in pRPL-6-B2 had 34.1% identity in 261 amino acids with MELO4, 33.8% identity in 240 amino acids with GLELO, 28.5% identity in 274 amino acids with HSELO1, and 32.5% identity in 246 amino acids with TELO1. (Plasmid pRPL-6-B2 was deposited with the American Type Culture Collection, 10801 Manassas, Va. 20110-2209 under the terms of the Budapest Treaty and was accorded accession number PTA-4350.)

The constructs pRPL-6-B2 and pRPL-6-A3 were transformed into *S. cerevisiae* 334 (Hoveland et al., supra) and screened for elongase activity. *S. cerevisiae* 334 containing the unaltered pYX242 vector was used as a negative control. The cultures were grown for 44 hours at 24° C., in selective media (Ausubel et al., supra), in the presence of 25 μM of GLA or EPA. In this study, DGLA or ω3-docosapentaenoic acid (DPA, 22:5n-3), respectively, was the predicted product of the elongase activity. The lipid profiles of these yeast cultures indicated that GLA was not elongated to DGLA in any of the samples (data not shown). The cultures of 334 (pRPL-6-B2) and 334(pRAT-6-A3) had significant levels of conversion of the substrate EPA to DPA, indicating that the expressed enzymes in these cultures preferred the elongation of 20-carbon chain long PUFA, and not the 18-chain long PUFA, GLA.

The amino acid sequences of the 3 clones were compared to determine if the substrate conversion levels were dictated by the translated sequences. The cDNA sequence of pRPL-6-1 is different from pRPL-6-B2 at A512G. This single mutation substantially reduced the conversion of the C20 substrate fatty acid to its elongated product. It appears that this is an important region of the enzyme for 20-carbon chain elongation. The cDNA sequence of pRPL-6-A3 is different from pRPL-6-B2 at D169N and C745R. These mutations reduced the conversion of the C20 substrate fatty acid to its elongated product, but the expressed enzyme was able to maintain some activity. The elongase gene in pRPL-6-B2, has the sequence set forth in SEQ ID NO:49 and the amino acid sequence set forth in SEQ ID NO:50.

To further confirm the substrate specificity of the algal elongation enzyme, described above and referred to herein as PELO1 p, the recombinant yeast strain 334(pRPL-6-B2) was grown in minimal media containing n-6 fatty acids LA, GLA, DGLA, AA, or n-3 fatty acids ALA, STA, ETA, EPA, or 20:0, or 20:1. The lipid profiles of these yeast cultures, when examined by GC and GC-MS, indicated that there were accumulations of adrenic acid (ADA, 22:4-6) and EPA, respectively. The levels of these fatty acids were 1.40% ADA and 2.54% EPA, respectively, of the total fatty acids in the strains containing the PELO1 sequence. These represented 14.0% and 14.1% conversions of the substrate fatty acids, respectively, to the products elongated by two carbon atoms. No elongation of the saturated fatty acid 20:0, or monounsaturated fatty acid 20:1 was seen. Also, no elongation of the C18 substrates LA, GLA, ALA, or STA was seen. These results indicated that the expressed enzyme activity in strain 334(pRPL-6-B2) was specific for the elongation of 20-carbon chain long PUFAs, and not the 18-chain long PUFA, or the 20-carbon chain long saturated or monounsaturated fatty acids.

Example 13

Assembling DHA Biosynthetic Pathway Genes for Expression in Somatic Soybean Embryos (pKR365, pKR364, and pKR357)

Construction of plasmid pKR365

The *S. diclina* delta-6 desaturase, *M. alpina* delta-5 desaturase and *S. diclina* delta-17 desaturase were cloned into plasmid pKR365 behind strong, seed-specific promoters allowing for high expression of these genes in somatic soybean embryos and soybean seeds. The delta6 desaturase was cloned behind the KTi promoter followed by the KTi 3' termination region (Kti/Sdd6/Kti3' cassette). The delta-5 desaturase was cloned behind the GlycininGy1 promoter followed by the pea leguminA2 3' termination region (Gy1/Mad5/legA2 cassette). The *S. diclina* delta-17 desaturase was cloned behind the soybean Annexin promoter followed by the soy BD30 3' termination region (Ann/Sdd17/BD30 cassette). Plasmid pKR365 also contains the T7prom/HPT/T7term cassette for bacterial selection of the plasmid on hygromycin B and a bacterial origin of replication (ori) from the vector pSP72 (Stratagene).

Figure 6:
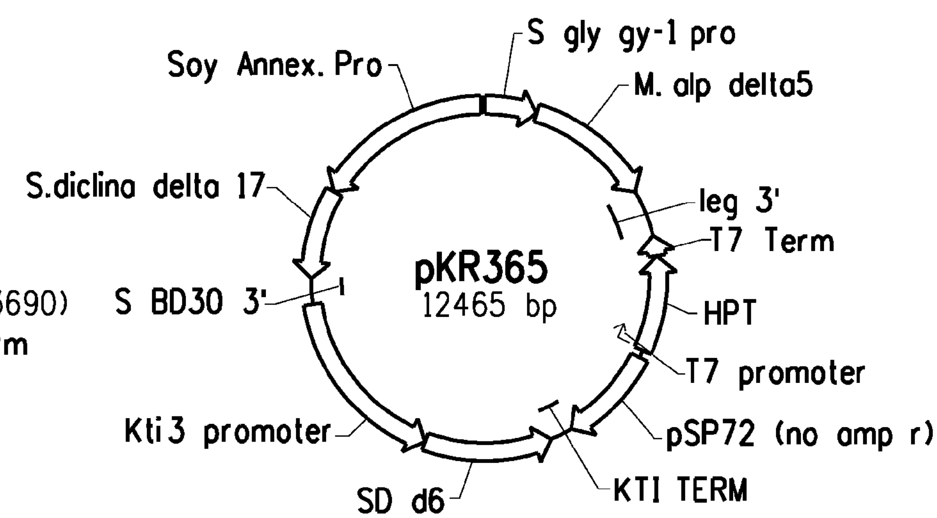
FIG. 6 is a schematic depiction of plasmid pKR365.

Plasmid pKR365 was constructed from a number of different intermediate cloning vectors as follows: The Gy1/Mad5/legA2 cassette was released from plasmid pKR287 by digestion with SbfI and BsiWI. This cassette was cloned into the SbfI/BsiWI site of plasmid pKR359, containing the Kti/Sdd6/Kti3' cassette, the T7prom/hpt/T7term cassette and the bacterial ori to give pKR362. The Ann/Sdd17/BD30 cassette, released from pKR271 (described in Example 7) by digestion with PstI, was then cloned into the SbfI site of pKR362 to give pKR365. A schematic representation of pKR365 is shown in FIG. 6. A detailed description for plasmid construction for pKR287 and pKR359 is provided below.

Plasmid pKR287 was constructed by digesting pKR136 (described in Example 4) with NotI, to release the *M. alpina* delta-5 desaturase, and cloning this fragment into the NotI site of pKR263 (described in Example 4).

Plasmid pKR359 was constructed by cloning the NotI fragment of pKR295, containing the delta-6 desaturase, into the NotI site of the Kti/NotI/Kti3' cassette in pKR353. Vector pKR353 was constructed by cloning the HindIII fragment, containing the Kti/NotI/Kti3' cassette, from pKR124 (described in Example 2) into the HindIII site of pKR277. Plasmid pKR277 was constructed by digesting pKR197 (described in Example 4) with HindIII to remove the Bcon/NotI/phas3' cassette. To construct pKR295, the gene for the *S. diclina* delta-6 desaturase was removed from pRSP1 (Table 1) by digestion with EcoRI and EcoRV and cloned into the MfeI/EcoRV site of pKR288. Vector pKR288 was an intermediate cloning vector containing a DNA stuffer fragment flanked by NotI/MfeI sites at the 5' end and EcoRV/NotI sites at the 3' end of the fragment. The DNA stuffer fragment was amplified with Vent polymerase (NEB) from plasmid CalFad2-2 (described in WO 01/12800) using primer oCal-26 (SEQ ID NO:96), designed to introduce an MfeI site at the 5' end of the fragment, and oCal-27 (SEQ ID NO:97), designed to introduce an EcoRV site at the 3' end of the fragment.

```
GCCAATTGGAGCGAGTTCCAATCTC       (SEQ ID NO: 96)

GCGATATCCGTTTCTTCTGACCTTCATC,   (SEQ ID NO: 97)
```

The primers also introduced partial NotI sites at both ends of the fragment such that subsequent cloning into a filled NotI site added NotI sites to the end.

Construction of Plasmid pKR364

Figure 7:
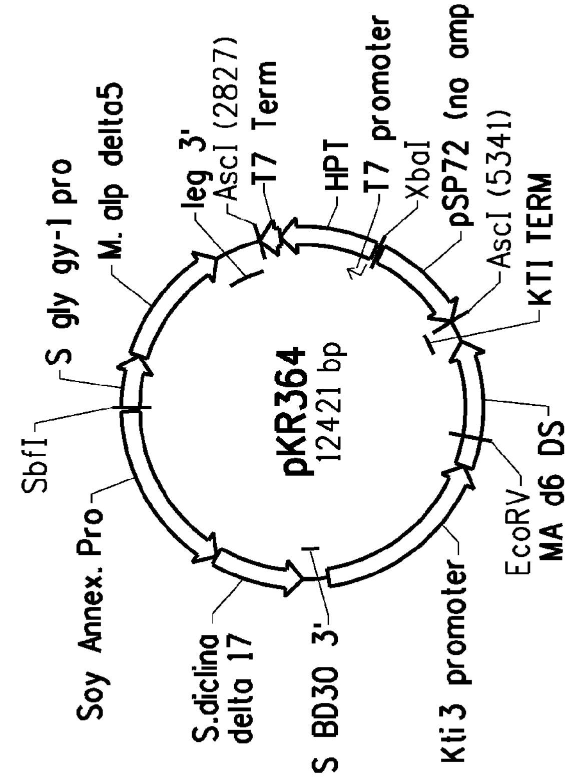
FIG. 7 is a schematic depiction of plasmid pKR364.

The *M. alpina* delta-6 desaturase, *M. alpina* delta-5 desaturase and *S. diclina* delta-17 desaturase were cloned into plasmid pKR364 behind strong, seed-specific promoters allowing for high expression of these genes in somatic soybean embryos and soybean seeds. Plasmid pKR364 is identical to pKR365 except that the NotI fragment that contains the *S. diclina* delta-6 desaturase in pKR365 was replaced with the NotI fragment containing the *M. alpina* delta-6 desaturase as found in pKR274. A schematic representation of pKR364 is shown in FIG. 7.

Construction of Plasmid pKR357

The *S. aggregatum* delta-4 desaturase, *M. alpina* elongase and *Pavlova* elongase (Table1) were cloned into plasmid pKR357 behind strong, seed-specific promoters allowing for high expression of these genes in somatic soybean embryos and soybean seeds. The delta-4 desaturase (SEQ ID NO:51, and its protein translation product shown in SEQ ID NO:52) was cloned behind the KTi promoter followed by the KTi 3' termination region (Kti/Sad4/Kti3' cassette). The *Pavlova* elongase (SEQ ID NO:49) was cloned behind the GlycininGy1 promoter followed by the pea leguminA2 3' termination region (Gy1/Pavelo/legA2 cassette). The *M. alpina* elongase was cloned behind the promoter for the α'-subunit of β-conglycinin followed by the 3' transcription termination region of the phaseolin gene (βcon/Maelo/Phas3' cassette). Plasmid pKR357 also contains the T7prom/HPT/T7term cassette for bacterial selection of the plasmid on hygromycin B, a 35S/hpt/NOS3' cassette for selection in soy and a bacterial origin of replication (ori).

Figure 8:
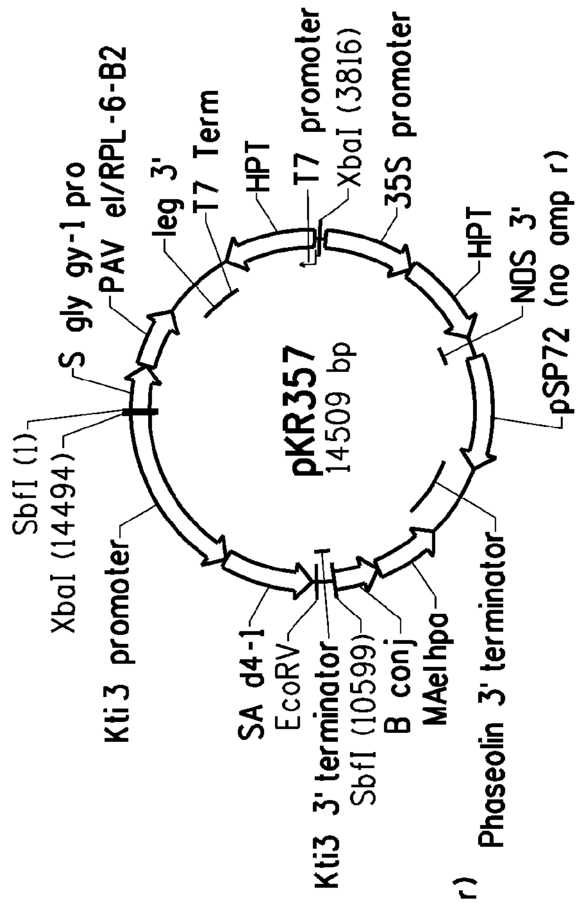
FIG. 8 is a schematic depiction of plasmid pKR357.

Plasmid pKR357 was constructed from a number of different intermediate cloning vectors as follows: The Gy1/Pavelo/legA2 cassette was released from plasmid pKR336 by digestion with PstI and BsiWI. The Gy1/Pavelo/legA2 cassette was then cloned into the SbfI/BsiWI site of plasmid pKR324, containing the βcon/Maelo/Phas3' cassette, the T7prom/hpt/T7term cassette, the 35S/hpt/Nos3' cassette and the bacterial ori to give pKR342. The KTi/Sad4/KTi3' cassette, released from pKR348 by digestion with PstI, was then cloned into the SbfI site of pKR342 to give pKR357. A schematic representation of pKR357 is shown in FIG. 8. A detailed description for plasmid construction for pKR336, pKR324 and pKR348 is provided below.

Plasmid pKR336 was constructed by digesting pKR335 with NotI, to release the *Pavlova* elongase, and cloning this fragment into the NotI site of pKR263 (described in Example 4), which contained the Gy1/NotI/legA2 cassette. To construct pKR335, pRPL-6-B2 (described in Table 1) was digested with PstI and the 3' overhang removed by treatment with VENT polymerase (NEB). The plasmid was then digested with EcoRI to fully release the *Pavlova* elongase as an EcoRI/PstI blunt fragment. This fragment was cloned into the MfeI/EcoRV site of intermediate cloning vector pKR333 to give pKR335. Vector pKR333 was identical to pKR288 (Example 3 and 13) in that it contained the same MfeI and EcoRV sites flanked by NotI sites and was generated in a similar way as pKR288.

Plasmid pKR324 was constructed by cloning the NotI fragment of pKS134 (described in Example 3), containing the *M. alpina* elongase, into the NotI site of the βcon/NotI/Phas3' cassette of vector pKR72 (described in Example 4).

Plasmid pKR348 was constructed by cloning the NotI fragment of pKR300, containing the *S. aggregatum* delta-4 desaturase, into the NotI site of the KTi/NotI/KTi3' cassette in oKTi5 (SEQ ID NO:23) and oKTi7 (SEQ ID NO:98) designed to introduce an XbaI and BsiWI site at the 5' end, and a PstI/SbfI and XbaI site at the 3' end, of the cassette.

```
TTCTAGACCTGCAGGATATAATGAGCCG    (SEQ ID NO: 98)
```

The resulting PCR fragment was subcloned into the XbaI site of the cloning vector pUC19 to give plasmid pKR123R with the KTi/NotI/KTi3' cassette flanked by PstI sites.

Production of DHA in Somatic Embryos

Plasmids pKR357, pKR365 and pKR364 were prepared as described in Example 9. Fragments of pKR365 and pKR364 were also obtained and purified as described for pKR274, pKR275 and pKKE2 in Example 9. Plasmids pKR357 and either pKR365 or pKR364 were cotransformed into soybean embryogenic suspension cultures (cv. Jack) as described in Example 9. Hygromycin-resistant embryos containing pKR365 and pKR357, or pKR364 and pKR357 were selected and clonally propagated also as described in Example 9. Embryos were matured by culture for 4-6 weeks at 26° C. in SB196 under cool white fluorescent (Phillips cool white Econowatt F40/CW/RS/EW) and Agro (Phillips F40 Agro) bulbs (40 watt) on a 16:8 hr photoperiod with light intensity of 90-120 μE/m2s. After this time embryo clusters were removed to a solid agar media, SB166, for 1-2 weeks. Clusters were then subcultured to medium SB103 for 3 weeks. During this period, individual embryos were removed from the clusters and screened for alterations in their fatty acid compositions as follows.

Fatty acid methyl esters were prepared from single, matured, somatic soy embryos by transesterification as described in Example 10. Retention times were compared to those for methyl esters of standards commercially available (Nu-Chek Prep, Inc. catalog #U-99-A). Six embryos from each event were analyzed in this way. Fatty acid methyl esters from embryos transformed with pKR357 and pKR365 containing the highest levels of DHA are shown in Table 9.

TABLE 9

Fatty Acid Analysis of Somatic Embryos Containing DHA Pathway Genes (pKR357 and pKR365)

| Event | '16:0 | '18:0 | '18:1 | '18:2 | GLA | '18:3 | '18:4 | 20:2 (11, 14) | 20:3 (8, 11, 14) | ARA | 20:3 (11, 14, 17) | 20:4 (5, 11, 14, 17) | EPA | DHA |
|---|---|---|---|---|---|---|---|---|---|---|---|---|---|---|
| 1114-6-5-1 | 10.8 | 9.4 | 2.3 | 28.8 | 0 | 19.7 | 2 | 6.2 | 3.2 | 1.4 | 4.2 | 1.7 | 2.5 | 1.3 |
| 1114-6-5-7 | 13.8 | 8 | 6.4 | 30.1 | 2.1 | 15 | 2 | 3.7 | 4.3 | 2.9 | 1.9 | 1.6 | 4.1 | 1.6 |
| 1116-8-16-1 | 13.8 | 7 | 6.2 | 27.3 | 4 | 10.5 | 0.9 | 4.6 | 3.9 | 5.2 | 2.3 | 1.1 | 6.1 | 3.1 |

pKR123R. To construct pKR300, the gene for the delta-4 desaturase was removed from pRSA1 (Table 1) by digestion with EcoRI and EcoRV and cloned into the MfeI/EcoRV site of pKR288 (described in Example 3 and 13). Plasmid pKR123R contains a NotI site flanked by the KTi promoter and the KTi transcription termination region (KTi/NotI/KTi3' cassette). In addition, the KTi/NotI/KTi3' cassette was flanked by PstI sites. The KTi/NotI/KTi3' cassette was amplified from pKS126 (described in Example 2) using primers In addition to those fatty acids shown, 20:0, 20:1, 20:3 (5, 11, 14), DPA and ETA are also present in the extracts, each less than 1% of total fatty acids.

DHA is defined as 22:6(4, 7, 10, 13, 16, 19) by the nomenclature described in Example 11.

Fatty acid methyl esters for embryos transformed with pKR357 and pKR364 containing the highest levels of DHA are shown in Table 10.

TABLE 10

Fatty Acid Analysis of Somatic Embryos Containing DHA Pathway Genes (pKR357 & pKR364)

| Event | 16:0 | 18:0 | 18:1 | 18:2 | GLA | 18:3 | STA | 20:2 | HGLA | ARA | 20:3 | 20:4 (5, 11, 14, 17) | ETA | EPA | DPA | DHA | Others |
|---|---|---|---|---|---|---|---|---|---|---|---|---|---|---|---|---|---|
| 1141-4-2-1 | 17.4 | 2.8 | 1.8 | 41.2 | 0.0 | 33.7 | 2.7 | 0.0 | 0.0 | 0.0 | 0.0 | 0.0 | 0.0 | 0.0 | 0.0 | 0.0 | 0.2 |
| 1141-4-2-2 | 11.8 | 7.4 | 3.9 | 23.7 | 2.7 | 22.0 | 3.6 | 2.3 | 3.1 | 0.0 | 4.4 | 2.5 | 2.1 | 5.2 | 1.0 | 3.3 | 1.0 |
| 1141-4-2-3 | 16.6 | 5.5 | 4.8 | 26.3 | 3.0 | 23.7 | 3.1 | 1.4 | 2.6 | 0.3 | 3.1 | 1.3 | 2.8 | 3.8 | 0.0 | 1.4 | 0.4 |
| 1141-4-2-4 | 16.5 | 5.8 | 3.8 | 28.5 | 4.1 | 27.7 | 2.9 | 1.0 | 1.4 | 0.0 | 2.5 | 1.1 | 1.9 | 1.9 | 0.0 | 1.0 | 0.0 |
| 1141-4-2-5 | 15.3 | 3.6 | 3.3 | 27.3 | 3.4 | 28.9 | 3.2 | 0.8 | 2.3 | 0.0 | 2.8 | 0.9 | 2.6 | 4.0 | 0.0 | 1.6 | 0.0 |
| 1141-4-2-6 | 16.5 | 3.1 | 3.7 | 41.5 | 2.0 | 25.6 | 1.7 | 0.2 | 1.0 | 0.0 | 1.1 | 0.3 | 1.3 | 1.2 | 0.0 | 0.7 | 0.0 |
| 1141-5-2-1 | 14.1 | 3.9 | 4.7 | 24.1 | 7.4 | 26.2 | 1.8 | 1.1 | 3.7 | 1.8 | 1.1 | 0.7 | 0.7 | 6.5 | 0.0 | 2.2 | 0.0 |
| 1141-5-2-2 | 12.6 | 5.0 | 1.9 | 29.8 | 1.1 | 28.9 | 2.9 | 3.4 | 4.2 | 1.1 | 3.7 | 1.1 | 0.6 | 1.8 | 0.0 | 2.0 | 0.0 |
| 1141-5-2-3 | 10.8 | 3.5 | 7.8 | 34.5 | 5.0 | 22.9 | 1.1 | 2.2 | 2.4 | 0.8 | 2.0 | 1.7 | 0.0 | 3.4 | 0.0 | 1.8 | 0.0 |
| 1141-5-2-4 | 12.0 | 3.8 | 3.8 | 30.9 | 3.5 | 27.1 | 1.5 | 2.3 | 4.1 | 1.3 | 2.4 | 1.0 | 0.0 | 3.7 | 0.0 | 2.6 | 0.0 |
| 1141-5-2-5 | 11.2 | 3.8 | 8.4 | 33.9 | 6.1 | 19.4 | 0.0 | 2.1 | 2.0 | 0.7 | 2.0 | 1.7 | 0.6 | 5.7 | 0.0 | 2.1 | 0.3 |
| 1141-5-2-6 | 14.1 | 7.4 | 3.9 | 28.8 | 2.2 | 20.2 | 2.4 | 3.7 | 5.7 | 1.5 | 2.7 | 1.0 | 0.0 | 3.0 | 0.0 | 2.1 | 1.3 |
| 1142-9-4-1 | 13.6 | 2.7 | 5.7 | 39.7 | 4.1 | 18.1 | 0.0 | 1.5 | 2.0 | 0.8 | 1.3 | 1.8 | 0.6 | 6.1 | 0.0 | 1.8 | 0.0 |
| 1142-9-4-2 | 13.8 | 3.9 | 8.2 | 35.7 | 3.2 | 18.3 | 1.0 | 2.1 | 1.7 | 0.7 | 2.0 | 1.7 | 0.6 | 4.3 | 0.3 | 1.4 | 0.8 |
| 1142-9-4-3 | 15.4 | 5.2 | 6.6 | 31.0 | 5.0 | 14.7 | 1.1 | 1.8 | 2.9 | 0.6 | 2.1 | 2.5 | 0.8 | 7.6 | 0.0 | 1.9 | 0.5 |
| 1142-9-4-4 | 14.4 | 3.4 | 6.4 | 37.8 | 4.5 | 18.2 | 0.9 | 1.4 | 2.5 | 0.7 | 1.4 | 1.3 | 0.6 | 4.4 | 0.0 | 1.2 | 0.8 |
| 1142-9-4-5 | 13.5 | 3.4 | 3.7 | 35.8 | 4.1 | 24.0 | 1.3 | 1.3 | 1.6 | 0.4 | 1.9 | 2.3 | 0.8 | 4.7 | 0.0 | 1.3 | 0.0 |
| 1142-9-4-6 | 12.9 | 3.6 | 7.6 | 37.6 | 2.4 | 18.7 | 0.0 | 2.1 | 0.9 | 0.6 | 2.3 | 2.4 | 0.6 | 5.5 | 0.0 | 2.5 | 0.3 |
| 1142-10-6-1 | 9.7 | 5.1 | 6.1 | 41.7 | 2.2 | 16.7 | 0.5 | 4.4 | 1.7 | 0.2 | 3.3 | 3.4 | 0.4 | 1.8 | 0.4 | 0.8 | 1.7 |
| 1142-10-6-2 | 11.4 | 3.1 | 6.5 | 39.3 | 4.3 | 21.4 | 0.0 | 1.2 | 0.8 | 0.0 | 2.4 | 3.4 | 0.0 | 4.9 | 0.0 | 1.1 | 0.0 |
| 1142-10-6-3 | 15.5 | 3.1 | 7.5 | 46.6 | 1.3 | 19.2 | 0.4 | 0.8 | 0.5 | 0.0 | 2.0 | 1.1 | 0.6 | 1.0 | 0.0 | 0.0 | 0.3 |
| 1142-10-6-4 | 11.8 | 4.1 | 8.0 | 38.8 | 3.0 | 17.2 | 0.0 | 2.2 | 1.3 | 0.0 | 2.9 | 5.2 | 0.8 | 3.6 | 0.0 | 1.1 | 0.0 |
| 1142-10-6-5 | 12.1 | 4.5 | 7.1 | 34.6 | 2.5 | 21.5 | 1.5 | 1.8 | 1.9 | 0.0 | 3.4 | 2.2 | 2.0 | 2.8 | 0.5 | 1.4 | 0.3 |
| 1142-10-6-6 | 11.7 | 3.0 | 6.2 | 39.2 | 4.3 | 20.9 | 1.0 | 1.5 | 1.6 | 0.0 | 2.5 | 3.1 | 1.3 | 2.9 | 0.0 | 0.9 | 0.0 |
| 1142-10-8-1 | 14.6 | 6.5 | 5.4 | 26.4 | 8.7 | 11.1 | 1.4 | 4.3 | 3.3 | 2.5 | 1.9 | 1.6 | 0.8 | 6.1 | 0.5 | 2.6 | 2.3 |
| 1142-10-8-2 | 14.3 | 3.3 | 3.9 | 28.4 | 4.0 | 28.2 | 1.7 | 1.0 | 2.3 | 0.2 | 2.5 | 1.3 | 2.6 | 4.6 | 0.4 | 1.3 | 0.0 |
| 1142-10-8-3 | 16.7 | 3.7 | 15.2 | 13.8 | 27.9 | 10.6 | 1.7 | 0.4 | 3.3 | 0.4 | 0.3 | 0.0 | 1.6 | 2.9 | 0.0 | 0.4 | 1.2 |
| 1142-10-8-4 | 20.5 | 4.2 | 10.0 | 12.1 | 21.8 | 12.0 | 2.6 | 0.4 | 6.4 | 1.0 | 0.5 | 0.0 | 2.4 | 4.3 | 0.3 | 0.6 | 1.1 |
| 1142-10-8-5 | 13.4 | 5.1 | 3.9 | 31.5 | 2.2 | 24.1 | 2.1 | 2.5 | 2.5 | 0.0 | 4.5 | 1.5 | 2.3 | 2.3 | 0.4 | 1.2 | 0.5 |
| 1142-10-8-6 | 11.2 | 3.9 | 17.0 | 21.0 | 15.3 | 13.0 | 0.0 | 2.4 | 2.6 | 2.1 | 1.1 | 1.3 | 0.9 | 4.8 | 0.0 | 1.3 | 2.1 |

For Table 10, fatty acids listed as "others" include: 20:0, 20:1 (11), 20:3 (5, 11, 14) and 22:0. Each of these fatty acids is present at relative abundance of less than 1% of the total fatty acids.

Example 14

Co-expression of the *Saprolegnia diclina* Delta-6 Desaturase with the *Mortierella alpina* Elongase, the *Mortierella alpina* Delta-5 Desaturase, the *Saprolegnia diclina* Delta-17 Desaturase and the *Arabidopsis thaliana* Delta-15 Desaturase in Soybean Seed Transformed with Soybean Expression Vectors PKR275 and PKKE2 (Called KKE2)

Figure 4:
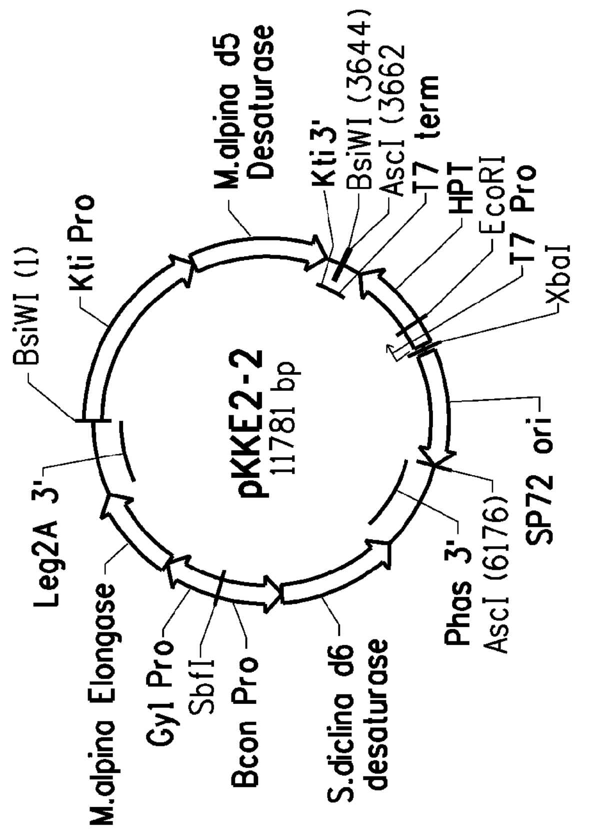
FIG. 4 is a schematic depiction of plasmid pKKE2.
Figure 5:
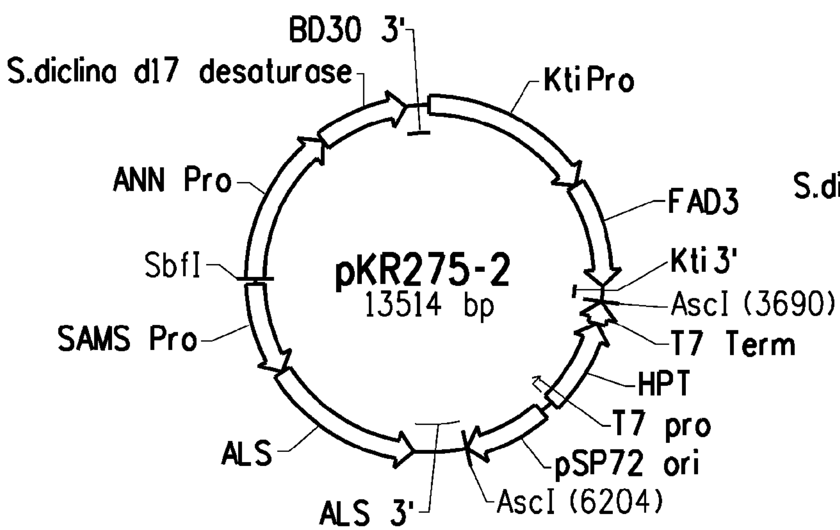
FIG. 5 is a schematic depiction of plasmid pKR275.

The present Example describes the transformation of soybean seed with soybean expression vectors pKR275 (SEQ ID NO:99; FIG. 5; ATCC Accession No. PTA-4989; see Example 7 for a description of its construction) pKKE2 (SEQ ID NO:100; FIG. 4; ATCC Accession No. PTA-4987; see Example 5 for a description of its construction), suitable for use in the production of ARA.

In this way, 215 events transformed with pKR275 and pKKE2 (experiment called KKE2) were analyzed. The method for preparation of fatty acid methyl esters (FAMEs) from embryos and seed by transesterification and analysis by gas chromatography is described above (see Example 10). Of the 215 events analyzed, a subset were selected for re-generation into plants based on the high EPA levels and total C20 fatty acid levels found in embryos. Plants were regenerated from event number 3338-3-4 and 3343-6-3 and the fatty acid profiles for the four seeds, having the highest ARA in these events, are shown in FIG. 9. Seed names are designated by a five number series separated by hyphens where the first three numbers indicate a particular event, the fourth number indicates the plant and the fifth number indicates the seed analyzed. Fatty acids are identified as 16:0 (palmitate), 18:0 (stearic acid), 18:1 (oleic acid), LA, GLA, ALA, 20:1 (1), EDA, DGLA, ARA, ERA, JUN, ETA, EPA and DPA; and, fatty acid compositions listed in FIG. 11 are expressed as a weight percent (wt. %) of total fatty acids. For FIG. 11, fatty acids listed as "others" include: 18:2 (5,9), STA, 20:0, 20:2 (7,11) or 20:2 (8,11) and SCI. Each of these fatty acids is present at a relative abundance of less than 1.0% of the total fatty acids.

Example 15

Cloning the *Mortierella alpina* Delta-6 Desaturase with the *Mortierella alpina* Elongase and the *Mortierella alpina* Delta-5 Desaturase, into an *Arabidopsis thaliana* Binary Expression Vector (pKR451)

Various restriction sites were added, through a number of cloning steps, to the ends of the Bcon/NotI/Phas3' cassette from KS123 (SEQ ID NO:101), which was previously described in PCT Publication No. WO 02/008269 (the contents of which are hereby incorporated by reference). Briefly, a DNA fragment (cal a24-4; SEQ ID NO:102) was amplified from plasmid CalFad2-2 (described in PCT Publication No. WO 01/12800) using primers oCal-15 (SEQ ID NO:103) and oCal-6 (SEQ ID NO:104). DNA fragment cal a24-4 was digested with Bg/II and BamHI and cloned into the BamHI site of pKS123 (SEQ ID NO:101) to give pKR53B (SEQ ID NO:105). The XbaI/SbfI fragment of pKR53B, containing the Bcon/NotI/Phas3' cassette was cloned into the XbaI/SbfI fragment of pKR72 (SEQ ID NO:114; see Example 4 for a description of its construction), containing the bacterial hygromycin phosphotransferase gene, to give pKR85 (SEQ ID NO:106).

The Bcon/NotI/Phas3' cassette was amplified from plasmid pKR85 (SEQ ID NO:63) using primers oKR85-1 (SEQ ID NO:107) and oKR85-2 (SEQ ID NO:108) and the resulting DNA fragment was cloned into PCR-Script® (Stratgene) following the manufacture's protocol, to give pPCR85 (SEQ ID NO:109).

The EcoRI/Bg/II fragment of pPCR85, containing the Bcon/NotI/Phas3' cassette was cloned into the EcoRI/BamHI fragment of plasmid pZS199 (PCT Publication No. WO 93/11245 (also U.S. Pat. No. 5,952,544) which was published on Jun. 10, 1993, the disclosures of which are hereby incorporated by reference), containing the *Arabidopsis* binary vector backbone to produce pKR91 (SEQ ID NO:110).

The Bcon/NotI/Phas3' cassette was removed from pKR91 by digestion with Asci and the re-ligated binary vector containing a unique Asci cloning site was produced called pKR92 (SEQ ID NO:111).

Figure 3:
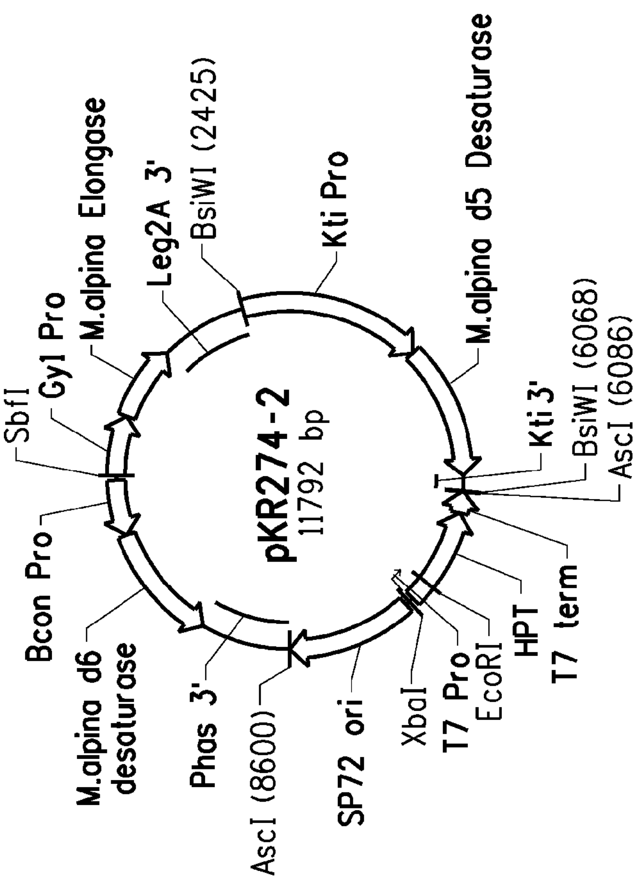
FIG. 3 is a schematic depiction of plasmid pKR274.
Figure 10:
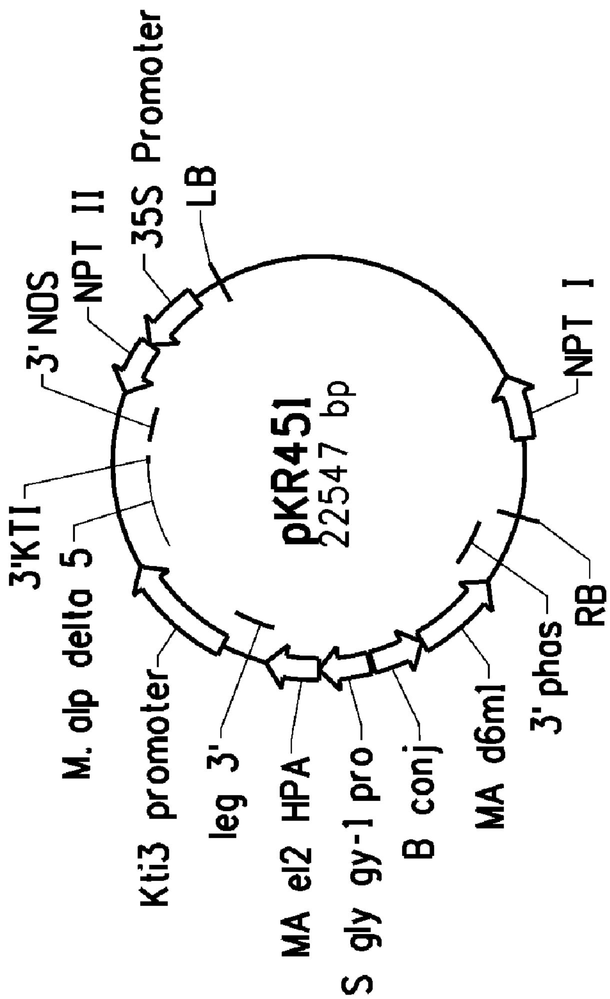
FIG. 10 is a schematic depiction of plasmid pKR451.

The AscI fragment of pKR274 (SEQ ID NO:112; FIG. 3; ATCC Accession No. PTA-4988; see Example 4 for a description of its construction); described PCT Publication No. WO 04/071467), containing the *Mortierella alpina* delta-6 desaturase, the *Mortierella alpina* elongase and the *Mortierella alpina* delta-5 desaturase, was cloned into the Asci site of pKR92 to give pKR451 (SEQ ID NO:113; FIG. 10).

Example 16

Transformation of *Arabidopsis*

Transformed *Arabidopsis* plants were created by whole plant *Agrobacterium* transformation. Binary vector pKR451 (SEQ ID NO:113; FIG. 10) was transformed into *Agrobacterium tumefaciens* NTL4 (Luo et al., *Molecular Plant-Microbe Interactions* 14(1):98-103 (2001)) by electroporation. Briefly, 1 μg plasmid DNA was mixed with 100 μL of electrocompetent cells on ice. The cell suspension was transferred to a 100 μL electro oration curette (1 mm gap width) and electro orated using a BIORAD electro orator set to 1 kV, 400Ω and 25 μF. Cells were transferred to 1 mL LB medium and incubated for 2 h at 30° C. Cells were plated onto LB medium containing 50 μg/mL kanamycin. Plates were incubated at 30° C. for 60 h. Recombinant *agrobacterium* cultures (500 mL LB, 50 μg/mL kanamycin) were inoculated from single colonies of transformed *Agrobacterium* cells and grown at 30° C. for 60 h.

Cells were harvested by centrifugation (5000×g, 10 min) and resuspended in 1 L of 5% (W/V) sucrose containing 0.05% (V/V) Silwet L-77 (OSI Specialties, Inc). *Arabidopsis* plants were grown in soil at a density of 10 plants per 100 $cm^2$ pot in metromix 360 soil mixture for 4 weeks (22° C., 16 h light/8 h dark, 100 μE $m^{-2}s^{-1}$). At early bolting, *Arabidopsis* plants were dipped into the *Agrobacterium* suspension. Two days later, the same plants were dipped again with the same *Agrobacterium* strain in sucrose/Silwet. Plants were grown for three to four weeks under standard plant growth conditions described above and plant material was harvested and dried for one week at ambient temperatures in paper bags. Seeds were harvested using a 0.425 mm mesh brass sieve.

Cleaned *Arabidopsis* seeds (2 grams, corresponding to about 100,000 seeds) were sterilized by washes in 45 mL of 80% ethanol, 0.01% triton X-100, followed by 45 mL of 30% (V/V) household bleach in water, 0.01% triton X-100 and finally by repeated rinsing in sterile water. Aliquots of 20,000 seeds were transferred to square plates (20×20 cm) containing 150 mL of sterile plant growth medium comprised of 0.5×MS salts, 1.0% (W/V) sucrose, 0.05 MES/KOH (pH 5.8), 200 μg/mL timentin, and 50 μg/mL kanamycin solidified with 10 g/L agar. Homogeneous dispersion of the seed on the medium was facilitated by mixing the aqueous seed suspension with an equal volume of melted plant growth medium. Plates were incubated under standard growth conditions for fourteen days. Kanamycin-resistant seedlings were transferred to soil and grown to maturity as described above. T2 seed was obtained from these individual transformants.

Example 17

Functional Analysis of *Arabidopsis* Seed Transformed with *Arabidopsis* Expression Vector pKR451

Wild-type *Arabidopsis thaliana* (Columbia ecotype) and a fad3/fae1 double mutant (Smith et al., *Planta* 217:507-516 (2003)) were transformed with pKR451 (SEQ ID NO:70) as described above and segregating T2 seed was obtained from a number of individual events for each. Bulk T2 seed lipid profiles for each event were obtained by transesterification with TMSH as described in Example 10 with the following modifications. For each event, a small scoopful of seeds (approximately 25-50 seed each scoopful) was crushed in 50 μL of TMSH in a 1.5 mL eppendorf tube. After shaking in TMSH for 15 min., 400 μL of heptane was added and the tubes were vortexed well, shaken for an additional 15 min and centrifuged at 13,000×g for 1 min. After shaking, the heptane layer was removed into glass GC vials and the fatty acid methyl esters were analyzed as described above.

Bulk T2 seed fatty acid profiles were obtained for 20 events where wild-type (wt) *Arabidopsis* was transformed with pKR451 (SEQ ID NO:70) and for 6 events where the fad3/fae1 mutant (ff) was transformed. The lipid profiles of T2 bulk seed for the 20 wild-type-transformed events, 6 fad3/fae1-transformed events as well as for a representative untransformed wt and fad3/fae1 event are shown in FIG. 11. Fatty acids are identified as 16:0 (palmitate), 18:0 (stearic acid), 18:1 (oleic acid), LA, GLA, ALA, STA, 20:0 (arachidic acid), 20:1 (11) (eicosenoic acid), EDA, DGLA, ARA, ERA, ETA and EPA; and, fatty acid compositions listed in FIG. 11 are expressed as a weight percent (wt. %) of total fatty acids.

Seeds from one representative event from the wild-type transformation with pKR415 (wt pKR451-6), where T2 seeds segregated as a single copy insert (i.e., 3:1 for Kanamycin resistance), where plated on kanamycin. After germination, six kanamycin resistant seed were grown into plants on soil and T3 seed was harvested as described in Example 13. Bulk T3 seed fatty acid profiles were obtained as described above for seed from all six plants and the results are shown in FIG. 12. Fatty acids are identified as 16:0 (palmitate), 18:0 (stearic acid), 18:1 (oleic acid), LA, GLA, ALA, STA, 20:0 (arachidic acid), 20:1 (11) (eicosenoic acid), EDA, DGLA, ARA, ERA, ETA and EPA; and, fatty acid compositions listed in FIG. 12 are expressed as a weight percent (wt. %) of total fatty acids. The plant having seed with the highest level of ARA, wt pKR451-6-1, had 8.0%.

What is claimed is:

1. Oil obtained from the seeds of a transgenic oilseed plant that produces mature seeds in which the total seed fatty acid profile comprises at least 2.0% arachidonic acid wherein the oilseed plant is selected from the group consisting of soybean, *Brassica* species, sunflower, maize, cotton, flax and safflower.

2. A food product or food analog which has incorporated therein the oil of claim 1.

3. The food product of claim 2 wherein said product is selected from the group consisting of a spray-dried food particle, a freeze-dried food particle, meat products, a cereal food, a snack food, a baked good, an extruded food, a fried food, a health food, a dairy food, meat analogs, cheese analogs, milk analogs, a pet food, animal feed or aquaculture feed.

4. A beverage which has incorporated therein the oil of claim 1.

5. Infant formula which has incorporated therein the oil of claim 1.

6. A nutritional supplement which has incorporated therein the oil of claim 1.

7. A pet food which has incorporated therein the oil of claim 1.

8. Animal feed which has incorporated therein the oil of claim 1.

9. An aquaculture food product which has incorporated therein the oil of claim 1.

10. Products obtained from the hydrogenation, fractionation, interesterification or hydrolysis of the oil of claim 1.

11. By-products made during the production of the oil of claim 1.

12. Partially processed by-products made during the production of the oil of claim 1.

* * * * *

SEQUENCE LISTING

<160> NUMBER OF SEQ ID NOS: 114

<210> SEQ ID NO 1
<211> LENGTH: 24
<212> TYPE: DNA
<213> ORGANISM: Artificial Sequence
<220> FEATURE:
<223> OTHER INFORMATION: synthetic oligonucleotide

<400> SEQUENCE: 1
gccccccatc ctttgaaagc ctgt 24

<210> SEQ ID NO 2
<211> LENGTH: 24
<212> TYPE: DNA
<213> ORGANISM: Artificial Sequence
<220> FEATURE:
<223> OTHER INFORMATION: synthetic oligonucleotide

<400> SEQUENCE: 2
gccccccatc ctttgaaagc ctgt 24

<210> SEQ ID NO 3
<211> LENGTH: 2012
<212> TYPE: DNA
<213> ORGANISM: Glycine max

<400> SEQUENCE: 3
atcttaggcc cttgattata tggtgtttag atggattcac atgcaagttt ttatttcaat 60 ccctttttcct ttgaataact gaccaagaac aacaagaaaa aaaaaaaaag aaaaggatca 120
ttttgaaagg atatttttcg ctcctattca aatactgtat ttttaccaaa aaaactgtat 180
ttttcctaca ctctcaagct ttgtttttcg cttcgactct catgatttcc ttcatatgcc 240
aatcactcta tttataaatg gcataaggta gtgtgaacaa ttgcaaagct tgtcatcaaa 300
agcttgcaat gtacaaatta atgtttttca tgcctttcaa aattatctgc accccctagc 360
tattaatcta acatctaagt aaggctagtg aattttttcg aatagtcatg cagtgcatta 420
atttccccgt gactattttg gctttgactc caacactggc cccgtacatc cgtccctcat 480
tacatgaaaa gaaatattgt ttatattctt aattaaaaat attgtccctt ctaaattttc 540
atatagttaa ttattatatt actttttttct ctattctatt agttctattt tcaaattatt 600
atttatgcat atgtaaagta cattatattt ttgctatata cttaaatatt tctaaattat 660
taaaaaaaga ctgatatgaa aaatttattc tttttaaagc tatatcattt tatatatact 720
ttttcttttc ttttctttca ttttctattc aatttaataa gaaataaatt ttgtaaattt 780
ttatttatca atttataaaa atattttact ttatatgttt tttcacattt ttgttaaaca 840
aatcatatca ttatgattga aagagaggaa attgacagtg agtaataagt gatgagaaaa 900
aaatgtgtta tttcctaaaa aaaacctaaa caaacatgta tctactctct atttcatcta 960
tctctcattt catttttctc tttatctctt tctttatttt tttatcatat catttcacat 1020
taattatttt tactctcttt attttttctc tctatccctc tcttatttcc actcatatat 1080
acactccaaa attggggcat gcctttatca ctactctatc tcctccacta aatcatttaa 1140
atgaaactga aaagcattgg caagtctcct cccctcctca agtgatttcc aactcagcat 1200
tggcatctga ttgattcagt atatctattg catgtgtaaa agtctttcca caatacataa 1260
ctattaatta atcttaaata aataaaggat aaaatatttt tttttcttca taaaattaaa 1320
atatgttatt ttttgtttag atgtatattc gaataaatct aaatatatga taatgatttt 1380
ttatattgat taaacatata atcaatatta aatatgatat ttttttatat aggttgtaca 1440
cataatttta taaggataaa aaatatgata aaaataaatt ttaaatattt ttatatttac 1500
gagaaaaaaa aatattttag ccataaataa atgaccagca tattttacaa ccttagtaat 1560
tcataaattc ctatatgtat atttgaaatt aaaaacagat aatcgttaag ggaaggaatc 1620
ctacgtcatc tcttgccatt tgtttttcat gcaaacagaa agggacgaaa aaccacctca 1680
ccatgaatca ctcttcacac catttttact agcaaacaag tctcaacaac tgaagccagc 1740
tctctttccg tttcttttta caacactttc tttgaaatag tagtattttt ttttcacatg 1800
atttattaac gtgccaaaag atgcttattg aatagagtgc acatttgtaa tgtactacta 1860
attagaacat gaaaaagcat tgttctaaca cgataatcct gtgaaggcgt taactccaaa 1920
gatccaattt cactatataa attgtgacga aagcaaaatg aattcacata gctgagagag 1980
aaaggaaagg ttaactaaga agcaatactt ca 2012

<210> SEQ ID NO 4
<211> LENGTH: 27
<212> TYPE: DNA
<213> ORGANISM: Artificial Sequence
<220> FEATURE:
<223> OTHER INFORMATION: synthetic oligonucleotide

<400> SEQUENCE: 4
ggtccaatat ggaacgatga gttgata 27

<210> SEQ ID NO 5
<211> LENGTH: 35
<212> TYPE: DNA
<213> ORGANISM: Artificial Sequence
<220> FEATURE:
<223> OTHER INFORMATION: synthetic oligonucleotide

<400> SEQUENCE: 5
cgcggatccg ctggaactag aagagagacc taaga 35

<210> SEQ ID NO 6
<211> LENGTH: 1408
<212> TYPE: DNA
<213> ORGANISM: Glycine max

<400> SEQUENCE: 6
aactaaaaaa agctctcaaa ttacattttg agttgtttca ggttccattg ccttattgct 60
aaaactccaa ctaaaataac aaatagcaca tgcaggtgca aacaacacgt tactctgatg 120
aaggtgatgt gcctctagca gtctagctta tgaggctcgc tgcttatcaa cgattcatca 180
ttccccaaga cgtgtacgca gattaaacaa tggacaaaac ttcaatcgat tatagaataa 240
taattttaac agtgccgact tttttctgta aacaaaaggc cagaatcata tcgcacatca 300
tcttgaatgc agtgtcgagt ttggaccatt tgagtacaaa gccaatattg aatgattttt 360
cgattttaca tgtgtgaatc agacaaaagt gcatgcaatc acttgcaagt aaattaagga 420
tactaatcta ttcctttcat tttatatgct ccacttttat ataaaaaaat atacattatt 480
atatatgcat tattaattat tgcagtatta tgctattggt tttatggccc tgctaaataa 540
cctaaatgag tctaactatt gcatatgaat caaatgaagg aagaatcatg atctaaacct 600
gagtacccaa tgcaataaaa tgcgtcctat tacctaaact tcaaacacac attgccatcg 660
gacgtataaa ttaatgcata taggttattt tgagaaaaga aaacatcaaa agctctaaaa 720
cttcttttaa ctttgaaata agctgataaa aatacgcttt aaatcaactg tgtgctgtat 780
ataagctgca atttcacatt ttaccaaacc gaaacaagaa tggtaacagt gaggcaaaaa 840
tttgaaaaat gtcctacttc acattcacat caaattaatt acaactaaat aaataaacat 900
cgtgattcaa gcagtaatga aagtcgaaat cagatagaat atacacgttt aacatcaatt 960
gaattttttt ttaaatggat atatacaagt ttactatttt atatataatg aaaattcatt 1020
ttgtgttagc acaaaactta cagaaagaga taaattttaa ataaagagaa ttatatccaa 1080
ttttataatc caaaataatc aaattaaaga atattggcta gatagaccgg ctttttcact 1140
gcccctgctg gataatgaaa attcatatca aaacaataca gaagttctag tttaataata 1200
aaaaagttgg caaactgtca ttccctgttg gtttttaagc caaatcacaa ttcaattacg 1260
tatcagaaat taatttaaac caaatatata gctacgaggg aacttcttca gtcattacta 1320
gctagctcac taatcactat atatacgaca tgctacaagt gaagtgacca tatcttaatt 1380
tcaaatcata aaattcttcc accaagtt 1408

<210> SEQ ID NO 7
<211> LENGTH: 898
<212> TYPE: DNA
<213> ORGANISM: Glycine max

<400> SEQUENCE: 7
tatatatgtg agggtagagg gtatcacatg agctctggat ttccataatg aaaaggaatc 60
agaaaaaaga aaagggtttg caactaaaaa cttgggaaag aacaaaggtt taatcttggg 120
atcggtgacc aaacctcttt ttgataccat cttccattta atctagaata tgaaaataag 180
tggataataa aaaagaaaaa tgatatttaa tctaagttca aacaactcga ttagtccttt 240
cctcagttat aaaaaggaaa acaaaacaac gtacaactca atcagatttc aatttgctta 300
ttttgtttca actcaatatt tagcttttaa taattaacta aggtttttat attatattta 360
gaattttttt tctcctttta ttttatttgc atgtatatta ggagttgtcc aatgataatt 420
attctttaat aatgaatcat tagtcttaca tcattacatg atacacatgt atgagatgtc 480
cactccatct cttgttaatt tgatgggcat ccattactta tcaaccatcc gccatagtta 540
tctggttgtg tattttgtta tctgttggta ctctggagta gcatgcataa cgctatattt 600
ttatttctag gatcatgcat atacgcgcaa accaaagaac agagaccgat gtaaagacaa 660
aacatagagt atcctttcca aaacaacgtc caagttcata aaatagagac gaaatgcaag 720
cacagcacac ataagtggat gatcaagatg ggctcgtcca tgccacgcac accaacacac 780
gtcaagcagc aagccctccc gtggccaaat gtgcatgcat acatgttaac aagagcttgc 840
ataactataa atagccctaa tctcactcca tgtttcatcg tccaataata tatatact 898

<210> SEQ ID NO 8
<211> LENGTH: 36
<212> TYPE: DNA
<213> ORGANISM: Artificial Sequence
<220> FEATURE:
<223> OTHER INFORMATION: synthetic oligonucleotide

<400> SEQUENCE: 8
cgcggatcct atatatgtga gggtagaggg tatcac 36

<210> SEQ ID NO 9
<211> LENGTH: 44
<212> TYPE: DNA
<213> ORGANISM: Artificial Sequence
<220> FEATURE:

<223> OTHER INFORMATION: synthetic oligonucleotide

<400> SEQUENCE: 9
gaattcgcgg ccgcagtata tatattattg gacgatgaaa catg 44

<210> SEQ ID NO 10
<211> LENGTH: 690
<212> TYPE: DNA
<213> ORGANISM: Glycine max

<400> SEQUENCE: 10
tagcctaagt acgtactcaa aatgccaaca aataaaaaaa aagttgcttt aataatgcca 60
aaacaaatta ataaaacact tacaacaccg gattttttt aattaaaatg tgccatttag 120
gataaatagt taatattttt aataattatt taaaaagccg tatctactaa aatgattttt 180
atttggttga aaatattaat atgtttaaat caacacaatc tatcaaaatt aaactaaaaa 240
aaaaataagt gtacgtggtt aacattagta cagtaatata agaggaaaat gagaaattaa 300
gaaattgaaa gcgagtctaa tttttaaatt atgaacctgc atatataaaa ggaaagaaag 360
aatccaggaa gaaaagaaat gaaaccatgc atggtcccct cgtcatcacg agtttctgcc 420
atttgcaata gaaacactga aacacctttc tctttgtcac ttaattgaga tgccgaagcc 480
acctcacacc atgaacttca tgaggtgtag cacccaaggc ttccatagcc atgcatactg 540
aagaatgtct caagctcagc accctacttc tgtgacgttg tccctcattc accttcctct 600
cttccctata aataaccacg cctcaggttc tccgcttcac aactcaaaca ttctcctcca 660
ttggtcctta aacactcatc agtcatcacc 690

<210> SEQ ID NO 11
<211> LENGTH: 36
<212> TYPE: DNA
<213> ORGANISM: Artificial Sequence
<220> FEATURE:
<223> OTHER INFORMATION: synthetic oligonucleotide

<400> SEQUENCE: 11
cgcggatcct agcctaagta cgtactcaaa atgcca 36

<210> SEQ ID NO 12
<211> LENGTH: 41
<212> TYPE: DNA
<213> ORGANISM: Artificial Sequence
<220> FEATURE:
<223> OTHER INFORMATION: synthetic oligonucleotide

<400> SEQUENCE: 12
gaattcgcgg ccgcggtgat gactgatgag tgtttaagga c 41

<210> SEQ ID NO 13
<211> LENGTH: 32
<212> TYPE: DNA
<213> ORGANISM: Artificial Sequence
<220> FEATURE:
<223> OTHER INFORMATION: synthetic oligonucleotide

<400> SEQUENCE: 13
ttgcggccgc aaaccatggc tgctgctccc ag 32

<210> SEQ ID NO 14
<211> LENGTH: 24
<212> TYPE: DNA
<213> ORGANISM: Artificial Sequence
<220> FEATURE:

<223> OTHER INFORMATION: synthetic oligonucleotide

<400> SEQUENCE: 14
aagcggccgc ttactgcgcc ttac 24

<210> SEQ ID NO 15
<211> LENGTH: 34
<212> TYPE: DNA
<213> ORGANISM: Artificial Sequence
<220> FEATURE:
<223> OTHER INFORMATION: synthetic oligonucleotide

<400> SEQUENCE: 15
atctagacct gcaggccaac tgcgtttggg gctc 34

<210> SEQ ID NO 16
<211> LENGTH: 40
<212> TYPE: DNA
<213> ORGANISM: Artificial Sequence
<220> FEATURE:
<223> OTHER INFORMATION: synthetic oligonucleotide

<400> SEQUENCE: 16
cttttaactt cgcggccgct tgctattgat gggtgaagtg 40

<210> SEQ ID NO 17
<211> LENGTH: 38
<212> TYPE: DNA
<213> ORGANISM: Artificial Sequence
<220> FEATURE:
<223> OTHER INFORMATION: synthetic oligonucleotide

<400> SEQUENCE: 17
caatagcaag cggccgcgaa gttaaaagca atgttgtc 38

<210> SEQ ID NO 18
<211> LENGTH: 35
<212> TYPE: DNA
<213> ORGANISM: Artificial Sequence
<220> FEATURE:
<223> OTHER INFORMATION: synthetic oligonucleotide

<400> SEQUENCE: 18
aatctagacg tacgcaaagg caaagattta aactc 35

<210> SEQ ID NO 19
<211> LENGTH: 36
<212> TYPE: DNA
<213> ORGANISM: Artificial Sequence
<220> FEATURE:
<223> OTHER INFORMATION: synthetic oligonucleotide

<400> SEQUENCE: 19
tttctagacg tacgtccctt cttatctttg atctcc 36

<210> SEQ ID NO 20
<211> LENGTH: 34
<212> TYPE: DNA
<213> ORGANISM: Artificial Sequence
<220> FEATURE:
<223> OTHER INFORMATION: synthetic oligonucleotide

<400> SEQUENCE: 20
gcggccgcag ttggatagaa tatatgtttg tgac 34

<210> SEQ ID NO 21

<211> LENGTH: 41
<212> TYPE: DNA
<213> ORGANISM: Artificial Sequence
<220> FEATURE:
<223> OTHER INFORMATION: synthetic oligonucleotide

<400> SEQUENCE: 21
ctatccaact gcggccgcat ttcgcaccaa atcaatgaaa g 41

<210> SEQ ID NO 22
<211> LENGTH: 38
<212> TYPE: DNA
<213> ORGANISM: Artificial Sequence
<220> FEATURE:
<223> OTHER INFORMATION: synthetic oligonucleotide

<400> SEQUENCE: 22
aatctagacg tacgtgaagg ttaaacatgg tgaatatg 38

<210> SEQ ID NO 23
<211> LENGTH: 29
<212> TYPE: DNA
<213> ORGANISM: Artificial Sequence
<220> FEATURE:
<223> OTHER INFORMATION: synthetic oligonucleotide

<400> SEQUENCE: 23
atctagacgt acgtcctcga agagaaggg 29

<210> SEQ ID NO 24
<211> LENGTH: 22
<212> TYPE: DNA
<213> ORGANISM: Artificial Sequence
<220> FEATURE:
<223> OTHER INFORMATION: synthetic oligonucleotide

<400> SEQUENCE: 24
ttctagacgt acggatataa tg 22

<210> SEQ ID NO 25
<211> LENGTH: 36
<212> TYPE: DNA
<213> ORGANISM: Artificial Sequence
<220> FEATURE:
<223> OTHER INFORMATION: synthetic oligonucleotide

<400> SEQUENCE: 25
tttctagacg tacggtctca atagattaag aagttg 36

<210> SEQ ID NO 26
<211> LENGTH: 33
<212> TYPE: DNA
<213> ORGANISM: Artificial Sequence
<220> FEATURE:
<223> OTHER INFORMATION: synthetic oligonucleotide

<400> SEQUENCE: 26
gcggccgcga agagagatac taagagaatg ttg 33

<210> SEQ ID NO 27
<211> LENGTH: 39
<212> TYPE: DNA
<213> ORGANISM: Artificial Sequence
<220> FEATURE:
<223> OTHER INFORMATION: synthetic oligonucleotide

<400> SEQUENCE: 27
gtatctctct tcgcggccgc atttggcacc aaatcaatg 39

<210> SEQ ID NO 28
<211> LENGTH: 36
<212> TYPE: DNA
<213> ORGANISM: Artificial Sequence
<220> FEATURE:
<223> OTHER INFORMATION: synthetic oligonucleotide

<400> SEQUENCE: 28
tttctagacg tacgtcaaaa aatttcattg taactc 36

<210> SEQ ID NO 29
<211> LENGTH: 37
<212> TYPE: DNA
<213> ORGANISM: Artificial Sequence
<220> FEATURE:
<223> OTHER INFORMATION: synthetic oligonucleotide

<400> SEQUENCE: 29
cgcggatcca tcttaggccc ttgattatat ggtgttt 37

<210> SEQ ID NO 30
<211> LENGTH: 43
<212> TYPE: DNA
<213> ORGANISM: Artificial Sequence
<220> FEATURE:
<223> OTHER INFORMATION: synthetic oligonucleotide

<400> SEQUENCE: 30
gaattcgcgg ccgctgaagt attgcttctt agttaacctt tcc 43

<210> SEQ ID NO 31
<211> LENGTH: 41
<212> TYPE: DNA
<213> ORGANISM: Artificial Sequence
<220> FEATURE:
<223> OTHER INFORMATION: synthetic oligonucleotide

<400> SEQUENCE: 31
cgcggatcca actaaaaaaa gctctcaaat tacattttga g 41

<210> SEQ ID NO 32
<211> LENGTH: 44
<212> TYPE: DNA
<213> ORGANISM: Artificial Sequence
<220> FEATURE:
<223> OTHER INFORMATION: synthetic oligonucleotide

<400> SEQUENCE: 32
gaattcgcgg ccgcaacttg gtggaagaat tttatgattt gaaa 44

<210> SEQ ID NO 33
<211> LENGTH: 1617
<212> TYPE: DNA
<213> ORGANISM: Mortierella alpina

<400> SEQUENCE: 33
cgacactcct tccttcttct cacccgtcct agtccccttc aacccccctc tttgacaaag 60
acaacaaacc atggctgctg ctcccagtgt gaggacgttt actcgggccg aggttttgaa 120
tgccgaggct ctgaatgagg gcaagaagga tgccgaggca cccttcttga tgatcatcga 180
caacaaggtg tacgatgtcc gcgagttcgt ccctgatcat cccggtggaa gtgtgattct 240
cacgcacgtt ggcaaggacg gcactgacgt ctttgacact tttcaccccg aggctgcttg 300

```
ggagactctt gccaactttt acgttggtga tattgacgag agcgaccgcg atatcaagaa    360

tgatgacttt gcggccgagg tccgcaagct gcgtaccttg ttccagtctc ttggttacta    420

cgattcttcc aaggcatact acgccttcaa ggtctcgttc aacctctgca tctggggttt    480

gtcgacggtc attgtggcca agtggggcca gacctcgacc ctcgccaacg tgctctcggc    540

tgcgcttttg ggtctgttct ggcagcagtg cggatggttg gctcacgact tttgcatcca    600

ccaggtcttc caggaccgtt tctggggtga tcttttcggc gccttcttgg gaggtgtctg    660

ccagggcttc tcgtcctcgt ggtggaagga caagcacaac actcaccacg ccgcccccaa    720

cgtccacggc gaggatcccg acattgacac ccaccctctg ttgacctgga gtgagcatgc    780

gttggagatg ttctcggatg tcccagatga ggagctgacc cgcatgtggt cgcgtttcat    840

ggtcctgaac cagacctggt tttacttccc cattctctcg tttgcccgtc tctcctggtg    900

cctccagtcc attctctttg tgctgcctaa cggtcaggcc cacaagccct cgggcgcgcg    960

tgtgcccatc tcgttggtcg agcagctgtc gcttgcgatg cactggacct ggtacctcgc   1020

caccatgttc ctgttcatca aggatcccgt caacatgctg gtgtactttt tggtgtcgca   1080

ggcggtgtgc ggaaacttgt tggcgatcgt gttctcgctc aaccacaacg gtatgcctgt   1140

gatctcgaag gaggaggcgg tcgatatgga tttcttcacg aagcagatca tcacgggtcg   1200

tgatgtccac ccgggtctat ttgccaactg gttcacgggt ggattgaact atcagatcga   1260

gcaccacttg ttcccttcga tgcctcgcca caacttttca aagatccagc ctgctgtcga   1320

gaccctgtgc aaaaagtaca atgtccgata ccacaccacc ggtatgatcg agggaactgc   1380

agaggtcttt agccgtctga acgaggtctc caaggctgcc tccaagatgg gtaaggcgca   1440

gtaaaaaaaa aaacaaggac gttttttttc gccagtgcct gtgcctgtgc ctgcttccct   1500

tgtcaagtcg agcgtttctg gaaaggatcg ttcagtgcag tatcatcatt ctccttttac   1560

cccccgctca tatctcattc atttctctta ttaaacaact tgttcccccc ttcaccg      1617
```

<210> SEQ ID NO 34
<211> LENGTH: 457
<212> TYPE: PRT
<213> ORGANISM: Mortierella alpina

<400> SEQUENCE: 34

```
Met Ala Ala Ala Pro Ser Val Arg Thr Phe Thr Arg Ala Glu Val Leu
1               5                   10                  15

Asn Ala Glu Ala Leu Asn Glu Gly Lys Lys Asp Ala Glu Ala Pro Phe
            20                  25                  30

Leu Met Ile Ile Asp Asn Lys Val Tyr Asp Val Arg Glu Phe Val Pro
        35                  40                  45

Asp His Pro Gly Gly Ser Val Ile Leu Thr His Val Gly Lys Asp Gly
    50                  55                  60

Thr Asp Val Phe Asp Thr Phe His Pro Glu Ala Ala Trp Glu Thr Leu
65                  70                  75                  80

Ala Asn Phe Tyr Val Gly Asp Ile Asp Glu Ser Asp Arg Asp Ile Lys
                85                  90                  95

Asn Asp Asp Phe Ala Ala Glu Val Arg Lys Leu Arg Thr Leu Phe Gln
            100                 105                 110

Ser Leu Gly Tyr Tyr Asp Ser Ser Lys Ala Tyr Tyr Ala Phe Lys Val
        115                 120                 125

Ser Phe Asn Leu Cys Ile Trp Gly Leu Ser Thr Val Ile Val Ala Lys
    130                 135                 140

Trp Gly Gln Thr Ser Thr Leu Ala Asn Val Leu Ser Ala Ala Leu Leu
```

```
145                 150                 155                 160

Gly Leu Phe Trp Gln Gln Cys Gly Trp Leu Ala His Asp Phe Leu His
                165                 170                 175

His Gln Val Phe Gln Asp Arg Phe Trp Gly Asp Leu Phe Gly Ala Phe
            180                 185                 190

Leu Gly Gly Val Cys Gln Gly Phe Ser Ser Ser Trp Trp Lys Asp Lys
        195                 200                 205

His Asn Thr His His Ala Ala Pro Asn Val His Gly Glu Asp Pro Asp
    210                 215                 220

Ile Asp Thr His Pro Leu Leu Thr Trp Ser Glu His Ala Leu Glu Met
225                 230                 235                 240

Phe Ser Asp Val Pro Asp Glu Glu Leu Thr Arg Met Trp Ser Arg Phe
                245                 250                 255

Met Val Leu Asn Gln Thr Trp Phe Tyr Phe Pro Ile Leu Ser Phe Ala
            260                 265                 270

Arg Leu Ser Trp Cys Leu Gln Ser Ile Leu Phe Val Leu Pro Asn Gly
        275                 280                 285

Gln Ala His Lys Pro Ser Gly Ala Arg Val Pro Ile Ser Leu Val Glu
    290                 295                 300

Gln Leu Ser Leu Ala Met His Trp Thr Trp Tyr Leu Ala Thr Met Phe
305                 310                 315                 320

Leu Phe Ile Lys Asp Pro Val Asn Met Leu Val Tyr Phe Leu Val Ser
                325                 330                 335

Gln Ala Val Cys Gly Asn Leu Leu Ala Ile Val Phe Ser Leu Asn His
            340                 345                 350

Asn Gly Met Pro Val Ile Ser Lys Glu Glu Ala Val Asp Met Asp Phe
        355                 360                 365

Phe Thr Lys Gln Ile Ile Thr Gly Arg Asp Val His Pro Gly Leu Phe
    370                 375                 380

Ala Asn Trp Phe Thr Gly Gly Leu Asn Tyr Gln Ile Glu His His Leu
385                 390                 395                 400

Phe Pro Ser Met Pro Arg His Asn Phe Ser Lys Ile Gln Pro Ala Val
                405                 410                 415

Glu Thr Leu Cys Lys Lys Tyr Asn Val Arg Tyr His Thr Thr Gly Met
            420                 425                 430

Ile Glu Gly Thr Ala Glu Val Phe Ser Arg Leu Asn Glu Val Ser Lys
        435                 440                 445

Ala Ala Ser Lys Met Gly Lys Ala Gln
    450                 455
```

<210> SEQ ID NO 35
<211> LENGTH: 1362
<212> TYPE: DNA
<213> ORGANISM: Saprolegnia diclina

<400> SEQUENCE: 35

```
atggtccagg ggcaaaaggc cgagaagatc tcgtgggcga ccatccgtga gcacaaccgc      60

caagacaacg cgtggatcgt gatccaccac aaggtgtacg acatctcggc ctttgaggac     120

cacccgggcg gcgtcgtcat gttcacgcag gccggcgaag acgcgaccga tgcgttcgct     180

gtcttccacc cgagctcggc gctcaagctc ctcgagcagt actacgtcgg cgacgtcgac     240

cagtcgacgg cggccgtcga cacgtcgatc tcggacgagg tcaagaagag ccagtcggac     300

ttcattgcgt cgtaccgcaa gctgcgcctt gaagtcaagc gcctcggctt gtacgactcg     360

agcaagctct actacctcta caagtgcgcc tcgacgctga gcattgcgct tgtgtcggcg     420
```

```
gccatttgcc tccactttga ctcgacggcc atgtacatgg tcgcggctgt catccttggc    480

ctcttttacc agcagtgcgg ctggctcgcc catgactttc tgcaccacca agtgtttgag    540

aaccacttgt ttggcgacct cgtcggcgtc atggtcggca acctctggca gggcttctcg    600

gtgcagtggt ggaagaacaa gcacaacacg caccatgcga tccccaacct ccacgcgacg    660

cccgagatcg ccttccacgg cgacccggac attgacacga tgccgattct cgcgtggtcg    720

ctcaagatgg cgcagcacgc ggtcgactcg cccgtcgggc tcttcttcat gcgctaccaa    780

gcgtacctgt actttcccat cttgctcttt gcgcgtatct cgtgggtgat ccagtcggcc    840

atgtacgcct tctacaacgt tgggcccggc ggcacctttg acaaggtcca gtacccgctg    900

ctcgagcgcg ccggcctcct cctctactac ggctggaacc tcggccttgt gtacgcagcc    960

aacatgtcgc tgctccaagc ggctgcgttc ctctttgtga gccaggcgtc gtgcggcctc   1020

ttcctcgcga tggtctttag cgtcggccac aacggcatgg aggtctttga caaggacagc   1080

aagcccgatt tttggaagct gcaagtgctc tcgacgcgca acgtgacgtc gtcgctctgg   1140

atcgactggt tcatgggcgg cctcaactac cagatcgacc accacttgtt cccgatggtg   1200

ccccggcaca acctcccggc gctcaacgtg ctcgtcaagt cgctctgcaa gcagtacgac   1260

atcccatacc acgagacggg cttcatcgcg ggcatggccg aggtcgtcgt gcacctcgag   1320

cgcatctcga tcgagttctt caaggagttt cccgccatgt aa                      1362
```

```
<210> SEQ ID NO 36
<211> LENGTH: 453
<212> TYPE: PRT
<213> ORGANISM: Saprolegnia diclina

<400> SEQUENCE: 36

Met Val Gln Gly Gln Lys Ala Glu Lys Ile Ser Trp Ala Thr Ile Arg
1               5                   10                  15

Glu His Asn Arg Gln Asp Asn Ala Trp Ile Val Ile His His Lys Val
            20                  25                  30

Tyr Asp Ile Ser Ala Phe Glu Asp His Pro Gly Gly Val Val Met Phe
        35                  40                  45

Thr Gln Ala Gly Glu Asp Ala Thr Asp Ala Phe Ala Val Phe His Pro
    50                  55                  60

Ser Ser Ala Leu Lys Leu Leu Glu Gln Tyr Tyr Val Gly Asp Val Asp
65                  70                  75                  80

Gln Ser Thr Ala Ala Val Asp Thr Ser Ile Ser Asp Glu Val Lys Lys
                85                  90                  95

Ser Gln Ser Asp Phe Ile Ala Ser Tyr Arg Lys Leu Arg Leu Glu Val
            100                 105                 110

Lys Arg Leu Gly Leu Tyr Asp Ser Ser Lys Leu Tyr Tyr Leu Tyr Lys
        115                 120                 125

Cys Ala Ser Thr Leu Ser Ile Ala Leu Val Ser Ala Ala Ile Cys Leu
    130                 135                 140

His Phe Asp Ser Thr Ala Met Tyr Met Val Ala Ala Val Ile Leu Gly
145                 150                 155                 160

Leu Phe Tyr Gln Gln Cys Gly Trp Leu Ala His Asp Phe Leu His His
                165                 170                 175

Gln Val Phe Glu Asn His Leu Phe Gly Asp Leu Val Gly Val Met Val
            180                 185                 190

Gly Asn Leu Trp Gln Gly Phe Ser Val Gln Trp Trp Lys Asn Lys His
        195                 200                 205
```

-continued

```
Asn Thr His His Ala Ile Pro Asn Leu His Ala Thr Pro Glu Ile Ala
    210                 215                 220

Phe His Gly Asp Pro Asp Ile Asp Thr Met Pro Ile Leu Ala Trp Ser
225                 230                 235                 240

Leu Lys Met Ala Gln His Ala Val Asp Ser Pro Val Gly Leu Phe Phe
                245                 250                 255

Met Arg Tyr Gln Ala Tyr Leu Tyr Phe Pro Ile Leu Leu Phe Ala Arg
            260                 265                 270

Ile Ser Trp Val Ile Gln Ser Ala Met Tyr Ala Phe Tyr Asn Val Gly
        275                 280                 285

Pro Gly Gly Thr Phe Asp Lys Val Gln Tyr Pro Leu Leu Glu Arg Ala
    290                 295                 300

Gly Leu Leu Leu Tyr Tyr Gly Trp Asn Leu Gly Leu Val Tyr Ala Ala
305                 310                 315                 320

Asn Met Ser Leu Leu Gln Ala Ala Ala Phe Leu Phe Val Ser Gln Ala
                325                 330                 335

Ser Cys Gly Leu Phe Leu Ala Met Val Phe Ser Val Gly His Asn Gly
            340                 345                 350

Met Glu Val Phe Asp Lys Asp Ser Lys Pro Asp Phe Trp Lys Leu Gln
        355                 360                 365

Val Leu Ser Thr Arg Asn Val Thr Ser Ser Leu Trp Ile Asp Trp Phe
    370                 375                 380

Met Gly Gly Leu Asn Tyr Gln Ile Asp His His Leu Phe Pro Met Val
385                 390                 395                 400

Pro Arg His Asn Leu Pro Ala Leu Asn Val Leu Val Lys Ser Leu Cys
                405                 410                 415

Lys Gln Tyr Asp Ile Pro Tyr His Glu Thr Gly Phe Ile Ala Gly Met
            420                 425                 430

Ala Glu Val Val Val His Leu Glu Arg Ile Ser Ile Glu Phe Phe Lys
        435                 440                 445

Glu Phe Pro Ala Met
    450


<210> SEQ ID NO 37
<211> LENGTH: 1413
<212> TYPE: DNA
<213> ORGANISM: Saprolegnia diclina

<400> SEQUENCE: 37

atggccccgc agacggagct ccgccagcgc cacgccgccg tcgccgagac gccggtggcc      60

ggcaagaagg cctttacatg gcaggaggtc gcgcagcaca acacggcggc ctcggcctgg     120

atcattatcc gcggcaaggt ctacgacgtg accgagtggg ccaacaagca ccccggcggc     180

cgcgagatgg tgctgctgca cgccggtcgc gaggccaccg acacgttcga ctcgtaccac     240

ccgttcagcg acaaggccga gtcgatcttg aacaagtatg agattggcac gttcacgggc     300

ccgtccgagt ttccgacctt caagccggac acgggcttct acaaggagtg ccgcaagcgc     360

gttggcgagt acttcaagaa gaacaacctc catccgcagg acggcttccc gggcctctgg     420

cgcatgatgg tcgtgtttgc ggtcgccggc ctcgccttgt acggcatgca cttttcgact     480

atctttgcgc tgcagctcgc ggccgcggcg ctctttggcg tctgccaggc gctgccgctg     540

ctccacgtca tgcacgactc gtcgcacgcg tcgtacacca acatgccgtt cttccattac     600

gtcgtcggcc gctttgccat ggactggttt gccggcggct cgatggtgtc atggctcaac     660

cagcacgtcg tgggccacca catctacacg aacgtcgcgg gctcggaccc ggatcttccg     720
```

```
gtcaacatgg acggcgacat ccgccgcatc gtgaaccgcc aggtgttcca gcccatgtac     780

gcattccagc acatctacct tccgccgctc tatggcgtgc ttggcctcaa gttccgcatc     840

caggacttca ccgacacgtt cggctcgcac acgaacggcc cgatccgcgt caacccgcac     900

gcgctctcga cgtggatggc catgatcagc tccaagtcgt tctgggcctt ctaccgcgtg     960

taccttccgc ttgccgtgct ccagatgccc atcaagacgt accttgcgat cttcttcctc    1020

gccgagtttg tcacgggctg gtacctcgcg ttcaacttcc aagtaagcca tgtctcgacc    1080

gagtgcggct acccatgcgg cgacgaggcc aagatggcgc tccaggacga gtgggcagtc    1140

tcgcaggtca agacgtcggt cgactacgcc catggctcgt ggatgacgac gttccttgcc    1200

ggcgcgctca actaccaggt cgtgcaccac ttgttcccca gcgtgtcgca gtaccactac    1260

ccggcgatcg cgcccatcat cgtcgacgtc tgcaaggagt acaacatcaa gtacgccatc    1320

ttgccggact ttacggcggc gttcgttgcc cacttgaagc acctccgcaa catgggccag    1380

cagggcatcg ccgccacgat ccacatgggc taa                                 1413


<210> SEQ ID NO 38
<211> LENGTH: 470
<212> TYPE: PRT
<213> ORGANISM: Saprolegnia diclina

<400> SEQUENCE: 38

Met Ala Pro Gln Thr Glu Leu Arg Gln Arg His Ala Ala Val Ala Glu
1               5                   10                  15

Thr Pro Val Ala Gly Lys Lys Ala Phe Thr Trp Gln Glu Val Ala Gln
            20                  25                  30

His Asn Thr Ala Ala Ser Ala Trp Ile Ile Ile Arg Gly Lys Val Tyr
        35                  40                  45

Asp Val Thr Glu Trp Ala Asn Lys His Pro Gly Gly Arg Glu Met Val
    50                  55                  60

Leu Leu His Ala Gly Arg Glu Ala Thr Asp Thr Phe Asp Ser Tyr His
65                  70                  75                  80

Pro Phe Ser Asp Lys Ala Glu Ser Ile Leu Asn Lys Tyr Glu Ile Gly
                85                  90                  95

Thr Phe Thr Gly Pro Ser Glu Phe Pro Thr Phe Lys Pro Asp Thr Gly
            100                 105                 110

Phe Tyr Lys Glu Cys Arg Lys Arg Val Gly Glu Tyr Phe Lys Lys Asn
        115                 120                 125

Asn Leu His Pro Gln Asp Gly Phe Pro Gly Leu Trp Arg Met Met Val
    130                 135                 140

Val Phe Ala Val Ala Gly Leu Ala Leu Tyr Gly Met His Phe Ser Thr
145                 150                 155                 160

Ile Phe Ala Leu Gln Leu Ala Ala Ala Ala Leu Phe Gly Val Cys Gln
                165                 170                 175

Ala Leu Pro Leu Leu His Val Met His Asp Ser Ser His Ala Ser Tyr
            180                 185                 190

Thr Asn Met Pro Phe Phe His Tyr Val Val Gly Arg Phe Ala Met Asp
        195                 200                 205

Trp Phe Ala Gly Gly Ser Met Val Ser Trp Leu Asn Gln His Val Val
    210                 215                 220

Gly His His Ile Tyr Thr Asn Val Ala Gly Ser Asp Pro Asp Leu Pro
225                 230                 235                 240

Val Asn Met Asp Gly Asp Ile Arg Arg Ile Val Asn Arg Gln Val Phe
                245                 250                 255
```

```
Gln Pro Met Tyr Ala Phe Gln His Ile Tyr Leu Pro Pro Leu Tyr Gly
            260                 265                 270

Val Leu Gly Leu Lys Phe Arg Ile Gln Asp Phe Thr Asp Thr Phe Gly
        275                 280                 285

Ser His Thr Asn Gly Pro Ile Arg Val Asn Pro His Ala Leu Ser Thr
    290                 295                 300

Trp Met Ala Met Ile Ser Ser Lys Ser Phe Trp Ala Phe Tyr Arg Val
305                 310                 315                 320

Tyr Leu Pro Leu Ala Val Leu Gln Met Pro Ile Lys Thr Tyr Leu Ala
            325                 330                 335

Ile Phe Phe Leu Ala Glu Phe Val Thr Gly Trp Tyr Leu Ala Phe Asn
            340                 345                 350

Phe Gln Val Ser His Val Ser Thr Glu Cys Gly Tyr Pro Cys Gly Asp
        355                 360                 365

Glu Ala Lys Met Ala Leu Gln Asp Glu Trp Ala Val Ser Gln Val Lys
    370                 375                 380

Thr Ser Val Asp Tyr Ala His Gly Ser Trp Met Thr Thr Phe Leu Ala
385                 390                 395                 400

Gly Ala Leu Asn Tyr Gln Val Val His His Leu Phe Pro Ser Val Ser
            405                 410                 415

Gln Tyr His Tyr Pro Ala Ile Ala Pro Ile Ile Val Asp Val Cys Lys
            420                 425                 430

Glu Tyr Asn Ile Lys Tyr Ala Ile Leu Pro Asp Phe Thr Ala Ala Phe
        435                 440                 445

Val Ala His Leu Lys His Leu Arg Asn Met Gly Gln Gln Gly Ile Ala
    450                 455                 460

Ala Thr Ile His Met Gly
465                 470
```

<210> SEQ ID NO 39
<211> LENGTH: 819
<212> TYPE: DNA
<213> ORGANISM: Thraustochytrium aureum

<400> SEQUENCE: 39

```
atggcaaaca gcagcgtgtg ggatgatgtg gtgggccgcg tggagaccgg cgtggaccag      60

tggatggatg gcgccaagcc gtacgcactc accgatgggc tcccgatgat ggacgtgtcc     120

accatgctgg cattcgaggt gggatacatg gccatgctgc tcttcggcat cccgatcatg     180

aggcagatgg agaagccttt tgagctcaag accatcaagc tcttgcacaa cttgtttctc     240

ttcggacttt ccttgtacat gtgcgtggtg accatccgcc aggctatcct tggaggctac     300

aaagtgtttg gaaacgacat ggagaagggc aacgagtctc atgctcaggg catgtctcgc     360

atcgtgtacg tgttctacgt gtccaaggca tacgagttct tggataccgc catcatgatc     420

ctttgcaaga agttcaacca ggtttccttc ttgcatgtgt accaccatgc caccattttt     480

gccatctggt gggctatcgc caagtacgct ccaggaggtg atgcgtactt ttcagtgatc     540

ctcaactctt tcgtgcacac cgtcatgtac gcatactact tcttctcctc ccaagggttc     600

gggttcgtga agccaatcaa gccgtacatc accacccttc agatgaccca gttcatggca     660

atgcttgtgc agtccttgta cgactacctc ttcccatgcg actacccaca ggctcttgtg     720

cagcttcttg gagtgtacat gatcaccttg cttgccctct tcggcaactt ttttgtgcag     780

agctatctta aaaagccaaa aaagagcaag accaactaa                           819
```

<210> SEQ ID NO 40

<211> LENGTH: 272
<212> TYPE: PRT
<213> ORGANISM: Thraustochytrium aureum

<400> SEQUENCE: 40

```
Met Ala Asn Ser Ser Val Trp Asp Asp Val Val Gly Arg Val Glu Thr
1               5                   10                  15

Gly Val Asp Gln Trp Met Asp Gly Ala Lys Pro Tyr Ala Leu Thr Asp
            20                  25                  30

Gly Leu Pro Met Met Asp Val Ser Thr Met Leu Ala Phe Glu Val Gly
        35                  40                  45

Tyr Met Ala Met Leu Leu Phe Gly Ile Pro Ile Met Arg Gln Met Glu
    50                  55                  60

Lys Pro Phe Glu Leu Lys Thr Ile Lys Leu Leu His Asn Leu Phe Leu
65                  70                  75                  80

Phe Gly Leu Ser Leu Tyr Met Cys Val Val Thr Ile Arg Gln Ala Ile
                85                  90                  95

Leu Gly Gly Tyr Lys Val Phe Gly Asn Asp Met Glu Lys Gly Asn Glu
            100                 105                 110

Ser His Ala Gln Gly Met Ser Arg Ile Val Tyr Val Phe Tyr Val Ser
        115                 120                 125

Lys Ala Tyr Glu Phe Leu Asp Thr Ala Ile Met Ile Leu Cys Lys Lys
    130                 135                 140

Phe Asn Gln Val Ser Phe Leu His Val Tyr His His Ala Thr Ile Phe
145                 150                 155                 160

Ala Ile Trp Trp Ala Ile Ala Lys Tyr Ala Pro Gly Gly Asp Ala Tyr
                165                 170                 175

Phe Ser Val Ile Leu Asn Ser Phe Val His Thr Val Met Tyr Ala Tyr
            180                 185                 190

Tyr Phe Phe Ser Ser Gln Gly Phe Gly Phe Val Lys Pro Ile Lys Pro
        195                 200                 205

Tyr Ile Thr Thr Leu Gln Met Thr Gln Phe Met Ala Met Leu Val Gln
    210                 215                 220

Ser Leu Tyr Asp Tyr Leu Phe Pro Cys Asp Tyr Pro Gln Ala Leu Val
225                 230                 235                 240

Gln Leu Leu Gly Val Tyr Met Ile Thr Leu Leu Ala Leu Phe Gly Asn
                245                 250                 255

Phe Phe Val Gln Ser Tyr Leu Lys Lys Pro Lys Lys Ser Lys Thr Asn
            260                 265                 270
```

<210> SEQ ID NO 41
<211> LENGTH: 1077
<212> TYPE: DNA
<213> ORGANISM: Saprolegnia diclina

<400> SEQUENCE: 41

```
atgactgagg ataagacgaa ggtcgagttc ccgacgctca cggagctcaa gcactcgatc      60

ccgaacgcgt gctttgagtc gaacctcggc ctctcgctct actacacggc ccgcgcgatc     120

ttcaacgcgt cggcctcggc ggcgctgctc tacgcggcgc gctcgacgcc gttcattgcc     180

gataacgttc tgctccacgc gctcgtttgc gccacctaca tctacgtgca gggcgtcatc     240

ttctggggct tcttcacggt cggccacgac tgcggccact cggccttctc gcgctaccac     300

agcgtcaact ttatcatcgg ctgcatcatg cactctgcga ttttgacgcc gttcgagagc     360

tggcgcgtga cgcaccgcca ccaccacaag aacacgggca acattgataa ggacgagatc     420

ttttacccgc accggtcggt caaggacctc caggacgtgc gccaatgggt ctacacgctc     480
```

```
ggcggtgcgt ggtttgtcta cttgaaggtc gggtatgccc cgcgcacgat gagccacttt    540

gacccgtggg acccgctcct ccttcgccgc gcgtcggccg tcatcgtgtc gctcggcgtc    600

tgggccgcct tcttcgccgc gtacgcgtac ctcacatact cgctcggctt tgccgtcatg    660

ggcctctact actatgcgcc gctctttgtc tttgcttcgt tcctcgtcat tacgaccttc    720

ttgcaccaca acgacgaagc gacgccgtgg tacggcgact cggagtggac gtacgtcaag    780

ggcaacctct cgagcgtcga ccgctcgtac ggcgcgttcg tggacaacct gagccaccac    840

attggcacgc accaggtcca ccacttgttc ccgatcattc cgcactacaa gctcaacgaa    900

gccaccaagc actttgcggc cgcgtacccg cacctcgtgc gcaggaacga cgagcccatc    960

atcacggcct tcttcaagac cgcgcacctc tttgtcaact acggcgctgt gcccgagacg   1020

gcgcagatct tcacgctcaa agagtcggcc gcggccgcca aggccaagtc ggactaa      1077
```

<210> SEQ ID NO 42
<211> LENGTH: 358
<212> TYPE: PRT
<213> ORGANISM: Saprolegnia diclina

<400> SEQUENCE: 42

```
Met Thr Glu Asp Lys Thr Lys Val Glu Phe Pro Thr Leu Thr Glu Leu
1               5                   10                  15

Lys His Ser Ile Pro Asn Ala Cys Phe Glu Ser Asn Leu Gly Leu Ser
            20                  25                  30

Leu Tyr Tyr Thr Ala Arg Ala Ile Phe Asn Ala Ser Ala Ser Ala Ala
        35                  40                  45

Leu Leu Tyr Ala Ala Arg Ser Thr Pro Phe Ile Ala Asp Asn Val Leu
    50                  55                  60

Leu His Ala Leu Val Cys Ala Thr Tyr Ile Tyr Val Gln Gly Val Ile
65                  70                  75                  80

Phe Trp Gly Phe Phe Thr Val Gly His Asp Cys Gly His Ser Ala Phe
                85                  90                  95

Ser Arg Tyr His Ser Val Asn Phe Ile Ile Gly Cys Ile Met His Ser
            100                 105                 110

Ala Ile Leu Thr Pro Phe Glu Ser Trp Arg Val Thr His Arg His His
        115                 120                 125

His Lys Asn Thr Gly Asn Ile Asp Lys Asp Glu Ile Phe Tyr Pro His
    130                 135                 140

Arg Ser Val Lys Asp Leu Gln Asp Val Arg Gln Trp Val Tyr Thr Leu
145                 150                 155                 160

Gly Gly Ala Trp Phe Val Tyr Leu Lys Val Gly Tyr Ala Pro Arg Thr
                165                 170                 175

Met Ser His Phe Asp Pro Trp Asp Pro Leu Leu Leu Arg Arg Ala Ser
            180                 185                 190

Ala Val Ile Val Ser Leu Gly Val Trp Ala Ala Phe Phe Ala Ala Tyr
        195                 200                 205

Ala Tyr Leu Thr Tyr Ser Leu Gly Phe Ala Val Met Gly Leu Tyr Tyr
    210                 215                 220

Tyr Ala Pro Leu Phe Val Phe Ala Ser Phe Leu Val Ile Thr Thr Phe
225                 230                 235                 240

Leu His His Asn Asp Glu Ala Thr Pro Trp Tyr Gly Asp Ser Glu Trp
                245                 250                 255

Thr Tyr Val Lys Gly Asn Leu Ser Ser Val Asp Arg Ser Tyr Gly Ala
            260                 265                 270
```

-continued

Phe Val Asp Asn Leu Ser His His Ile Gly Thr His Gln Val His His
275 280 285

Leu Phe Pro Ile Ile Pro His Tyr Lys Leu Asn Glu Ala Thr Lys His
290 295 300

Phe Ala Ala Ala Tyr Pro His Leu Val Arg Arg Asn Asp Glu Pro Ile
305 310 315 320

Ile Thr Ala Phe Phe Lys Thr Ala His Leu Phe Val Asn Tyr Gly Ala
325 330 335

Val Pro Glu Thr Ala Gln Ile Phe Thr Leu Lys Glu Ser Ala Ala Ala
340 345 350

Ala Lys Ala Lys Ser Asp
355

<210> SEQ ID NO 43
<211> LENGTH: 954
<212> TYPE: DNA
<213> ORGANISM: Mortierella alpina

<400> SEQUENCE: 43
atggccgccg caatcttgga caaggtcaac ttcggcattg atcagccctt cggaatcaag 60
ctcgacacct actttgctca ggcctatgaa ctcgtcaccg gaaagtccat cgactccttc 120
gtcttccagg agggcgtcac gcctctctcg acccagagag aggtcgccat gtggactatc 180
acttacttcg tcgtcatctt tggtggtcgc cagatcatga agagccagga cgccttcaag 240
ctcaagcccc tcttcatcct ccacaacttc ctcctgacga tcgcgtccgg atcgctgttg 300
ctcctgttca tcgagaacct ggtccccatc ctcgccagaa acggactttt ctacgccatc 360
tgcgacgacg gtgcctggac ccagcgcctc gagctcctct actacctcaa ctacctggtc 420
aagtactggg agttggccga caccgtcttt ttggtcctca agaagaagcc tcttgagttc 480
ctgcactact tccaccactc gatgaccatg gttctctgct ttgtccagct tggaggatac 540
acttcagtgt cctgggtccc tattaccctc aacttgactg tccacgtctt catgtactac 600
tactacatgc gctccgctgc cggtgttcgc atctggtgga agcagtactt gaccactctc 660
cagatcgtcc agttcgttct tgacctcgga ttcatctact tctgcgccta cacctacttc 720
gccttcacct acttcccctg ggctcccaac gtcggcaagt gcgccggtac cgagggtgct 780
gctctctttg gctgcggact cctctccagc tatctcttgc tctttatcaa cttctaccgc 840
attacctaca atgccaaggc caaggcagcc aaggagcgtg gaagcaactt tacccccaag 900
actgtcaagt ccggcggatc gcccaagaag ccctccaaga gcaagcacat ctaa 954

<210> SEQ ID NO 44
<211> LENGTH: 317
<212> TYPE: PRT
<213> ORGANISM: Mortierella alpina

<400> SEQUENCE: 44

Met Ala Ala Ala Ile Leu Asp Lys Val Asn Phe Gly Ile Asp Gln Pro
1 5 10 15

Phe Gly Ile Lys Leu Asp Thr Tyr Phe Ala Gln Ala Tyr Glu Leu Val
20 25 30

Thr Gly Lys Ser Ile Asp Ser Phe Val Phe Gln Glu Gly Val Thr Pro
35 40 45

Leu Ser Thr Gln Arg Glu Val Ala Met Trp Thr Ile Thr Tyr Phe Val
50 55 60

Val Ile Phe Gly Gly Arg Gln Ile Met Lys Ser Gln Asp Ala Phe Lys
65 70 75 80

```
Leu Lys Pro Leu Phe Ile Leu His Asn Phe Leu Leu Thr Ile Ala Ser
                85                  90                  95

Gly Ser Leu Leu Leu Leu Phe Ile Glu Asn Leu Val Pro Ile Leu Ala
            100                 105                 110

Arg Asn Gly Leu Phe Tyr Ala Ile Cys Asp Asp Gly Ala Trp Thr Gln
        115                 120                 125

Arg Leu Glu Leu Leu Tyr Tyr Leu Asn Tyr Leu Val Lys Tyr Trp Glu
    130                 135                 140

Leu Ala Asp Thr Val Phe Leu Val Leu Lys Lys Lys Pro Leu Glu Phe
145                 150                 155                 160

Leu His Tyr Phe His His Ser Met Thr Met Val Leu Cys Phe Val Gln
                165                 170                 175

Leu Gly Gly Tyr Thr Ser Val Ser Trp Val Pro Ile Thr Leu Asn Leu
            180                 185                 190

Thr Val His Val Phe Met Tyr Tyr Tyr Tyr Met Arg Ser Ala Ala Gly
        195                 200                 205

Val Arg Ile Trp Trp Lys Gln Tyr Leu Thr Thr Leu Gln Ile Val Gln
    210                 215                 220

Phe Val Leu Asp Leu Gly Phe Ile Tyr Phe Cys Ala Tyr Thr Tyr Phe
225                 230                 235                 240

Ala Phe Thr Tyr Phe Pro Trp Ala Pro Asn Val Gly Lys Cys Ala Gly
                245                 250                 255

Thr Glu Gly Ala Ala Leu Phe Gly Cys Gly Leu Leu Ser Ser Tyr Leu
            260                 265                 270

Leu Leu Phe Ile Asn Phe Tyr Arg Ile Thr Tyr Asn Ala Lys Ala Lys
        275                 280                 285

Ala Ala Lys Glu Arg Gly Ser Asn Phe Thr Pro Lys Thr Val Lys Ser
    290                 295                 300

Gly Gly Ser Pro Lys Lys Pro Ser Lys Ser Lys His Ile
305                 310                 315
```

<210> SEQ ID NO 45
<211> LENGTH: 1483
<212> TYPE: DNA
<213> ORGANISM: Mortierella alpina

<400> SEQUENCE: 45

```
gcttcctcca gttcatcctc catttcgcca cctgcattct ttacgaccgt taagcaagat     60

gggaacggac caaggaaaaa ccttcacctg ggaagagctg gcggcccata acaccaagga    120

cgacctactc ttggccatcc gcggcagggt gtacgatgtc acaaagttct tgagccgcca    180

tcctggtgga gtggacactc tcctgctcgg agctggccga gatgttactc cggtctttga    240

gatgtatcac gcgtttgggg ctgcagatgc cattatgaag aagtactatg tcggtacact    300

ggtctcgaat gagctgccca tcttcccgga gccaacggtg ttccacaaaa ccatcaagac    360

gagagtcgag ggctacttta cggatcggaa cattgatccc aagaatagac cagagatctg    420

gggacgatac gctcttatct ttggatcctt gatcgcttcc tactacgcgc agctctttgt    480

gcctttcgtt gtcgaacgca catggcttca ggtggtgttt gcaatcatca tgggatttgc    540

gtgcgcacaa gtcggactca accctcttca tgatgcgtct cacttttcag tgacccacaa    600

ccccactgtc tggaagattc tgggagccac gcacgacttt ttcaacggag catcgtacct    660

ggtgtggatg taccaacata tgctcggcca tcacccctac accaacattg ctggagcaga    720

tcccgacgtg tcgacgtctg agcccgatgt tcgtcgtatc aagcccaacc aaaagtggtt    780
```

```
tgtcaaccac atcaaccagc acatgtttgt tcctttcctg tacggactgc tggcgttcaa    840

ggtgcgcatt caggacatca acattttgta ctttgtcaag accaatgacg ctattcgtgt    900

caatcccatc tcgacatggc acactgtgat gttctggggc ggcaaggctt tctttgtctg    960

gtatcgcctg attgttcccc tgcagtatct gcccctgggc aaggtgctgc tcttgttcac   1020

ggtcgcggac atggtgtcgt cttactggct ggcgctgacc ttccaggcga accacgttgt   1080

tgaggaagtt cagtggccgt tgcctgacga gaacgggatc atccaaaagg actgggcagc   1140

tatgcaggtc gagactacgc aggattacgc acacgattcg cacctctgga ccagcatcac   1200

tggcagcttg aactaccagg ctgtgcacca tctgttcccc aacgtgtcgc agcaccatta   1260

tcccgatatt ctggccatca tcaagaacac ctgcagcgag tacaaggttc cataccttgt   1320

caaggatacg ttttggcaag catttgcttc acatttggag cacttgcgtg ttcttggact   1380

ccgtcccaag gaagagtaga agaaaaaaag cgccgaatga agtattgccc ccttttctc    1440

caagaatggc aaaaggagat caagtggaca ttctctatga aga                     1483
```

<210> SEQ ID NO 46
<211> LENGTH: 446
<212> TYPE: PRT
<213> ORGANISM: Mortierella alpina

<400> SEQUENCE: 46

```
Met Gly Thr Asp Gln Gly Lys Thr Phe Thr Trp Glu Glu Leu Ala Ala
1               5                   10                  15

His Asn Thr Lys Asp Asp Leu Leu Leu Ala Ile Arg Gly Arg Val Tyr
            20                  25                  30

Asp Val Thr Lys Phe Leu Ser Arg His Pro Gly Gly Val Asp Thr Leu
        35                  40                  45

Leu Leu Gly Ala Gly Arg Asp Val Thr Pro Val Phe Glu Met Tyr His
    50                  55                  60

Ala Phe Gly Ala Ala Asp Ala Ile Met Lys Lys Tyr Tyr Val Gly Thr
65                  70                  75                  80

Leu Val Ser Asn Glu Leu Pro Ile Phe Pro Glu Pro Thr Val Phe His
                85                  90                  95

Lys Thr Ile Lys Thr Arg Val Glu Gly Tyr Phe Thr Asp Arg Asn Ile
            100                 105                 110

Asp Pro Lys Asn Arg Pro Glu Ile Trp Gly Arg Tyr Ala Leu Ile Phe
        115                 120                 125

Gly Ser Leu Ile Ala Ser Tyr Tyr Ala Gln Leu Phe Val Pro Phe Val
    130                 135                 140

Val Glu Arg Thr Trp Leu Gln Val Val Phe Ala Ile Ile Met Gly Phe
145                 150                 155                 160

Ala Cys Ala Gln Val Gly Leu Asn Pro Leu His Asp Ala Ser His Phe
                165                 170                 175

Ser Val Thr His Asn Pro Thr Val Trp Lys Ile Leu Gly Ala Thr His
            180                 185                 190

Asp Phe Phe Asn Gly Ala Ser Tyr Leu Val Trp Met Tyr Gln His Met
        195                 200                 205

Leu Gly His His Pro Tyr Thr Asn Ile Ala Gly Ala Asp Pro Asp Val
    210                 215                 220

Ser Thr Ser Glu Pro Asp Val Arg Arg Ile Lys Pro Asn Gln Lys Trp
225                 230                 235                 240

Phe Val Asn His Ile Asn Gln His Met Phe Val Pro Phe Leu Tyr Gly
                245                 250                 255
```

```
Leu Leu Ala Phe Lys Val Arg Ile Gln Asp Ile Asn Ile Leu Tyr Phe
            260                 265                 270

Val Lys Thr Asn Asp Ala Ile Arg Val Asn Pro Ile Ser Thr Trp His
        275                 280                 285

Thr Val Met Phe Trp Gly Gly Lys Ala Phe Phe Val Trp Tyr Arg Leu
    290                 295                 300

Ile Val Pro Leu Gln Tyr Leu Pro Leu Gly Lys Val Leu Leu Leu Phe
305                 310                 315                 320

Thr Val Ala Asp Met Val Ser Ser Tyr Trp Leu Ala Leu Thr Phe Gln
                325                 330                 335

Ala Asn His Val Val Glu Glu Val Gln Trp Pro Leu Pro Asp Glu Asn
            340                 345                 350

Gly Ile Ile Gln Lys Asp Trp Ala Ala Met Gln Val Glu Thr Thr Gln
        355                 360                 365

Asp Tyr Ala His Asp Ser His Leu Trp Thr Ser Ile Thr Gly Ser Leu
    370                 375                 380

Asn Tyr Gln Ala Val His His Leu Phe Pro Asn Val Ser Gln His His
385                 390                 395                 400

Tyr Pro Asp Ile Leu Ala Ile Ile Lys Asn Thr Cys Ser Glu Tyr Lys
                405                 410                 415

Val Pro Tyr Leu Val Lys Asp Thr Phe Trp Gln Ala Phe Ala Ser His
            420                 425                 430

Leu Glu His Leu Arg Val Leu Gly Leu Arg Pro Lys Glu Glu
        435                 440                 445
```

<210> SEQ ID NO 47
<211> LENGTH: 1350
<212> TYPE: DNA
<213> ORGANISM: Arabidopsis thaliana

<400> SEQUENCE: 47

```
ctctctctct ctctcttctc tctttctctc cccctctctc cggcgatggt tgttgctatg      60

gaccaacgca ccaatgtgaa cggagatccc ggcgccggag accggaagaa agaagaaagg     120

tttgatccga gtgcacaacc accgttcaag atcggagata taagggcggc gattcctaag     180

cactgttggg ttaagagtcc tttgagatca atgagttacg tcgtcagaga cattatcgcc     240

gtcgcggctt tggccatcgc tgccgtgtat gttgatagct ggttcctttg gcctctttat     300

tgggccgccc aaggaacact tttctgggcc atctttgttc tcggccacga ctgtggacat     360

gggagtttct cagacattcc tctactgaat agtgtggttg gtcacattct tcattctttc     420

atcctcgttc cttaccatgg ttggagaata agccaccgga cacaccacca gaaccatggc     480

catgttgaaa acgacgagtc atgggttccg ttaccagaaa gggtgtacaa gaaattgccc     540

cacagtactc ggatgctcag atacactgtc cctctcccca tgctcgcata tcctctctat     600

ttgtgctaca gaagtcctgg aaaagaagga tcacatttta acccatacag tagtttattt     660

gctccaagcg agagaaagct tattgcaact tcaactactt gttggtccat aatgttcgtc     720

agtcttatcg ctctatcttt cgtcttcggt ccactcgcgg ttcttaaagt ctacggtgta     780

ccgtacatta tctttgtgat gtggttggat gctgtcacgt atttgcatca tcatggtcac     840

gatgagaagt tgccttggta tagaggcaag gaatggagtt atctacgtgg aggattaaca     900

acaattgata gagattacgg aatctttaac aacattcatc acgacattgg aactcacgtg     960

atccatcatc tcttcccaca aatccctcac tatcacttgg tcgacgccac gaaagcagct    1020

aaacatgtgt tgggaagata ctacagagaa ccaaagacgt caggagcaat accgatccac    1080
```

```
ttggtggaga gtttggtcgc aagtattaag aaagatcatt acgtcagcga cactggtgat   1140

attgtcttct acgagacaga tccagatctc tacgtttacg cttctgacaa atctaaaatc   1200

aattaatctc catttgttta gctctattag gaataaacca gcccactttt aaaattttta   1260

tttcttgttg tttttaagtt aaaagtgtac tcgtgaaact cttttttttt tctttttttt   1320

tattaatgta tttacattac aaggcgtaaa                                    1350


<210> SEQ ID NO 48
<211> LENGTH: 386
<212> TYPE: PRT
<213> ORGANISM: Arabidopsis thaliana

<400> SEQUENCE: 48

Met Val Val Ala Met Asp Gln Arg Thr Asn Val Asn Gly Asp Pro Gly
1               5                   10                  15

Ala Gly Asp Arg Lys Lys Glu Glu Arg Phe Asp Pro Ser Ala Gln Pro
            20                  25                  30

Pro Phe Lys Ile Gly Asp Ile Arg Ala Ala Ile Pro Lys His Cys Trp
        35                  40                  45

Val Lys Ser Pro Leu Arg Ser Met Ser Tyr Val Val Arg Asp Ile Ile
    50                  55                  60

Ala Val Ala Ala Leu Ala Ile Ala Ala Val Tyr Val Asp Ser Trp Phe
65                  70                  75                  80

Leu Trp Pro Leu Tyr Trp Ala Ala Gln Gly Thr Leu Phe Trp Ala Ile
                85                  90                  95

Phe Val Leu Gly His Asp Cys Gly His Gly Ser Phe Ser Asp Ile Pro
            100                 105                 110

Leu Leu Asn Ser Val Val Gly His Ile Leu His Ser Phe Ile Leu Val
        115                 120                 125

Pro Tyr His Gly Trp Arg Ile Ser His Arg Thr His His Gln Asn His
    130                 135                 140

Gly His Val Glu Asn Asp Glu Ser Trp Val Pro Leu Pro Glu Arg Val
145                 150                 155                 160

Tyr Lys Lys Leu Pro His Ser Thr Arg Met Leu Arg Tyr Thr Val Pro
                165                 170                 175

Leu Pro Met Leu Ala Tyr Pro Leu Tyr Leu Cys Tyr Arg Ser Pro Gly
            180                 185                 190

Lys Glu Gly Ser His Phe Asn Pro Tyr Ser Ser Leu Phe Ala Pro Ser
        195                 200                 205

Glu Arg Lys Leu Ile Ala Thr Ser Thr Thr Cys Trp Ser Ile Met Phe
    210                 215                 220

Val Ser Leu Ile Ala Leu Ser Phe Val Phe Gly Pro Leu Ala Val Leu
225                 230                 235                 240

Lys Val Tyr Gly Val Pro Tyr Ile Ile Phe Val Met Trp Leu Asp Ala
                245                 250                 255

Val Thr Tyr Leu His His His Gly His Asp Glu Lys Leu Pro Trp Tyr
            260                 265                 270

Arg Gly Lys Glu Trp Ser Tyr Leu Arg Gly Gly Leu Thr Thr Ile Asp
        275                 280                 285

Arg Asp Tyr Gly Ile Phe Asn Asn Ile His His Asp Ile Gly Thr His
    290                 295                 300

Val Ile His His Leu Phe Pro Gln Ile Pro His Tyr His Leu Val Asp
305                 310                 315                 320

Ala Thr Lys Ala Ala Lys His Val Leu Gly Arg Tyr Tyr Arg Glu Pro
                325                 330                 335
```

```
Lys Thr Ser Gly Ala Ile Pro Ile His Leu Val Glu Ser Leu Val Ala
            340                 345                 350

Ser Ile Lys Lys Asp His Tyr Val Ser Asp Thr Gly Asp Ile Val Phe
        355                 360                 365

Tyr Glu Thr Asp Pro Asp Leu Tyr Val Tyr Ala Ser Asp Lys Ser Lys
    370                 375                 380

Ile Asn
385
```

<210> SEQ ID NO 49
<211> LENGTH: 834
<212> TYPE: DNA
<213> ORGANISM: Pavlova sp.

<400> SEQUENCE: 49

```
atgatgttgg ccgcaggcta tcttctagtg ctctcggccg ctcgccagag cttccagcag      60

gacattgaca accccaacgg ggcctactcg acctcgtgga ctggcctgcc cattgtgatg     120

tctgtggtct atctcagcgg tgtgtttggg ctcacaaagt acttcgagaa ccggaagccc     180

atgacggggc tgaaggacta catgttcact tacaatctct accaggtgat catcaacgtg     240

tggtgcgtgg tggcctttct cctggaggtg cggcgtgcgg gcatgtcact catcggcaat     300

aaggtggacc ttgggcccaa ctccttcagg ctcggcttcg tcacgtgggt gcactacaac     360

aacaagtacg tggagctcct cgacacccta tggatggtgc tgcgcaagaa gacgcagcag     420

gtctccttcc tccacgtcta tcatcacgtg cttctgatgt gggcctggtt cgttgtcgtc     480

aagctcggca atggtggtga cgcatatttt ggcggtctca tgaactcgat catccacgtg     540

atgatgtatt cctactacac catggcgctc ctgggctggt catgcccctg gaagcgctac     600

ctcacgcagg cacagctcgt gcagttttgc atctgcctcg cccactccac atgggcggca     660

gtaacgggtg cctacccgtg gcgaatttgc ttggtggagg tgtgggtgat ggtgtccatg     720

ctggtgctct tcacacgctt ctaccgccag gcctatgcca aggaggcgaa ggccaaggag     780

gcgaaaaagc tcgcacagga ggcatcacag gccaaggcgg tcaaggcgga gtaa           834
```

<210> SEQ ID NO 50
<211> LENGTH: 277
<212> TYPE: PRT
<213> ORGANISM: Pavlova sp.

<400> SEQUENCE: 50

```
Met Met Leu Ala Ala Gly Tyr Leu Leu Val Leu Ser Ala Ala Arg Gln
1               5                   10                  15

Ser Phe Gln Gln Asp Ile Asp Asn Pro Asn Gly Ala Tyr Ser Thr Ser
            20                  25                  30

Trp Thr Gly Leu Pro Ile Val Met Ser Val Val Tyr Leu Ser Gly Val
        35                  40                  45

Phe Gly Leu Thr Lys Tyr Phe Glu Asn Arg Lys Pro Met Thr Gly Leu
    50                  55                  60

Lys Asp Tyr Met Phe Thr Tyr Asn Leu Tyr Gln Val Ile Ile Asn Val
65                  70                  75                  80

Trp Cys Val Val Ala Phe Leu Leu Glu Val Arg Arg Ala Gly Met Ser
                85                  90                  95

Leu Ile Gly Asn Lys Val Asp Leu Gly Pro Asn Ser Phe Arg Leu Gly
            100                 105                 110

Phe Val Thr Trp Val His Tyr Asn Asn Lys Tyr Val Glu Leu Leu Asp
        115                 120                 125
```

```
Thr Leu Trp Met Val Leu Arg Lys Lys Thr Gln Gln Val Ser Phe Leu
    130                 135                 140

His Val Tyr His His Val Leu Leu Met Trp Ala Trp Phe Val Val Val
145                 150                 155                 160

Lys Leu Gly Asn Gly Gly Asp Ala Tyr Phe Gly Gly Leu Met Asn Ser
                165                 170                 175

Ile Ile His Val Met Met Tyr Ser Tyr Tyr Thr Met Ala Leu Leu Gly
            180                 185                 190

Trp Ser Cys Pro Trp Lys Arg Tyr Leu Thr Gln Ala Gln Leu Val Gln
        195                 200                 205

Phe Cys Ile Cys Leu Ala His Ser Thr Trp Ala Ala Val Thr Gly Ala
    210                 215                 220

Tyr Pro Trp Arg Ile Cys Leu Val Glu Val Trp Val Met Val Ser Met
225                 230                 235                 240

Leu Val Leu Phe Thr Arg Phe Tyr Arg Gln Ala Tyr Ala Lys Glu Ala
                245                 250                 255

Lys Ala Lys Glu Ala Lys Lys Leu Ala Gln Glu Ala Ser Gln Ala Lys
            260                 265                 270

Ala Val Lys Ala Glu
        275
```

```
<210> SEQ ID NO 51
<211> LENGTH: 1542
<212> TYPE: DNA
<213> ORGANISM: Schizochytrium aggregatum

<400> SEQUENCE: 51

gaattcatga cggtgggcgg cgatgaggtg tacagcatgg cgcaggtgcg cgaccacaac      60

accccggacg acgcctggtg cgccatccac ggcgaggtgt acgagctgac caagttcgcc     120

cgcacccacc ccggggggga catcatcttg ctggccgccg gcaaggaggc caccatcctg     180

ttcgagacgt accacgtgcg ccccatctcc gacgcggtcc tgcgcaagta ccgcatcggc     240

aagctcgccg ccgccggcaa ggatgagccg gccaacgaca gcacctacta cagctgggac     300

agcgactttt acaaggtgct ccgccagcgt gtcgtggcgc gcctcgagga gcgcaagatc     360

gcccgccgcg gcggccccga gatctggatc aaggccgcca tcctcgtcag cggcttctgg     420

tccatgctct acctcatgtg caccctggac ccgaaccgcg gcgccatcct ggccgccatc     480

gcgctgggca tcgtcgccgc cttcgtcggc acgtgcattc agcacgacgg caaccacggc     540

gcgttcgcct tctctccgtt catgaacaag ctctctggct ggacgctcga catgatcggc     600

gccagtgcca tgacctggga gatgcagcac gtgctgggcc accacccgta caccaacctg     660

atcgagatgg agaacggcac ccaaaaggtc acccacgccg acgtcgaccc caagaaggcc     720

gaccaggaga gcgacccgga cgtcttcagc acctacccca tgctccgtct gcacccgtgg     780

caccgcaagc gcttctacca ccgcttccag cacctgtacg cgccgctgct cttcggtttc     840

atgaccatca acaaggtgat cacccaggat gtgggagttg tcctcagcaa gcgtctgttt     900

cagatcgatg ccaactgccg ttacgccagc aagtcgtacg ttgcgcgctt ctggatcatg     960

aagctgctca ccgtcctcta catggtcgcc ctccccgtgt acacccaggg ccttgtcgac    1020

gggctcaagc tcttcttcat cgcccacttt tcgtgcggcg agctgctggc caccatgttc    1080

atcgtcaacc acatcatcga gggcgtctcg tacgcctcca aggactctgt caagggcacc    1140

atggcgccgc cgcgcacggt gcacggcgtg accccgatgc atgacacccg cgacgcgctc    1200

ggcaaggaga aggcagccac caagcacgtg ccgctcaacg actgggccgc ggtccagtgc    1260
```

```
cagacctcgg tcaactggtc gatcggctcg tggttctgga accacttctc cggcgggctc   1320

aaccaccaga tcgagcacca cctcttcccc ggcctcaccc acaccaccta cgtgtacatt   1380

caggatgtgg tgcaggcgac gtgcgccgag tacggggtcc cgtaccagtc ggagcagagc   1440

ctcttctccg cctacttcaa gatgctctcc caccttcggg cgctcggcaa cgagccgatg   1500

ccctcgtggg agaaggacca ccccaagtcc aagtgaaagc tt                      1542


<210> SEQ ID NO 52
<211> LENGTH: 511
<212> TYPE: PRT
<213> ORGANISM: Schizochytrium aggregatum

<400> SEQUENCE: 52

Glu Phe Met Thr Val Gly Gly Asp Glu Val Tyr Ser Met Ala Gln Val
1               5                   10                  15

Arg Asp His Asn Thr Pro Asp Asp Ala Trp Cys Ala Ile His Gly Glu
            20                  25                  30

Val Tyr Glu Leu Thr Lys Phe Ala Arg Thr His Pro Gly Gly Asp Ile
        35                  40                  45

Ile Leu Leu Ala Ala Gly Lys Glu Ala Thr Ile Leu Phe Glu Thr Tyr
    50                  55                  60

His Val Arg Pro Ile Ser Asp Ala Val Leu Arg Lys Tyr Arg Ile Gly
65                  70                  75                  80

Lys Leu Ala Ala Ala Gly Lys Asp Glu Pro Ala Asn Asp Ser Thr Tyr
                85                  90                  95

Tyr Ser Trp Asp Ser Asp Phe Tyr Lys Val Leu Arg Gln Arg Val Val
            100                 105                 110

Ala Arg Leu Glu Glu Arg Lys Ile Ala Arg Arg Gly Gly Pro Glu Ile
        115                 120                 125

Trp Ile Lys Ala Ala Ile Leu Val Ser Gly Phe Trp Ser Met Leu Tyr
    130                 135                 140

Leu Met Cys Thr Leu Asp Pro Asn Arg Gly Ala Ile Leu Ala Ala Ile
145                 150                 155                 160

Ala Leu Gly Ile Val Ala Ala Phe Val Gly Thr Cys Ile Gln His Asp
                165                 170                 175

Gly Asn His Gly Ala Phe Ala Phe Ser Pro Phe Met Asn Lys Leu Ser
            180                 185                 190

Gly Trp Thr Leu Asp Met Ile Gly Ala Ser Ala Met Thr Trp Glu Met
        195                 200                 205

Gln His Val Leu Gly His His Pro Tyr Thr Asn Leu Ile Glu Met Glu
    210                 215                 220

Asn Gly Thr Gln Lys Val Thr His Ala Asp Val Asp Pro Lys Lys Ala
225                 230                 235                 240

Asp Gln Glu Ser Asp Pro Asp Val Phe Ser Thr Tyr Pro Met Leu Arg
                245                 250                 255

Leu His Pro Trp His Arg Lys Arg Phe Tyr His Arg Phe Gln His Leu
            260                 265                 270

Tyr Ala Pro Leu Leu Phe Gly Phe Met Thr Ile Asn Lys Val Ile Thr
        275                 280                 285

Gln Asp Val Gly Val Val Leu Ser Lys Arg Leu Phe Gln Ile Asp Ala
    290                 295                 300

Asn Cys Arg Tyr Ala Ser Lys Ser Tyr Val Ala Arg Phe Trp Ile Met
305                 310                 315                 320

Lys Leu Leu Thr Val Leu Tyr Met Val Ala Leu Pro Val Tyr Thr Gln
```

```
                325                 330                 335

Gly Leu Val Asp Gly Leu Lys Leu Phe Phe Ile Ala His Phe Ser Cys
            340                 345                 350

Gly Glu Leu Leu Ala Thr Met Phe Ile Val Asn His Ile Ile Glu Gly
        355                 360                 365

Val Ser Tyr Ala Ser Lys Asp Ser Val Lys Gly Thr Met Ala Pro Pro
    370                 375                 380

Arg Thr Val His Gly Val Thr Pro Met His Asp Thr Arg Asp Ala Leu
385                 390                 395                 400

Gly Lys Glu Lys Ala Ala Thr Lys His Val Pro Leu Asn Asp Trp Ala
                405                 410                 415

Ala Val Gln Cys Gln Thr Ser Val Asn Trp Ser Ile Gly Ser Trp Phe
            420                 425                 430

Trp Asn His Phe Ser Gly Gly Leu Asn His Gln Ile Glu His His Leu
        435                 440                 445

Phe Pro Gly Leu Thr His Thr Thr Tyr Val Tyr Ile Gln Asp Val Val
    450                 455                 460

Gln Ala Thr Cys Ala Glu Tyr Gly Val Pro Tyr Gln Ser Glu Gln Ser
465                 470                 475                 480

Leu Phe Ser Ala Tyr Phe Lys Met Leu Ser His Leu Arg Ala Leu Gly
                485                 490                 495

Asn Glu Pro Met Pro Ser Trp Glu Lys Asp His Pro Lys Ser Lys
            500                 505                 510
```

<210> SEQ ID NO 53
<211> LENGTH: 27
<212> TYPE: DNA
<213> ORGANISM: Artificial Sequence
<220> FEATURE:
<223> OTHER INFORMATION: synthetic oligonucleotide

<400> SEQUENCE: 53
gcggccgcat gactgaggat aagacga 27

<210> SEQ ID NO 54
<211> LENGTH: 27
<212> TYPE: DNA
<213> ORGANISM: Artificial Sequence
<220> FEATURE:
<223> OTHER INFORMATION: synthetic oligonucleotide

<400> SEQUENCE: 54
gcggccgctt agtccgactt ggccttg 27

<210> SEQ ID NO 55
<211> LENGTH: 24
<212> TYPE: DNA
<213> ORGANISM: Artificial Sequence
<220> FEATURE:
<223> OTHER INFORMATION: synthetic oligonucleotide

<400> SEQUENCE: 55
gcggccgcat ggagtcgatt gcgc 24

<210> SEQ ID NO 56
<211> LENGTH: 24
<212> TYPE: DNA
<213> ORGANISM: Artificial Sequence
<220> FEATURE:
<223> OTHER INFORMATION: synthetic oligonucleotide

<400> SEQUENCE: 56
gcggccgctt actgcaactt cctt 24

<210> SEQ ID NO 57
<211> LENGTH: 24
<212> TYPE: DNA
<213> ORGANISM: Artificial Sequence
<220> FEATURE:
<223> OTHER INFORMATION: synthetic oligonucleotide

<400> SEQUENCE: 57
gcggccgcat gggaacggac caag 24

<210> SEQ ID NO 58
<211> LENGTH: 24
<212> TYPE: DNA
<213> ORGANISM: Artificial Sequence
<220> FEATURE:
<223> OTHER INFORMATION: synthetic oligonucleotide

<400> SEQUENCE: 58
gcggccgcct actcttcctt ggga 24

<210> SEQ ID NO 59
<211> LENGTH: 29
<212> TYPE: DNA
<213> ORGANISM: Artificial Sequence
<220> FEATURE:
<223> OTHER INFORMATION: synthetic oligonucleotide

<400> SEQUENCE: 59
ttcctgcagg ctagcctaag tacgtactc 29

<210> SEQ ID NO 60
<211> LENGTH: 21
<212> TYPE: DNA
<213> ORGANISM: Artificial Sequence
<220> FEATURE:
<223> OTHER INFORMATION: synthetic oligonucleotide

<400> SEQUENCE: 60
aagcggccgc ggtgatgact g 21

<210> SEQ ID NO 61
<211> LENGTH: 12
<212> TYPE: PRT
<213> ORGANISM: Artificial Sequence
<220> FEATURE:
<223> OTHER INFORMATION: consensus peptide

<400> SEQUENCE: 61

Thr Arg Ala Ala Ile Pro Lys His Cys Trp Val Lys
1 5 10

<210> SEQ ID NO 62
<211> LENGTH: 36
<212> TYPE: DNA
<213> ORGANISM: Artificial Sequence
<220> FEATURE:
<223> OTHER INFORMATION: synthetic oligonucleotide

<400> SEQUENCE: 62
atccgcgccg ccatccccaa gcactgctgg gtcaag 36

<210> SEQ ID NO 63
<211> LENGTH: 15
<212> TYPE: PRT

<213> ORGANISM: Artificial Sequence
<220> FEATURE:
<223> OTHER INFORMATION: consensus peptide

<400> SEQUENCE: 63

Ala Leu Phe Val Leu Gly His Asp Cys Gly His Gly Ser Phe Ser
1 5 10 15

<210> SEQ ID NO 64
<211> LENGTH: 45
<212> TYPE: DNA
<213> ORGANISM: Artificial Sequence
<220> FEATURE:
<223> OTHER INFORMATION: synthetic oligonucleotide
<220> FEATURE:
<221> NAME/KEY: unsure
<222> LOCATION: (21)..(21)
<223> OTHER INFORMATION: y = c or t
<220> FEATURE:
<221> NAME/KEY: unsure
<222> LOCATION: (33)..(33)
<223> OTHER INFORMATION: y = c or t

<400> SEQUENCE: 64
gccctcttcg tcctcggcca ygactgcggc cayggctcgt tctcg 45

<210> SEQ ID NO 65
<211> LENGTH: 45
<212> TYPE: DNA
<213> ORGANISM: Artificial Sequence
<220> FEATURE:
<223> OTHER INFORMATION: synthetic oligonucleotide
<220> FEATURE:
<221> NAME/KEY: unsure
<222> LOCATION: (4)..(4)
<223> OTHER INFORMATION: r = a or g
<220> FEATURE:
<221> NAME/KEY: unsure
<222> LOCATION: (10)..(10)
<223> OTHER INFORMATION: r = a or g
<220> FEATURE:
<221> NAME/KEY: unsure
<222> LOCATION: (30)..(30)
<223> OTHER INFORMATION: r = a or g
<220> FEATURE:
<221> NAME/KEY: unsure
<222> LOCATION: (31)..(31)
<223> OTHER INFORMATION: r = a or g
<220> FEATURE:
<221> NAME/KEY: unsure
<222> LOCATION: (34)..(34)
<223> OTHER INFORMATION: r = a or g
<220> FEATURE:
<221> NAME/KEY: unsure
<222> LOCATION: (38)..(38)
<223> OTHER INFORMATION: r = a or g
<220> FEATURE:
<221> NAME/KEY: unsure
<222> LOCATION: (39)..(39)
<223> OTHER INFORMATION: y = c or t
<220> FEATURE:
<221> NAME/KEY: unsure
<222> LOCATION: (43)..(43)
<223> OTHER INFORMATION: r = a or g

<400> SEQUENCE: 65
gagrtggtar tgggggatct gggggaagar rtgrtggryg acrtg 45

<210> SEQ ID NO 66
<211> LENGTH: 15
<212> TYPE: PRT
<213> ORGANISM: Artificial Sequence
<220> FEATURE:
<223> OTHER INFORMATION: consensus peptide

<400> SEQUENCE: 66

```
Pro Tyr His Gly Trp Arg Ile Ser His Arg Thr His His Gln Asn
1               5                   10                  15
```

<210> SEQ ID NO 67
<211> LENGTH: 45
<212> TYPE: DNA
<213> ORGANISM: Artificial Sequence
<220> FEATURE:
<223> OTHER INFORMATION: synthetic oligonucleotide
<220> FEATURE:
<221> NAME/KEY: unsure
<222> LOCATION: (9)..(9)
<223> OTHER INFORMATION: y = c or t
<220> FEATURE:
<221> NAME/KEY: unsure
<222> LOCATION: (27)..(27)
<223> OTHER INFORMATION: y = c or t
<220> FEATURE:
<221> NAME/KEY: unsure
<222> LOCATION: (36)..(36)
<223> OTHER INFORMATION: y = c or t
<220> FEATURE:
<221> NAME/KEY: unsure
<222> LOCATION: (39)..(39)
<223> OTHER INFORMATION: y = c or t

<400> SEQUENCE: 67

```
ccctaccayg gctggcgcat ctcgcaycgc acccaycayc agaac                     45
```

<210> SEQ ID NO 68
<211> LENGTH: 45
<212> TYPE: DNA
<213> ORGANISM: Artificial Sequence
<220> FEATURE:
<223> OTHER INFORMATION: synthetic oligonucleotide
<220> FEATURE:
<221> NAME/KEY: unsure
<222> LOCATION: (7)..(7)
<223> OTHER INFORMATION: r = a or g
<220> FEATURE:
<221> NAME/KEY: unsure
<222> LOCATION: (10)..(10)
<223> OTHER INFORMATION: r = a or g
<220> FEATURE:
<221> NAME/KEY: unsure
<222> LOCATION: (19)..(19)
<223> OTHER INFORMATION: r = a or g
<220> FEATURE:
<221> NAME/KEY: unsure
<222> LOCATION: (37)..(37)
<223> OTHER INFORMATION: r = a or g

<400> SEQUENCE: 68

```
gttctgrtgr tgggtccgrt gcgagatgcg ccagccrtgg taggg                     45
```

<210> SEQ ID NO 69
<211> LENGTH: 12
<212> TYPE: PRT
<213> ORGANISM: Artificial Sequence
<220> FEATURE:
<223> OTHER INFORMATION: consensus peptide
<220> FEATURE:
<221> NAME/KEY: UNSURE
<222> LOCATION: (5)..(5)
<223> OTHER INFORMATION: Xaa = Asp or His
<220> FEATURE:
<221> NAME/KEY: UNSURE
<222> LOCATION: (7)..(7)
<223> OTHER INFORMATION: Xaa = Asp or Tyr

<400> SEQUENCE: 69

```
Gly Ser His Phe Xaa Pro Xaa Ser Asp Leu Phe Val
1               5                   10


<210> SEQ ID NO 70
<211> LENGTH: 36
<212> TYPE: DNA
<213> ORGANISM: Artificial Sequence
<220> FEATURE:
<223> OTHER INFORMATION: synthetic oligonucleotide
<220> FEATURE:
<221> NAME/KEY: unsure
<222> LOCATION: (13)..(13)
<223> OTHER INFORMATION: s = c or g
<220> FEATURE:
<221> NAME/KEY: unsure
<222> LOCATION: (19)..(19)
<223> OTHER INFORMATION: k = g or t

<400> SEQUENCE: 70

ggctcgcact tcsaccccka ctcggacctc ttcgtc                               36


<210> SEQ ID NO 71
<211> LENGTH: 36
<212> TYPE: DNA
<213> ORGANISM: Artificial Sequence
<220> FEATURE:
<223> OTHER INFORMATION: synthetic oligonucleotide
<220> FEATURE:
<221> NAME/KEY: unsure
<222> LOCATION: (18)..(18)
<223> OTHER INFORMATION: m = a or c
<220> FEATURE:
<221> NAME/KEY: unsure
<222> LOCATION: (24)..(24)
<223> OTHER INFORMATION: w = a or t

<400> SEQUENCE: 71

gacgaagagg tccgagtmgg ggtwgaagtg cgagcc                               36


<210> SEQ ID NO 72
<211> LENGTH: 13
<212> TYPE: PRT
<213> ORGANISM: Artificial Sequence
<220> FEATURE:
<223> OTHER INFORMATION: consensus peptide
<220> FEATURE:
<221> NAME/KEY: UNSURE
<222> LOCATION: (3)..(3)
<223> OTHER INFORMATION: Xaa = Tyr or Phe
<220> FEATURE:
<221> NAME/KEY: UNSURE
<222> LOCATION: (4)..(4)
<223> OTHER INFORMATION: Xaa = Leu or Val
<220> FEATURE:
<221> NAME/KEY: UNSURE
<222> LOCATION: (11)..(11)
<223> OTHER INFORMATION: Xaa = Leu or Ile

<400> SEQUENCE: 72

Trp Ser Xaa Xaa Arg Gly Gly Leu Thr Thr Xaa Asp Arg
1               5                   10


<210> SEQ ID NO 73
<211> LENGTH: 39
<212> TYPE: DNA
<213> ORGANISM: Artificial Sequence
<220> FEATURE:
<223> OTHER INFORMATION: synthetic oligonucleotide
<220> FEATURE:
<221> NAME/KEY: unsure
<222> LOCATION: (9)..(9)
<223> OTHER INFORMATION: k = g or t
<220> FEATURE:
```

<221> NAME/KEY: unsure
<222> LOCATION: (30)..(30)
<223> OTHER INFORMATION: w = a or t
<220> FEATURE:
<221> NAME/KEY: unsure
<222> LOCATION: (32)..(32)
<223> OTHER INFORMATION: s = c or g

<400> SEQUENCE: 73
gcgctggakg gtggtgaggc cgccgcggaw gsacgacca 39

<210> SEQ ID NO 74
<211> LENGTH: 15
<212> TYPE: PRT
<213> ORGANISM: Artificial Sequence
<220> FEATURE:
<223> OTHER INFORMATION: consensus peptide

<400> SEQUENCE: 74

His His Asp Ile Gly Thr His Val Ile His His Leu Phe Pro Gln
1 5 10 15

<210> SEQ ID NO 75
<211> LENGTH: 45
<212> TYPE: DNA
<213> ORGANISM: Artificial Sequence
<220> FEATURE:
<223> OTHER INFORMATION: synthetic oligonucleotide
<220> FEATURE:
<221> NAME/KEY: unsure
<222> LOCATION: (13)..(13)
<223> OTHER INFORMATION: r = a or g
<220> FEATURE:
<221> NAME/KEY: unsure
<222> LOCATION: (16)..(16)
<223> OTHER INFORMATION: r = a or g
<220> FEATURE:
<221> NAME/KEY: unsure
<222> LOCATION: (25)..(25)
<223> OTHER INFORMATION: r = a or g
<220> FEATURE:
<221> NAME/KEY: unsure
<222> LOCATION: (40)..(40)
<223> OTHER INFORMATION: r = a or g
<220> FEATURE:
<221> NAME/KEY: unsure
<222> LOCATION: (43)..(43)
<223> OTHER INFORMATION: r = a or g

<400> SEQUENCE: 75
ctgggggaag agrtgrtgga tgacrtgggt gccgatgtcr tgrtg 45

<210> SEQ ID NO 76
<211> LENGTH: 15
<212> TYPE: PRT
<213> ORGANISM: Artificial Sequence
<220> FEATURE:
<223> OTHER INFORMATION: consensus peptide
<220> FEATURE:
<221> NAME/KEY: UNSURE
<222> LOCATION: (2)..(2)
<223> OTHER INFORMATION: Xaa = Leu or Phe
<220> FEATURE:
<221> NAME/KEY: UNSURE
<222> LOCATION: (5)..(5)
<223> OTHER INFORMATION: Xaa = Gln or Lys
<220> FEATURE:
<221> NAME/KEY: UNSURE
<222> LOCATION: (12)..(12)
<223> OTHER INFORMATION: Xaa = Val or Ile

<400> SEQUENCE: 76

His Xaa Phe Pro Xaa Ile Pro His Tyr His Leu Xaa Glu Ala Thr 1 5 10 15

<210> SEQ ID NO 77
<211> LENGTH: 45
<212> TYPE: DNA
<213> ORGANISM: Artificial Sequence
<220> FEATURE:
<223> OTHER INFORMATION: synthetic oligonucleotide
<220> FEATURE:
<221> NAME/KEY: unsure
<222> LOCATION: (12)..(12)
<223> OTHER INFORMATION: y = c or t
<220> FEATURE:
<221> NAME/KEY: unsure
<222> LOCATION: (16)..(16)
<223> OTHER INFORMATION: r = a or g
<220> FEATURE:
<221> NAME/KEY: unsure
<222> LOCATION: (22)..(22)
<223> OTHER INFORMATION: r = a or g
<220> FEATURE:
<221> NAME/KEY: unsure
<222> LOCATION: (33)..(33)
<223> OTHER INFORMATION: k = g or t
<220> FEATURE:
<221> NAME/KEY: unsure
<222> LOCATION: (42)..(42)
<223> OTHER INFORMATION: r = a or g
<220> FEATURE:
<221> NAME/KEY: unsure
<222> LOCATION: (43)..(43)
<223> OTHER INFORMATION: r = a or g

<400> SEQUENCE: 77
ggtggcctcg aygagrtggt artgggggat ctkggggaag arrtg 45

<210> SEQ ID NO 78
<211> LENGTH: 15
<212> TYPE: PRT
<213> ORGANISM: Artificial Sequence
<220> FEATURE:
<223> OTHER INFORMATION: consensus peptide
<220> FEATURE:
<221> NAME/KEY: UNSURE
<222> LOCATION: (3)..(3)
<223> OTHER INFORMATION: Xaa = Ala or Ile
<220> FEATURE:
<221> NAME/KEY: UNSURE
<222> LOCATION: (6)..(6)
<223> OTHER INFORMATION: Xaa = Leu or Phe

<400> SEQUENCE: 78

His Val Xaa His His Xaa Phe Pro Gln Ile Pro His Tyr His Leu
1 5 10 15

<210> SEQ ID NO 79
<211> LENGTH: 25
<212> TYPE: DNA
<213> ORGANISM: Artificial Sequence
<220> FEATURE:
<223> OTHER INFORMATION: synthetic oligonucleotide

<400> SEQUENCE: 79
tacgcgtacc tcacgtactc gctcg 25

<210> SEQ ID NO 80
<211> LENGTH: 27
<212> TYPE: DNA
<213> ORGANISM: Artificial Sequence
<220> FEATURE:
<223> OTHER INFORMATION: synthetic oligonucleotide

<400> SEQUENCE: 80
ttcttgcacc acaacgacga agcgacg 27

<210> SEQ ID NO 81
<211> LENGTH: 25
<212> TYPE: DNA
<213> ORGANISM: Artificial Sequence
<220> FEATURE:
<223> OTHER INFORMATION: synthetic oligonucleotide

<400> SEQUENCE: 81
ggagtggacg tacgtcaagg gcaac 25

<210> SEQ ID NO 82
<211> LENGTH: 26
<212> TYPE: DNA
<213> ORGANISM: Artificial Sequence
<220> FEATURE:
<223> OTHER INFORMATION: synthetic oligonucleotide

<400> SEQUENCE: 82
tcaagggcaa cctctcgagc gtcgac 26

<210> SEQ ID NO 83
<211> LENGTH: 31
<212> TYPE: DNA
<213> ORGANISM: Artificial Sequence
<220> FEATURE:
<223> OTHER INFORMATION: synthetic oligonucleotide

<400> SEQUENCE: 83
cccagtcacg acgttgtaaa acgacggcca g 31

<210> SEQ ID NO 84
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 84
agcggataac aatttcacac aggaaacagc 30

<210> SEQ ID NO 85
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 85
ggtaaaagat ctcgtccttg tcgatgttgc 30

<210> SEQ ID NO 86
<211> LENGTH: 20
<212> TYPE: DNA
<213> ORGANISM: Artificial Sequence
<220> FEATURE:
<223> OTHER INFORMATION: synthetic oligonucleotide

<400> SEQUENCE: 86
gtcaaagtgg ctcatcgtgc 20

<210> SEQ ID NO 87
<211> LENGTH: 26
<212> TYPE: DNA
<213> ORGANISM: Artificial Sequence
<220> FEATURE:
<223> OTHER INFORMATION: synthetic oligonucleotide

<400> SEQUENCE: 87
cgagcgagta cgtgaggtac gcgtac 26

<210> SEQ ID NO 88
<211> LENGTH: 45
<212> TYPE: DNA
<213> ORGANISM: Artificial Sequence
<220> FEATURE:
<223> OTHER INFORMATION: synthetic oligonucleotide

<400> SEQUENCE: 88
tcaacagaat tcatgaccga ggataagacg aaggtcgagt tcccg 45

<210> SEQ ID NO 89
<211> LENGTH: 45
<212> TYPE: DNA
<213> ORGANISM: Artificial Sequence
<220> FEATURE:
<223> OTHER INFORMATION: synthetic oligonucleotide

<400> SEQUENCE: 89
aaaagaaagc ttcgcttcct agtcttagtc cgacttggcc ttggc 45

<210> SEQ ID NO 90
<211> LENGTH: 3979
<212> TYPE: DNA
<213> ORGANISM: Glycine max

<400> SEQUENCE: 90
ggccgcagat ttaggtgaca ctatagaata tgcatcacta gtaagctttg ctctagatca 60
aactcacatc caaacataac atggatatct tccttaccaa tcatactaat tattttgggt 120
taaatattaa tcattatttt taagatatta attaagaaat taaaagattt tttaaaaaaa 180
tgtataaaat tatattattc atgatttttc atacatttga ttttgataat aaatatattt 240
tttttaattt cttaaaaaat gttgcaagac acttattaga catagtcttg ttctgtttac 300
aaaagcattc atcatttaat acattaaaaa atatttaata ctaacagtag aatcttcttg 360
tgagtggtgt gggagtaggc aacctggcat tgaaacgaga gaaagagagt cagaaccaga 420
agacaaataa aaagtatgca acaaacaaat caaaatcaaa gggcaaaggc tggggttggc 480
tcaattggtt gctacattca attttcaact cagtcaacgg ttgagattca ctctgacttc 540
cccaatctaa gccgcggatg caaacggttg aatctaaccc acaatccaat ctcgttactt 600
aggggctttt ccgtcattaa ctcacccctg ccacccggtt tccctataaa ttggaactca 660
atgctcccct ctaaactcgt atcgcttcag agttgagacc aagacacact cgttcatata 720
tctctctgct cttctcttct cttctacctc tcaaggtact tttcttctcc ctctaccaaa 780
tcctagattc cgtggttcaa tttcggatct tgcacttctg gtttgctttg ccttgctttt 840
tcctcaactg ggtccatcta ggatccatgt gaaactctac tctttcttta atatctgcgg 900
aatacgcgtt ggactttcag atctagtcga aatcatttca taattgcctt tctttctttt 960
agcttatgag aaataaaatc actttttttt tatttcaaaa taaaccttgg gccttgtgct 1020
gactgagatg gggtttggtg attacagaat tttagcgaat tttgtaattg tacttgtttg 1080
tctgtagttt tgttttgttt tcttgtttct catacattcc ttaggcttca attttattcg 1140
agtataggtc acaataggaa ttcaaacttt gagcagggga attaatccct tccttcaaat 1200
ccagtttgtt tgtatatatg tttaaaaaat gaaacttttg ctttaaattc tattataact 1260

```
tttttatgg ctgaaatttt tgcatgtgtc tttgctctct gttgtaaatt tactgtttag   1320
gtactaactc taggcttgtt gtgcagtttt tgaagtataa ccatgccaca caacacaatg   1380
gcggccaccg cttccagaac cacccgattc tcttcttcct cttcacaccc caccttcccc   1440
aaacgcatta ctagatccac cctccctctc tctcatcaaa ccctcaccaa acccaaccac   1500
gctctcaaaa tcaaatgttc catctccaaa ccccccacgg cggcgccctt caccaaggaa   1560
gcgccgacca cggagccctt cgtgtcacgg ttcgcctccg gcgaacctcg caagggcgcg   1620
gacatccttg tggaggcgct ggagaggcag ggcgtgacga cggtgttcgc gtaccccggc   1680
ggtgcgtcga tggagatcca ccaggcgctc acgcgctccg ccgccatccg caacgtgctc   1740
ccgcgccacg agcagggcgg cgtcttcgcc gccgaaggct acgcgcgttc ctccggcctc   1800
cccggcgtct gcattgccac ctccggcccc ggcgccacca acctcgtgag cggcctcgcc   1860
gacgctttaa tggacagcgt cccagtcgtc gccatcaccg gccaggtcgc ccgccggatg   1920
atcggcaccg acgccttcca agaaaccccg atcgtggagg tgagcagatc catcacgaag   1980
cacaactacc tcatcctcga cgtcgacgac atcccccgcg tcgtcgccga ggctttcttc   2040
gtcgccacct ccggccgccc cggtccggtc ctcatcgaca ttcccaaaga cgttcagcag   2100
caactcgccg tgcctaattg ggacgagccc gttaacctcc ccggttacct cgccaggctg   2160
cccaggcccc ccgccgaggc ccaattggaa cacattgtca gactcatcat ggaggcccaa   2220
aagcccgttc tctacgtcgg cggtggcagt ttgaattcca gtgctgaatt gaggcgcttt   2280
gttgaactca ctggtattcc cgttgctagc actttaatgg gtcttggaac ttttcctatt   2340
ggtgatgaat attcccttca gatgctgggt atgcatggta ctgtttatgc taactatgct   2400
gttgacaata gtgatttgtt gcttgccttt ggggtaaggt ttgatgaccg tgttactggg   2460
aagcttgagg cttttgctag tagggctaag attgttcaca ttgatattga ttctgccgag   2520
attgggaaga acaagcaggc gcacgtgtcg gtttgcgcgg atttgaagtt ggccttgaag   2580
ggaattaata tgattttgga ggagaaagga gtggagggta agtttgatct tggaggttgg   2640
agagaagaga ttaatgtgca gaaacacaag tttccattgg gttacaagac attccaggac   2700
gcgatttctc cgcagcatgc tatcgaggtt cttgatgagt tgactaatgg agatgctatt   2760
gttagtactg ggttgggca gcatcaaatg tgggctgcgc agttttacaa gtacaagaga   2820
ccgaggcagt ggttgacctc aggggggtctt ggagccatgg gttttggatt gcctgcggct   2880
attggtgctg ctgttgctaa ccctggggct gttgtggttg acattgatgg ggatggtagt   2940
ttcatcatga atgttcagga gttggccact ataagagtgg agaatctccc agttaagata   3000
ttgttgttga acaatcagca tttgggtatg gtggttcagt tggaggatag gttctacaag   3060
tccaatagag ctcacaccta tcttggagat ccgtctagcg agagcgagat attcccaaac   3120
atgctcaagt ttgctgatgc ttgtgggata ccggcagcgc gagtgacgaa gaaggaagag   3180
cttagagcgg caattcagag aatgttggac acccctggcc cctaccttct tgatgtcatt   3240
gtgccccatc aggagcatgt gttgccgatg attcccagta atggatcctt caaggatgtg   3300
ataactgagg gtgatggtag aacgaggtac tgattgccta gaccaaatgt tccttgatgc   3360
ttgttttgta caatatatat aagataatgc tgtcctagtt gcaggatttg gcctgtggtg   3420
agcatcatag tctgtagtag ttttggtagc aagacatttt attttccttt tatttaactt   3480
actacatgca gtagcatcta tctatctctg tagtctgata tctcctgttg tctgtattgt   3540
gccgttggat tttttgctgt agtgagactg aaaatgatgt gctagtaata atatttctgt   3600
tagaaatcta agtagagaat ctgttgaaga agtcaaaagc taatggaatc aggttacata   3660
```

tcaatgtttt tcttttttta gcggttggta gacgtgtaga ttcaacttct cttggagctc 3720
acctaggcaa tcagtaaaat gcatattcct tttttaactt gccatttatt tacttttagt 3780
ggaaattgtg accaatttgt tcatgtagaa cggatttgga ccattgcgtc cacaaaacgt 3840
ctcttttgct cgatcttcac aaagcgatac cgaaatccag agatagtttt caaaagtcag 3900
aaatggcaaa gttataaata gtaaaacaga atagatgctg taatcgactt caataacaag 3960
tggcatcacg tttctagtt 3979

<210> SEQ ID NO 91
<211> LENGTH: 17
<212> TYPE: DNA
<213> ORGANISM: Artificial Sequence
<220> FEATURE:
<223> OTHER INFORMATION: synthetic oligonucleotide

<400> SEQUENCE: 91
tgcggccgca tgagccg 17

<210> SEQ ID NO 92
<211> LENGTH: 32
<212> TYPE: DNA
<213> ORGANISM: Artificial Sequence
<220> FEATURE:
<223> OTHER INFORMATION: synthetic oligonucleotide

<400> SEQUENCE: 92
acgtacggta ccatctgcta atattttaaa tc 32

<210> SEQ ID NO 93
<211> LENGTH: 20
<212> TYPE: DNA
<213> ORGANISM: Artificial Sequence
<220> FEATURE:
<223> OTHER INFORMATION: synthetic oligonucleotide

<400> SEQUENCE: 93
taatacgact cactattagg 20

<210> SEQ ID NO 94
<211> LENGTH: 35
<212> TYPE: DNA
<213> ORGANISM: Artificial Sequence
<220> FEATURE:
<223> OTHER INFORMATION: synthetic oligonucleotide

<400> SEQUENCE: 94
tgcccatgat gttggccgca ggctatcttc tagtg 35

<210> SEQ ID NO 95
<211> LENGTH: 25
<212> TYPE: DNA
<213> ORGANISM: Artificial Sequence
<220> FEATURE:
<223> OTHER INFORMATION: synthetic oligonucleotide

<400> SEQUENCE: 95
gctgtcaacg atacgctacg taacg 25

<210> SEQ ID NO 96
<211> LENGTH: 25
<212> TYPE: DNA
<213> ORGANISM: Artificial Sequence
<220> FEATURE:
<223> OTHER INFORMATION: synthetic oligonucleotide

<400> SEQUENCE: 96
gccaattgga gcgagttcca atctc 25

<210> SEQ ID NO 97
<211> LENGTH: 28
<212> TYPE: DNA
<213> ORGANISM: Artificial Sequence
<220> FEATURE:
<223> OTHER INFORMATION: synthetic oligonucleotide

<400> SEQUENCE: 97
gcgatatccg tttcttctga ccttcatc 28

<210> SEQ ID NO 98
<211> LENGTH: 28
<212> TYPE: DNA
<213> ORGANISM: Artificial Sequence
<220> FEATURE:
<223> OTHER INFORMATION: synthetic oligonucleotide

<400> SEQUENCE: 98
ttctagacct gcaggatata atgagccg 28

<210> SEQ ID NO 99
<211> LENGTH: 13514
<212> TYPE: DNA
<213> ORGANISM: Artificial Sequence
<220> FEATURE:
<223> OTHER INFORMATION: plamsid pKR275
<220> FEATURE:
<221> NAME/KEY: misc_feature
<222> LOCATION: (1192)..(1192)
<223> OTHER INFORMATION: n is a, c, g, or t
<220> FEATURE:
<221> NAME/KEY: misc_feature
<222> LOCATION: (2675)..(2675)
<223> OTHER INFORMATION: n is a, c, g, or t

<400> SEQUENCE: 99
ggtcgactcg acgtacgtcc tcgaagagaa gggttaataa cacatttttt aacattttta 60
acacaaattt tagttattta aaaatttatt aaaaaattta aaataagaag aggaactctt 120
taaataaatc taacttacaa aatttatgat ttttaataag ttttcaccaa taaaaaatgt 180
cataaaaata tgttaaaaag tatattatca atattctctt tatgataaat aaaaagaaaa 240
aaaaaataaa agttaagtga aaatgagatt gaagtgactt taggtgtgta taaatatatc 300
aaccccgcca acaatttatt taatccaaat atattgaagt atattattcc atagccttta 360
tttatttata tatttattat ataaaagctt tatttgttct aggttgttca tgaaatattt 420
ttttggtttt atctccgttg taagaaaatc atgtgctttg tgtcgccact cactattgca 480
gctttttcat gcattggtca gattgacggt tgattgtatt tttgtttttt atggttttgt 540
gttatgactt aagtcttcat ctctttatct cttcatcagg tttgatggtt acctaatatg 600
gtccatgggt acatgcatgg ttaaattagg tggccaactt tgttgtgaac gatagaattt 660
tttttatatt aagtaaacta tttttatatt atgaaataat aataaaaaaa atattttatc 720
attattaaca aaatcatatt agttaatttg ttaactctat aataaaagaa atactgtaac 780
attcacatta catggtaaca tctttccacc ctttcatttg ttttttgttt gatgactttt 840
tttcttgttt aaatttattt cccttctttt aaatttggaa tacattatca tcatatataa 900
actaaaatac taaaaacagg attacacaaa tgataaataa taacacaaat atttataaat 960
ctagctgcaa tatatttaaa ctagctatat cgatattgta aaataaaact agctgcattg 1020

```
atactgataa aaaaatatca tgtgctttct ggactgatga tgcagtatac ttttgacatt   1080
gcctttattt tatttttcag aaaagctttc ttagttctgg gttcttcatt atttgtttcc   1140
catctccatt gtgaattgaa tcatttgctt cgtgtcacaa atacaattta gntaggtaca   1200
tgcattggtc agattcacgg tttattatgt catgacttaa gttcatggta gtacattacc   1260
tgccacgcat gcattatatt ggttagattt gataggcaaa tttggttgtc aacaatataa   1320
atataaataa tgtttttata ttacgaaata acagtgatca aaacaaacag ttttatcttt   1380
attaacaaga ttttgttttt gtttgatgac gttttttaat gtttacgctt tccccccttct   1440
tttgaattta gaacacttta tcatcataaa atcaaatact aaaaaaatta catatttcat   1500
aaataataac acaaatattt ttaaaaaatc tgaaataata atgaacaata ttacatatta   1560
tcacgaaaat tcattaataa aaatattata taaataaaat gtaatagtag ttatatgtag   1620
gaaaaaagta ctgcacgcat aatatataca aaaagattaa aatgaactat tataaataat   1680
aacactaaat taatggtgaa tcatatcaaa ataatgaaaa agtaaataaa atttgtaatt   1740
aacttctata tgtattacac acacaaataa taaataatag taaaaaaaat tatgataaat   1800
atttaccatc tcataagata tttaaaataa tgataaaaat atagattatt ttttatgcaa   1860
ctagctagcc aaaaagagaa cacgggtata tataaaaaga gtacctttaa attctactgt   1920
acttccttta ttcctgacgt ttttatatca agtggacata cgtgaagatt ttaattatca   1980
gtctaaatat ttcattagca cttaatactt ttctgtttta ttcctatcct ataagtagtc   2040
ccgattctcc caacattgct tattcacaca actaactaag aaagtcttcc atagcccccc   2100
aagcggccgc ctctctctct ctctcttctc tctttctctc cccctctctc cggcgatggt   2160
tgttgctatg gaccaacgca ccaatgtgaa cggagatccc ggcgccggag accggaagaa   2220
agaagaaagg tttgatccga gtgcacaacc accgttcaag atcggagata taagggcggc   2280
gattcctaag cactgttggg ttaagagtcc tttgagatca atgagttacg tcgtcagaga   2340
cattatcgcc gtcgcggctt tggccatcgc tgccgtgtat gttgatagct ggttcctttg   2400
gcctctttat tgggccgccc aaggaacact tttctgggcc atctttgttc tcggccacga   2460
ctgtggacat gggagtttct cagacattcc tctactgaat agtgtggttg gtcacattct   2520
tcattctttc atcctcgttc cttaccatgg ttggagaata agccaccgga cacaccacca   2580
gaaccatggc catgttgaaa acgacgagtc atgggttccg ttaccagaaa gggtgtacaa   2640
gaaattgccc cacagtactc ggatgctcag atacnctgtc cctctcccca tgctcgcata   2700
tcctctctat ttgtgctaca gaagtcctgg aaaagaagga tcacatttta acccatacag   2760
tagtttattt gctccaagcg agagaaagct tattgcaact tcaactactt gttggtccat   2820
aatgttcgtc agtcttatcg ctctatcttt cgtcttcggt ccactcgcgg ttcttaaagt   2880
ctacggtgta ccgtacatta tctttgtgat gtggttggat gctgtcacgt atttgcatca   2940
tcatggtcac gatgagaagt tgccttggta tagaggcaag gaatggagtt atctacgtgg   3000
aggattaaca acaattgata gagattacgg aatctttaac aacattcatc acgacattgg   3060
aactcacgtg atccatcatc tcttcccaca aatccctcac tatcacttgg tcgacgccac   3120
gaaagcagct aaacatgtgt tgggaagata ctacagagaa ccaaagacgt caggagcaat   3180
accgatccac ttggtggaga gtttggtcgc aagtattaag aaagatcatt acgtcagcga   3240
cactggtgat attgtcttct acgagacaga tccagatctc tacgtttacg cttctgacaa   3300
atctaaaatc aattaatctc catttgttta gctctattag gaataaacca gcccactttt   3360
aaaattttta tttcttgttg tttttaagtt aaaagtgtac tcgtgaaact cttttttttt   3420
```

```
tcttttttt tattaatgta tttacattac aaggcgtaaa gcggccgcga cacaagtgtg   3480
agagtactaa ataaatgctt tggttgtacg aaatcattac actaaataaa ataatcaaag   3540
cttatatatg ccttccgcta aggccgaatg caaagaaatt ggttctttct cgttatcttt   3600
tgccactttt actagtacgt attaattact acttaatcat ctttgtttac ggctcattat   3660
atccgtacgt ctagaggatc cgtcgacggc gcgcccgatc atccggatat agttcctcct   3720
ttcagcaaaa aacccctcaa gacccgttta gaggccccaa ggggttatgc tagttattgc   3780
tcagcggtgg cagcagccaa ctcagcttcc tttcgggctt tgttagcagc cggatcgatc   3840
caagctgtac ctcactattc ctttgccctc ggacgagtgc tggggcgtcg gtttccacta   3900
tcggcgagta cttctacaca gccatcggtc cagacggccg cgcttctgcg ggcgatttgt   3960
gtacgcccga cagtcccggc tccggatcgg acgattgcgt cgcatcgacc ctgcgcccaa   4020
gctgcatcat cgaaattgcc gtcaaccaag ctctgataga gttggtcaag accaatgcgg   4080
agcatatacg cccggagccg cggcgatcct gcaagctccg gatgcctccg ctcgaagtag   4140
cgcgtctgct gctccataca agccaaccac ggcctccaga agaagatgtt ggcgacctcg   4200
tattgggaat ccccgaacat cgcctcgctc cagtcaatga ccgctgttat gcggccattg   4260
tccgtcagga cattgttgga gccgaaatcc gcgtgcacga ggtgccggac ttcggggcag   4320
tcctcggccc aaagcatcag ctcatcgaga gcctgcgcga cggacgcact gacggtgtcg   4380
tccatcacag tttgccagtg atacacatgg ggatcagcaa tcgcgcatat gaaatcacgc   4440
catgtagtgt attgaccgat tccttgcggt ccgaatgggc cgaacccgct cgtctggcta   4500
agatcggccg cagcgatcgc atccatagcc tccgcgaccg gctgcagaac agcgggcagt   4560
tcggtttcag gcaggtcttg caacgtgaca ccctgtgcac ggcgggagat gcaataggtc   4620
aggctctcgc tgaattcccc aatgtcaagc acttccggaa tcgggagcgc ggccgatgca   4680
aagtgccgat aaacataacg atctttgtag aaaccatcgg cgcagctatt tacccgcagg   4740
acatatccac gccctcctac atcgaagctg aaagcacgag attcttcgcc ctccgagagc   4800
tgcatcaggt cggagacgct gtcgaacttt tcgatcagaa acttctcgac agacgtcgcg   4860
gtgagttcag gcttttccat gggtatatct ccttcttaaa gttaaacaaa attatttcta   4920
gagggaaacc gttgtggtct ccctatagtg agtcgtatta atttcgcggg atcgagatct   4980
gatcaacctg cattaatgaa tcggccaacg cgcggggaga ggcggtttgc gtattgggcg   5040
ctcttccgct tcctcgctca ctgactcgct gcgctcggtc gttcggctgc ggcgagcggt   5100
atcagctcac tcaaaggcgg taatacggtt atccacagaa tcaggggata acgcaggaaa   5160
gaacatgtga gcaaaaggcc agcaaaaggc caggaaccgt aaaaaggccg cgttgctggc   5220
gtttttccat aggctccgcc cccctgacga gcatcacaaa aatcgacgct caagtcagag   5280
gtggcgaaac ccgacaggac tataaagata ccaggcgttt ccccctggaa gctccctcgt   5340
gcgctctcct gttccgaccc tgccgcttac cggatacctg tccgcctttc tcccttcggg   5400
aagcgtggcg ctttctcaat gctcacgctg taggtatctc agttcggtgt aggtcgttcg   5460
ctccaagctg ggctgtgtgc acgaaccccc cgttcagccc gaccgctgcg ccttatccgg   5520
taactatcgt cttgagtcca acccggtaag acacgactta tcgccactgg cagcagccac   5580
tggtaacagg attagcagag cgaggtatgt aggcggtgct acagagttct tgaagtggtg   5640
gcctaactac ggctacacta gaaggacagt atttggtatc tgcgctctgc tgaagccagt   5700
taccttcgga aaaagagttg gtagctcttg atccggcaaa caaaccaccg ctggtagcgg   5760
tggttttttt gtttgcaagc agcagattac gcgcagaaaa aaaggatctc aagaagatcc   5820
```

```
tttgatcttt tctacggggt ctgacgctca gtggaacgaa aactcacgtt aagggatttt   5880
ggtcatgaca ttaacctata aaaataggcg tatcacgagg ccctttcgtc tcgcgcgttt   5940
cggtgatgac ggtgaaaacc tctgacacat gcagctcccg gagacggtca cagcttgtct   6000
gtaagcggat gccgggagca gacaagcccg tcagggcgcg tcagcgggtg ttggcgggtg   6060
tcggggctgg cttaactatg cggcatcaga gcagattgta ctgagagtgc accatatgga   6120
catattgtcg ttagaacgcg gctacaatta atacataacc ttatgtatca tacacatacg   6180
atttaggtga cactatagaa cggcgcgcca agctgggtct agaactagaa acgtgatgcc   6240
acttgttatt gaagtcgatt acagcatcta ttctgtttta ctatttataa ctttgccatt   6300
tctgactttt gaaaactatc tctggatttc ggtatcgctt tgtgaagatc gagcaaaaga   6360
gacgttttgt ggacgcaatg gtccaaatcc gttctacatg aacaaattgg tcacaatttc   6420
cactaaaagt aaataaatgg caagttaaaa aaggaatatg cattttactg attgcctagg   6480
tgagctccaa gagaagttga atctacacgt ctaccaaccg ctaaaaaaag aaaaacattg   6540
atatgtaacc tgattccatt agcttttgac ttcttcaaca gattctctac ttagatttct   6600
aacagaaata ttattactag cacatcattt tcagtctcac tacagcaaaa aatccaacgg   6660
cacaatacag acaacaggag atatcagact acagagatag atagatgcta ctgcatgtag   6720
taagttaaat aaaaggaaaa taaaatgtct tgctaccaaa actactacag actatgatgc   6780
tcaccacagg ccaaatcctg caactaggac agcattatct tatatatatt gtacaaaaca   6840
agcatcaagg aacatttggt ctaggcaatc agtacctcgt tctaccatca ccctcagtta   6900
tcacatcctt gaaggatcca ttactgggaa tcatcggcaa cacatgctcc tgatggggca   6960
caatgacatc aagaaggtag gggccagggg tgtccaacat tctctgaatt gccgctctaa   7020
gctcttcctt cttcgtcact cgcgctgccg gtatcccaca agcatcagca aacttgagca   7080
tgtttgggaa tatctcgctc tcgctagacg gatctccaag ataggtgtga gctctattgg   7140
acttgtagaa cctatcctcc aactgaacca ccatacccaa atgctgattg ttcaacaaca   7200
atatcttaac tgggagattc tccactctta tagtggccaa ctcctgaaca ttcatgatga   7260
aactaccatc cccatcaatg tcaaccacaa cagccccagg gttagcaaca gcagcaccaa   7320
tagccgcagg caatccaaaa cccatggctc caagaccccc tgaggtcaac cactgcctcg   7380
gtctcttgta cttgtaaaac tgcgcagccc acatttgatg ctgcccaacc ccagtactaa   7440
caatagcatc tccattagtc aactcatcaa gaacctcgat agcatgctgc ggagaaatcg   7500
cgtcctggaa tgtcttgtaa cccaatggaa acttgtgttt ctgcacatta atctcttctc   7560
tccaacctcc aagatcaaac ttaccctcca ctcctttctc ctccaaaatc atattaattc   7620
ccttcaaggc caacttcaaa tccgcgcaaa ccgacacgtg cgcctgcttg ttcttcccaa   7680
tctcggcaga atcaatatca atgtgaacaa tcttagccct actagcaaaa gcctcaagct   7740
tcccagtaac acggtcatca aaccttaccc caaaggcaag caacaaatca ctattgtcaa   7800
cagcatagtt agcataaaca gtaccatgca tacccagcat ctgaagggaa tattcatcac   7860
caataggaaa agttccaaga cccattaaag tgctagcaac gggaatacca gtgagttcaa   7920
caaagcgcct caattcagca ctggaattca aactgccacc gccgacgtag agaacgggct   7980
tttgggcctc catgatgagt ctgacaatgt gttccaattg ggcctcggcg gggggcctgg   8040
gcagcctggc gaggtaaccg gggaggttaa cgggctcgtc ccaattaggc acggcgagtt   8100
gctgctgaac gtctttggga atgtcgatga ggaccggacc ggggcggccg gaggtggcga   8160
cgaagaaagc ctcggcgacg acgcggggga tgtcgtcgac gtcgaggatg aggtagttgt   8220
```

```
gcttcgtgat ggatctgctc acctccacga tcggggtttc ttggaaggcg tcggtgccga   8280
tcatccggcg ggcgacctgg ccggtgatgg cgacgactgg gacgctgtcc attaaagcgt   8340
cggcgaggcc gctcacgagg ttggtggcgc cggggccgga ggtggcaatg cagacgccgg   8400
ggaggccgga ggaacgcgcg tagccttcgg cggcgaagac gccgccctgc tcgtggcgcg   8460
ggagcacgtt gcggatggcg gcggagcgcg tgagcgcctg gtggatctcc atcgacgcac   8520
cgccggggta cgcgaacacc gtcgtcacgc cctgcctctc cagcgcctcc acaaggatgt   8580
ccgcgccctt gcgaggttcg ccggaggcga accgtgacac gaagggctcc gtggtcggcg   8640
cttccttggt gaagggcgcc gccgtggggg gtttggagat ggaacatttg attttgagag   8700
cgtggttggg tttggtgagg gtttgatgag agagagggag ggtggatcta gtaatgcgtt   8760
tggggaaggt ggggtgtgaa gaggaagaag agaatcgggt ggttctggaa gcggtggccg   8820
ccattgtgtt gtgtggcatg gttatacttc aaaaactgca caacaagcct agagttagta   8880
cctaaacagt aaatttacaa cagagagcaa agacacatgc aaaaatttca gccataaaaa   8940
aagttataat agaatttaaa gcaaaagttt catttttaa acatatatac aaacaaactg   9000
gatttgaagg aagggattaa ttcccctgct caaagtttga attcctattg tgacctatac   9060
tcgaataaaa ttgaagccta aggaatgtat gagaaacaag aaaacaaaac aaaactacag   9120
acaaacaagt acaattacaa aattcgctaa aattctgtaa tcaccaaacc ccatctcagt   9180
cagcacaagg cccaaggttt attttgaaat aaaaaaaaag tgattttatt tctcataagc   9240
taaaagaaag aaaggcaatt atgaaatgat ttcgactaga tctgaaagtc caacgcgtat   9300
tccgcagata ttaaagaaag agtagagttt cacatggatc ctagatggac ccagttgagg   9360
aaaaagcaag gcaaagcaaa ccagaagtgc aagatccgaa attgaaccac ggaatctagg   9420
atttggtaga gggagaagaa aagtaccttg agaggtagaa gagaagagaa gagcagagag   9480
atatatgaac gagtgtgtct tggtctcaac tctgaagcga tacgagttta gaggggagca   9540
ttgagttcca atttataggg aaaccgggtg gcaggggtga gttaatgacg gaaaagcccc   9600
taagtaacga gattggattg tgggttagat tcaaccgttt gcatccgcgg cttagattgg   9660
ggaagtcaga gtgaatctca accgttgact gagttgaaaa ttgaatgtag caaccaattg   9720
agccaacccc agcctttgcc ctttgatttt gatttgtttg ttgcatactt tttatttgtc   9780
ttctggttct gactctcttt ctctcgtttc aatgccaggt tgcctactcc cacaccactc   9840
acaagaagat tctactgtta gtattaaata ttttttaatg tattaaatga tgaatgcttt   9900
tgtaaacaga acaagactat gtctaataag tgtcttgcaa catttttaa gaaattaaaa   9960
aaaatatatt tattatcaaa atcaaatgta tgaaaaatca tgaataatat aattttatac  10020
attttttaa aaaatctttt aatttcttaa ttaatatctt aaaaataatg attaatattt  10080
aacccaaaat aattagtatg attggtaagg aagatatcca tgttatgttt ggatgtgagt  10140
ttgatctaga gcaaagctta ctagagtcga cctgcaggtc gactcgacgt acgatcccac  10200
atgcaagttt ttatttcaat ccccttttcct ttgaataact gaccaagaac aacaagaaaa  10260
aaaaaaaaaa agaaaaggat cattttgaaa ggatattttt cgctcctatt caaatactgt  10320
atttttacca aaaaaactgt atttttccta cactctcaag ctttgttttt cgcttcgact  10380
ctcatgattt ccttcatatg ccaatcactc tatttataaa tggcataagg tagtgtgaac  10440
aattgcaaag cttgtcatca aaagcttgca atgtacaaat taatgttttt catgcctttc  10500
aaaattatct gcacccccta gctattaatc taacatctaa gtaaggctag tgaatttttt  10560
cgaatagtca tgcagtgcat taatttcccc gtgactattt tggctttgac tccaacactg  10620
```

```
gccccgtaca tccgtccctc attacatgaa aagaaatatt gtttatattc ttaattaaaa  10680
atattgtccc ttctaaattt tcatatagtt aattattata ttactttttt ctctattcta  10740
ttagttctat tttcaaatta ttatttatgc atatgtaaag tacattatat ttttgctata  10800
tacttaaata tttctaaatt attaaaaaaa gactgatatg aaaaatttat tctttttaaa  10860
gctatatcat tttatatata ctttttcttt tcttttcttt cattttctat tcaatttaat  10920
aagaaataaa ttttgtaaat ttttatttat caatttataa aaatatttta ctttatatgt  10980
tttttcacat ttttgttaaa caaatcatat cattatgatt gaaagagagg aaattgacag  11040
tgagtaataa gtgatgagaa aaaaatgtgt tatttcctaa aaaaaaccta aacaaacatg  11100
tatctactct ctatttcatc tatctctcat ttcattttc tctttatctc tttctttatt  11160
tttttatcat atcatttcac attaattatt tttactctct ttattttttc tctctatccc  11220
tctcttattt ccactcatat atacactcca aaattggggc atgcctttat cactactcta  11280
tctcctccac taaatcattt aaatgaaact gaaaagcatt ggcaagtctc ctcccctcct  11340
caagtgattt ccaactcagc attggcatct aattgattca gtatatctat tgcatgtgta  11400
aaagtctttc cacaatacat aactattaat taatcttaaa taaataaagg ataaaatatt  11460
tttttttctt cataaaatta aaatatgtta ttttttgttt agatgtatat tcgaataaat  11520
ctaaatatat gataatgatt ttttatattg attaaacata taatcaatat taaatatgat  11580
atttttttat ataggttgta cacataattt tataaggata aaaaatatga taaaaataaa  11640
ttttaaatat ttttatattt acgagaaaaa aaaatatttt agccataaat aaatgaccag  11700
catattttac aaccttagta attcataaat tcctatatgt atatttgaaa ttaaaaacag  11760
ataatcgtta agggaaggaa tcctacgtca tctcttgcca tttgtttttc atgcaaacag  11820
aaagggacga aaaaccacct caccatgaat cactcttcac accattttta ctagcaaaca  11880
agtctcaaca actgaagcca gctctctttc cgtttctttt tacaacactt tctttgaaat  11940
agtagtattt ttttttcaca tgatttatta acgtgccaaa agatgcttat tgaatagagt  12000
gcacatttgt aatgtactac taattagaac atgaaaaagc attgttctaa cacgataatc  12060
ctgtgaaggc gttaactcca aagatccaat ttcactatat aaattgtgac gaaagcaaaa  12120
tgaattcaca tagctgagag agaaaggaaa ggttaactaa gaagcaatac ttcagcggcc  12180
gcatgactga ggataagacg aaggtcgagt tcccgacgct cacggagctc aagcactcga  12240
tcccgaacgc gtgctttgag tcgaacctcg gcctctcgct ctactacacg gcccgcgcga  12300
tcttcaacgc gtcggcctcg gcggcgctgc tctacgcggc gcgctcgacg ccgttcattg  12360
ccgataacgt tctgctccac gcgctcgttt gcgccaccta catctacgtg cagggcgtca  12420
tcttctgggg cttcttcacg gtcggccacg actgcggcca ctcggccttc tcgcgctacc  12480
acagcgtcaa ctttatcatc ggctgcatca tgcactctgc gattttgacg ccgttcgaga  12540
gctggcgcgt gacgcaccgc caccaccaca agaacacggg caacattgat aaggacgaga  12600
tcttttaccc gcaccggtcg gtcaaggacc tccaggacgt gcgccaatgg gtctacacgc  12660
tcggcggtgc gtggtttgtc tacttgaagg tcgggtatgc cccgcgcacg atgagccact  12720
ttgacccgtg ggacccgctc ctccttcgcc gcgcgtcggc cgtcatcgtg tcgctcggcg  12780
tctgggccgc cttcttcgcc gcgtacgcgt acctcacata ctcgctcggc tttgccgtca  12840
tgggcctcta ctactatgcg ccgctctttg tctttgcttc gttcctcgtc attacgacct  12900
tcttgcacca caacgacgaa gcgacgccgt ggtacggcga ctcggagtgg acgtacgtca  12960
agggcaacct ctcgagcgtc gaccgctcgt acggcgcgtt cgtggacaac ctgagccacc  13020
```

```
acattggcac gcaccaggtc caccacttgt tcccgatcat tccgcactac aagctcaacg  13080

aagccaccaa gcactttgcg gccgcgtacc cgcacctcgt gcgcaggaac gacgagccca  13140

tcatcacggc cttcttcaag accgcgcacc tctttgtcaa ctacggcgct gtgcccgaga  13200

cggcgcagat cttcacgctc aaagagtcgg ccgcggccgc caaggccaag tcggactaag  13260

cggccgcatg agccgtaaag gttcaataca acgagtgctt gttttcttag ggacaagcat  13320

tgtacttatg tatgattctg tgtaaccatg agtcttccac gttgtactaa tgtgaagggc  13380

aaaaataaaa cacagaacaa gttcgttttt ctcaaataat gtgaaggtag aaaatggaac  13440

catgcctcct ctcttgcatg tgatttaaaa tattagcaga tggtaccgta cgtgggcgga  13500

tcccccgggc tgca                                                    13514


<210> SEQ ID NO 100
<211> LENGTH: 11781
<212> TYPE: DNA
<213> ORGANISM: Artificial Sequence
<220> FEATURE:
<223> OTHER INFORMATION: plasmid pKKE2
<220> FEATURE:
<221> NAME/KEY: misc_feature
<222> LOCATION: (1180)..(1180)
<223> OTHER INFORMATION: n is a, c, g, or t

<400> SEQUENCE: 100

gtacgtcctc gaagagaagg gttaataaca catttttaa catttttaac acaaatttta     60

gttatttaaa aatttattaa aaaatttaaa ataagaagag gaactcttta aataaatcta    120

acttacaaaa tttatgattt ttaataagtt ttcaccaata aaaaatgtca taaaaatatg    180

ttaaaaagta tattatcaat attctcttta tgataaataa aaagaaaaaa aaaataaaag    240

ttaagtgaaa atgagattga agtgacttta ggtgtgtata aatatatcaa ccccgccaac    300

aatttattta atccaaatat attgaagtat attattccat agcctttatt tatttatata    360

tttattatat aaaagcttta tttgttctag gttgttcatg aaatattttt ttggttttat    420

ctccgttgta agaaaatcat gtgctttgtg tcgccactca ctattgcagc tttttcatgc    480

attggtcaga ttgacggttg attgtatttt tgttttttat ggttttgtgt tatgacttaa    540

gtcttcatct ctttatctct tcatcaggtt tgatggttac ctaatatggt ccatgggtac    600

atgcatggtt aaattaggtg gccaactttg ttgtgaacga tagaattttt tttatattaa    660

gtaaactatt tttatattat gaaataataa taaaaaaaat attttatcat tattaacaaa    720

atcatattag ttaatttgtt aactctataa taaaagaaat actgtaacat tcacattaca    780

tggtaacatc tttccaccct ttcatttgtt ttttgtttga tgactttttt tcttgtttaa    840

atttatttcc cttcttttaa atttggaata cattatcatc atatataaac taaaatacta    900

aaaacaggat tacacaaatg ataaataata acacaaatat ttataaatct agctgcaata    960

tatttaaact agctatatcg atattgtaaa ataaaactag ctgcattgat actgataaaa   1020

aaatatcatg tgctttctgg actgatgatg cagtatactt ttgacattgc ctttatttta   1080

tttttcagaa aagctttctt agttctgggt tcttcattat ttgtttccca tctccattgt   1140

gaattgaatc atttgcttcg tgtcacaaat acaatttagn taggtacatg cattggtcag   1200

attcacggtt tattatgtca tgacttaagt tcatggtagt acattacctg ccacgcatgc   1260

attatattgg ttagatttga taggcaaatt tggttgtcaa caatataaat ataaataatg   1320

tttttatatt acgaaataac agtgatcaaa acaaacagtt ttatctttat taacaagatt   1380

ttgtttttgt ttgatgacgt tttttaatgt ttacgctttc ccccttcttt tgaatttaga   1440
```

```
acactttatc atcataaaat caaatactaa aaaaattaca tatttcataa ataataacac   1500
aaatattttt aaaaaatctg aaataataat gaacaatatt acatattatc acgaaaattc   1560
attaataaaa atattatata aataaaatgt aatagtagtt atatgtagga aaaaagtact   1620
gcacgcataa tatatacaaa aagattaaaa tgaactatta taaataataa cactaaatta   1680
atggtgaatc atatcaaaat aatgaaaaag taaataaaat ttgtaattaa cttctatatg   1740
tattacacac acaaataata aataatagta aaaaaaatta tgataaatat ttaccatctc   1800
ataagatatt taaaataatg ataaaaatat agattatttt ttatgcaact agctagccaa   1860
aaagagaaca cgggtatata taaaaagagt acctttaaat tctactgtac ttcctttatt   1920
cctgacgttt ttatatcaag tggacatacg tgaagatttt aattatcagt ctaaatattt   1980
cattagcact taatactttt ctgttttatt cctatcctat aagtagtccc gattctccca   2040
acattgctta ttcacacaac taactaagaa agtcttccat agccccccaa gcggccgcat   2100
gggaacggac caaggaaaaa ccttcacctg ggaagagctg gcggcccata acaccaagga   2160
cgacctactc ttggccatcc gcggcagggt gtacgatgtc acaaagttct tgagccgcca   2220
tcctggtgga gtggacactc tcctgctcgg agctggccga gatgttactc cggtctttga   2280
gatgtatcac gcgtttgggg ctgcagatgc cattatgaag aagtactatg tcggtacact   2340
ggtctcgaat gagctgccca tcttcccgga gccaacggtg ttccacaaaa ccatcaagac   2400
gagagtcgag ggctacttta cggatcggaa cattgatccc aagaatagac cagagatctg   2460
gggacgatac gctcttatct ttggatcctt gatcgcttcc tactacgcgc agctctttgt   2520
gcctttcgtt gtcgaacgca catggcttca ggtggtgttt gcaatcatca tgggatttgc   2580
gtgcgcacaa gtcggactca accctcttca tgatgcgtct cacttttcag tgacccacaa   2640
ccccactgtc tggaagattc tgggagccac gcacgacttt ttcaacggag catcgtacct   2700
ggtgtggatg taccaacata tgctcggcca tcacccctac accaacattg ctggagcaga   2760
tcccgacgtg tcgacgtctg agcccgatgt tcgtcgtatc aagcccaacc aaaagtggtt   2820
tgtcaaccac atcaaccagc acatgtttgt tcctttcctg tacggactgc tggcgttcaa   2880
ggtgcgcatt caggacatca acattttgta ctttgtcaag accaatgacg ctattcgtgt   2940
caatcccatc tcgacatggc acactgtgat gttctggggc ggcaaggctt tctttgtctg   3000
gtatcgcctg attgttcccc tgcagtatct gcccctgggc aaggtgctgc tcttgttcac   3060
ggtcgcggac atggtgtcgt cttactggct ggcgctgacc ttccaggcga accacgttgt   3120
tgaggaagtt cagtggccgt tgcctgacga gaacgggatc atccaaaagg actgggcagc   3180
tatgcaggtc gagactacgc aggattacgc acacgattcg cacctctgga ccagcatcac   3240
tggcagcttg aactaccagg ctgtgcacca tctgttcccc aacgtgtcgc agcaccatta   3300
tcccgatatt ctggccatca tcaagaacac ctgcagcgag tacaaggttc catacccttgt   3360
caaggatacg ttttggcaag catttgcttc acatttggag cacttgcgtg ttcttggact   3420
ccgtcccaag gaagagtagg cggccgcgac acaagtgtga gagtactaaa taaatgcttt   3480
ggttgtacga aatcattaca ctaaataaaa taatcaaagc ttatatatgc cttccgctaa   3540
ggccgaatgc aaagaaattg gttctttctc gttatctttt gccactttta ctagtacgta   3600
ttaattacta cttaatcatc tttgtttacg gctcattata tccgtacgga tccgtcgacg   3660
gcgcgcccga tcatccggat atagttcctc ctttcagcaa aaaacccctc aagacccgtt   3720
tagaggcccc aaggggttat gctagttatt gctcagcggt ggcagcagcc aactcagctt   3780
cctttcgggc tttgttagca gccggatcga tccaagctgt acctcactat tcctttgccc   3840
```

```
tcggacgagt gctggggcgt cggtttccac tatcggcgag tacttctaca cagccatcgg   3900
tccagacggc cgcgcttctg cgggcgattt gtgtacgccc gacagtcccg gctccggatc   3960
ggacgattgc gtcgcatcga ccctgcgccc aagctgcatc atcgaaattg ccgtcaacca   4020
agctctgata gagttggtca agaccaatgc ggagcatata cgcccggagc cgcggcgatc   4080
ctgcaagctc cggatgcctc cgctcgaagt agcgcgtctg ctgctccata caagccaacc   4140
acggcctcca gaagaagatg ttggcgacct cgtattggga atccccgaac atcgcctcgc   4200
tccagtcaat gaccgctgtt atgcggccat tgtccgtcag gacattgttg gagccgaaat   4260
ccgcgtgcac gaggtgccgg acttcggggc agtcctcggc ccaaagcatc agctcatcga   4320
gagcctgcgc gacggacgca ctgacggtgt cgtccatcac agtttgccag tgatacacat   4380
ggggatcagc aatcgcgcat atgaaatcac gccatgtagt gtattgaccg attccttgcg   4440
gtccgaatgg gccgaacccg ctcgtctggc taagatcggc cgcagcgatc gcatccatag   4500
cctccgcgac cggctgcaga acagcgggca gttcggtttc aggcaggtct tgcaacgtga   4560
caccctgtgc acggcgggag atgcaatagg tcaggctctc gctgaattcc ccaatgtcaa   4620
gcacttccgg aatcgggagc gcggccgatg caaagtgccg ataaacataa cgatctttgt   4680
agaaaccatc ggcgcagcta tttacccgca ggacatatcc acgccctcct acatcgaagc   4740
tgaaagcacg agattcttcg ccctccgaga gctgcatcag gtcggagacg ctgtcgaact   4800
tttcgatcag aaacttctcg acagacgtcg cggtgagttc aggctttttcc atgggtatat   4860
ctccttctta aagttaaaca aaattatttc tagagggaaa ccgttgtggt ctccctatag   4920
tgagtcgtat taatttcgcg ggatcgagat ctgatcaacc tgcattaatg aatcggccaa   4980
cgcgcgggga gaggcggttt gcgtattggg cgctcttccg cttcctcgct cactgactcg   5040
ctgcgctcgg tcgttcggct gcggcgagcg gtatcagctc actcaaaggc ggtaatacgg   5100
ttatccacag aatcagggga taacgcagga aagaacatgt gagcaaaagg ccagcaaaag   5160
gccaggaacc gtaaaaaggc cgcgttgctg gcgtttttcc ataggctccg cccccctgac   5220
gagcatcaca aaaatcgacg ctcaagtcag aggtggcgaa acccgacagg actataaaga   5280
taccaggcgt ttccccctgg aagctccctc gtgcgctctc ctgttccgac cctgccgctt   5340
accggatacc tgtccgcctt tctcccttcg ggaagcgtgg cgctttctca atgctcacgc   5400
tgtaggtatc tcagttcggt gtaggtcgtt cgctccaagc tgggctgtgt gcacgaaccc   5460
cccgttcagc ccgaccgctg cgccttatcc ggtaactatc gtcttgagtc caacccggta   5520
agacacgact tatcgccact ggcagcagcc actggtaaca ggattagcag agcgaggtat   5580
gtaggcggtg ctacagagtt cttgaagtgg tggcctaact acggctacac tagaaggaca   5640
gtatttggta tctgcgctct gctgaagcca gttaccttcg gaaaaagagt tggtagctct   5700
tgatccggca aacaaaccac cgctggtagc ggtggttttt ttgtttgcaa gcagcagatt   5760
acgcgcagaa aaaaaggatc tcaagaagat cctttgatct tttctacggg gtctgacgct   5820
cagtggaacg aaaactcacg ttaagggatt ttggtcatga cattaaccta taaaaatagg   5880
cgtatcacga ggccctttcg tctcgcgcgt ttcggtgatg acggtgaaaa cctctgacac   5940
atgcagctcc cggagacggt cacagcttgt ctgtaagcgg atgccgggag cagacaagcc   6000
cgtcagggcg cgtcagcggg tgttggcggg tgtcggggct ggcttaacta tgcggcatca   6060
gagcagattg tactgagagt gcaccatatg gacatattgt cgttagaacg cggctacaat   6120
taatacataa ccttatgtat catacacata cgatttaggt gacactatag aacggcgcgc   6180
caagcttgtt gaaacatccc tgaagtgtct cattttattt tatttattct ttgctgataa   6240
```

aaaaataaaa taaaagaagc taagcacacg gtcaaccatt gctctactgc taaaagggtt 6300
atgtgtagtg ttttactgca taaattatgc agcaaacaag acaactcaaa ttaaaaaatt 6360
tcctttgctt gtttttttgt tgtctctgac ttgactttct tgtggaagtt ggttgtataa 6420
ggattgggac accattgtcc ttcttaattt aattttattc tttgctgata aaaaaaaaaa 6480
tttcatatag tgttaaataa taatttgtta aataaccaaa aagtcaaata tgtttactct 6540
cgtttaaata attgagattc gtccagcaag gctaaacgat tgtatagatt tatgacaata 6600
tttacttttt tatagataaa tgttatatta taataaattt atatacatat attatatgtt 6660
atttattatt attttaaatc cttcaatatt ttatcaaacc aactcataat ttttttttta 6720
tctgtaagaa gcaataaaat taaatagacc cactttaagg atgatccaac ctttatacag 6780
agtaagagag ttcaaatagt accctttcat atacatatca actaaaatat tagaaatatc 6840
atggatcaaa ccttataaag acattaaata agtggataag tataatatat aaatgggtag 6900
tatataatat ataaatggat acaaacttct ctctttataa ttgttatgtc tccttaacat 6960
cctaatataa tacataagtg ggtaatatat aatatataaa tggagacaaa cttcttccat 7020
tataattgtt atgtcttctt aacacttatg tctcgttcac aatgctaagg ttagaattgt 7080
ttagaaagtc ttatagtaca catttgtttt tgtactattt gaagcattcc ataagccgtc 7140
acgattcaga tgatttataa taataagagg aaatttatca tagaacaata aggtgcatag 7200
atagagtgtt aatatatcat aacatccttt gtttattcat agaagaagtg agatggagct 7260
cagttattat actgttacat ggtcggatac aatattccat gctctccatg agctcttaca 7320
cctacatgca ttttagttca tacttgcggc cagcttttac atggcgggaa actccttgaa 7380
gaactcgatc gagatgcgct cgaggtgcac gacgacctcg gccatgcccg cgatgaagcc 7440
cgtctcgtgg tatgggatgt cgtactgctt gcagagcgac ttgacgagca cgttgagcgc 7500
cgggaggttg tgccggggca ccatcgggaa caagtggtgg tcgatctggt agttgaggcc 7560
gcccatgaac cagtcgatcc agagcgacga cgtcacgttg cgcgtcgaga gcacttgcag 7620
cttccaaaaa tcgggcttgc tgtccttgtc aaagacctcc atgccgttgt ggccgacgct 7680
aaagaccatc gcgaggaaga ggccgcacga cgcctggctc acaaagagga acgcagccgc 7740
ttggagcagc gacatgttgg ctgcgtacac aaggccgagg ttccagccgt agtagaggag 7800
gaggccggcg cgctcgagca gcgggtactg gaccttgtca aaggtgccgc cgggcccaac 7860
gttgtagaag gcgtacatgg ccgactggat cacccacgag atacgcgcaa agagcaagat 7920
gggaaagtac aggtacgctt ggtagcgcat gaagaagagc ccgacgggcg agtcgaccgc 7980
gtgctgcgcc atcttgagcg accacgcgag aatcggcatc gtgtcaatgt ccgggtcgcc 8040
gtggaaggcg atctcgggcg tcgcgtggag gttggggatc gcatggtgcg tgttgtgctt 8100
gttcttccac cactgcaccg agaagccctg ccagaggttg ccgaccatga cgccgacgag 8160
gtcgccaaac aagtggttct caaacacttg gtggtgcaga aagtcatggg cgagccagcc 8220
gcactgctgg taaaagaggc caaggatgac agccgcgacc atgtacatgg ccgtcgagtc 8280
aaagtggagg caaatggccg ccgacacaag cgcaatgctc agcgtcgagg cgcacttgta 8340
gaggtagtag agcttgctcg agtcgtacaa gccgaggcgc ttgacttcaa ggcgcagctt 8400
gcggtacgac gcaatgaagt ccgactggct cttcttgacc tcgtccgaga tcgacgtgtc 8460
gacggccgcc gtcgactggt cgacgtcgcc gacgtagtac tgctcgagga gcttgagcgc 8520
cgagctcggg tggaagacag cgaacgcatc ggtcgcgtct tcgccggcct gcgtgaacat 8580
gacgacgccg cccgggtggt cctcaaaggc cgagatgtcg tacaccttgt ggtggatcac 8640

```
gatccacgcg ttgtcttggc ggttgtgctc acggatggtc gcccacgaga tcttctcggc   8700
cttttgcccc tggaccatga attggccgca gtatatctta aattctttaa tacggtgtac   8760
taggatattg aactggttct tgatgatgaa aacctgggcc gagattgcag ctatttatag   8820
tcataggtct tgttaacatg catggacatt tggccacggg gtggcatgca gtttgacggg   8880
tgttgaaata aacaaaaatg aggtggcgga agagaatacg agtttgaggt tgggttagaa   8940
acaacaaatg tgagggctca tgatgggttg agttggtgaa tgttttgggc tgctcgattg   9000
acacctttgt gagtacgtgt tgttgtgcat ggcttttggg gtccagtttt tttttcttga   9060
cgcggcgatc ctgatcagct agtggataag tgatgtccac tgtgtgtgat tgcgtttttg   9120
tttgaatttt atgaacttag acattgctat gcaaaggata ctctcattgt gttttgtctt   9180
cttttgttcc ttggcttttt cttatgatcc aagagactag tcagtgttgt ggcattcgag   9240
actaccaaga ttaattatga tgggggaagg ataagtaact gattagtacg gactgttacc   9300
aaattaatta ataagcggca aatgaagggc atggatcaaa agcttggatc tcctgcaggc   9360
tagcctaagt acgtactcaa aatgccaaca aataaaaaaa aagttgcttt aataatgcca   9420
aaacaaatta ataaaacact tacaacaccg gatttttttt aattaaaatg tgccatttag   9480
gataaatagt taatattttt aataattatt taaaaagccg tatctactaa aatgattttt   9540
atttggttga aaatattaat atgtttaaat caacacaatc tatcaaaatt aaactaaaaa   9600
aaaaataagt gtacgtggtt aacattagta cagtaatata agaggaaaat gagaaattaa   9660
gaaattgaaa gcgagtctaa tttttaaatt atgaacctgc atatataaaa ggaaagaaag   9720
aatccaggaa gaaaagaaat gaaaccatgc atggtcccct cgtcatcacg agtttctgcc   9780
atttgcaata gaaacactga aacacctttc tctttgtcac ttaattgaga tgccgaagcc   9840
acctcacacc atgaacttca tgaggtgtag cacccaaggc ttccatagcc atgcatactg   9900
aagaatgtct caagctcagc accctacttc tgtgacgtgt ccctcattca ccttcctctc   9960
ttccctataa ataaccacgc ctcaggttct ccgcttcaca actcaaacat tctctccatt  10020
ggtccttaaa cactcatcag tcatcaccgc ggccgcatgg agtcgattgc gccattcctc  10080
ccatcaaaga tgccgcaaga tctgtttatg gaccttgcca ccgctatcgg tgtccgggcc  10140
gcgccctatg tcgatcctct cgaggccgcg ctggtggccc aggccgagaa gtacatcccc  10200
acgattgtcc atcacacgcg tgggttcctg gtcgcggtgg agtcgccttt ggcccgtgag  10260
ctgccgttga tgaacccgtt ccacgtgctg ttgatcgtgc tcgcttattt ggtcacggtc  10320
tttgtgggca tgcagatcat gaagaacttt gagcggttcg aggtcaagac gttttcgctc  10380
ctgcacaact tttgtctggt ctcgatcagc gcctacatgt gcggtgggat cctgtacgag  10440
gcttatcagg ccaactatgg actgtttgag aacgctgctg atcatacctt caagggtctt  10500
cctatggcca agatgatctg gctcttctac ttctccaaga tcatggagtt tgtcgacacc  10560
atgatcatgg tcctcaagaa gaacaaccgc cagatctcct tcttgcacgt ttaccaccac  10620
agctccatct tcaccatctg gtggttggtc acctttgttg cacccaacgg tgaagcctac  10680
ttctctgctg cgttgaactc gttcatccat gtgatcatgt acggctacta cttcttgtcg  10740
gccttgggct tcaagcaggt gtcgttcatc aagttctaca tcacgcgctc gcagatgaca  10800
cagttctgca tgatgtcggt ccagtcttcc tgggacatgt acgccatgaa ggtccttggc  10860
cgccccggat accccttctt catcacggct ctgctttggt tctacatgtg gaccatgctc  10920
ggtctcttct acaactttta cagaaagaac gccaagttgg ccaagcaggc caaggccgac  10980
gctgccaagg agaaggcaag gaagttgcag taagcggccg catttcgcac caaatcaatg  11040
```

aaagtaataa tgaaaagtct gaataagaat acttaggctt agatgccttt gttacttgtg 11100
taaaataact tgagtcatgt acctttggcg gaaacagaat aaataaaagg tgaaattcca 11160
atgctctatg tataagttag taatacttaa tgtgttctac ggttgtttca atatcatcaa 11220
actctaattg aaactttaga accacaaatc tcaatctttt cttaatgaaa tgaaaaatct 11280
taattgtacc atgtttatgt taaacacctt acaattggtt ggagaggagg accaaccgat 11340
gggacaacat tgggagaaag agattcaatg gagatttgga taggagaaca acattctttt 11400
tcacttcaat acaagatgag tgcaacacta aggatatgta tgagactttc agaagctacg 11460
acaacataga tgagtgaggt ggtgattcct agcaagaaag acattagagg aagccaaaat 11520
cgaacaagga agacatcaag ggcaagagac aggaccatcc atctcaggaa aaggagcttt 11580
gggatagtcc gagaagttgt acaagaaatt ttttggaggg tgagtgatgc attgctggtg 11640
actttaactc aatcaaaatt gagaaagaaa gaaaagggag ggggctcaca tgtgaataga 11700
agggaaacgg gagaatttta cagttttgat ctaatgggca tcccagctag tggtaacata 11760
ttcaccatgt ttaaccttca c 11781

<210> SEQ ID NO 101
<211> LENGTH: 7048
<212> TYPE: DNA
<213> ORGANISM: Artificial Sequence
<220> FEATURE:
<223> OTHER INFORMATION: plasmid KS123

<400> SEQUENCE: 101
agcttggatc cgtcgacggc gcgcccgatc atccggatat agttcctcct ttcagcaaaa 60
aacccctcaa gacccgttta gaggccccaa ggggttatgc tagttattgc tcagcggtgg 120
cagcagccaa ctcagcttcc tttcgggctt tgttagcagc cggatcgatc caagctgtac 180
ctcactattc ctttgccctc ggacgagtgc tggggcgtcg gtttccacta tcggcgagta 240
cttctacaca gccatcggtc cagacggccg cgcttctgcg ggcgatttgt gtacgcccga 300
cagtcccggc tccggatcgg acgattgcgt cgcatcgacc ctgcgcccaa gctgcatcat 360
cgaaattgcc gtcaaccaag ctctgataga gttggtcaag accaatgcgg agcatatacg 420
cccggagccg cggcgatcct gcaagctccg gatgcctccg ctcgaagtag cgcgtctgct 480
gctccataca agccaaccac ggcctccaga agaagatgtt ggcgacctcg tattgggaat 540
ccccgaacat cgcctcgctc cagtcaatga ccgctgttat gcggccattg tccgtcagga 600
cattgttgga gccgaaatcc gcgtgcacga ggtgccggac ttcggggcag tcctcggccc 660
aaagcatcag ctcatcgaga gcctgcgcga cggacgcact gacggtgtcg tccatcacag 720
tttgccagtg atacacatgg ggatcagcaa tcgcgcatat gaaatcacgc catgtagtgt 780
attgaccgat tccttgcggt ccgaatgggc cgaacccgct cgtctggcta agatcggccg 840
cagcgatcgc atccatagcc tccgcgaccg gctgcagaac agcgggcagt tcggtttcag 900
gcaggtcttg caacgtgaca ccctgtgcac ggcgggagat gcaataggtc aggctctcgc 960
tgaattcccc aatgtcaagc acttccggaa tcgggagcgc ggccgatgca aagtgccgat 1020
aaacataacg atctttgtag aaaccatcgg cgcagctatt tacccgcagg acatatccac 1080
gccctcctac atcgaagctg aaagcacgag attcttcgcc ctccgagagc tgcatcaggt 1140
cggagacgct gtcgaacttt tcgatcagaa acttctcgac agacgtcgcg gtgagttcag 1200
gcttttccat gggtatatct ccttcttaaa gttaaacaaa attatttcta gagggaaacc 1260
gttgtggtct ccctatagtg agtcgtatta atttcgcggg atcgagatcg atccaattcc 1320

```
aatcccacaa aaatctgagc ttaacagcac agttgctcct ctcagagcag aatcgggtat   1380
tcaacaccct catatcaact actacgttgt gtataacggt ccacatgccg gtatatacga   1440
tgactggggt tgtacaaagg cggcaacaaa cggcgttccc ggagttgcac acaagaaatt   1500
tgccactatt acagaggcaa gagcagcagc tgacgcgtac acaacaagtc agcaaacaga   1560
caggttgaac ttcatcccca aaggagaagc tcaactcaag cccaagagct ttgctaaggc   1620
cctaacaagc ccaccaaagc aaaaagccca ctggctcacg ctaggaacca aaaggcccag   1680
cagtgatcca gccccaaaag agatctcctt tgccccggag attacaatgg acgatttcct   1740
ctatctttac gatctaggaa ggaagttcga aggtgaaggt gacgacacta tgttcaccac   1800
tgataatgag aaggttagcc tcttcaattt cagaaagaat gctgacccac agatggttag   1860
agaggcctac gcagcaggtc tcatcaagac gatctacccg agtaacaatc tccaggagat   1920
caaatacctt cccaagaagg ttaaagatgc agtcaaaaga ttcaggacta attgcatcaa   1980
gaacacagag aaagacatat ttctcaagat cagaagtact attccagtat ggacgattca   2040
aggcttgctt cataaaccaa ggcaagtaat agagattgga gtctctaaaa aggtagttcc   2100
tactgaatct aaggccatgc atggagtcta agattcaaat cgaggatcta acagaactcg   2160
ccgtgaagac tggcgaacag ttcatacaga gtcttttacg actcaatgac aagaagaaaa   2220
tcttcgtcaa catggtggag cacgacactc tggtctactc caaaaatgtc aaagatacag   2280
tctcagaaga ccaaagggct attgagactt ttcaacaaag gataatttcg ggaaacctcc   2340
tcggattcca ttgcccagct atctgtcact tcatcgaaag gacagtagaa aaggaaggtg   2400
gctcctacaa atgccatcat tgcgataaag gaaaggctat cattcaagat gcctctgccg   2460
acagtggtcc caaagatgga cccccaccca cgaggagcat cgtggaaaaa gaagacgttc   2520
caaccacgtc ttcaaagcaa gtggattgat gtgacatctc cactgacgta agggatgacg   2580
cacaatccca ctatccttcg caagaccctt cctctatata aggaagttca tttcatttgg   2640
agaggacacg ctcgagctca tttctctatt acttcagcca taacaaaaga actcttttct   2700
cttcttatta aaccatgaaa aagcctgaac tcaccgcgac gtctgtcgag aagtttctga   2760
tcgaaaagtt cgacagcgtc tccgacctga tgcagctctc ggagggcgaa gaatctcgtg   2820
ctttcagctt cgatgtagga gggcgtggat atgtcctgcg ggtaaatagc tgcgccgatg   2880
gtttctacaa agatcgttat gtttatcggc actttgcatc ggccgcgctc ccgattccgg   2940
aagtgcttga cattggggaa ttcagcgaga gcctgaccta ttgcatctcc cgccgtgcac   3000
agggtgtcac gttgcaagac ctgcctgaaa ccgaactgcc cgctgttctg cagccggtcg   3060
cggaggccat ggatgcgatc gctgcggccg atcttagcca gacgagcggg ttcggcccat   3120
tcggaccgca aggaatcggt caatacacta catggcgtga tttcatatgc gcgattgctg   3180
atccccatgt gtatcactgg caaactgtga tggacgacac cgtcagtgcg tccgtcgcgc   3240
aggctctcga tgagctgatg ctttgggccg aggactgccc cgaagtccgg cacctcgtgc   3300
acgcggattt cggctccaac aatgtcctga cggacaatgg ccgcataaca gcggtcattg   3360
actggagcga ggcgatgttc ggggattccc aatacgaggt cgccaacatc ttcttctgga   3420
ggccgtggtt ggcttgtatg gagcagcaga cgcgctactt cgagcggagg catccggagc   3480
ttgcaggatc gccgcggctc cgggcgtata tgctccgcat tggtcttgac caactctatc   3540
agagcttggt tgacggcaat ttcgatgatg cagcttgggc gcagggtcga tgcgacgcaa   3600
tcgtccgatc cggagccggg actgtcgggc gtacacaaat cgcccgcaga agcgcggccg   3660
tctggaccga tggctgtgta gaagtactcg ccgatagtgg aaaccgacgc cccagcactc   3720
```

```
gtccgagggc aaaggaatag tgaggtacct aaagaaggag tgcgtcgaag cagatcgttc   3780
aaacatttgg caataaagtt tcttaagatt gaatcctgtt gccggtcttg cgatgattat   3840
catataattt ctgttgaatt acgttaagca tgtaataatt aacatgtaat gcatgacgtt   3900
atttatgaga tgggttttta tgattagagt cccgcaatta tacatttaat acgcgataga   3960
aaacaaaata tagcgcgcaa actaggataa attatcgcgc gcggtgtcat ctatgttact   4020
agatcgatgt cgaatcgatc aacctgcatt aatgaatcgg ccaacgcgcg gggagaggcg   4080
gtttgcgtat tgggcgctct tccgcttcct cgctcactga ctcgctgcgc tcggtcgttc   4140
ggctgcggcg agcggtatca gctcactcaa aggcggtaat acggttatcc acagaatcag   4200
gggataacgc aggaaagaac atgtgagcaa aaggccagca aaaggccagg aaccgtaaaa   4260
aggccgcgtt gctggcgttt ttccataggc tccgcccccc tgacgagcat cacaaaaatc   4320
gacgctcaag tcagaggtgg cgaaacccga caggactata aagataccag gcgtttcccc   4380
ctggaagctc cctcgtgcgc tctcctgttc cgaccctgcc gcttaccgga tacctgtccg   4440
cctttctccc ttcgggaagc gtggcgcttt ctcaatgctc acgctgtagg tatctcagtt   4500
cggtgtaggt cgttcgctcc aagctgggct gtgtgcacga accccccgtt cagcccgacc   4560
gctgcgcctt atccggtaac tatcgtcttg agtccaaccc ggtaagacac gacttatcgc   4620
cactggcagc agccactggt aacaggatta gcagagcgag gtatgtaggc ggtgctacag   4680
agttcttgaa gtggtggcct aactacggct acactagaag gacagtattt ggtatctgcg   4740
ctctgctgaa gccagttacc ttcggaaaaa gagttggtag ctcttgatcc ggcaaacaaa   4800
ccaccgctgg tagcggtggt ttttttgttt gcaagcagca gattacgcgc agaaaaaaag   4860
gatctcaaga agatcctttg atcttttcta cggggtctga cgctcagtgg aacgaaaact   4920
cacgttaagg gattttggtc atgacattaa cctataaaaa taggcgtatc acgaggccct   4980
ttcgtctcgc gcgtttcggt gatgacggtg aaaacctctg acacatgcag ctcccggaga   5040
cggtcacagc ttgtctgtaa gcggatgccg ggagcagaca agcccgtcag ggcgcgtcag   5100
cgggtgttgg cgggtgtcgg ggctggctta actatgcggc atcagagcag attgtactga   5160
gagtgcacca tatggacata ttgtcgttag aacgcggcta caattaatac ataaccttat   5220
gtatcataca catacgattt aggtgacact atagaacggc gcgccaagct tttgatccat   5280
gcccttcatt tgccgcttat taattaattt ggtaacagtc cgtactaatc agttacttat   5340
ccttccccca tcataattaa tcttggtagt ctcgaatgcc acaacactga ctagtctctt   5400
ggatcataag aaaaagccaa ggaacaaaag aagacaaaac acaatgagag tatcctttgc   5460
atagcaatgt ctaagttcat aaaattcaaa caaaaacgca atcacacaca gtggacatca   5520
cttatccact agctgatcag gatcgccgcg tcaagaaaaa aaaactggac cccaaaagcc   5580
atgcacaaca acacgtactc acaaaggtgt caatcgagca gcccaaaaca ttcaccaact   5640
caacccatca tgagccctca catttgttgt ttctaaccca acctcaaact cgtattctct   5700
tccgccacct catttttgtt tatttcaaca cccgtcaaac tgcatgccac ccgtggcca   5760
aatgtccatg catgttaaca agacctatga ctataaatag ctgcaatctc ggcccaggtt   5820
ttcatcatca agaaccagtt caatatccta gtacaccgta ttaaagaatt taagatatac   5880
tgcggccgca agtatgaact aaaatgcatg taggtgtaag agctcatgga gagcatggaa   5940
tattgtatcc gaccatgtaa cagtataata actgagctcc atctcacttc ttctatgaat   6000
aaacaaagga tgttatgata tattaacact ctatctatgc accttattgt tctatgataa   6060
atttcctctt attattataa atcatctgaa tcgtgacggc ttatggaatg cttcaaatag   6120
```

tacaaaaaca aatgtgtact ataagacttt ctaaacaatt ctaaccttag cattgtgaac 6180
gagacataag tgttaagaag acataacaat tataatggaa gaagtttgtc tccatttata 6240
tattatatat tacccactta tgtattatat taggatgtta aggagacata acaattataa 6300
agagagaagt ttgtatccat ttatatatta tatactaccc atttatatat tatacttatc 6360
cacttattta atgtctttat aaggtttgat ccatgatatt tctaatattt tagttgatat 6420
gtatatgaaa gggtactatt tgaactctct tactctgtat aaaggttgga tcatccttaa 6480
agtgggtcta tttaatttta ttgcttctta cagataaaaa aaaaattatg agttggtttg 6540
ataaaatatt gaaggattta aaataataat aaataacata taatatatgt atataaattt 6600
attataatat aacatttatc tataaaaaag taaatattgt cataaatcta tacaatcgtt 6660
tagccttgct ggacgaatct caattattta aacgagagta aacatatttg actttttggt 6720
tatttaacaa attattattt aacactatat gaaatttttt tttttatcag caaagaataa 6780
aattaaatta agaaggacaa tggtgtccca atccttatac aaccaacttc cacaagaaag 6840
tcaagtcaga gacaacaaaa aaacaagcaa aggaaatttt ttaatttgag ttgtcttgtt 6900
tgctgcataa tttatgcagt aaaacactac acataaccct tttagcagta gagcaatggt 6960
tgaccgtgtg cttagcttct tttattttat ttttttatca gcaaagaata aataaaataa 7020
aatgagacac ttcagggatg tttcaaca 7048

<210> SEQ ID NO 102
<211> LENGTH: 1098
<212> TYPE: DNA
<213> ORGANISM: Artificial Sequence
<220> FEATURE:
<223> OTHER INFORMATION: DNA fragment cal a24-4

<400> SEQUENCE: 102
aggatcctgc aggcagccaa gaaggttttg gagcgagttc caatctcaaa accgccattc 60
gaatacaatg atctgaagaa agcagtacca ccacattgtt tttcacgacc actttcccga 120
tccttgtatt tcctctttca cgacattatt gtaacatgta tccttttcta cgtagcatca 180
aactacattc atatgctccc tcgtttcctt tcctgcatcg tatggcctgt ttactggatc 240
tcccaaggag tttttctcgg cagattgtgg atgatcggcc acgaatgcgg tcatcatagc 300
ttcagtaatt accgttgggt cgacgataca gtcggttttc taatccatac ggccaccctc 360
actccctatt tttccttcaa atatagccac cgtaatcacc atgcacacac caattccatg 420
gaatacgacg aggttcatat cccgaaacgc aaatcagaag ctctctactt tgaatttctg 480
ggcaacaacc caatcggctt aatgatcacc atgctatgta aactgacttt cggatatgca 540
gcttacatta tgttcaatta cacaggtaag aagcacaaat ctgggggctt agcgagccac 600
ttctacccac aaagccctct ctttaacgac agcgaacgta accatgtttt gttctctgac 660
atcgggattt gcatcgtctt gtacgcgtgt taccgtattg tgacggtcac aggggcaatg 720
ccggcatttt atgtgtacgg tattccttgg gttataatga gtgctattct ctttgcagca 780
acttatttac aacacactca tccttcaatc cctcattatg atacaacgga gtggaactgg 840
cttagagggg ctttatcgac aattgataga gatttagggt tcttcaacat gaacaaaaca 900
cattatcatg ttatccacca tttgtttcct gtcattccgg aataccatgc acaagaggca 960
accgaggcca tcaagcccat cttaggtcaa tattacaagt atgatggtac tccgtttcta 1020
aaggccttgt ggagagaaat gaaggagtgt atttatgtag aatccgatga aggtcagaag 1080
aaacctgcag gagatctt 1098

<210> SEQ ID NO 103
<211> LENGTH: 30
<212> TYPE: DNA
<213> ORGANISM: Artificial Sequence
<220> FEATURE:
<223> OTHER INFORMATION: primer ocal-15

<400> SEQUENCE: 103
aggatcctgc aggcagccaa gaaggttttg 30

<210> SEQ ID NO 104
<211> LENGTH: 29
<212> TYPE: DNA
<213> ORGANISM: Artificial Sequence
<220> FEATURE:
<223> OTHER INFORMATION: primer ocal-6

<400> SEQUENCE: 104
aagatctcct gcaggtttct tctgacctc 29

<210> SEQ ID NO 105
<211> LENGTH: 8138
<212> TYPE: DNA
<213> ORGANISM: Artificial Sequence
<220> FEATURE:
<223> OTHER INFORMATION: plasmid pKR53B

<400> SEQUENCE: 105
gatccgtcga cggcgcgccc gatcatccgg atatagttcc tcctttcagc aaaaaacccc 60
tcaagacccg tttagaggcc ccaaggggtt atgctagtta ttgctcagcg gtggcagcag 120
ccaactcagc ttcctttcgg gctttgttag cagccggatc gatccaagct gtacctcact 180
attcctttgc cctcggacga gtgctggggc gtcggtttcc actatcggcg agtacttcta 240
cacagccatc ggtccagacg gccgcgcttc tgcgggcgat ttgtgtacgc ccgacagtcc 300
cggctccgga tcggacgatt gcgtcgcatc gaccctgcgc ccaagctgca tcatcgaaat 360
tgccgtcaac caagctctga tagagttggt caagaccaat gcggagcata tacgcccgga 420
gccgcggcga tcctgcaagc tccggatgcc tccgctcgaa gtagcgcgtc tgctgctcca 480
tacaagccaa ccacggcctc cagaagaaga tgttggcgac ctcgtattgg gaatccccga 540
acatcgcctc gctccagtca atgaccgctg ttatgcggcc attgtccgtc aggacattgt 600
tggagccgaa atccgcgtgc acgaggtgcc ggacttcggg gcagtcctcg gcccaaagca 660
tcagctcatc gagagcctgc gcgacggacg cactgacggt gtcgtccatc acagtttgcc 720
agtgatacac atggggatca gcaatcgcgc atatgaaatc acgccatgta gtgtattgac 780
cgattccttg cggtccgaat gggccgaacc cgctcgtctg gctaagatcg gccgcagcga 840
tcgcatccat agcctccgcg accggctgca gaacagcggg cagttcggtt tcaggcaggt 900
cttgcaacgt gacaccctgt gcacggcggg agatgcaata ggtcaggctc tcgctgaatt 960
ccccaatgtc aagcacttcc ggaatcggga gcgcggccga tgcaaagtgc cgataaacat 1020
aacgatcttt gtagaaacca tcggcgcagc tatttacccg caggacatat ccacgccctc 1080
ctacatcgaa gctgaaagca cgagattctt cgccctccga gagctgcatc aggtcggaga 1140
cgctgtcgaa cttttcgatc agaaacttct cgacagacgt cgcggtgagt tcaggctttt 1200
ccatgggtat atctccttct taaagttaaa caaaattatt tctagaggga aaccgttgtg 1260
gtctccctat agtgagtcgt attaatttcg cgggatcgag atcgatccaa ttccaatccc 1320
acaaaaatct gagcttaaca gcacagttgc tcctctcaga gcagaatcgg gtattcaaca 1380
ccctcatatc aactactacg ttgtgtataa cggtccacat gccggtatat acgatgactg 1440
gggttgtaca aaggcggcaa caaacggcgt tcccggagtt gcacacaaga aatttgccac 1500
tattacagag gcaagagcag cagctgacgc gtacacaaca agtcagcaaa cagacaggtt 1560
gaacttcatc cccaaaggag aagctcaact caagcccaag agctttgcta aggccctaac 1620
aagcccacca aagcaaaaag cccactggct cacgctagga accaaaaggc ccagcagtga 1680
tccagcccca aaagagatct cctttgcccc ggagattaca atggacgatt tcctctatct 1740
ttacgatcta ggaaggaagt tcgaaggtga aggtgacgac actatgttca ccactgataa 1800
tgagaaggtt agcctcttca atttcagaaa gaatgctgac ccacagatgg ttagagaggc 1860
ctacgcagca ggtctcatca agacgatcta cccgagtaac aatctccagg agatcaaata 1920
ccttcccaag aaggttaaag atgcagtcaa aagattcagg actaattgca tcaagaacac 1980
agagaaagac atatttctca agatcagaag tactattcca gtatggacga ttcaaggctt 2040
gcttcataaa ccaaggcaag taatagagat tggagtctct aaaaaggtag ttcctactga 2100
atctaaggcc atgcatggag tctaagattc aaatcgagga tctaacagaa ctcgccgtga 2160
agactggcga acagttcata cagagtcttt tacgactcaa tgacaagaag aaaatcttcg 2220
tcaacatggt ggagcacgac actctggtct actccaaaaa tgtcaaagat acagtctcag 2280
aagaccaaag ggctattgag acttttcaac aaaggataat ttcgggaaac ctcctcggat 2340
tccattgccc agctatctgt cacttcatcg aaaggacagt agaaaaggaa ggtggctcct 2400
acaaatgcca tcattgcgat aaaggaaagg ctatcattca agatgcctct gccgacagtg 2460
gtcccaaaga tggaccccca cccacgagga gcatcgtgga aaaagaagac gttccaacca 2520
cgtcttcaaa gcaagtggat tgatgtgaca tctccactga cgtaagggat gacgcacaat 2580
cccactatcc ttcgcaagac ccttcctcta tataaggaag ttcatttcat ttggagagga 2640
cacgctcgag ctcatttctc tattacttca gccataacaa aagaactctt ttctcttctt 2700
attaaaccat gaaaaagcct gaactcaccg cgacgtctgt cgagaagttt ctgatcgaaa 2760
agttcgacag cgtctccgac ctgatgcagc tctcggaggg cgaagaatct cgtgctttca 2820
gcttcgatgt aggagggcgt ggatatgtcc tgcgggtaaa tagctgcgcc gatggtttct 2880
acaaagatcg ttatgtttat cggcactttg catcggccgc gctcccgatt ccggaagtgc 2940
ttgacattgg ggaattcagc gagagcctga cctattgcat ctcccgccgt gcacagggtg 3000
tcacgttgca agacctgcct gaaaccgaac tgcccgctgt tctgcagccg gtcgcggagg 3060
ccatggatgc gatcgctgcg gccgatctta gccagacgag cgggttcggc ccattcggac 3120
cgcaaggaat cggtcaatac actacatggc gtgatttcat atgcgcgatt gctgatcccc 3180
atgtgtatca ctggcaaact gtgatggacg acaccgtcag tgcgtccgtc gcgcaggctc 3240
tcgatgagct gatgctttgg gccgaggact gccccgaagt ccggcacctc gtgcacgcgg 3300
atttcggctc caacaatgtc ctgacggaca atggccgcat aacagcggtc attgactgga 3360
gcgaggcgat gttcggggat tcccaatacg aggtcgccaa catcttcttc tggaggccgt 3420
ggttggcttg tatggagcag cagacgcgct acttcgagcg gaggcatccg gagcttgcag 3480
gatcgccgcg gctccgggcg tatatgctcc gcattggtct tgaccaactc tatcagagct 3540
tggttgacgg caatttcgat gatgcagctt gggcgcaggg tcgatgcgac gcaatcgtcc 3600
gatccggagc cgggactgtc gggcgtacac aaatcgcccg cagaagcgcg gccgtctgga 3660
ccgatggctg tgtagaagta ctcgccgata gtggaaaccg acgccccagc actcgtccga 3720
gggcaaagga atagtgaggt acctaaagaa ggagtgcgtc gaagcagatc gttcaaacat 3780
ttggcaataa agtttcttaa gattgaatcc tgttgccggt cttgcgatga ttatcatata 3840
atttctgttg aattacgtta agcatgtaat aattaacatg taatgcatga cgttatttat 3900
gagatgggtt tttatgatta gagtcccgca attatacatt taatacgcga tagaaaacaa 3960
aatatagcgc gcaaactagg ataaattatc gcgcgcggtg tcatctatgt tactagatcg 4020
atgtcgaatc gatcaacctg cattaatgaa tcggccaacg cgcggggaga ggcggtttgc 4080
gtattgggcg ctcttccgct tcctcgctca ctgactcgct gcgctcggtc gttcggctgc 4140
ggcgagcggt atcagctcac tcaaaggcgg taatacggtt atccacagaa tcaggggata 4200
acgcaggaaa gaacatgtga gcaaaaggcc agcaaaaggc caggaaccgt aaaaaggccg 4260
cgttgctggc gtttttccat aggctccgcc cccctgacga gcatcacaaa aatcgacgct 4320
caagtcagag gtggcgaaac ccgacaggac tataaagata ccaggcgttt ccccctggaa 4380
gctccctcgt gcgctctcct gttccgaccc tgccgcttac cggatacctg tccgcctttc 4440
tcccttcggg aagcgtggcg ctttctcaat gctcacgctg taggtatctc agttcggtgt 4500
aggtcgttcg ctccaagctg ggctgtgtgc acgaaccccc cgttcagccc gaccgctgcg 4560
ccttatccgg taactatcgt cttgagtcca acccggtaag acacgactta tcgccactgg 4620
cagcagccac tggtaacagg attagcagag cgaggtatgt aggcggtgct acagagttct 4680
tgaagtggtg gcctaactac ggctacacta gaaggacagt atttggtatc tgcgctctgc 4740
tgaagccagt taccttcgga aaaagagttg gtagctcttg atccggcaaa caaaccaccg 4800
ctggtagcgg tggttttttt gtttgcaagc agcagattac gcgcagaaaa aaaggatctc 4860
aagaagatcc tttgatcttt tctacggggt ctgacgctca gtggaacgaa aactcacgtt 4920
aagggatttt ggtcatgaca ttaacctata aaaataggcg tatcacgagg ccctttcgtc 4980
tcgcgcgttt cggtgatgac ggtgaaaacc tctgacacat gcagctcccg gagacggtca 5040
cagcttgtct gtaagcggat gccgggagca gacaagcccg tcagggcgcg tcagcgggtg 5100
ttggcgggtg tcggggctgg cttaactatg cggcatcaga gcagattgta ctgagagtgc 5160
accatatgga catattgtcg ttagaacgcg gctacaatta atacataacc ttatgtatca 5220
tacacatacg atttaggtga cactatagaa cggcgcgcca agcttttgat ccatgccctt 5280
catttgccgc ttattaatta atttggtaac agtccgtact aatcagttac ttatccttcc 5340
cccatcataa ttaatcttgg tagtctcgaa tgccacaaca ctgactagtc tcttggatca 5400
taagaaaaag ccaaggaaca aaagaagaca aaacacaatg agagtatcct ttgcatagca 5460
atgtctaagt tcataaaatt caaacaaaaa cgcaatcaca cacagtggac atcacttatc 5520
cactagctga tcaggatcgc cgcgtcaaga aaaaaaaact ggaccccaaa agccatgcac 5580
aacaacacgt actcacaaag gtgtcaatcg agcagcccaa aacattcacc aactcaaccc 5640
atcatgagcc ctcacatttg ttgtttctaa cccaacctca aactcgtatt ctcttccgcc 5700
acctcatttt tgtttatttc aacacccgtc aaactgcatg ccaccccgtg gccaaatgtc 5760
catgcatgtt aacaagacct atgactataa atagctgcaa tctcggccca ggttttcatc 5820
atcaagaacc agttcaatat cctagtacac cgtattaaag aatttaagat atactgcggc 5880
cgcaagtatg aactaaaatg catgtaggtg taagagctca tggagagcat ggaatattgt 5940
atccgaccat gtaacagtat aataactgag ctccatctca cttcttctat gaataaacaa 6000
aggatgttat gatatattaa cactctatct atgcacctta ttgttctatg ataaatttcc 6060
tcttattatt ataaatcatc tgaatcgtga cggcttatgg aatgcttcaa atagtacaaa 6120
aacaaatgtg tactataaga ctttctaaac aattctaacc ttagcattgt gaacgagaca 6180

```
taagtgttaa gaagacataa caattataat ggaagaagtt tgtctccatt tatatattat   6240

atattaccca cttatgtatt atattaggat gttaaggaga cataacaatt ataaagagag   6300

aagtttgtat ccatttatat attatatact acccatttat atattatact tatccactta   6360

tttaatgtct ttataaggtt tgatccatga tatttctaat attttagttg atatgtatat   6420

gaaagggtac tatttgaact ctcttactct gtataaaggt tggatcatcc ttaaagtggg   6480

tctatttaat tttattgctt cttacagata aaaaaaaaat tatgagttgg tttgataaaa   6540

tattgaagga tttaaaataa taataaataa catataatat atgtatataa atttattata   6600

atataacatt tatctataaa aaagtaaata ttgtcataaa tctatacaat cgtttagcct   6660

tgctggacga atctcaatta tttaaacgag agtaaacata tttgactttt tggttattta   6720

acaaattatt atttaacact atatgaaatt ttttttttta tcagcaaaga ataaaattaa   6780

attaagaagg acaatggtgt cccaatcctt atacaaccaa cttccacaag aaagtcaagt   6840

cagagacaac aaaaaaacaa gcaaaggaaa tttttaatt tgagttgtct tgtttgctgc    6900

ataatttatg cagtaaaaca ctacacataa ccccttttagc agtagagcaa tggttgaccg   6960

tgtgcttagc ttcttttatt ttattttttt atcagcaaag aataaataaa ataaaatgag   7020

acacttcagg gatgtttcaa caagcttgga tctcctgcag gtttcttctg accttcatcg   7080

gattctacat aaatacactc cttcatttct ctccacaagg cctttagaaa cggagtacca   7140

tcatacttgt aatattgacc taagatgggc ttgatggcct cggttgcctc ttgtgcatgg   7200

tattccggaa tgacaggaaa caaatggtgg ataacatgat aatgtgtttt gttcatgttg   7260

aagaacccta aatctctatc aattgtcgat aaagcccctc taagccagtt ccactccgtt   7320

gtatcataat gagggattga aggatgagtg tgttgtaaat aagttgctgc aaagagaata   7380

gcactcatta taacccaagg aataccgtac acataaaatg ccggcattgc ccctgtgacc   7440

gtcacaatac ggtaacacgc gtacaagacg atgcaaatcc cgatgtcaga gaacaaaaca   7500

tggttacgtt cgctgtcgtt aaagagaggg ctttgtgggt agaagtggct cgctaagccc   7560

ccagatttgt gcttcttacc tgtgtaattg aacataatgt aagctgcata tccgaaagtc   7620

agtttacata gcatggtgat cattaagccg attgggttgt tgcccagaaa ttcaaagtag   7680

agagcttctg atttgcgttt cgggatatga acctcgtcgt attccatgga attggtgtgt   7740

gcatggtgat tacggtggct atatttgaag gaaaaatagg gagtgagggt ggccgtatgg   7800

attagaaaac cgactgtatc gtcgacccaa cggtaattac tgaagctatg atgaccgcat   7860

tcgtggccga tcatccacaa tctgccgaga aaaactcctt gggagatcca gtaaacaggc   7920

catacgatgc aggaaaggaa acgagggagc atatgaatgt agtttgatgc tacgtagaaa   7980

aggatacatg ttacaataat gtcgtgaaag aggaaataca aggatcggga aagtggtcgt   8040

gaaaaacaat gtggtggtac tgctttcttc agatcattgt attcgaatgg cggttttgag   8100

attggaactc gctccaaaac cttcttggct gcctgcag                           8138
```

<210> SEQ ID NO 106
<211> LENGTH: 7085
<212> TYPE: DNA
<213> ORGANISM: Artificial Sequence
<220> FEATURE:
<223> OTHER INFORMATION: plasmid pKR85

<400> SEQUENCE: 106

```
cgcgccaagc ttttgatcca tgcccttcat ttgccgctta ttaattaatt tggtaacagt     60

ccgtactaat cagttactta tccttccccc atcataatta atcttggtag tctcgaatgc    120
```

```
cacaacactg actagtctct tggatcataa gaaaaagcca aggaacaaaa gaagacaaaa    180
cacaatgaga gtatcctttg catagcaatg tctaagttca taaaattcaa acaaaaacgc    240
aatcacacac agtggacatc acttatccac tagctgatca ggatcgccgc gtcaagaaaa    300
aaaaactgga ccccaaaagc catgcacaac aacacgtact cacaaaggtg tcaatcgagc    360
agcccaaaac attcaccaac tcaacccatc atgagccctc acatttgttg tttctaaccc    420
aacctcaaac tcgtattctc ttccgccacc tcatttttgt ttatttcaac acccgtcaaa    480
ctgcatgcca ccccgtggcc aaatgtccat gcatgttaac aagacctatg actataaata    540
gctgcaatct cggcccaggt tttcatcatc aagaaccagt tcaatatcct agtacaccgt    600
attaaagaat ttaagatata ctgcggccgc aagtatgaac taaaatgcat gtaggtgtaa    660
gagctcatgg agagcatgga atattgtatc cgaccatgta acagtataat aactgagctc    720
catctcactt cttctatgaa taaacaaagg atgttatgat atattaacac tctatctatg    780
caccttattg ttctatgata aatttcctct tattattata aatcatctga atcgtgacgg    840
cttatggaat gcttcaaata gtacaaaaac aaatgtgtac tataagactt tctaaacaat    900
tctaacctta gcattgtgaa cgagacataa gtgttaagaa gacataacaa ttataatgga    960
agaagtttgt ctccatttat atattatata ttacccactt atgtattata ttaggatgtt   1020
aaggagacat aacaattata aagagagaag tttgtatcca tttatatatt atatactacc   1080
catttatata ttatacttat ccacttattt aatgtcttta taaggtttga tccatgatat   1140
ttctaatatt ttagttgata tgtatatgaa agggtactat ttgaactctc ttactctgta   1200
taaaggttgg atcatcctta aagtgggtct atttaatttt attgcttctt acagataaaa   1260
aaaaaattat gagttggttt gataaaatat tgaaggattt aaaataataa taaataacat   1320
ataatatatg tatataaatt tattataata taacatttat ctataaaaaa gtaaatattg   1380
tcataaatct atacaatcgt ttagccttgc tggacgaatc tcaattattt aaacgagagt   1440
aaacatattt gactttttgg ttatttaaca aattattatt taacactata tgaaattttt   1500
tttttatca gcaaagaata aaattaaatt aagaaggaca atggtgtccc aatccttata    1560
caaccaactt ccacaagaaa gtcaagtcag agacaacaaa aaaacaagca aaggaaattt   1620
tttaatttga gttgtcttgt ttgctgcata atttatgcag taaaacacta cacataaccc   1680
ttttagcagt agagcaatgg ttgaccgtgt gcttagcttc ttttatttta ttttttttatc  1740
agcaaagaat aaataaaata aaatgagaca cttcagggat gtttcaacaa gcttggatct   1800
cctgcaggat ctggccggcc ggatctcgta cggatccgtc gacggcgcgc ccgatcatcc   1860
ggatatagtt cctcctttca gcaaaaaacc cctcaagacc cgtttagagg ccccaagggg   1920
ttatgctagt tattgctcag cggtggcagc agccaactca gcttcctttc gggctttgtt   1980
agcagccgga tcgatccaag ctgtacctca ctattccttt gccctcggac gagtgctggg   2040
gcgtcggttt ccactatcgg cgagtacttc tacacagcca tcggtccaga cggccgcgct   2100
tctgcgggcg atttgtgtac gcccgacagt cccggctccg gatcggacga ttgcgtcgca   2160
tcgaccctgc gcccaagctg catcatcgaa attgccgtca accaagctct gatagagttg   2220
gtcaagacca atgcggagca tatacgcccg gagccgcggc gatcctgcaa gctccggatg   2280
cctccgctcg aagtagcgcg tctgctgctc catacaagcc aaccacggcc tccagaagaa   2340
gatgttggcg acctcgtatt gggaatcccc gaacatcgcc tcgctccagt caatgaccgc   2400
tgttatgcgg ccattgtccg tcaggacatt gttggagccg aaatccgcgt gcacgaggtg   2460
ccggacttcg ggcagtcct cggcccaaag catcagctca tcgagagcct gcgcgacgga    2520
```

```
cgcactgacg gtgtcgtcca tcacagtttg ccagtgatac acatggggat cagcaatcgc   2580
gcatatgaaa tcacgccatg tagtgtattg accgattcct tgcggtccga atgggccgaa   2640
cccgctcgtc tggctaagat cggccgcagc gatcgcatcc atagcctccg cgaccggctg   2700
cagaacagcg ggcagttcgg tttcaggcag gtcttgcaac gtgacaccct gtgcacggcg   2760
ggagatgcaa taggtcaggc tctcgctgaa ttccccaatg tcaagcactt ccggaatcgg   2820
gagcgcggcc gatgcaaagt gccgataaac ataacgatct ttgtagaaac catcggcgca   2880
gctatttacc cgcaggacat atccacgccc tcctacatcg aagctgaaag cacgagattc   2940
ttcgccctcc gagagctgca tcaggtcgga gacgctgtcg aacttttcga tcagaaactt   3000
ctcgacagac gtcgcggtga gttcaggctt ttccatgggt atatctcctt cttaaagtta   3060
aacaaaatta tttctagagg gaaaccgttg tggtctccct atagtgagtc gtattaattt   3120
cgcgggatcg agatcgatcc aattccaatc ccacaaaaat ctgagcttaa cagcacagtt   3180
gctcctctca gagcagaatc gggtattcaa caccctcata tcaactacta cgttgtgtat   3240
aacggtccac atgccggtat atacgatgac tggggttgta caaaggcggc aacaaacggc   3300
gttcccggag ttgcacacaa gaaatttgcc actattacag aggcaagagc agcagctgac   3360
gcgtacacaa caagtcagca aacagacagg ttgaacttca tccccaaagg agaagctcaa   3420
ctcaagccca agagctttgc taaggcccta acaagcccac caaagcaaaa agcccactgg   3480
ctcacgctag gaaccaaaag gcccagcagt gatccagccc caaaagagat ctcctttgcc   3540
ccggagatta caatggacga tttcctctat ctttacgatc taggaaggaa gttcgaaggt   3600
gaaggtgacg acactatgtt caccactgat aatgagaagg ttagcctctt caatttcaga   3660
aagaatgctg acccacagat ggttagagag gcctacgcag caggtctcat caagacgatc   3720
tacccgagta acaatctcca ggagatcaaa taccttccca agaaggttaa agatgcagtc   3780
aaaagattca ggactaattg catcaagaac acagagaaag acatatttct caagatcaga   3840
agtactattc cagtatggac gattcaaggc ttgcttcata aaccaaggca agtaatagag   3900
attggagtct ctaaaaaggt agttcctact gaatctaagg ccatgcatgg agtctaagat   3960
tcaaatcgag gatctaacag aactcgccgt gaagactggc gaacagttca tacagagtct   4020
tttacgactc aatgacaaga agaaaatctt cgtcaacatg gtggagcacg acactctggt   4080
ctactccaaa aatgtcaaag atacagtctc agaagaccaa agggctattg agacttttca   4140
acaaaggata atttcgggaa acctcctcgg attccattgc ccagctatct gtcacttcat   4200
cgaaaggaca gtagaaaagg aaggtggctc ctacaaatgc catcattgcg ataaaggaaa   4260
ggctatcatt caagatgcct ctgccgacag tggtcccaaa gatggacccc cacccacgag   4320
gagcatcgtg gaaaaagaag acgttccaac cacgtcttca aagcaagtgg attgatgtga   4380
catctccact gacgtaaggg atgacgcaca atcccactat ccttcgcaag acccttcctc   4440
tatataagga agttcatttc atttggagag gacacgctcg agctcatttc tctattactt   4500
cagccataac aaaagaactc ttttctcttc ttattaaacc atgaaaaagc ctgaactcac   4560
cgcgacgtct gtcgagaagt ttctgatcga aaagttcgac agcgtctccg acctgatgca   4620
gctctcggag ggcgaagaat ctcgtgcttt cagcttcgat gtaggagggc gtggatatgt   4680
cctgcgggta aatagctgcg ccgatggttt ctacaaagat cgttatgttt atcggcactt   4740
tgcatcggcc gcgctcccga ttccggaagt gcttgacatt ggggaattca gcgagagcct   4800
gacctattgc atctcccgcc gtgcacaggg tgtcacgttg caagacctgc ctgaaaccga   4860
actgcccgct gttctgcagc cggtcgcgga ggccatggat gcgatcgctg cggccgatct   4920
```

```
tagccagacg agcgggttcg gcccattcgg accgcaagga atcggtcaat acactacatg   4980
gcgtgatttc atatgcgcga ttgctgatcc ccatgtgtat cactggcaaa ctgtgatgga   5040
cgacaccgtc agtgcgtccg tcgcgcaggc tctcgatgag ctgatgcttt gggccgagga   5100
ctgccccgaa gtccggcacc tcgtgcacgc ggatttcggc tccaacaatg tcctgacgga   5160
caatggccgc ataacagcgg tcattgactg gagcgaggcg atgttcgggg attcccaata   5220
cgaggtcgcc aacatcttct tctggaggcc gtggttggct tgtatggagc agcagacgcg   5280
ctacttcgag cggaggcatc cggagcttgc aggatcgccg cggctccggg cgtatatgct   5340
ccgcattggt cttgaccaac tctatcagag cttggttgac ggcaatttcg atgatgcagc   5400
ttgggcgcag ggtcgatgcg acgcaatcgt ccgatccgga gccgggactg tcgggcgtac   5460
acaaatcgcc cgcagaagcg cggccgtctg gaccgatggc tgtgtagaag tactcgccga   5520
tagtggaaac cgacgcccca gcactcgtcc gagggcaaag gaatagtgag gtacctaaag   5580
aaggagtgcg tcgaagcaga tcgttcaaac atttggcaat aaagtttctt aagattgaat   5640
cctgttgccg gtcttgcgat gattatcata taatttctgt tgaattacgt taagcatgta   5700
ataattaaca tgtaatgcat gacgttattt atgagatggg tttttatgat tagagtcccg   5760
caattataca tttaatacgc gatagaaaac aaaatatagc gcgcaaacta ggataaatta   5820
tcgcgcgcgg tgtcatctat gttactagat cgatgtcgaa tcgatcaacc tgcattaatg   5880
aatcggccaa cgcgcgggga gaggcggttt gcgtattggg cgctcttccg cttcctcgct   5940
cactgactcg ctgcgctcgg tcgttcggct gcggcgagcg gtatcagctc actcaaaggc   6000
ggtaatacgg ttatccacag aatcagggga taacgcagga aagaacatgt gagcaaaagg   6060
ccagcaaaag gccaggaacc gtaaaaaggc cgcgttgctg gcgtttttcc ataggctccg   6120
cccccctgac gagcatcaca aaaatcgacg ctcaagtcag aggtggcgaa acccgacagg   6180
actataaaga taccaggcgt ttccccctgg aagctccctc gtgcgctctc ctgttccgac   6240
cctgccgctt accggatacc tgtccgcctt tctcccttcg ggaagcgtgg cgctttctca   6300
atgctcacgc tgtaggtatc tcagttcggt gtaggtcgtt cgctccaagc tgggctgtgt   6360
gcacgaaccc cccgttcagc ccgaccgctg cgccttatcc ggtaactatc gtcttgagtc   6420
caacccggta agacacgact tatcgccact ggcagcagcc actggtaaca ggattagcag   6480
agcgaggtat gtaggcggtg ctacagagtt cttgaagtgg tggcctaact acggctacac   6540
tagaaggaca gtatttggta tctgcgctct gctgaagcca gttaccttcg gaaaaagagt   6600
tggtagctct tgatccggca aacaaaccac cgctggtagc ggtggttttt ttgtttgcaa   6660
gcagcagatt acgcgcagaa aaaaaggatc tcaagaagat cctttgatct tttctacggg   6720
gtctgacgct cagtggaacg aaaactcacg ttaagggatt ttggtcatga cattaaccta   6780
taaaaatagg cgtatcacga ggccctttcg tctcgcgcgt ttcggtgatg acggtgaaaa   6840
cctctgacac atgcagctcc cggagacggt cacagcttgt ctgtaagcgg atgccgggag   6900
cagacaagcc cgtcagggcg cgtcagcggg tgttggcggg tgtcggggct ggcttaacta   6960
tgcggcatca gagcagattg tactgagagt gcaccatatg gacatattgt cgttagaacg   7020
cggctacaat taatacataa ccttatgtat catacacata cgatttaggt gacactatag   7080
aacgg                                                               7085
```

<210> SEQ ID NO 107
<211> LENGTH: 22
<212> TYPE: DNA
<213> ORGANISM: Artificial Sequence
<220> FEATURE:
<223> OTHER INFORMATION: primer oKR85-1

<400> SEQUENCE: 107
actcgaggcg cgccgtcgac gg 22

<210> SEQ ID NO 108
<211> LENGTH: 18
<212> TYPE: DNA
<213> ORGANISM: Artificial Sequence
<220> FEATURE:
<223> OTHER INFORMATION: primer oKR85-2

<400> SEQUENCE: 108
aagatctggc gcgccaag 18

<210> SEQ ID NO 109
<211> LENGTH: 4827
<212> TYPE: DNA
<213> ORGANISM: Artificial Sequence
<220> FEATURE:
<223> OTHER INFORMATION: plasmid pPCR85

<400> SEQUENCE: 109
actcgaggcg cgccgtcgac ggatccgtac gagatccggc cggccagatc ctgcaggaga 60
tccaagcttg ttgaaacatc cctgaagtgt ctcattttat tttatttatt ctttgctgat 120
aaaaaaataa aataaaagaa gctaagcaca cggtcaacca ttgctctact gctaaaaggg 180
ttatgtgtag tgttttactg cataaattat gcagcaaaca agacaactca aattaaaaaa 240
tttcctttgc ttgttttttt gttgtctctg acttgacttt cttgtggaag ttggttgtat 300
aaggattggg acaccattgt ccttcttaat ttaattttat tctttgctga taaaaaaaaa 360
aatttcatat agtgttaaat aataatttgt taaataacca aaaagtcaaa tatgtttact 420
ctcgtttaaa taattgagat tcgtccagca aggctaaacg attgtataga tttatgacaa 480
tatttacttt tttatagata aatgttatat tataataaat ttatatacat atattatatg 540
ttatttatta ttattttaaa tccttcaata ttttatcaaa ccaactcata attttttttt 600
tatctgtaag aagcaataaa attaaataga cccactttaa ggatgatcca acctttatac 660
agagtaagag agttcaaata gtaccctttc atatacatat caactaaaat attagaaata 720
tcatggatca aaccttataa agacattaaa taagtggata agtataatat ataaatgggt 780
agtatataat atataaatgg atacaaactt ctctctttat aattgttatg tctccttaac 840
atcctaatat aatacataag tgggtaatat ataatatata aatggagaca aacttcttcc 900
attataattg ttatgtcttc ttaacactta tgtctcgttc acaatgctaa ggttagaatt 960
gtttagaaag tcttatagta cacatttgtt tttgtactat ttgaagcatt ccataagccg 1020
tcacgattca gatgatttat aataataaga ggaaatttat catagaacaa taaggtgcat 1080
agatagagtg ttaatatatc ataacatcct ttgtttattc atagaagaag tgagatggag 1140
ctcagttatt atactgttac atggtcggat acaatattcc atgctctcca tgagctctta 1200
cacctacatg cattttagtt catacttgcg gccgcagtat atcttaaatt ctttaatacg 1260
gtgtactagg atattgaact ggttcttgat gatgaaaacc tgggccgaga ttgcagctat 1320
ttatagtcat aggtcttgtt aacatgcatg gacatttggc cacggggtgg catgcagttt 1380
gacgggtgtt gaaataaaca aaaatgaggt ggcggaagag aatacgagtt tgaggttggg 1440
ttagaaacaa caaatgtgag ggctcatgat gggttgagtt ggtgaatgtt ttgggctgct 1500
cgattgacac ctttgtgagt acgtgttgtt gtgcatggct tttggggtcc agttttttt 1560

```
tcttgacgcg gcgatcctga tcagctagtg gataagtgat gtccactgtg tgtgattgcg   1620
tttttgtttg aattttatga acttagacat tgctatgcaa aggatactct cattgtgttt   1680
tgtcttcttt tgttccttgg ctttttctta tgatccaaga gactagtcag tgttgtggca   1740
ttcgagacta ccaagattaa ttatgatggg ggaaggataa gtaactgatt agtacggact   1800
gttaccaaat taattaataa gcggcaaatg aagggcatgg atcaaaagct tggcgcgcca   1860
gatcttgggc tagagcggcc gccaccgcgg tggagctcca gcttttgttc cctttagtga   1920
gggttaattg cgcgcttggc gtaatcatgg tcatagctgt ttcctgtgtg aaattgttat   1980
ccgctcacaa ttccacacaa catacgagcc ggaagcataa agtgtaaagc ctggggtgcc   2040
taatgagtga gctaactcac attaattgcg ttgcgctcac tgcccgcttt ccagtcggga   2100
aacctgtcgt gccagctgca ttaatgaatc ggccaacgcg cggggagagg cggtttgcgt   2160
attgggcgct cttccgcttc ctcgctcact gactcgctgc gctcggtcgt tcggctgcgg   2220
cgagcggtat cagctcactc aaaggcggta atacggttat ccacagaatc aggggataac   2280
gcaggaaaga acatgtgagc aaaaggccag caaaaggcca ggaaccgtaa aaaggccgcg   2340
ttgctggcgt ttttccatag gctccgcccc cctgacgagc atcacaaaaa tcgacgctca   2400
agtcagaggt ggcgaaaccc gacaggacta taaagatacc aggcgtttcc ccctggaagc   2460
tccctcgtgc gctctcctgt tccgaccctg ccgcttaccg gatacctgtc cgcctttctc   2520
ccttcgggaa gcgtggcgct ttctcatagc tcacgctgta ggtatctcag ttcggtgtag   2580
gtcgttcgct ccaagctggg ctgtgtgcac gaaccccccg ttcagcccga ccgctgcgcc   2640
ttatccggta actatcgtct tgagtccaac ccggtaagac acgacttatc gccactggca   2700
gcagccactg gtaacaggat tagcagagcg aggtatgtag gcggtgctac agagttcttg   2760
aagtggtggc ctaactacgg ctacactaga aggacagtat ttggtatctg cgctctgctg   2820
aagccagtta ccttcggaaa aagagttggt agctcttgat ccggcaaaca aaccaccgct   2880
ggtagcggtg gtttttttgt ttgcaagcag cagattacgc gcagaaaaaa aggatctcaa   2940
gaagatcctt tgatcttttc tacggggtct gacgctcagt ggaacgaaaa ctcacgttaa   3000
gggattttgg tcatgagatt atcaaaaagg atcttcacct agatcctttt aaattaaaaa   3060
tgaagtttta aatcaatcta aagtatatat gagtaaactt ggtctgacag ttaccaatgc   3120
ttaatcagtg aggcacctat ctcagcgatc tgtctatttc gttcatccat agttgcctga   3180
ctccccgtcg tgtagataac tacgatacgg gagggcttac catctggccc cagtgctgca   3240
atgataccgc gagacccacg ctcaccggct ccagatttat cagcaataaa ccagccagcc   3300
ggaagggccg agcgcagaag tggtcctgca actttatccg cctccatcca gtctattaat   3360
tgttgccggg aagctagagt aagtagttcg ccagttaata gtttgcgcaa cgttgttgcc   3420
attgctacag gcatcgtggt gtcacgctcg tcgtttggta tggcttcatt cagctccggt   3480
tcccaacgat caaggcgagt tacatgatcc cccatgttgt gcaaaaaagc ggttagctcc   3540
ttcggtcctc cgatcgttgt cagaagtaag ttggccgcag tgttatcact catggttatg   3600
gcagcactgc ataattctct tactgtcatg ccatccgtaa gatgcttttc tgtgactggt   3660
gagtactcaa ccaagtcatt ctgagaatag tgtatgcggc gaccgagttg ctcttgcccg   3720
gcgtcaatac gggataatac cgcgccacat agcagaactt taaaagtgct catcattgga   3780
aaacgttctt cggggcgaaa actctcaagg atcttaccgc tgttgagatc cagttcgatg   3840
taacccactc gtgcacccaa ctgatcttca gcatctttta ctttcaccag cgtttctggg   3900
tgagcaaaaa caggaaggca aaatgccgca aaaaagggaa taagggcgac acggaaatgt   3960
```

```
tgaatactca tactcttcct ttttcaatat tattgaagca tttatcaggg ttattgtctc   4020
atgagcggat acatatttga atgtatttag aaaaataaac aaataggggt tccgcgcaca   4080
tttccccgaa aagtgccacc taaattgtaa gcgttaatat tttgttaaaa ttcgcgttaa   4140
atttttgtta aatcagctca ttttttaacc aataggccga aatcggcaaa atcccttata   4200
aatcaaaaga atagaccgag atagggttga gtgttgttcc agtttggaac aagagtccac   4260
tattaaagaa cgtggactcc aacgtcaaag ggcgaaaaac cgtctatcag ggcgatggcc   4320
cactacgtga accatcaccc taatcaagtt ttttggggtc gaggtgccgt aaagcactaa   4380
atcggaaccc taaagggagc ccccgattta gagcttgacg gggaaagccg gcgaacgtgg   4440
cgagaaagga agggaagaaa gcgaaaggag cgggcgctag ggcgctggca agtgtagcgg   4500
tcacgctgcg cgtaaccacc acacccgccg cgcttaatgc gccgctacag ggcgcgtccc   4560
attcgccatt caggctgcgc aactgttggg aagggcgatc ggtgcgggcc tcttcgctat   4620
tacgccagct ggcgaaaggg ggatgtgctg caaggcgatt aagttgggta acgccagggt   4680
tttcccagtc acgacgttgt aaaacgacgg ccagtgagcg cgcgtaatac gactcactat   4740
agggcgaatt gggtaccggg ccccccctcg aggtcgacgg tatcgataag cttgatatcg   4800
aattcctgca gcccggggga tccgccc                                        4827
```

<210> SEQ ID NO 110
<211> LENGTH: 15114
<212> TYPE: DNA
<213> ORGANISM: Artificial Sequence
<220> FEATURE:
<223> OTHER INFORMATION: plasmid pKR91

<400> SEQUENCE: 110

```
gatctggcgc gccaagcttt tgatccatgc ccttcatttg ccgcttatta attaatttgg     60
taacagtccg tactaatcag ttacttatcc ttcccccatc ataattaatc ttggtagtct    120
cgaatgccac aacactgact agtctcttgg atcataagaa aaagccaagg aacaaaagaa    180
gacaaaacac aatgagagta tcctttgcat agcaatgtct aagttcataa aattcaaaca    240
aaaacgcaat cacacacagt ggacatcact tatccactag ctgatcagga tcgccgcgtc    300
aagaaaaaaa aactggaccc caaaagccat gcacaacaac acgtactcac aaaggtgtca    360
atcgagcagc ccaaaacatt caccaactca acccatcatg agccctcaca tttgttgttt    420
ctaacccaac ctcaaactcg tattctcttc cgccacctca tttttgttta tttcaacacc    480
cgtcaaactg catgccaccc cgtggccaaa tgtccatgca tgttaacaag acctatgact    540
ataaatagct gcaatctcgg cccaggtttt catcatcaag aaccagttca atatcctagt    600
acaccgtatt aaagaattta agatatactg cggccgcaag tatgaactaa aatgcatgta    660
ggtgtaagag ctcatggaga gcatggaata ttgtatccga ccatgtaaca gtataataac    720
tgagctccat ctcacttctt ctatgaataa acaaaggatg ttatgatata ttaacactct    780
atctatgcac cttattgttc tatgataaat ttcctcttat tattataaat catctgaatc    840
gtgacggctt atggaatgct tcaaatagta caaaaacaaa tgtgtactat aagactttct    900
aaacaattct aaccttagca ttgtgaacga gacataagtg ttaagaagac ataacaatta    960
taatggaaga agtttgtctc catttatata ttatatatta cccacttatg tattatatta   1020
ggatgttaag gagacataac aattataaag agagaagttt gtatccattt atatattata   1080
tactacccat ttatatatta tacttatcca cttatttaat gtctttataa ggtttgatcc   1140
atgatatttc taatatttta gttgatatgt atatgaaagg gtactatttg aactctctta   1200
```

```
ctctgtataa aggttggatc atccttaaag tgggtctatt taattttatt gcttcttaca   1260
gataaaaaaa aaattatgag ttggtttgat aaaatattga aggatttaaa ataataataa   1320
ataacatata atatatgtat ataaatttat tataatataa catttatcta taaaaaagta   1380
aatattgtca taaatctata caatcgttta gccttgctgg acgaatctca attatttaaa   1440
cgagagtaaa catatttgac tttttggtta tttaacaaat tattatttaa cactatatga   1500
aatttttttt tttatcagca aagaataaaa ttaaattaag aaggacaatg gtgtcccaat   1560
ccttatacaa ccaacttcca caagaaagtc aagtcagaga caacaaaaaa acaagcaaag   1620
gaaatttttt aatttgagtt gtcttgtttg ctgcataatt tatgcagtaa aacactacac   1680
ataacccttt tagcagtaga gcaatggttg accgtgtgct tagcttcttt tattttattt   1740
ttttatcagc aaagaataaa taaaataaaa tgagacactt cagggatgtt tcaacaagct   1800
tggatctcct gcaggatctg gccggccgga tctcgtacgg atccgtcgac ggcgcgcctc   1860
gagtgggcgg atcccccggg ctgcaggaat tcactggccg tcgttttaca acgtcgtgac   1920
tgggaaaacc ctggcgttac ccaacttaat cgccttgcag cacatccccc tttcgccagc   1980
tggcgtaata gcgaagaggc ccgcaccgat cgcccttccc aacagttgcg cagcctgaat   2040
ggcgaatgga tcgatccatc gcgatgtacc ttttgttagt cagcctctcg attgctcatc   2100
gtcattacac agtaccgaag tttgatcgat ctagtaacat agatgacacc gcgcgcgata   2160
atttatccta gtttgcgcgc tatattttgt tttctatcgc gtattaaatg tataattgcg   2220
ggactctaat cataaaaacc catctcataa ataacgtcat gcattacatg ttaattatta   2280
catgcttaac gtaattcaac agaaattata tgataatcat cgcaagaccg gcaacaggat   2340
tcaatcttaa gaaactttat tgccaaatgt ttgaacgatc tgcttcgacg cactccttct   2400
ttactccacc atctcgtcct tattgaaaac gtgggtagca ccaaaacgaa tcaagtcgct   2460
ggaactgaag ttaccaatca cgctggatga tttgccagtt ggattaatct tgcctttccc   2520
cgcatgaata atattgatga atgcatgcgt gaggggtagt tcgatgttgg caatagctgc   2580
aattgccgcg acatcctcca acgagcataa ttcttcagaa aaatagcgat gttccatgtt   2640
gtcagggcat gcatgatgca cgttatgagg tgacggtgct aggcagtatt ccctcaaagt   2700
ttcatagtca gtatcatatt catcattgca ttcctgcaag agagaattga gacgcaatcc   2760
acacgctgcg gcaaccttcc ggcgttcgtg gtctatttgc tcttggacgt tgcaaacgta   2820
agtgttggat cgatccgggg tgggcgaaga actccagcat gagatccccg cgctggagga   2880
tcatccagcc ggcgtcccgg aaaacgattc cgaagcccaa cctttcatag aaggcggcgg   2940
tggaatcgaa atctcgtgat ggcaggttgg gcgtcgcttg gtcggtcatt tcgaacccca   3000
gagtcccgct cagaagaact cgtcaagaag gcgatagaag gcgatgcgct gcgaatcggg   3060
agcggcgata ccgtaaagca cgaggaagcg gtcagcccat tcgccgccaa gctcttcagc   3120
aatatcacgg gtagccaacg ctatgtcctg atagcggtcc gccacaccca gccggccaca   3180
gtcgatgaat ccagaaaagc ggccattttc caccatgata ttcggcaagc aggcatcgcc   3240
atgggtcacg acgagatcct cgccgtcggg catgcgcgcc ttgagcctgg cgaacagttc   3300
ggctggcgcg agcccctgat gctcttcgtc cagatcatcc tgatcgacaa gaccggcttc   3360
catccgagta cgtgctcgct cgatgcgatg tttcgcttgg tggtcgaatg ggcaggtagc   3420
cggatcaagc gtatgcagcc gccgcattgc atcagccatg atggatactt tctcggcagg   3480
agcaaggtga gatgacagga gatcctgccc cggcacttcg cccaatagca gccagtccct   3540
tcccgcttca gtgacaacgt cgagcacagc tgcgcaagga acgcccgtcg tggccagcca   3600
```

-continued

```
cgatagccgc gctgcctcgt cctgcagttc attcagggca ccggacaggt cggtcttgac   3660
aaaaagaacc gggcgcccct gcgctgacag ccggaacacg gcggcatcag agcagccgat   3720
tgtctgttgt gcccagtcat agccgaatag cctctccacc caagcggccg gagaacctgc   3780
gtgcaatcca tcttgttcaa tcatgcgaaa cgatccccgc aagcttggag actggtgatt   3840
tcagcgtgtc ctctccaaat gaaatgaact tccttatata gaggaagggt cttgcgaagg   3900
atagtgggat tgtgcgtcat cccttacgtc agtggagata tcacatcaat ccacttgctt   3960
tgaagacgtg gttggaacgt cttctttttc cacgatgctc ctcgtgggtg ggggtccatc   4020
tttgggacca ctgtcggcag aggcatcttc aacgatggcc tttcctttat cgcaatgatg   4080
gcatttgtag gagccacctt ccttttccac tatcttcaca ataaagtgac agatagctgg   4140
gcaatggaat ccgaggaggt ttccggatat taccctttgt tgaaaagtct caattgccct   4200
ttggtcttct gagactgtat ctttgatatt tttggagtag acaagcgtgt cgtgctccac   4260
catgttgacg aagattttct tcttgtcatt gagtcgtaag agactctgta tgaactgttc   4320
gccagtcttt acggcgagtt ctgttaggtc ctctatttga atctttgact ccatggcctt   4380
tgattcagtg ggaactacct tttagagac tccaatctct attacttgcc ttggtttgtg    4440
aagcaagcct tgaatcgtcc atactggaat agtacttctg atcttgagaa atatatcttt   4500
ctctgtgttc ttgatgcagt tagtcctgaa tcttttgact gcatctttaa ccttcttggg   4560
aaggtatttg atctcctgga gattattgct cgggtagatc gtcttgatga gacctgctgc   4620
gtaagcctct ctaaccatct gtgggttagc attctttctg aaattgaaaa ggctaatctt   4680
ctcattatca gtggtgaaca tggtatcgtc accttctccg tcgaacttcc tgactagatc   4740
gtagagatag aggaagtcgt ccattgtgat ctctggggca aaggagatct gaattaattc   4800
gatatggtgg atttatcaca aatgggaccc gccgccgaca gaggtgtgat gttaggccag   4860
gactttgaaa atttgcgcaa ctatcgtata gtggccgaca aattgacgcc gagttgacag   4920
actgcctagc atttgagtga attatgtgag gtaatgggct acactgaatt ggtagctcaa   4980
actgtcagta tttatgtata tgagtgtata ttttcgcata atctcagacc aatctgaaga   5040
tgaaatgggt atctgggaat ggcgaaatca aggcatcgat cgtgaagttt ctcatctaag   5100
cccccatttg gacgtgaatg tagacacgtc gaaataaaga tttccgaatt agaataattt   5160
gtttattgct ttcgcctata aatacgacgg atcgtaattt gtcgttttat caaaatgtac   5220
tttcatttta taataacgct gcggacatct acatttttga attgaaaaaa aattggtaat   5280
tactctttct ttttctccat attgaccatc atactcattg ctgatccatg tagatttccc   5340
ggacatgaag ccatttacaa ttgaatatat cctgccgccg ctgccgcttt gcacccggtg   5400
gagcttgcat gttggtttct acgcagaact gagccggtta ggcagataat ttccattgag   5460
aactgagcca tgtgcacctt ccccccaaca cggtgagcga cggggcaacg gagtgatcca   5520
catgggactt ttaaacatca tccgtcggat ggcgttgcga gagaagcagt cgatccgtga   5580
gatcagccga cgcaccgggc aggcgcgcaa cacgatcgca aagtatttga acgcaggtac   5640
aatcgagccg acgttcacgc ggaacgacca agcaagctag ctttaatgcg gtagtttatc   5700
acagttaaat tgctaacgca gtcaggcacc gtgtatgaaa tctaacaatg cgctcatcgt   5760
catcctcggc accgtcaccc tggatgctgt aggcataggc ttggttatgc cggtactgcc   5820
gggcctcttg cgggatatcg tccattccga cagcatcgcc agtcactatg gcgtgctgct   5880
agcgctatat gcgttgatgc aatttctatg cgcacccgtt ctcggagcac tgtccgaccg   5940
ctttggccgc cgcccagtcc tgctcgcttc gctacttgga gccactatcg actacgcgat   6000
```

catggcgacc acacccgtcc tgtggtccaa cccctccgct gctatagtgc agtcggcttc 6060
tgacgttcag tgcagccgtc ttctgaaaac gacatgtcgc acaagtccta agttacgcga 6120
caggctgccg ccctgccctt ttcctggcgt tttcttgtcg cgtgttttag tcgcataaag 6180
tagaatactt gcgactagaa ccggagacat tacgccatga acaagagcgc cgccgctggc 6240
ctgctgggct atgcccgcgt cagcaccgac gaccaggact tgaccaacca acgggccgaa 6300
ctgcacgcgg ccggctgcac caagctgttt tccgagaaga tcaccggcac caggcgcgac 6360
cgcccggagc tggccaggat gcttgaccac ctacgccctg gcgacgttgt gacagtgacc 6420
aggctagacc gcctggcccg cagcacccgc gacctactgg acattgccga gcgcatccag 6480
gaggccggcg cgggcctgcg tagcctggca gagccgtggg ccgacaccac cacgccggcc 6540
ggccgcatgg tgttgaccgt gttcgccggc attgccgagt tcgagcgttc cctaatcatc 6600
gaccgcaccc ggagcgggcg cgaggccgcc aaggcccgag gcgtgaagtt tggcccccgc 6660
cctaccctca ccccggcaca gatcgcgcac gcccgcgagc tgatcgacca ggaaggccgc 6720
accgtgaaag aggcggctgc actgcttggc gtgcatcgct cgaccctgta ccgcgcactt 6780
gagcgcagcg aggaagtgac gcccaccgag gccaggcggc gcggtgcctt ccgtgaggac 6840
gcattgaccg aggccgacgc cctggcggcc gccgagaatg aacgccaaga ggaacaagca 6900
tgaaaccgca ccaggacggc caggacgaac cgtttttcat taccgaagag atcgaggcgg 6960
agatgatcgc ggccgggtac gtgttcgagc cgcccgcgca cgtctcaacc gtgcggctgc 7020
atgaaatcct ggccggtttg tctgatgcca agctggcggc ctggccggcc agcttggccg 7080
ctgaagaaac cgagcgccgc cgtctaaaaa ggtgatgtgt atttgagtaa aacagcttgc 7140
gtcatgcggt cgctgcgtat atgatgcgat gagtaaataa acaaatacgc aagggaacgc 7200
atgaagttat cgctgtactt aaccagaaag gcgggtcagg caagacgacc atcgcaaccc 7260
atctagcccg cgccctgcaa ctcgccgggg ccgatgttct gttagtcgat tccgatcccc 7320
agggcagtgc ccgcgattgg gcggccgtgc gggaagatca accgctaacc gttgtcggca 7380
tcgaccgccc gacgattgac cgcgacgtga aggccatcgg ccggcgcgac ttcgtagtga 7440
tcgacggagc gccccaggcg gcggacttgg ctgtgtccgc gatcaaggca gccgacttcg 7500
tgctgattcc ggtgcagcca agcccttacg acatatgggc caccgccgac ctggtggagc 7560
tggttaagca gcgcattgag gtcacggatg gaaggctaca agcggccttt gtcgtgtcgc 7620
gggcgatcaa aggcacgcgc atcggcggtg aggttgccga ggcgctggcc gggtacgagc 7680
tgcccattct tgagtcccgt atcacgcagc gcgtgagcta cccaggcact gccgccgccg 7740
gcacaaccgt tcttgaatca gaacccgagg gcgacgctgc ccgcgaggtc caggcgctgg 7800
ccgctgaaat taaatcaaaa ctcatttgag ttaatgaggt aaagagaaaa tgagcaaaag 7860
cacaaacacg ctaagtgccg gccgtccgag cgcacgcagc agcaaggctg caacgttggc 7920
cagcctggca gacacgccag ccatgaagcg ggtcaacttt cagttgccgg cggaggatca 7980
caccaagctg aagatgtacg cggtacgcca aggcaagacc attaccgagc tgctatctga 8040
atacatcgcg cagctaccag agtaaatgag caaatgaata aatgagtaga tgaattttag 8100
cggctaaagg aggcggcatg gaaaatcaag aacaaccagg caccgacgcc gtggaatgcc 8160
ccatgtgtgg aggaacgggc ggttggccag gcgtaagcgg ctgggttgtc tgccggccct 8220
gcaatggcac tggaaccccc aagcccgagg aatcggcgtg agcggtcgca aaccatccgg 8280
cccggtacaa atcggcgcgg cgctgggtga tgacctggtg gagaagttga aggccgcgca 8340
ggccgcccag cggcaacgca tcgaggcaga agcacgcccc ggtgaatcgt ggcaagcggc 8400

```
cgctgatcga atccgcaaag aatcccggca accgccggca gccggtgcgc cgtcgattag   8460
gaagccgccc aagggcgacg agcaaccaga tttttcgtt ccgatgctct atgacgtggg   8520
cacccgcgat agtcgcagca tcatggacgt ggccgttttc cgtctgtcga agcgtgaccg   8580
acgagctggc gaggtgatcc gctacgagct tccagacggg cacgtagagg tttccgcagg   8640
gccggccggc atggccagtg tgtgggatta cgacctggta ctgatggcgg tttcccatct   8700
aaccgaatcc atgaaccgat accgggaagg gaagggagac aagcccggcc gcgtgttccg   8760
tccacacgtt gcggacgtac tcaagttctg ccggcgagcc gatggcggaa agcagaaaga   8820
cgacctggta gaaacctgca ttcggttaaa caccacgcac gttgccatgc agcgtacgaa   8880
gaaggccaag aacggccgcc tggtgacggt atccgagggt gaagccttga ttagccgcta   8940
caagatcgta aagagcgaaa ccgggcggcc ggagtacatc gagatcgagc tagctgattg   9000
gatgtaccgc gagatcacag aaggcaagaa cccggacgtg ctgacggttc accccgatta   9060
ctttttgatc gatcccggca tcggccgttt tctctaccgc ctggcacgcc gcgccgcagg   9120
caaggcagaa gccagatggt tgttcaagac gatctacgaa cgcagtggca gcgccggaga   9180
gttcaagaag ttctgtttca ccgtgcgcaa gctgatcggg tcaaatgacc tgccggagta   9240
cgatttgaag gaggaggcgg ggcaggctgg cccgatccta gtcatgcgct accgcaacct   9300
gatcgagggc gaagcatccg ccggttccta atgtacggag cagatgctag ggcaaattgc   9360
cctagcaggg gaaaaaggtc gaaaaggtct ctttcctgtg gatagcacgt acattgggaa   9420
cccaaagccg tacattggga accggaaccc gtacattggg aacccaaagc cgtacattgg   9480
gaaccggtca cacatgtaag tgactgatat aaaagagaaa aaaggcgatt tttccgccta   9540
aaactcttta aaacttatta aaactcttaa aacccgcctg gcctgtgcat aactgtctgg   9600
ccagcgcaca gccgaagagc tgcaaaaagc gcctaccctt cggtcgctgc gctccctacg   9660
ccccgccgct tcgcgtcggc ctatcgcggc cgctggccgc tcaaaaatgg ctggcctacg   9720
gccaggcaat ctaccagggc gcggacaagc cgcgccgtcg ccactcgacc gccggcgccc   9780
acatcaaggc accctgcctc gcgcgtttcg gtgatgacgg tgaaaacctc tgacacatgc   9840
agctcccgga gacggtcaca gcttgtctgt aagcggatgc cgggagcaga caagcccgtc   9900
agggcgcgtc agcgggtgtt ggcgggtgtc ggggcgcagc catgacccag tcacgtagcg   9960
atagcggagt gtatactggc ttaactatgc ggcatcagag cagattgtac tgagagtgca  10020
ccatatgcgg tgtgaaatac cgcacagatg cgtaaggaga aaataccgca tcaggcgctc  10080
ttccgcttcc tcgctcactg actcgctgcg ctcggtcgtt cggctgcggc gagcggtatc  10140
agctcactca aaggcggtaa tacggttatc cacagaatca ggggataacg caggaaagaa  10200
catgtgagca aaaggccagc aaaaggccag gaaccgtaaa aaggccgcgt tgctggcgtt  10260
tttccatagg ctccgccccc ctgacgagca tcacaaaaat cgacgctcaa gtcagaggtg  10320
gcgaaacccg acaggactat aaagatacca ggcgtttccc cctggaagct ccctcgtgcg  10380
ctctcctgtt ccgaccctgc cgcttaccgg atacctgtcc gcctttctcc cttcgggaag  10440
cgtggcgctt tctcatagct cacgctgtag gtatctcagt tcggtgtagg tcgttcgctc  10500
caagctgggc tgtgtgcacg aaccccccgt tcagcccgac cgctgcgcct tatccggtaa  10560
ctatcgtctt gagtccaacc cggtaagaca cgacttatcg ccactggcag cagccactgg  10620
taacaggatt agcagagcga ggtatgtagg cggtgctaca gagttcttga agtggtggcc  10680
taactacggc tacactagaa ggacagtatt tggtatctgc gctctgctga agccagttac  10740
cttcggaaaa agagttggta gctcttgatc cggcaaacaa accaccgctg gtagcggtgg  10800
```

```
tttttttgtt tgcaagcagc agattacgcg cagaaaaaaa ggatctcaag aagatccttt  10860
gatcttttct acggggtctg acgctcagtg gaacgaaaac tcacgttaag ggattttggt  10920
catgagatta tcaaaaagga tcttcaccta gatcctttta aattaaaaat gaagttttaa  10980
atcaatctaa agtatatatg agtaaacttg gtctgacagt taccaatgct taatcagtga  11040
ggcacctatc tcagcgatct gtctatttcg ttcatccata gttgcctgac tccccgtcgt  11100
gtagataact acgatacggg agggcttacc atctggcccc agtgctgcaa tgataccgcg  11160
agacccacgc tcaccggctc cagatttatc agcaataaac cagccagccg gaagggccga  11220
gcgcagaagt ggtcctgcaa ctttatccgc ctccatccag tctattaatt gttgccggga  11280
agctagagta agtagttcgc cagttaatag tttgcgcaac gttgttgcca ttgctacagg  11340
catcgtggtg tcacgctcgt cgtttggtat ggcttcattc agctccggtt cccaacgatc  11400
aaggcgagtt acatgatccc ccatgttgtg caaaaaagcg gttagctcct tcggtcctcc  11460
gatcgttgtc agaagtaagt tggccgcagt gttatcactc atggttatgg cagcactgca  11520
taattctctt actgtcatgc catccgtaag atgcttttct gtgactggtg agtactcaac  11580
caagtcattc tgagaatagt gtatgcggcg accgagttgc tcttgcccgg cgtcaacacg  11640
ggataatacc gcgccacata gcagaacttt aaaagtgctc atcattggaa aagacctgca  11700
gggggggggg ggcgctgagg tctgcctcgt gaagaaggtg ttgctgactc ataccaggcc  11760
tgaatcgccc catcatccag ccagaaagtg agggagccac ggttgatgag agctttgttg  11820
taggtggacc agttggtgat tttgaacttt tgctttgcca cggaacggtc tgcgttgtcg  11880
ggaagatgcg tgatctgatc cttcaactca gcaaaagttc gatttattca acaaagccgc  11940
cgtcccgtca agtcagcgta atgctctgcc agtgttacaa ccaattaacc aattctgatt  12000
agaaaaactc atcgagcatc aaatgaaact gcaatttatt catatcagga ttatcaatac  12060
catatttttg aaaaagccgt ttctgtaatg aaggagaaaa ctcaccgagg cagttccata  12120
ggatggcaag atcctggtat cggtctgcga ttccgactcg tccaacatca atacaaccta  12180
ttaatttccc ctcgtcaaaa ataaggttat caagtgagaa atcaccatga gtgacgactg  12240
aatccggtga gaatggcaaa agcttatgca tttctttcca gacttgttca acaggccagc  12300
cattacgctc gtcatcaaaa tcactcgcat caaccaaacc gttattcatt cgtgattgcg  12360
cctgagcgag acgaaatacg cgatcgctgt taaaaggaca attacaaaca ggaatcgaat  12420
gcaaccggcg caggaacact gccagcgcat caacaatatt ttcacctgaa tcaggatatt  12480
cttctaatac ctggaatgct gttttcccgg ggatcgcagt ggtgagtaac catgcatcat  12540
caggagtacg gataaaatgc ttgatggtcg gaagaggcat aaattccgtc agccagttta  12600
gtctgaccat ctcatctgta acatcattgg caacgctacc tttgccatgt ttcagaaaca  12660
actctggcgc atcgggcttc ccatacaatc gatagattgt cgcacctgat tgcccgacat  12720
tatcgcgagc ccatttatac ccatataaat cagcatccat gttggaattt aatcgcggcc  12780
tcgagcaaga cgtttcccgt tgaatatggc tcataacacc ccttgtatta ctgtttatgt  12840
aagcagacag ttttattgtt catgatgata tatttttatc ttgtgcaatg taacatcaga  12900
gattttgaga cacaacgtgg ctttcccccc ccccccctgca ggtcaattcg gtcgatatgg  12960
ctattacgaa gaaggctcgt gcgcggagtc ccgtgaactt tcccacgcaa caagtgaacc  13020
gcaccgggtt tgccggaggc catttcgtta aaatgcgcag ccatggctgc ttcgtccagc  13080
atggcgtaat actgatcctc gtcttcggct ggcggtatat tgccgatggg cttcaaaagc  13140
cgccgtggtt gaaccagtct atccattcca aggtagcgaa ctcgaccgct tcgaagctcc  13200
```

```
tccatggtcc acgccgatga atgacctcgg ccttgtaaag accgttgatc gcttctgcga  13260
gggcgttgtc gtgctgtcgc cgacgcttcc gatagatggc tcgatacctg cttctgccaa  13320
ccgctcggaa tagcgaaagg acacgtattg aacaccgcga tccgagtgat gcactaggcc  13380
gccatgagcg ggacgccgat catgatgagc ctcctcgagg gcatcgagga caaagcctgc  13440
atgtgctgtc cggctcgccc gccatccgac aatgcgacgg gcgaagacgt cgatcacgaa  13500
ggccacgtag acgaagccct cccaagtggc gacataagta cggacatgcg caaaggcttt  13560
cccggtttgt cgctgatggt gcaagagacg ctgaagcgcg atccgatgcg caggcatctg  13620
ttcgtcttcc gcggtcgtgg cggtggcctg atcaaggtca ctcgccgaag agctgcatga  13680
ttggctcgaa accgagcggg ggaaattgtc gcgcagttct cccgtcgccg aggcgataaa  13740
ttacatgctc aagcgatggg atggcattac gtcattcctc gatgacggcc cgatttgcct  13800
gacgaacaat gctgccgaac gaacgctcag aggctatgta ctcggcagga agtcatggct  13860
gtttgccgga tcggatcgtt gtgctgaacg tgcggcgttc atggcgacac tgatcatgag  13920
cgccaagctc aataacatcg atccgcaggc ctggcttgcc gacgtccgcg ccgaccttgc  13980
ggacgctccg atcagcaggc ttgagcaaca gctgccgtgg aactggacat ccaagacact  14040
gagtgctcag gcggcctgac ctgcggcctt caccggatac ttaccccatt atcgcagatt  14100
gcgatgaagc atcagcgtca ttcagcaatc ttgccaaagt atgcaggctc gcgagaatcg  14160
acgtgcgaaa ccggctggtt gcgccaaaga tccgcttgcg gagcggtcga acattcatgc  14220
tgggacttca agaggtcgag tagaggaaga accggaaagg ttgcaccgga aaatatgcgt  14280
tcctttggag agcgcctcat ggacgtgaac aaatcgcccg gaccaaggat gccacggata  14340
caaaagctcg cgaagctcgg tcccgtgggt gttctgtcgt ctcgttgtac aacgaaatcc  14400
attcccattc cgcgctcaag atggcttccc ctcggcagtt catcagggct aaatcaatct  14460
agccgacttg tccggtgaaa tgggctgcac tccaacagaa acaatcaaac aaacatacac  14520
agcgacttat tcacacgagc tcaaattaca acggtatata tcctgccagt cagcatcatc  14580
acaccaaaag ttaggcccga atagtttgaa attagaaagc tcgcaattga ggtctacagg  14640
ccaaattcgc tcttagccgt acaatattac tcaccggtgc gatgcccccc atcgtaggtg  14700
aaggtggaaa ttaatgatcc atcttgagac cacaggccca caacagctac cagtttcctc  14760
aagggtccac caaaaacgta agcgcttacg tacatggtcg ataagaaaag gcaatttgta  14820
gatgttaaca tccaacgtcg ctttcaggga tcgatccaat acgcaaaccg cctctccccg  14880
cgcgttggcc gattcattaa tgcagctggc acgacaggtt tcccgactgg aaagcgggca  14940
gtgagcgcaa cgcaattaat gtgagttagc tcactcatta ggcaccccag gctttacact  15000
ttatgcttcc ggctcgtatg ttgtgtggaa ttgtgagcgg ataacaattt cacacaggaa  15060
acagctatga ccatgattac gccaagcttg catgcctgca ggtcgactct agag        15114
```

```
<210> SEQ ID NO 111
<211> LENGTH: 13268
<212> TYPE: DNA
<213> ORGANISM: Artificial Sequence
<220> FEATURE:
<223> OTHER INFORMATION: plasmid pKR92

<400> SEQUENCE: 111

cgcgcctcga gtgggcggat cccccgggct gcaggaattc actggccgtc gttttacaac     60
gtcgtgactg ggaaaaccct ggcgttaccc aacttaatcg ccttgcagca catcccccctt   120
tcgccagctg gcgtaatagc gaagaggccc gcaccgatcg cccttcccaa cagttgcgca    180
```

-continued

```
gcctgaatgg cgaatggatc gatccatcgc gatgtacctt ttgttagtca gcctctcgat    240
tgctcatcgt cattacacag taccgaagtt tgatcgatct agtaacatag atgacaccgc    300
gcgcgataat ttatcctagt ttgcgcgcta tattttgttt tctatcgcgt attaaatgta    360
taattgcggg actctaatca taaaaaccca tctcataaat aacgtcatgc attacatgtt    420
aattattaca tgcttaacgt aattcaacag aaattatatg ataatcatcg caagaccggc    480
aacaggattc aatcttaaga aactttattg ccaaatgttt gaacgatctg cttcgacgca    540
ctccttcttt actccaccat ctcgtcctta ttgaaaacgt gggtagcacc aaaacgaatc    600
aagtcgctgg aactgaagtt accaatcacg ctggatgatt tgccagttgg attaatcttg    660
cctttccccg catgaataat attgatgaat gcatgcgtga ggggtagttc gatgttggca    720
atagctgcaa ttgccgcgac atcctccaac gagcataatt cttcagaaaa atagcgatgt    780
tccatgttgt cagggcatgc atgatgcacg ttatgaggtg acggtgctag gcagtattcc    840
ctcaaagttt catagtcagt atcatattca tcattgcatt cctgcaagag agaattgaga    900
cgcaatccac acgctgcggc aaccttccgg cgttcgtggt ctatttgctc ttggacgttg    960
caaacgtaag tgttggatcg atccggggtg ggcgaagaac tccagcatga gatccccgcg   1020
ctggaggatc atccagccgg cgtcccggaa aacgattccg aagcccaacc tttcatagaa   1080
ggcggcggtg gaatcgaaat ctcgtgatgg caggttgggc gtcgcttggt cggtcatttc   1140
gaaccccaga gtcccgctca gaagaactcg tcaagaaggc gatagaaggc gatgcgctgc   1200
gaatcgggag cggcgatacc gtaaagcacg aggaagcggt cagcccattc gccgccaagc   1260
tcttcagcaa tatcacgggt agccaacgct atgtcctgat agcggtccgc cacacccagc   1320
cggccacagt cgatgaatcc agaaaagcgg ccattttcca ccatgatatt cggcaagcag   1380
gcatcgccat gggtcacgac gagatcctcg ccgtcgggca tgcgcgcctt gagcctggcg   1440
aacagttcgg ctggcgcgag cccctgatgc tcttcgtcca gatcatcctg atcgacaaga   1500
ccggcttcca tccgagtacg tgctcgctcg atgcgatgtt tcgcttggtg gtcgaatggg   1560
caggtagccg gatcaagcgt atgcagccgc cgcattgcat cagccatgat ggatactttc   1620
tcggcaggag caaggtgaga tgacaggaga tcctgccccg gcacttcgcc caatagcagc   1680
cagtcccttc ccgcttcagt gacaacgtcg agcacagctg cgcaaggaac gcccgtcgtg   1740
gccagccacg atagccgcgc tgcctcgtcc tgcagttcat tcagggcacc ggacaggtcg   1800
gtcttgacaa aaagaaccgg gcgcccctgc gctgacagcc ggaacacggc ggcatcagag   1860
cagccgattg tctgttgtgc ccagtcatag ccgaatagcc tctccaccca agcggccgga   1920
gaacctgcgt gcaatccatc ttgttcaatc atgcgaaacg atccccgcaa gcttggagac   1980
tggtgatttc agcgtgtcct ctccaaatga aatgaacttc cttatataga ggaagggtct   2040
tgcgaaggat agtgggattg tgcgtcatcc cttacgtcag tggagatatc acatcaatcc   2100
acttgctttg aagacgtggt tggaacgtct tctttttcca cgatgctcct cgtgggtggg   2160
ggtccatctt tgggaccact gtcggcagag gcatcttcaa cgatggcctt tcctttatcg   2220
caatgatggc atttgtagga gccaccttcc ttttccacta tcttcacaat aaagtgacag   2280
atagctgggc aatggaatcc gaggaggttt ccggatatta ccctttgttg aaaagtctca   2340
attgcccttt ggtcttctga gactgtatct ttgatatttt tggagtagac aagcgtgtcg   2400
tgctccacca tgttgacgaa gattttcttc ttgtcattga gtcgtaagag actctgtatg   2460
aactgttcgc cagtctttac ggcgagttct gttaggtcct ctatttgaat ctttgactcc   2520
atggcctttg attcagtggg aactaccttt ttagagactc caatctctat tacttgcctt   2580
```

```
ggtttgtgaa gcaagccttg aatcgtccat actggaatag tacttctgat cttgagaaat   2640
atatctttct ctgtgttctt gatgcagtta gtcctgaatc ttttgactgc atctttaacc   2700
ttcttgggaa ggtatttgat ctcctggaga ttattgctcg ggtagatcgt cttgatgaga   2760
cctgctgcgt aagcctctct aaccatctgt gggttagcat tctttctgaa attgaaaagg   2820
ctaatcttct cattatcagt ggtgaacatg gtatcgtcac cttctccgtc gaacttcctg   2880
actagatcgt agagatagag gaagtcgtcc attgtgatct ctggggcaaa ggagtctgaa   2940
ttaattcgat atggtggatt tatcacaaat gggacccgcc gccgacagag gtgtgatgtt   3000
aggccaggac tttgaaaatt tgcgcaacta tcgtatagtg gccgacaaat tgacgccgag   3060
ttgacagact gcctagcatt tgagtgaatt atgtgaggta atgggctaca ctgaattggt   3120
agctcaaact gtcagtattt atgtatatga gtgtatattt tcgcataatc tcagaccaat   3180
ctgaagatga aatgggtatc tgggaatggc gaaatcaagg catcgatcgt gaagtttctc   3240
atctaagccc ccatttggac gtgaatgtag acacgtcgaa ataaagattt ccgaattaga   3300
ataatttgtt tattgctttc gcctataaat acgacggatc gtaatttgtc gttttatcaa   3360
aatgtacttt cattttataa taacgctgcg gacatctaca tttttgaatt gaaaaaaaat   3420
tggtaattac tctttctttt tctccatatt gaccatcata ctcattgctg atccatgtag   3480
atttcccgga catgaagcca tttacaattg aatatatcct gccgccgctg ccgctttgca   3540
cccggtggag cttgcatgtt ggtttctacg cagaactgag ccggttaggc agataatttc   3600
cattgagaac tgagccatgt gcaccttccc cccaacacgg tgagcgacgg ggcaacggag   3660
tgatccacat gggactttta aacatcatcc gtcggatggc gttgcgagag aagcagtcga   3720
tccgtgagat cagccgacgc accgggcagg cgcgcaacac gatcgcaaag tatttgaacg   3780
caggtacaat cgagccgacg ttcacgcgga acgaccaagc aagctagctt taatgcggta   3840
gtttatcaca gttaaattgc taacgcagtc aggcaccgtg tatgaaatct aacaatgcgc   3900
tcatcgtcat cctcggcacc gtcaccctgg atgctgtagg cataggcttg gttatgccgg   3960
tactgccggg cctcttgcgg gatatcgtcc attccgacag catcgccagt cactatggcg   4020
tgctgctagc gctatatgcg ttgatgcaat ttctatgcgc acccgttctc ggagcactgt   4080
ccgaccgctt tggccgccgc ccagtcctgc tcgcttcgct acttggagcc actatcgact   4140
acgcgatcat ggcgaccaca cccgtcctgt ggtccaaccc ctccgctgct atagtgcagt   4200
cggcttctga cgttcagtgc agccgtcttc tgaaaacgac atgtcgcaca agtcctaagt   4260
tacgcgacag gctgccgccc tgccctttc ctggcgtttt cttgtcgcgt gttttagtcg   4320
cataaagtag aatacttgcg actagaaccg gagacattac gccatgaaca agagcgccgc   4380
cgctggcctg ctgggctatg cccgcgtcag caccgacgac caggacttga ccaaccaacg   4440
ggccgaactg cacgcggccg gctgcaccaa gctgttttcc gagaagatca ccggcaccag   4500
gcgcgaccgc ccggagctgg ccaggatgct tgaccaccta cgccctggcg acgttgtgac   4560
agtgaccagg ctagaccgcc tggcccgcag cacccgcgac ctactggaca ttgccgagcg   4620
catccaggag gccggcgcgg gcctgcgtag cctggcagag ccgtgggccg acaccaccac   4680
gccggccggc cgcatggtgt tgaccgtgtt cgccggcatt gccgagttcg agcgttccct   4740
aatcatcgac cgcacccgga gcgggcgcga ggccgccaag gcccgaggcg tgaagtttgg   4800
cccccgccct accctcaccc cggcacagat cgcgcacgcc cgcgagctga tcgaccagga   4860
aggccgcacc gtgaaagagg cggctgcact gcttggcgtg catcgctcga ccctgtaccg   4920
cgcacttgag cgcagcgagg aagtgacgcc caccgaggcc aggcggcgcg gtgccttccg   4980
```

```
tgaggacgca ttgaccgagg ccgacgccct ggcggccgcc gagaatgaac gccaagagga   5040
acaagcatga aaccgcacca ggacggccag gacgaaccgt ttttcattac cgaagagatc   5100
gaggcggaga tgatcgcggc cgggtacgtg ttcgagccgc ccgcgcacgt ctcaaccgtg   5160
cggctgcatg aaatcctggc cggtttgtct gatgccaagc tggcggcctg gccggccagc   5220
ttggccgctg aagaaaccga gcgccgccgt ctaaaaaggt gatgtgtatt tgagtaaaac   5280
agcttgcgtc atgcggtcgc tgcgtatatg atgcgatgag taaataaaca aatacgcaag   5340
ggaacgcatg aagttatcgc tgtacttaac cagaaaggcg ggtcaggcaa gacgaccatc   5400
gcaacccatc tagcccgcgc cctgcaactc gccggggccg atgttctgtt agtcgattcc   5460
gatccccagg gcagtgcccg cgattgggcg gccgtgcggg aagatcaacc gctaaccgtt   5520
gtcggcatcg accgcccgac gattgaccgc gacgtgaagg ccatcggccg gcgcgacttc   5580
gtagtgatcg acggagcgcc ccaggcggcg gacttggctg tgtccgcgat caaggcagcc   5640
gacttcgtgc tgattccggt gcagccaagc ccttacgaca tatgggccac cgccgacctg   5700
gtggagctgg ttaagcagcg cattgaggtc acggatggaa ggctacaagc ggcctttgtc   5760
gtgtcgcggg cgatcaaagg cacgcgcatc ggcggtgagg ttgccgaggc gctggccggg   5820
tacgagctgc ccattcttga gtcccgtatc acgcagcgcg tgagctaccc aggcactgcc   5880
gccgccggca caaccgttct tgaatcagaa cccgagggcg acgctgcccg cgaggtccag   5940
gcgctggccg ctgaaattaa atcaaaactc atttgagtta atgaggtaaa gagaaaatga   6000
gcaaaagcac aaacacgcta agtgccggcc gtccgagcgc acgcagcagc aaggctgcaa   6060
cgttggccag cctggcagac acgccagcca tgaagcgggt caactttcag ttgccggcgg   6120
aggatcacac caagctgaag atgtacgcgg tacgccaagg caagaccatt accgagctgc   6180
tatctgaata catcgcgcag ctaccagagt aaatgagcaa atgaataaat gagtagatga   6240
attttagcgg ctaaaggagg cggcatggaa aatcaagaac aaccaggcac cgacgccgtg   6300
gaatgcccca tgtgtggagg aacgggcggt tggccaggcg taagcggctg ggttgtctgc   6360
cggccctgca atggcactgg aacccccaag cccgaggaat cggcgtgagc ggtcgcaaac   6420
catccggccc ggtacaaatc ggcgcggcgc tgggtgatga cctggtggag aagttgaagg   6480
ccgcgcaggc cgcccagcgg caacgcatcg aggcagaagc acgccccggt gaatcgtggc   6540
aagcggccgc tgatcgaatc cgcaaagaat cccggcaacc gccggcagcc ggtgcgccgt   6600
cgattaggaa gccgcccaag ggcgacgagc aaccagattt tttcgttccg atgctctatg   6660
acgtgggcac ccgcgatagt cgcagcatca tggacgtggc cgttttccgt ctgtcgaagc   6720
gtgaccgacg agctggcgag gtgatccgct acgagcttcc agacgggcac gtagaggttt   6780
ccgcagggcc ggccggcatg gccagtgtgt gggattacga cctggtactg atggcggttt   6840
cccatctaac cgaatccatg aaccgatacc gggaagggaa gggagacaag cccggccgcg   6900
tgttccgtcc acacgttgcg gacgtactca agttctgccg gcgagccgat ggcggaaagc   6960
agaaagacga cctggtagaa acctgcattc ggttaaacac cacgcacgtt gccatgcagc   7020
gtacgaagaa ggccaagaac ggccgcctgg tgacggtatc cgagggtgaa gccttgatta   7080
gccgctacaa gatcgtaaag agcgaaaccg ggcggccgga gtacatcgag atcgagctag   7140
ctgattggat gtaccgcgag atcacagaag gcaagaaccc ggacgtgctg acggttcacc   7200
ccgattactt tttgatcgat cccggcatcg gccgttttct ctaccgcctg gcacgccgcg   7260
ccgcaggcaa ggcagaagcc agatggttgt tcaagacgat ctacgaacgc agtggcagcg   7320
ccggagagtt caagaagttc tgtttcaccg tgcgcaagct gatcgggtca aatgacctgc   7380
```

```
cggagtacga tttgaaggag gaggcggggc aggctggccc gatcctagtc atgcgctacc   7440
gcaacctgat cgagggcgaa gcatccgccg gttcctaatg tacggagcag atgctagggc   7500
aaattgccct agcaggggaa aaaggtcgaa aaggtctctt tcctgtggat agcacgtaca   7560
ttgggaaccc aaagccgtac attgggaacc ggaacccgta cattgggaac ccaaagccgt   7620
acattgggaa ccggtcacac atgtaagtga ctgatataaa agagaaaaaa ggcgattttt   7680
ccgcctaaaa ctctttaaaa cttattaaaa ctcttaaaac ccgcctggcc tgtgcataac   7740
tgtctggcca gcgcacagcc gaagagctgc aaaaagcgcc tacccttcgg tcgctgcgct   7800
ccctacgccc cgccgcttcg cgtcggccta tcgcggccgc tggccgctca aaaatggctg   7860
gcctacggcc aggcaatcta ccagggcgcg gacaagccgc gccgtcgcca ctcgaccgcc   7920
ggcgcccaca tcaaggcacc ctgcctcgcg cgtttcggtg atgacggtga aaacctctga   7980
cacatgcagc tcccggagac ggtcacagct tgtctgtaag cggatgccgg gagcagacaa   8040
gcccgtcagg gcgcgtcagc gggtgttggc gggtgtcggg gcgcagccat gacccagtca   8100
cgtagcgata gcggagtgta tactggctta actatgcggc atcagagcag attgtactga   8160
gagtgcacca tatgcggtgt gaaataccgc acagatgcgt aaggagaaaa taccgcatca   8220
ggcgctcttc cgcttcctcg ctcactgact cgctgcgctc ggtcgttcgg ctgcggcgag   8280
cggtatcagc tcactcaaag gcggtaatac ggttatccac agaatcaggg gataacgcag   8340
gaaagaacat gtgagcaaaa ggccagcaaa aggccaggaa ccgtaaaaag gccgcgttgc   8400
tggcgttttt ccataggctc cgcccccctg acgagcatca caaaaatcga cgctcaagtc   8460
agaggtggcg aaacccgaca ggactataaa gataccaggc gtttccccct ggaagctccc   8520
tcgtgcgctc tcctgttccg accctgccgc ttaccggata cctgtccgcc tttctccctt   8580
cgggaagcgt ggcgctttct catagctcac gctgtaggta tctcagttcg gtgtaggtcg   8640
ttcgctccaa gctgggctgt gtgcacgaac cccccgttca gcccgaccgc tgcgccttat   8700
ccggtaacta tcgtcttgag tccaacccgg taagacacga cttatcgcca ctggcagcag   8760
ccactggtaa caggattagc agagcgaggt atgtaggcgg tgctacagag ttcttgaagt   8820
ggtggcctaa ctacggctac actagaagga cagtatttgg tatctgcgct ctgctgaagc   8880
cagttacctt cggaaaaaga gttggtagct cttgatccgg caaacaaacc accgctggta   8940
gcggtggttt ttttgtttgc aagcagcaga ttacgcgcag aaaaaaagga tctcaagaag   9000
atcctttgat cttttctacg gggtctgacg ctcagtggaa cgaaaactca cgttaaggga   9060
ttttggtcat gagattatca aaaaggatct tcacctagat ccttttaaat taaaaatgaa   9120
gttttaaatc aatctaaagt atatatgagt aaacttggtc tgacagttac caatgcttaa   9180
tcagtgaggc acctatctca gcgatctgtc tatttcgttc atccatagtt gcctgactcc   9240
ccgtcgtgta gataactacg atacgggagg gcttaccatc tggccccagt gctgcaatga   9300
taccgcgaga cccacgctca ccggctccag atttatcagc aataaaccag ccagccggaa   9360
gggccgagcg cagaagtggt cctgcaactt tatccgcctc catccagtct attaattgtt   9420
gccgggaagc tagagtaagt agttcgccag ttaatagttt gcgcaacgtt gttgccattg   9480
ctacaggcat cgtggtgtca cgctcgtcgt ttggtatggc ttcattcagc tccggttccc   9540
aacgatcaag gcgagttaca tgatccccca tgttgtgcaa aaaagcggtt agctccttcg   9600
gtcctccgat cgttgtcaga agtaagttgg ccgcagtgtt atcactcatg gttatggcag   9660
cactgcataa ttctcttact gtcatgccat ccgtaagatg cttttctgtg actggtgagt   9720
actcaaccaa gtcattctga gaatagtgta tgcggcgacc gagttgctct tgcccggcgt   9780
```

caacacggga taataccgcg ccacatagca gaactttaaa agtgctcatc attggaaaag 9840
acctgcaggg ggggggggc gctgaggtct gcctcgtgaa gaaggtgttg ctgactcata 9900
ccaggcctga atcgccccat catccagcca gaaagtgagg gagccacggt tgatgagagc 9960
tttgttgtag gtggaccagt tggtgatttt gaacttttgc tttgccacgg aacggtctgc 10020
gttgtcggga agatgcgtga tctgatcctt caactcagca aaagttcgat ttattcaaca 10080
aagccgccgt cccgtcaagt cagcgtaatg ctctgccagt gttacaacca attaaccaat 10140
tctgattaga aaaactcatc gagcatcaaa tgaaactgca atttattcat atcaggatta 10200
tcaataccat atttttgaaa aagccgtttc tgtaatgaag gagaaaactc accgaggcag 10260
ttccatagga tggcaagatc ctggtatcgg tctgcgattc cgactcgtcc aacatcaata 10320
caacctatta atttcccctc gtcaaaaata aggttatcaa gtgagaaatc accatgagtg 10380
acgactgaat ccggtgagaa tggcaaaagc ttatgcattt ctttccagac ttgttcaaca 10440
ggccagccat tacgctcgtc atcaaaatca ctcgcatcaa ccaaaccgtt attcattcgt 10500
gattgcgcct gagcgagacg aaatacgcga tcgctgttaa aaggacaatt acaaacagga 10560
atcgaatgca accggcgcag gaacactgcc agcgcatcaa caatattttc acctgaatca 10620
ggatattctt ctaatacctg gaatgctgtt ttcccgggga tcgcagtggt gagtaaccat 10680
gcatcatcag gagtacggat aaaatgcttg atggtcggaa gaggcataaa ttccgtcagc 10740
cagtttagtc tgaccatctc atctgtaaca tcattggcaa cgctaccttt gccatgtttc 10800
agaaacaact ctggcgcatc gggcttccca tacaatcgat agattgtcgc acctgattgc 10860
ccgacattat cgcgagccca tttataccca tataaatcag catccatgtt ggaatttaat 10920
cgcggcctcg agcaagacgt ttcccgttga atatggctca taacacccct tgtattactg 10980
tttatgtaag cagacagttt tattgttcat gatgatatat ttttatcttg tgcaatgtaa 11040
catcagagat tttgagacac aacgtggctt tcccccccc ccctgcaggt caattcggtc 11100
gatatggcta ttacgaagaa ggctcgtgcg cggagtcccg tgaactttcc cacgcaacaa 11160
gtgaaccgca ccgggtttgc cggaggccat ttcgttaaaa tgcgcagcca tggctgcttc 11220
gtccagcatg gcgtaatact gatcctcgtc ttcggctggc ggtatattgc cgatgggctt 11280
caaaagccgc cgtggttgaa ccagtctatc cattccaagg tagcgaactc gaccgcttcg 11340
aagctcctcc atggtccacg ccgatgaatg acctcggcct tgtaaagacc gttgatcgct 11400
tctgcgaggg cgttgtcgtg ctgtcgccga cgcttccgat agatggctcg atacctgctt 11460
ctgccaaccg ctcggaatag cgaaaggaca cgtattgaac accgcgatcc gagtgatgca 11520
ctaggccgcc atgagcggga cgccgatcat gatgagcctc ctcgagggca tcgaggacaa 11580
agcctgcatg tgctgtccgg ctcgcccgcc atccgacaat gcgacgggcg aagacgtcga 11640
tcacgaaggc cacgtagacg aagccctccc aagtggcgac ataagtacgg acatgcgcaa 11700
aggctttccc ggtttgtcgc tgatggtgca agagacgctg aagcgcgatc cgatgcgcag 11760
gcatctgttc gtcttccgcg gtcgtggcgg tggcctgatc aaggtcactc gccgaagagc 11820
tgcatgattg gctcgaaacc gagcgggga aattgtcgcg cagttctccc gtcgccgagg 11880
cgataaatta catgctcaag cgatgggatg gcattacgtc attcctcgat gacggcccga 11940
tttgcctgac gaacaatgct gccgaacgaa cgctcagagg ctatgtactc ggcaggaagt 12000
catggctgtt tgccggatcg gatcgttgtg ctgaacgtgc ggcgttcatg gcgacactga 12060
tcatgagcgc caagctcaat aacatcgatc cgcaggcctg gcttgccgac gtccgcgccg 12120
accttgcgga cgctccgatc agcaggcttg agcaacagct gccgtggaac tggacatcca 12180
agacactgag tgctcaggcg gcctgacctg cggccttcac cggatactta ccccattatc 12240
gcagattgcg atgaagcatc agcgtcattc agcaatcttg ccaaagtatg caggctcgcg 12300
agaatcgacg tgcgaaaccg gctggttgcg ccaaagatcc gcttgcggag cggtcgaaca 12360
ttcatgctgg gacttcaaga ggtcgagtag aggaagaacc ggaaaggttg caccggaaaa 12420
tatgcgttcc tttggagagc gcctcatgga cgtgaacaaa tcgcccggac caaggatgcc 12480
acggatacaa aagctcgcga agctcggtcc cgtgggtgtt ctgtcgtctc gttgtacaac 12540
gaaatccatt cccattccgc gctcaagatg gcttcccctc ggcagttcat cagggctaaa 12600
tcaatctagc cgacttgtcc ggtgaaatgg gctgcactcc aacagaaaca atcaaacaaa 12660
catacacagc gacttattca cacgagctca aattacaacg gtatatatcc tgccagtcag 12720
catcatcaca ccaaaagtta ggcccgaata gtttgaaatt agaaagctcg caattgaggt 12780
ctacaggcca aattcgctct tagccgtaca atattactca ccggtgcgat gccccccatc 12840
gtaggtgaag gtggaaatta atgatccatc ttgagaccac aggcccacaa cagctaccag 12900
tttcctcaag ggtccaccaa aaacgtaagc gcttacgtac atggtcgata agaaaaggca 12960
atttgtagat gttaacatcc aacgtcgctt tcagggatcg atccaatacg caaaccgcct 13020
ctccccgcgc gttggccgat tcattaatgc agctggcacg acaggtttcc cgactggaaa 13080
gcgggcagtg agcgcaacgc aattaatgtg agttagctca ctcattaggc accccaggct 13140
ttacacttta tgcttccggc tcgtatgttg tgtggaattg tgagcggata acaatttcac 13200
acaggaaaca gctatgacca tgattacgcc aagcttgcat gcctgcaggt cgactctaga 13260
ggatctgg 13268

<210> SEQ ID NO 112
<211> LENGTH: 11792
<212> TYPE: DNA
<213> ORGANISM: Artificial Sequence
<220> FEATURE:
<223> OTHER INFORMATION: plasmid pKR274
<220> FEATURE:
<221> NAME/KEY: misc_feature
<222> LOCATION: (3604)..(3604)
<223> OTHER INFORMATION: n is a, c, g, or t

<400> SEQUENCE: 112
ggctagccta agtacgtact caaaatgcca acaaataaaa aaaaagttgc tttaataatg 60
ccaaaacaaa ttaataaaac acttacaaca ccggattttt tttaattaaa atgtgccatt 120
taggataaat agttaatatt tttaataatt atttaaaaag ccgtatctac taaaatgatt 180
tttatttggt tgaaaatatt aatatgttta aatcaacaca atctatcaaa attaaactaa 240
aaaaaaaata agtgtacgtg gttaacatta gtacagtaat ataagaggaa aatgagaaat 300
taagaaattg aaagcgagtc taatttttaa attatgaacc tgcatatata aaaggaaaga 360
aagaatccag gaagaaaaga aatgaaacca tgcatggtcc cctcgtcatc acgagtttct 420
gccatttgca atagaaacac tgaaacacct ttctctttgt cacttaattg agatgccgaa 480
gccacctcac accatgaact tcatgaggtg tagcacccaa ggcttccata gccatgcata 540
ctgaagaatg tctcaagctc agcaccctac ttctgtgacg tgtccctcat tcaccttcct 600
ctcttcccta taaataacca cgcctcaggt tctccgcttc acaactcaaa cattctctcc 660
attggtcctt aaacactcat cagtcatcac cgcggccgca tggagtcgat tgcgccattc 720
ctcccatcaa agatgccgca agatctgttt atggaccttg ccaccgctat cggtgtccgg 780
gccgcgccct atgtcgatcc tctcgaggcc gcgctggtgg cccaggccga gaagtacatc 840

```
cccacgattg tccatcacac gcgtgggttc ctggtcgcgg tggagtcgcc tttggcccgt    900
gagctgccgt tgatgaaccc gttccacgtg ctgttgatcg tgctcgctta tttggtcacg    960
gtctttgtgg gcatgcagat catgaagaac tttgagcggt tcgaggtcaa gacgttttcg   1020
ctcctgcaca acttttgtct ggtctcgatc agcgcctaca tgtgcggtgg gatcctgtac   1080
gaggcttatc aggccaacta tggactgttt gagaacgctg ctgatcatac cttcaagggt   1140
cttcctatgg ccaagatgat ctggctcttc tacttctcca agatcatgga gtttgtcgac   1200
accatgatca tggtcctcaa gaagaacaac cgccagatct ccttcttgca cgtttaccac   1260
cacagctcca tcttcaccat ctggtggttg gtcacctttg ttgcacccaa cggtgaagcc   1320
tacttctctg ctgcgttgaa ctcgttcatc catgtgatca tgtacggcta ctacttcttg   1380
tcggccttgg gcttcaagca ggtgtcgttc atcaagttct acatcacgcg ctcgcagatg   1440
acacagttct gcatgatgtc ggtccagtct tcctgggaca tgtacgccat gaaggtcctt   1500
ggccgccccg gataccccct cttcatcacg gctctgcttt ggttctacat gtggaccatg   1560
ctcggtctct tctacaactt ttacagaaag aacgccaagt tggccaagca ggccaaggcc   1620
gacgctgcca aggagaaggc aaggaagttg cagtaagcgg ccgcatttcg caccaaatca   1680
atgaaagtaa taatgaaaag tctgaataag aatacttagg cttagatgcc tttgttactt   1740
gtgtaaaata acttgagtca tgtacctttg gcggaaacag aataaataaa aggtgaaatt   1800
ccaatgctct atgtataagt tagtaatact taatgtgttc tacggttgtt tcaatatcat   1860
caaactctaa ttgaaacttt agaaccacaa atctcaatct tttcttaatg aaatgaaaaa   1920
tcttaattgt accatgttta tgttaaacac cttacaattg gttggagagg aggaccaacc   1980
gatgggacaa cattgggaga aagagattca atggagattt ggataggaga acaacattct   2040
ttttcacttc aatacaagat gagtgcaaca ctaaggatat gtatgagact ttcagaagct   2100
acgacaacat agatgagtga ggtggtgatt cctagcaaga aagacattag aggaagccaa   2160
aatcgaacaa ggaagacatc aagggcaaga gacaggacca tccatctcag gaaaaggagc   2220
tttgggatag tccgagaagt tgtacaagaa attttttgga gggtgagtga tgcattgctg   2280
gtgactttaa ctcaatcaaa attgagaaag aaagaaaagg gagggggctc acatgtgaat   2340
agaagggaaa cgggagaatt ttacagtttt gatctaatgg gcatcccagc tagtggtaac   2400
atattcacca tgtttaacct tcacgtacgt cctcgaagag aagggttaat aacacatttt   2460
ttaacatttt taacacaaat tttagttatt taaaaattta ttaaaaaatt taaaataaga   2520
agaggaactc tttaaataaa tctaacttac aaaatttatg atttttaata agttttcacc   2580
aataaaaaat gtcataaaaa tatgttaaaa agtatattat caatattctc tttatgataa   2640
ataaaaagaa aaaaaaaata aaagttaagt gaaaatgaga ttgaagtgac tttaggtgtg   2700
tataaatata tcaaccccgc caacaattta tttaatccaa atatattgaa gtatattatt   2760
ccatagcctt tatttattta tatatttatt atataaaagc tttatttgtt ctaggttgtt   2820
catgaaatat ttttttggtt ttatctccgt tgtaagaaaa tcatgtgctt tgtgtcgcca   2880
ctcactattg cagctttttc atgcattggt cagattgacg gttgattgta tttttgtttt   2940
ttatggtttt gtgttatgac ttaagtcttc atctctttat ctcttcatca ggtttgatgg   3000
ttacctaata tggtccatgg gtacatgcat ggttaaatta ggtggccaac tttgttgtga   3060
acgatagaat ttttttata ttaagtaaac tatttttata ttatgaaata ataataaaaa   3120
aaatatttta tcattattaa caaaatcata ttagttaatt tgttaactct ataataaaag   3180
aaatactgta acattcacat tacatggtaa catctttcca ccctttcatt tgttttttgt   3240
```

```
ttgatgactt tttttcttgt ttaaatttat ttcccttctt ttaaatttgg aatacattat   3300
catcatatat aaactaaaat actaaaaaca ggattacaca aatgataaat aataacacaa   3360
atatttataa atctagctgc aatatattta aactagctat atcgatattg taaaataaaa   3420
ctagctgcat tgatactgat aaaaaaatat catgtgcttt ctggactgat gatgcagtat   3480
acttttgaca ttgcctttat tttatttttc agaaaagctt tcttagttct gggttcttca   3540
ttatttgttt cccatctcca ttgtgaattg aatcatttgc ttcgtgtcac aaatacaatt   3600
tagntaggta catgcattgg tcagattcac ggtttattat gtcatgactt aagttcatgg   3660
tagtacatta cctgccacgc atgcattata ttggttagat ttgataggca aatttggttg   3720
tcaacaatat aaatataaat aatgttttta tattacgaaa taacagtgat caaaacaaac   3780
agttttatct ttattaacaa gattttgttt ttgtttgatg acgtttttta atgtttacgc   3840
tttccccctt cttttgaatt tagaacactt tatcatcata aaatcaaata ctaaaaaaat   3900
tacatatttc ataaataata acacaaatat ttttaaaaaa tctgaaataa taatgaacaa   3960
tattacatat tatcacgaaa attcattaat aaaaatatta tataaataaa atgtaatagt   4020
agttatatgt aggaaaaaag tactgcacgc ataatatata caaaaagatt aaaatgaact   4080
attataaata ataacactaa attaatggtg aatcatatca aaataatgaa aaagtaaata   4140
aaatttgtaa ttaacttcta tatgtattac acacacaaat aataaataat agtaaaaaaa   4200
attatgataa atatttacca tctcataaga tatttaaaat aatgataaaa atatagatta   4260
tttttatgc aactagctag ccaaaaagag aacacgggta tatataaaaa gagtaccttt   4320
aaattctact gtacttcctt tattcctgac gtttttatat caagtggaca tacgtgaaga   4380
ttttaattat cagtctaaat atttcattag cacttaatac ttttctgttt tattcctatc   4440
ctataagtag tcccgattct cccaacattg cttattcaca caactaacta agaaagtctt   4500
ccatagcccc ccaagcggcc gcatgggaac ggaccaagga aaaaccttca cctgggaaga   4560
gctggcggcc cataacacca aggacgacct actcttggcc atccgcggca gggtgtacga   4620
tgtcacaaag ttcttgagcc gccatcctgg tggagtggac actctcctgc tcggagctgg   4680
ccgagatgtt actccggtct ttgagatgta tcacgcgttt ggggctgcag atgccattat   4740
gaagaagtac tatgtcggta cactggtctc gaatgagctg cccatcttcc cggagccaac   4800
ggtgttccac aaaaccatca agacgagagt cgagggctac tttacggatc ggaacattga   4860
tcccaagaat agaccagaga tctggggacg atacgctctt atctttggat ccttgatcgc   4920
ttcctactac gcgcagctct ttgtgccttt cgttgtcgaa cgcacatggc ttcaggtggt   4980
gtttgcaatc atcatgggat ttgcgtgcgc acaagtcgga ctcaaccctc ttcatgatgc   5040
gtctcacttt tcagtgaccc acaaccccac tgtctggaag attctgggag ccacgcacga   5100
ctttttcaac ggagcatcgt acctggtgtg gatgtaccaa catatgctcg gccatcaccc   5160
ctacaccaac attgctggag cagatcccga cgtgtcgacg tctgagcccg atgttcgtcg   5220
tatcaagccc aaccaaaagt ggtttgtcaa ccacatcaac cagcacatgt ttgttccttt   5280
cctgtacgga ctgctggcgt tcaaggtgcg cattcaggac atcaacattt tgtactttgt   5340
caagaccaat gacgctattc gtgtcaatcc catctcgaca tggcacactg tgatgttctg   5400
ggcggcaag gctttctttg tctggtatcg cctgattgtt cccctgcagt atctgcccct   5460
gggcaaggtg ctgctcttgt tcacggtcgc ggacatggtg tcgtcttact ggctggcgct   5520
gaccttccag gcgaaccacg ttgttgagga agttcagtgg ccgttgcctg acgagaacgg   5580
gatcatccaa aaggactggg cagctatgca ggtcgagact acgcaggatt acgcacacga   5640
```

```
ttcgcacctc tggaccagca tcactggcag cttgaactac caggctgtgc accatctgtt   5700
ccccaacgtg tcgcagcacc attatcccga tattctggcc atcatcaaga acacctgcag   5760
cgagtacaag gttccatacc ttgtcaagga tacgttttgg caagcatttg cttcacattt   5820
ggagcacttg cgtgttcttg gactccgtcc caaggaagag taggcggccg cgacacaagt   5880
gtgagagtac taaataaatg ctttggttgt acgaaatcat tacactaaat aaaataatca   5940
aagcttatat atgccttccg ctaaggccga atgcaaagaa attggttctt tctcgttatc   6000
ttttgccact tttactagta cgtattaatt actacttaat catctttgtt tacggctcat   6060
tatatccgta cggatccgtc gacggcgcgc ccgatcatcc ggatatagtt cctcctttca   6120
gcaaaaaacc cctcaagacc cgtttagagg ccccaagggg ttatgctagt tattgctcag   6180
cggtggcagc agccaactca gcttcctttc gggctttgtt agcagccgga tcgatccaag   6240
ctgtacctca ctattccttt gccctcggac gagtgctggg gcgtcggttt ccactatcgg   6300
cgagtacttc tacacagcca tcggtccaga cggccgcgct tctgcgggcg atttgtgtac   6360
gcccgacagt cccggctccg gatcggacga ttgcgtcgca tcgaccctgc gcccaagctg   6420
catcatcgaa attgccgtca accaagctct gatagagttg gtcaagacca atgcggagca   6480
tatacgcccg gagccgcggc gatcctgcaa gctccggatg cctccgctcg aagtagcgcg   6540
tctgctgctc catacaagcc aaccacggcc tccagaagaa gatgttggcg acctcgtatt   6600
gggaatcccc gaacatcgcc tcgctccagt caatgaccgc tgttatgcgg ccattgtccg   6660
tcaggacatt gttggagccg aaatccgcgt gcacgaggtg ccggacttcg gggcagtcct   6720
cggcccaaag catcagctca tcgagagcct gcgcgacgga cgcactgacg gtgtcgtcca   6780
tcacagtttg ccagtgatac acatggggat cagcaatcgc gcatatgaaa tcacgccatg   6840
tagtgtattg accgattcct tgcggtccga atgggccgaa cccgctcgtc tggctaagat   6900
cggccgcagc gatcgcatcc atagcctccg cgaccggctg cagaacagcg ggcagttcgg   6960
tttcaggcag gtcttgcaac gtgacaccct gtgcacggcg ggagatgcaa taggtcaggc   7020
tctcgctgaa ttccccaatg tcaagcactt ccggaatcgg gagcgcggcc gatgcaaagt   7080
gccgataaac ataacgatct ttgtagaaac catcggcgca gctatttacc cgcaggacat   7140
atccacgccc tcctacatcg aagctgaaag cacgagattc ttcgccctcc gagagctgca   7200
tcaggtcgga gacgctgtcg aacttttcga tcagaaactt ctcgacagac gtcgcggtga   7260
gttcaggctt ttccatgggt atatctcctt cttaaagtta aacaaaatta tttctagagg   7320
gaaaccgttg tggtctccct atagtgagtc gtattaattt cgcgggatcg agatctgatc   7380
aacctgcatt aatgaatcgg ccaacgcgcg gggagaggcg gtttgcgtat tgggcgctct   7440
tccgcttcct cgctcactga ctcgctgcgc tcggtcgttc ggctgcggcg agcggtatca   7500
gctcactcaa aggcggtaat acggttatcc acagaatcag gggataacgc aggaaagaac   7560
atgtgagcaa aaggccagca aaaggccagg aaccgtaaaa aggccgcgtt gctggcgttt   7620
ttccataggc tccgcccccc tgacgagcat cacaaaaatc gacgctcaag tcagaggtgg   7680
cgaaacccga caggactata aagataccag gcgtttcccc ctggaagctc cctcgtgcgc   7740
tctcctgttc cgaccctgcc gcttaccgga tacctgtccg cctttctccc ttcgggaagc   7800
gtggcgcttt ctcaatgctc acgctgtagg tatctcagtt cggtgtaggt cgttcgctcc   7860
aagctgggct gtgtgcacga accccccgtt cagcccgacc gctgcgcctt atccggtaac   7920
tatcgtcttg agtccaaccc ggtaagacac gacttatcgc cactggcagc agccactggt   7980
aacaggatta gcagagcgag gtatgtaggc ggtgctacag agttcttgaa gtggtggcct   8040
```

-continued

```
aactacggct acactagaag gacagtattt ggtatctgcg ctctgctgaa gccagttacc   8100
ttcggaaaaa gagttggtag ctcttgatcc ggcaaacaaa ccaccgctgg tagcggtggt   8160
tttttgtttt gcaagcagca gattacgcgc agaaaaaaag gatctcaaga agatcctttg   8220
atcttttcta cggggtctga cgctcagtgg aacgaaaact cacgttaagg gattttggtc   8280
atgacattaa cctataaaaa taggcgtatc acgaggccct ttcgtctcgc gcgtttcggt   8340
gatgacggtg aaaacctctg acacatgcag ctcccggaga cggtcacagc ttgtctgtaa   8400
gcggatgccg ggagcagaca agcccgtcag ggcgcgtcag cgggtgttgg cgggtgtcgg   8460
ggctggctta actatgcggc atcagagcag attgtactga gagtgcacca tatggacata   8520
ttgtcgttag aacgcggcta caattaatac ataaccttat gtatcataca catacgattt   8580
aggtgacact atagaacggc gcgccaagct tgttgaaaca tccctgaagt gtctcatttt   8640
attttattta ttctttgctg ataaaaaaat aaaataaaag aagctaagca cacggtcaac   8700
cattgctcta ctgctaaaag ggttatgtgt agtgttttac tgcataaatt atgcagcaaa   8760
caagacaact caaattaaaa aatttccttt gcttgttttt ttgttgtctc tgacttgact   8820
ttcttgtgga agttggttgt ataaggattg ggacaccatt gtccttctta atttaatttt   8880
attctttgct gataaaaaaa aaaatttcat atagtgttaa ataataattt gttaaataac   8940
caaaaagtca aatatgttta ctctcgttta aataattgag attcgtccag caaggctaaa   9000
cgattgtata gatttatgac aatatttact tttttataga taaatgttat attataataa   9060
atttatatac atatattata tgttatttat tattatttta aatccttcaa tattttatca   9120
aaccaactca taattttttt tttatctgta agaagcaata aaattaaata gacccacttt   9180
aaggatgatc caacctttat acagagtaag agagttcaaa tagtaccctt tcatatacat   9240
atcaactaaa atattagaaa tatcatggat caaaccttat aaagacatta aataagtgga   9300
taagtataat atataaatgg gtagtatata atatataaat ggatacaaac ttctctcttt   9360
ataattgtta tgtctcctta acatcctaat ataatacata agtgggtaat atataatata   9420
taaatggaga caaacttctt ccattataat tgttatgtct tcttaacact tatgtctcgt   9480
tcacaatgct aaggttagaa ttgtttagaa agtcttatag tacacatttg tttttgtact   9540
atttgaagca ttccataagc cgtcacgatt cagatgattt ataataataa gaggaaattt   9600
atcatagaac aataaggtgc atagatagag tgttaatata tcataacatc ctttgtttat   9660
tcatagaaga agtgagatgg agctcagtta ttatactgtt acatggtcgg atacaatatt   9720
ccatgctctc catgagctct tacacctaca tgcattttag ttcatacttg cggccgctta   9780
ctgcgcctta cccatcttgg aggcagcctt ggagacctcg ttcagacggc taaagacctc   9840
tgcagttccc tcgatcatac cggtggtgtg gtatcggaca ttgtactttt tgcacagggt   9900
ctcgacagca ggctggatct ttgaaaagtt gtggcgaggc atcgaaggga acaagtggtg   9960
ctcgatctga tagttcaatc cacccgtgaa ccagttggca aatagacccg ggtggacatc  10020
acgacccgtg atgatctgct tcgtgaagaa atccatatcg accgcctcct ccttcgagat  10080
cacaggcata ccgttgtggt tgagcgagaa cacgatcgcc aacaagtttc cgcacaccgc  10140
ctgcgacacc aaaaagtaca ccagcatgtt gacgggatcc ttgatgaaca ggaacatggt  10200
ggcgaggtac caggtccagt gcatcgcaag cgacagctgc tcgaccaacg agatgggcac  10260
acgcgcgccc gagggcttgt gggcctgacc gttaggcagc acaaagagaa tggactggag  10320
gcaccaggag agacgggcaa acgagagaat ggggaagtaa aaccaggtct ggttcaggac  10380
catgaaacgc gaccacatgc gggtcagctc ctcatctggg acatccgaga acatctccaa  10440
```

```
cgcatgctca ctccaggtca acagagggtg ggtgtcaatg tcgggatcct cgccgtggac  10500

gttgggggcg gcgtggtgag tgttgtgctt gtccttccac cacgaggacg agaagccctg  10560

gcagacacct cccaagaagg cgccgaaaag atcaccccag aaacggtcct ggaagacctg  10620

gtgatgcaaa aagtcgtgag ccaaccatcc gcactgctgc cagaacagac ccaaaagcgc  10680

agccgagagc acgttggcga gggtcgaggt ctggccccac ttggccacaa tgaccgtcga  10740

caaaccccag atgcagaggt tgaacgagac cttgaaggcg tagtatgcct tggaagaatc  10800

gtagtaacca agagactgga acaaggtacg cagcttgcgg acctcggccg caaagtcatc  10860

attcttgata tcgcggtcgc tctcgtcaat atcaccaacg taaaagttgg caagagtctc  10920

ccaagcagcc tcggggtgaa aagtgtcaaa gacgtcagtg ccgtccttgc caacgtgcgt  10980

gagaatcaca cttccaccgg gatgatcagg gacgaactcg cggacatcgt acaccttgtt  11040

gtcgatgatc atcaagaagg gtgcctcggc atccttcttg ccctcattca gagcctcggc  11100

attcaaaacc tcggcccgag taaacgtcct cacactggga gcagcagcca tggtttgcgg  11160

ccgcagtata tcttaaattc tttaatacgg tgtactagga tattgaactg gttcttgatg  11220

atgaaaacct gggccgagat tgcagctatt tatagtcata ggtcttgtta acatgcatgg  11280

acatttggcc acggggtggc atgcagtttg acgggtgttg aaataaacaa aaatgaggtg  11340

gcggaagaga atacgagttt gaggttgggt tagaaacaac aaatgtgagg gctcatgatg  11400

ggttgagttg gtgaatgttt tgggctgctc gattgacacc tttgtgagta cgtgttgttg  11460

tgcatggctt ttggggtcca gttttttttt cttgacgcgg cgatcctgat cagctagtgg  11520

ataagtgatg tccactgtgt gtgattgcgt ttttgtttga attttatgaa cttagacatt  11580

gctatgcaaa ggatactctc attgtgtttt gtcttctttt gttccttggc tttttcttat  11640

gatccaagag actagtcagt gttgtggcat tcgagactac caagattaat tatgatgggg  11700

gaaggataag taactgatta gtacggactg ttaccaaatt aattaataag cggcaaatga  11760

agggcatgga tcaaaagctt ggatctcctg ca                                11792
```

<210> SEQ ID NO 113
<211> LENGTH: 22547
<212> TYPE: DNA
<213> ORGANISM: Artificial Sequence
<220> FEATURE:
<223> OTHER INFORMATION: plasmid pKR451
<220> FEATURE:
<221> NAME/KEY: misc_feature
<222> LOCATION: (20066)..(20066)
<223> OTHER INFORMATION: n is a, c, g, or t

<400> SEQUENCE: 113

```
cgcgcctcga gtgggcggat cccccgggct gcaggaattc actggccgtc gttttacaac     60

gtcgtgactg ggaaaaccct ggcgttaccc aacttaatcg ccttgcagca catcccccctt   120

tcgccagctg gcgtaatagc gaagaggccc gcaccgatcg cccttcccaa cagttgcgca    180

gcctgaatgg cgaatggatc gatccatcgc gatgtacctt ttgttagtca gcctctcgat    240

tgctcatcgt cattacacag taccgaagtt tgatcgatct agtaacatag atgacaccgc    300

gcgcgataat ttatcctagt ttgcgcgcta tattttgttt tctatcgcgt attaaatgta    360

taattgcggg actctaatca taaaaaccca tctcataaat aacgtcatgc attacatgtt    420

aattattaca tgcttaacgt aattcaacag aaattatatg ataatcatcg caagaccggc    480

aacaggattc aatcttaaga aactttattg ccaaatgttt gaacgatctg cttcgacgca    540

ctccttcttt actccaccat ctcgtcctta ttgaaaacgt gggtagcacc aaaacgaatc    600
```

```
aagtcgctgg aactgaagtt accaatcacg ctggatgatt tgccagttgg attaatcttg    660
cctttccccg catgaataat attgatgaat gcatgcgtga ggggtagttc gatgttggca    720
atagctgcaa ttgccgcgac atcctccaac gagcataatt cttcagaaaa atagcgatgt    780
tccatgttgt cagggcatgc atgatgcacg ttatgaggtg acggtgctag gcagtattcc    840
ctcaaagttt catagtcagt atcatattca tcattgcatt cctgcaagag agaattgaga    900
cgcaatccac acgctgcggc aaccttccgg cgttcgtggt ctatttgctc ttggacgttg    960
caaacgtaag tgttggatcg atccggggtg ggcgaagaac tccagcatga gatccccgcg   1020
ctggaggatc atccagccgg cgtcccggaa aacgattccg aagcccaacc tttcatagaa   1080
ggcggcggtg gaatcgaaat ctcgtgatgg caggttgggc gtcgcttggt cggtcatttc   1140
gaaccccaga gtcccgctca gaagaactcg tcaagaaggc gatagaaggc gatgcgctgc   1200
gaatcgggag cggcgatacc gtaaagcacg aggaagcggt cagcccattc gccgccaagc   1260
tcttcagcaa tatcacgggt agccaacgct atgtcctgat agcggtccgc cacacccagc   1320
cggccacagt cgatgaatcc agaaaagcgg ccattttcca ccatgatatt cggcaagcag   1380
gcatcgccat gggtcacgac gagatcctcg ccgtcgggca tgcgcgcctt gagcctggcg   1440
aacagttcgg ctggcgcgag cccctgatgc tcttcgtcca gatcatcctg atcgacaaga   1500
ccggcttcca tccgagtacg tgctcgctcg atgcgatgtt tcgcttggtg gtcgaatggg   1560
caggtagccg gatcaagcgt atgcagccgc cgcattgcat cagccatgat ggatactttc   1620
tcggcaggag caaggtgaga tgacaggaga tcctgccccg gcacttcgcc caatagcagc   1680
cagtcccttc ccgcttcagt gacaacgtcg agcacagctg cgcaaggaac gcccgtcgtg   1740
gccagccacg atagccgcgc tgcctcgtcc tgcagttcat tcagggcacc ggacaggtcg   1800
gtcttgacaa aaagaaccgg gcgcccctgc gctgacagcc ggaacacggc ggcatcagag   1860
cagccgattg tctgttgtgc ccagtcatag ccgaatagcc tctccaccca agcggccgga   1920
gaacctgcgt gcaatccatc ttgttcaatc atgcgaaacg atccccgcaa gcttggagac   1980
tggtgatttc agcgtgtcct ctccaaatga aatgaacttc cttatataga ggaagggtct   2040
tgcgaaggat agtgggattg tgcgtcatcc cttacgtcag tggagatatc acatcaatcc   2100
acttgctttg aagacgtggt tggaacgtct tctttttcca cgatgctcct cgtgggtggg   2160
ggtccatctt tgggaccact gtcggcagag gcatcttcaa cgatggcctt tcctttatcg   2220
caatgatggc atttgtagga gccaccttcc ttttccacta tcttcacaat aaagtgacag   2280
atagctgggc aatggaatcc gaggaggttt ccggatatta ccctttgttg aaaagtctca   2340
attgcccttt ggtcttctga gactgtatct ttgatatttt tggagtagac aagcgtgtcg   2400
tgctccacca tgttgacgaa gattttcttc ttgtcattga gtcgtaagag actctgtatg   2460
aactgttcgc cagtctttac ggcgagttct gttaggtcct ctatttgaat ctttgactcc   2520
atggcctttg attcagtggg aactaccttt ttagagactc caatctctat tacttgcctt   2580
ggtttgtgaa gcaagccttg aatcgtccat actggaatag tacttctgat cttgagaaat   2640
atatctttct ctgtgttctt gatgcagtta gtcctgaatc ttttgactgc atctttaacc   2700
ttcttgggaa ggtatttgat ctcctggaga ttattgctcg ggtagatcgt cttgatgaga   2760
cctgctgcgt aagcctctct aaccatctgt gggttagcat tctttctgaa attgaaaagg   2820
ctaatcttct cattatcagt ggtgaacatg gtatcgtcac cttctccgtc gaacttcctg   2880
actagatcgt agagatagag gaagtcgtcc attgtgatct ctggggcaaa ggagatctga   2940
attaattcga tatggtggat ttatcacaaa tgggacccgc cgccgacaga ggtgtgatgt   3000
```

```
taggccagga ctttgaaaat ttgcgcaact atcgtatagt ggccgacaaa ttgacgccga   3060
gttgacagac tgcctagcat ttgagtgaat tatgtgaggt aatgggctac actgaattgg   3120
tagctcaaac tgtcagtatt tatgtatatg agtgtatatt ttcgcataat ctcagaccaa   3180
tctgaagatg aaatgggtat ctgggaatgg cgaaatcaag gcatcgatcg tgaagtttct   3240
catctaagcc cccatttgga cgtgaatgta gacacgtcga aataaagatt tccgaattag   3300
aataatttgt ttattgcttt cgcctataaa tacgacggat cgtaatttgt cgttttatca   3360
aaatgtactt tcattttata ataacgctgc ggacatctac atttttgaat tgaaaaaaaa   3420
ttggtaatta ctctttcttt ttctccatat tgaccatcat actcattgct gatccatgta   3480
gatttcccgg acatgaagcc atttacaatt gaatatatcc tgccgccgct gccgctttgc   3540
acccggtgga gcttgcatgt tggtttctac gcagaactga gccggttagg cagataattt   3600
ccattgagaa ctgagccatg tgcaccttcc ccccaacacg gtgagcgacg gggcaacgga   3660
gtgatccaca tgggactttt aaacatcatc cgtcggatgg cgttgcgaga gaagcagtcg   3720
atccgtgaga tcagccgacg caccgggcag gcgcgcaaca cgatcgcaaa gtatttgaac   3780
gcaggtacaa tcgagccgac gttcacgcgg aacgaccaag caagctagct ttaatgcggt   3840
agtttatcac agttaaattg ctaacgcagt caggcaccgt gtatgaaatc taacaatgcg   3900
ctcatcgtca tcctcggcac cgtcaccctg gatgctgtag gcataggctt ggttatgccg   3960
gtactgccgg gcctcttgcg ggatatcgtc cattccgaca gcatcgccag tcactatggc   4020
gtgctgctag cgctatatgc gttgatgcaa tttctatgcg cacccgttct cggagcactg   4080
tccgaccgct ttggccgccg cccagtcctg ctcgcttcgc tacttggagc cactatcgac   4140
tacgcgatca tggcgaccac acccgtcctg tggtccaacc cctccgctgc tatagtgcag   4200
tcggcttctg acgttcagtg cagccgtctt ctgaaaacga catgtcgcac aagtcctaag   4260
ttacgcgaca ggctgccgcc ctgccctttt cctggcgttt tcttgtcgcg tgttttagtc   4320
gcataaagta gaatacttgc gactagaacc ggagacatta cgccatgaac aagagcgccg   4380
ccgctggcct gctgggctat gcccgcgtca gcaccgacga ccaggacttg accaaccaac   4440
gggccgaact gcacgcggcc ggctgcacca agctgttttc cgagaagatc accggcacca   4500
ggcgcgaccg cccggagctg gccaggatgc ttgaccacct acgccctggc gacgttgtga   4560
cagtgaccag gctagaccgc ctggcccgca gcacccgcga cctactggac attgccgagc   4620
gcatccagga ggccggcgcg ggcctgcgta gcctggcaga gccgtgggcc gacaccacca   4680
cgccggccgg ccgcatggtg ttgaccgtgt tcgccggcat tgccgagttc gagcgttccc   4740
taatcatcga ccgcacccgg agcgggcgcg aggccgccaa ggcccgaggc gtgaagtttg   4800
gcccccgccc taccctcacc ccggcacaga tcgcgcacgc ccgcgagctg atcgaccagg   4860
aaggccgcac cgtgaaagag gcggctgcac tgcttggcgt gcatcgctcg accctgtacc   4920
gcgcacttga gcgcagcgag gaagtgacgc ccaccgaggc caggcggcgc ggtgccttcc   4980
gtgaggacgc attgaccgag gccgacgccc tggcggccgc cgagaatgaa cgccaagagg   5040
aacaagcatg aaaccgcacc aggacggcca ggacgaaccg tttttcatta ccgaagagat   5100
cgaggcggag atgatcgcgg ccgggtacgt gttcgagccg cccgcgcacg tctcaaccgt   5160
gcggctgcat gaaatcctgg ccggtttgtc tgatgccaag ctggcggcct ggccggccag   5220
cttggccgct gaagaaaccg agcgccgccg tctaaaaagg tgatgtgtat ttgagtaaaa   5280
cagcttgcgt catgcggtcg ctgcgtatat gatgcgatga gtaaataaac aaatacgcaa   5340
gggaacgcat gaagttatcg ctgtacttaa ccagaaaggc gggtcaggca agacgaccat   5400
```

```
cgcaacccat ctagcccgcg ccctgcaact cgccggggcc gatgttctgt tagtcgattc   5460
cgatccccag ggcagtgccc gcgattgggc ggccgtgcgg gaagatcaac cgctaaccgt   5520
tgtcggcatc gaccgcccga cgattgaccg cgacgtgaag gccatcggcc ggcgcgactt   5580
cgtagtgatc gacggagcgc cccaggcggc ggacttggct gtgtccgcga tcaaggcagc   5640
cgacttcgtg ctgattccgg tgcagccaag cccttacgac atatgggcca ccgccgacct   5700
ggtggagctg gttaagcagc gcattgaggt cacggatgga aggctacaag cggcctttgt   5760
cgtgtcgcgg gcgatcaaag gcacgcgcat cggcggtgag gttgccgagg cgctggccgg   5820
gtacgagctg cccattcttg agtcccgtat cacgcagcgc gtgagctacc caggcactgc   5880
cgccgccggc acaaccgttc ttgaatcaga acccgagggc gacgctgccc gcgaggtcca   5940
ggcgctggcc gctgaaatta aatcaaaact catttgagtt aatgaggtaa agagaaaatg   6000
agcaaaagca caaacacgct aagtgccggc cgtccgagcg cacgcagcag caaggctgca   6060
acgttggcca gcctggcaga cacgccagcc atgaagcggg tcaactttca gttgccggcg   6120
gaggatcaca ccaagctgaa gatgtacgcg gtacgccaag gcaagaccat taccgagctg   6180
ctatctgaat acatcgcgca gctaccagag taaatgagca aatgaataaa tgagtagatg   6240
aattttagcg gctaaaggag gcggcatgga aaatcaagaa caaccaggca ccgacgccgt   6300
ggaatgcccc atgtgtggag gaacgggcgg ttggccaggc gtaagcggct gggttgtctg   6360
ccggccctgc aatggcactg gaacccccaa gcccgaggaa tcggcgtgag cggtcgcaaa   6420
ccatccggcc cggtacaaat cggcgcggcg ctgggtgatg acctggtgga gaagttgaag   6480
gccgcgcagg ccgcccagcg gcaacgcatc gaggcagaag cacgccccgg tgaatcgtgg   6540
caagcggccg ctgatcgaat ccgcaaagaa tcccggcaac cgccggcagc cggtgcgccg   6600
tcgattagga agccgcccaa gggcgacgag caaccagatt ttttcgttcc gatgctctat   6660
gacgtgggca cccgcgatag tcgcagcatc atggacgtgg ccgttttccg tctgtcgaag   6720
cgtgaccgac gagctggcga ggtgatccgc tacgagcttc cagacgggca cgtagaggtt   6780
tccgcagggc cggccggcat ggccagtgtg tgggattacg acctggtact gatggcggtt   6840
tcccatctaa ccgaatccat gaaccgatac cgggaaggga agggagacaa gcccggccgc   6900
gtgttccgtc cacacgttgc ggacgtactc aagttctgcc ggcgagccga tggcggaaag   6960
cagaaagacg acctggtaga aacctgcatt cggttaaaca ccacgcacgt tgccatgcag   7020
cgtacgaaga aggccaagaa cggccgcctg gtgacggtat ccgagggtga agccttgatt   7080
agccgctaca agatcgtaaa gagcgaaacc gggcggccgg agtacatcga gatcgagcta   7140
gctgattgga tgtaccgcga gatcacagaa ggcaagaacc cggacgtgct gacggttcac   7200
cccgattact ttttgatcga tcccggcatc ggccgttttc tctaccgcct ggcacgccgc   7260
gccgcaggca aggcagaagc cagatggttg ttcaagacga tctacgaacg cagtggcagc   7320
gccggagagt tcaagaagtt ctgtttcacc gtgcgcaagc tgatcgggtc aaatgacctg   7380
ccggagtacg atttgaagga ggaggcgggg caggctggcc cgatcctagt catgcgctac   7440
cgcaacctga tcgagggcga agcatccgcc ggttcctaat gtacggagca gatgctaggg   7500
caaattgccc tagcagggga aaaaggtcga aaaggtctct ttcctgtgga tagcacgtac   7560
attgggaacc caaagccgta cattgggaac cggaacccgt acattgggaa cccaaagccg   7620
tacattggga accggtcaca catgtaagtg actgatataa aagagaaaaa aggcgatttt   7680
tccgcctaaa actctttaaa acttattaaa actcttaaaa cccgcctggc ctgtgcataa   7740
ctgtctggcc agcgcacagc cgaagagctg caaaaagcgc ctacccttcg gtcgctgcgc   7800
```

```
tccctacgcc ccgccgcttc gcgtcggcct atcgcggccg ctggccgctc aaaaatggct   7860
ggcctacggc caggcaatct accagggcgc ggacaagccg cgccgtcgcc actcgaccgc   7920
cggcgcccac atcaaggcac cctgcctcgc gcgtttcggt gatgacggtg aaaacctctg   7980
acacatgcag ctcccggaga cggtcacagc ttgtctgtaa gcggatgccg ggagcagaca   8040
agcccgtcag ggcgcgtcag cgggtgttgg cgggtgtcgg ggcgcagcca tgacccagtc   8100
acgtagcgat agcggagtgt atactggctt aactatgcgg catcagagca gattgtactg   8160
agagtgcacc atatgcggtg tgaaataccg cacagatgcg taaggagaaa ataccgcatc   8220
aggcgctctt ccgcttcctc gctcactgac tcgctgcgct cggtcgttcg gctgcggcga   8280
gcggtatcag ctcactcaaa ggcggtaata cggttatcca cagaatcagg ggataacgca   8340
ggaaagaaca tgtgagcaaa aggccagcaa aaggccagga accgtaaaaa ggccgcgttg   8400
ctggcgtttt tccataggct ccgcccccct gacgagcatc acaaaaatcg acgctcaagt   8460
cagaggtggc gaaacccgac aggactataa agataccagg cgtttccccc tggaagctcc   8520
ctcgtgcgct ctcctgttcc gaccctgccg cttaccggat acctgtccgc ctttctccct   8580
tcgggaagcg tggcgctttc tcatagctca cgctgtaggt atctcagttc ggtgtaggtc   8640
gttcgctcca agctgggctg tgtgcacgaa ccccccgttc agcccgaccg ctgcgcctta   8700
tccggtaact atcgtcttga gtccaacccg gtaagacacg acttatcgcc actggcagca   8760
gccactggta acaggattag cagagcgagg tatgtaggcg gtgctacaga gttcttgaag   8820
tggtggccta actacggcta cactagaagg acagtatttg gtatctgcgc tctgctgaag   8880
ccagttacct tcggaaaaag agttggtagc tcttgatccg gcaaacaaac caccgctggt   8940
agcggtggtt tttttgtttg caagcagcag attacgcgca gaaaaaaagg atctcaagaa   9000
gatcctttga tcttttctac ggggtctgac gctcagtgga acgaaaactc acgttaaggg   9060
attttggtca tgagattatc aaaaaggatc ttcacctaga tccttttaaa ttaaaaatga   9120
agttttaaat caatctaaag tatatatgag taaacttggt ctgacagtta ccaatgctta   9180
atcagtgagg cacctatctc agcgatctgt ctatttcgtt catccatagt tgcctgactc   9240
cccgtcgtgt agataactac gatacgggag ggcttaccat ctggccccag tgctgcaatg   9300
ataccgcgag acccacgctc accggctcca gatttatcag caataaacca gccagccgga   9360
agggccgagc gcagaagtgg tcctgcaact ttatccgcct ccatccagtc tattaattgt   9420
tgccgggaag ctagagtaag tagttcgcca gttaatagtt tgcgcaacgt tgttgccatt   9480
gctacaggca tcgtggtgtc acgctcgtcg tttggtatgg cttcattcag ctccggttcc   9540
caacgatcaa ggcgagttac atgatccccc atgttgtgca aaaaagcggt tagctccttc   9600
ggtcctccga tcgttgtcag aagtaagttg gccgcagtgt tatcactcat ggttatggca   9660
gcactgcata attctcttac tgtcatgcca tccgtaagat gcttttctgt gactggtgag   9720
tactcaacca agtcattctg agaatagtgt atgcggcgac cgagttgctc ttgcccggcg   9780
tcaacacggg ataataccgc gccacatagc agaactttaa aagtgctcat cattggaaaa   9840
gacctgcagg gggggggggg cgctgaggtc tgcctcgtga agaaggtgtt gctgactcat   9900
accaggcctg aatcgcccca tcatccagcc agaaagtgag ggagccacgg ttgatgagag   9960
ctttgttgta ggtggaccag ttggtgattt tgaacttttg ctttgccacg gaacggtctg  10020
cgttgtcggg aagatgcgtg atctgatcct tcaactcagc aaaagttcga tttattcaac  10080
aaagccgccg tcccgtcaag tcagcgtaat gctctgccag tgttacaacc aattaaccaa  10140
ttctgattag aaaaactcat cgagcatcaa atgaaactgc aatttattca tatcaggatt  10200
```

```
atcaatacca tatttttgaa aaagccgttt ctgtaatgaa ggagaaaact caccgaggca  10260
gttccatagg atggcaagat cctggtatcg gtctgcgatt ccgactcgtc caacatcaat  10320
acaacctatt aatttcccct cgtcaaaaat aaggttatca agtgagaaat caccatgagt  10380
gacgactgaa tccggtgaga atggcaaaag cttatgcatt tctttccaga cttgttcaac  10440
aggccagcca ttacgctcgt catcaaaatc actcgcatca accaaaccgt tattcattcg  10500
tgattgcgcc tgagcgagac gaaatacgcg atcgctgtta aaaggacaat tacaaacagg  10560
aatcgaatgc aaccggcgca ggaacactgc cagcgcatca acaatatttt cacctgaatc  10620
aggatattct tctaatacct ggaatgctgt tttcccgggg atcgcagtgg tgagtaacca  10680
tgcatcatca ggagtacgga taaaatgctt gatggtcgga agaggcataa attccgtcag  10740
ccagtttagt ctgaccatct catctgtaac atcattggca acgctacctt tgccatgttt  10800
cagaaacaac tctggcgcat cgggcttccc atacaatcga tagattgtcg cacctgattg  10860
cccgacatta tcgcgagccc atttataccc atataaatca gcatccatgt tggaatttaa  10920
tcgcggcctc gagcaagacg tttcccgttg aatatggctc ataacacccc ttgtattact  10980
gtttatgtaa gcagacagtt ttattgttca tgatgatata tttttatctt gtgcaatgta  11040
acatcagaga ttttgagaca caacgtggct ttcccccccc cccctgcagg tcaattcggt  11100
cgatatggct attacgaaga aggctcgtgc gcggagtccc gtgaactttc ccacgcaaca  11160
agtgaaccgc accgggtttg ccggaggcca tttcgttaaa atgcgcagcc atggctgctt  11220
cgtccagcat ggcgtaatac tgatcctcgt cttcggctgg cggtatattg ccgatgggct  11280
tcaaaagccg ccgtggttga accagtctat ccattccaag gtagcgaact cgaccgcttc  11340
gaagctcctc catggtccac gccgatgaat gacctcggcc ttgtaaagac cgttgatcgc  11400
ttctgcgagg gcgttgtcgt gctgtcgccg acgcttccga tagatggctc gatacctgct  11460
tctgccaacc gctcggaata gcgaaaggac acgtattgaa caccgcgatc cgagtgatgc  11520
actaggccgc catgagcggg acgccgatca tgatgagcct cctcgagggc atcgaggaca  11580
aagcctgcat gtgctgtccg gctcgcccgc catccgacaa tgcgacgggc gaagacgtcg  11640
atcacgaagg ccacgtagac gaagccctcc caagtggcga cataagtacg gacatgcgca  11700
aaggctttcc cggtttgtcg ctgatggtgc aagagacgct gaagcgcgat ccgatgcgca  11760
ggcatctgtt cgtcttccgc ggtcgtggcg gtggcctgat caaggtcact cgccgaagag  11820
ctgcatgatt ggctcgaaac cgagcggggg aaattgtcgc gcagttctcc cgtcgccgag  11880
gcgataaatt acatgctcaa gcgatgggat ggcattacgt cattcctcga tgacggcccg  11940
atttgcctga cgaacaatgc tgccgaacga acgctcagag gctatgtact cggcaggaag  12000
tcatggctgt ttgccggatc ggatcgttgt gctgaacgtg cggcgttcat ggcgacactg  12060
atcatgagcg ccaagctcaa taacatcgat ccgcaggcct ggcttgccga cgtccgcgcc  12120
gaccttgcgg acgctccgat cagcaggctt gagcaacagc tgccgtggaa ctggacatcc  12180
aagacactga gtgctcaggc ggcctgacct gcggccttca ccggatactt accccattat  12240
cgcagattgc gatgaagcat cagcgtcatt cagcaatctt gccaaagtat gcaggctcgc  12300
gagaatcgac gtgcgaaacc ggctggttgc gccaaagatc cgcttgcgga gcggtcgaac  12360
attcatgctg ggacttcaag aggtcgagta gaggaagaac cggaaaggtt gcaccggaaa  12420
atatgcgttc ctttggagag cgcctcatgg acgtgaacaa atcgcccgga ccaaggatgc  12480
cacggataca aaagctcgcg aagctcggtc ccgtgggtgt tctgtcgtct cgttgtacaa  12540
cgaaatccat tcccattccg cgctcaagat ggcttcccct cggcagttca tcagggctaa  12600
```

atcaatctag ccgacttgtc cggtgaaatg ggctgcactc caacagaaac aatcaaacaa 12660
acatacacag cgacttattc acacgagctc aaattacaac ggtatatatc ctgccagtca 12720
gcatcatcac accaaaagtt aggcccgaat agtttgaaat tagaaagctc gcaattgagg 12780
tctacaggcc aaattcgctc ttagccgtac aatattactc accggtgcga tgccccccat 12840
cgtaggtgaa ggtggaaatt aatgatccat cttgagacca caggcccaca acagctacca 12900
gtttcctcaa gggtccacca aaaacgtaag cgcttacgta catggtcgat aagaaaaggc 12960
aatttgtaga tgttaacatc caacgtcgct ttcagggatc gatccaatac gcaaaccgcc 13020
tctccccgcg cgttggccga ttcattaatg cagctggcac gacaggtttc ccgactggaa 13080
agcgggcagt gagcgcaacg caattaatgt gagttagctc actcattagg caccccaggc 13140
tttacacttt atgcttccgg ctcgtatgtt gtgtggaatt gtgagcggat aacaatttca 13200
cacaggaaac agctatgacc atgattacgc caagcttgca tgcctgcagg tcgactctag 13260
aggatctggc gcgccaagct tgttgaaaca tccctgaagt gtctcatttt attttattta 13320
ttctttgctg ataaaaaaat aaaataaaag aagctaagca cacggtcaac cattgctcta 13380
ctgctaaaag ggttatgtgt agtgttttac tgcataaatt atgcagcaaa caagacaact 13440
caaattaaaa aatttccttt gcttgttttt ttgttgtctc tgacttgact ttcttgtgga 13500
agttggttgt ataaggattg ggacaccatt gtccttctta atttaatttt attctttgct 13560
gataaaaaaa aaaatttcat atagtgttaa ataataattt gttaaataac caaaaagtca 13620
aatatgttta ctctcgttta aataattgag attcgtccag caaggctaaa cgattgtata 13680
gatttatgac aatatttact tttttataga taaatgttat attataataa atttatatac 13740
atatattata tgttatttat tattatttta aatccttcaa tattttatca aaccaactca 13800
taattttttt tttatctgta agaagcaata aaattaaata gacccacttt aaggatgatc 13860
caacctttat acagagtaag agagttcaaa tagtaccctt tcatatacat atcaactaaa 13920
atattagaaa tatcatggat caaaccttat aaagacatta aataagtgga taagtataat 13980
atataaatgg gtagtatata atatataaat ggatacaaac ttctctcttt ataattgtta 14040
tgtctcctta acatcctaat ataatacata agtgggtaat atataatata taaatggaga 14100
caaacttctt ccattataat tgttatgtct tcttaacact tatgtctcgt tcacaatgct 14160
aaggttagaa ttgtttagaa agtcttatag tacacatttg tttttgtact atttgaagca 14220
ttccataagc cgtcacgatt cagatgattt ataataataa gaggaaattt atcatagaac 14280
aataaggtgc atagatagag tgttaatata tcataacatc ctttgtttat tcatagaaga 14340
agtgagatgg agctcagtta ttatactgtt acatggtcgg atacaatatt ccatgctctc 14400
catgagctct tacacctaca tgcattttag ttcatacttg cggccgctta ctgcgcctta 14460
cccatcttgg aggtagcctt ggagacctcg ttcagacggc taaagacctc tgcagttccc 14520
tcgatcatac cggtggtgtg gtatcggaca ttgtactttt tgcacagggt ctcgacagca 14580
ggctggatct ttgaaaagtt gtggcgaggc atcgaaggga acaagtggtg ctcgatctga 14640
tagttcaatc cacccgtgaa ccagttggca aatagacccg ggtggacatc acgacccgtg 14700
atgatctgct tcgtgaagaa atccatatcg accgcctcct ccttcgagat cacaggcata 14760
ccgttgtggt tgagcgagaa cacgatcgcc aacaagtttc cgcacaccgc ctgcgacacc 14820
aaaaagtaca ccagcatgtt gacgggatcc ttgatgaaca ggaacatggt ggcgaggtac 14880
caggtccagt gcatcgcaag cgacagctgc tcgaccaacg agatgggcac acgcgcgccc 14940
gagggcttgt gggcctgacc gttaggcagc acaaagagaa tggactggag gcaccaggag 15000

```
agacgggcaa acgagagaat ggggaagtaa aaccaggtct ggttcaggac catgaaacgc  15060
gaccacatgc gggtcagctc ctcatctggg acatccgaga acatctccaa cgcatgctca  15120
ctccaggtca acagagggtg ggtgtcaatg tcgggatcct cgccgtggac gttgggggcg  15180
gcgtggtgag tgttgtgctt gtccttccac cacgaggacg agaagccctg gcagacacct  15240
cccaagaagg cgccgaaaag atcaccccag aaacggtcct ggaagacctg gtgatgcaaa  15300
aagtcgtgag ccaaccatcc gcactgctgc cagaacagac ccaaaagcgc agccgagagc  15360
acgttggcga gggtcgaggt ctggccccac ttggccacaa tgaccgtcga caaaccccag  15420
atgcagaggt tgaacgagac cttgaaggcg tagtatgcct tggaagaatc gtagtaacca  15480
agagactgga acaaggtacg cagcttgcgg acctcggccg caaagtcatc attcttgata  15540
tcgcggtcgc tctcgtcaat atcaccaacg taaaagttgg caagagtctc ccaagcagcc  15600
tcggggtgaa aagtgtcaaa gacgtcagtg ccgtccttgc caacgtgcgt gagaatcaca  15660
cttccaccgg gatgatcagg gacgaactcg cggacatcgt acaccttgtt gtcgatgatc  15720
atcaagaagg gtgcctcggc atccttcttg ccctcattca gagcctcggc attcaaaacc  15780
tcggcccgag taaacgtcct cacactggga gcagcagcca tggtttgcgg ccgcagtata  15840
tcttaaattc tttaatacgg tgtactagga tattgaactg gttcttgatg atgaaaacct  15900
gggccgagat tgcagctatt tatagtcata ggtcttgtta acatgcatgg acatttggcc  15960
acggggtggc atgcagtttg acgggtgttg aaataaacaa aaatgaggtg gcggaagaga  16020
atacgagttt gaggttgggt tagaaacaac aaatgtgagg gctcatgatg ggttgagttg  16080
gtgaatgttt tgggctgctc gattgacacc tttgtgagta cgtgttgttg tgcatggctt  16140
ttggggtcca gttttttttt cttgacgcgg cgatcctgat cagctagtgg ataagtgatg  16200
tccactgtgt gtgattgcgt ttttgtttga attttatgaa cttagacatt gctatgcaaa  16260
ggatactctc attgtgtttt gtcttctttt gttccttggc tttttcttat gatccaagag  16320
actagtcagt gttgtggcat tcgagactac caagattaat tatgatgggg gaaggataag  16380
taactgatta gtacggactg ttaccaaatt aattaataag cggcaaatga agggcatgga  16440
tcaaaagctt ggatctcctg caggctagcc taagtacgta ctcaaaatgc caacaaataa  16500
aaaaaaagtt gctttaataa tgccaaaaca aattaataaa acacttacaa caccggattt  16560
tttttaatta aaatgtgcca tttaggataa atagttaata tttttaataa ttatttaaaa  16620
agccgtatct actaaaatga tttttatttg gttgaaaata ttaatatgtt taaatcaaca  16680
caatctatca aaattaaact aaaaaaaaaa taagtgtacg tggttaacat tagtacagta  16740
atataagagg aaaatgagaa attaagaaat tgaaagcgag tctaattttt aaattatgaa  16800
cctgcatata taaaaggaaa gaaagaatcc aggaagaaaa gaaatgaaac catgcatggt  16860
cccctcgtca tcacgagttt ctgccatttg caatagaaac actgaaacac ctttctcttt  16920
gtcacttaat tgagatgccg aagccacctc acaccatgaa cttcatgagg tgtagcaccc  16980
aaggcttcca tagccatgca tactgaagaa tgtctcaagc tcagcaccct acttctgtga  17040
cgtgtccctc attcaccttc ctctcttccc tataaataac cacgcctcag gttctccgct  17100
tcacaactca aacattctct ccattggtcc ttaaacactc atcagtcatc accgcggccg  17160
catggagtcg attgcgccat tcctcccatc aaagatgccg caagatctgt ttatggacct  17220
tgccaccgct atcggtgtcc gggccgcgcc ctatgtcgat cctctcgagg ccgcgctggt  17280
ggcccaggcc gagaagtaca tccccacgat tgtccatcac acgcgtgggt tcctggtcgc  17340
ggtggagtcg cctttggccc gtgagctgcc gttgatgaac ccgttccacg tgctgttgat  17400
```

```
cgtgctcgct tatttggtca cggtctttgt gggcatgcag atcatgaaga actttgagcg  17460
gttcgaggtc aagacgtttt cgctcctgca caacttttgt ctggtctcga tcagcgccta  17520
catgtgcggt gggatcctgt acgaggctta tcaggccaac tatggactgt ttgagaacgc  17580
tgctgatcat accttcaagg gtcttcctat ggccaagatg atctggctct tctacttctc  17640
caagatcatg gagtttgtcg acaccatgat catggtcctc aagaagaaca accgccagat  17700
ctccttcttg cacgtttacc accacagctc catcttcacc atctggtggt tggtcacctt  17760
tgttgcaccc aacggtgaag cctacttctc tgctgcgttg aactcgttca tccatgtgat  17820
catgtacggc tactacttct tgtcggcctt gggcttcaag caggtgtcgt tcatcaagtt  17880
ctacatcacg cgctcgcaga tgacacagtt ctgcatgatg tcggtccagt cttcctggga  17940
catgtacgcc atgaaggtcc ttggccgccc cggatacccc ttcttcatca cggctctgct  18000
ttggttctac atgtggacca tgctcggtct cttctacaac ttttacagaa agaacgccaa  18060
gttggccaag caggccaagg ccgacgctgc caaggagaag gcaaggaagt tgcagtaagc  18120
ggccgcattt cgcaccaaat caatgaaagt aataatgaaa agtctgaata agaatactta  18180
ggcttagatg cctttgttac ttgtgtaaaa taacttgagt catgtacctt tggcggaaac  18240
agaataaata aaaggtgaaa ttccaatgct ctatgtataa gttagtaata cttaatgtgt  18300
tctacggttg tttcaatatc atcaaactct aattgaaact ttagaaccac aaatctcaat  18360
cttttcttaa tgaaatgaaa aatcttaatt gtaccatgtt tatgttaaac accttacaat  18420
tggttggaga ggaggaccaa ccgatgggac aacattggga gaaagagatt caatggagat  18480
ttggatagga gaacaacatt ctttttcact tcaatacaag atgagtgcaa cactaaggat  18540
atgtatgaga ctttcagaag ctacgacaac atagatgagt gaggtggtga ttcctagcaa  18600
gaaagacatt agaggaagcc aaaatcgaac aaggaagaca tcaagggcaa gagacaggac  18660
catccatctc aggaaaagga gctttgggat agtccgagaa gttgtacaag aaattttttg  18720
gagggtgagt gatgcattgc tggtgacttt aactcaatca aaattgagaa agaaagaaaa  18780
gggagggggc tcacatgtga atagaaggga aacgggagaa ttttacagtt ttgatctaat  18840
gggcatccca gctagtggta acatattcac catgtttaac cttcacgtac gtcctcgaag  18900
agaagggtta ataacacatt ttttaacatt tttaacacaa attttagtta tttaaaaatt  18960
tattaaaaaa tttaaaataa gaagaggaac tctttaaata aatctaactt acaaaattta  19020
tgatttttaa taagttttca ccaataaaaa atgtcataaa aatatgttaa aaagtatatt  19080
atcaatattc tctttatgat aaataaaaag aaaaaaaaaa taaaagttaa gtgaaaatga  19140
gattgaagtg actttaggtg tgtataaata tatcaacccc gccaacaatt tatttaatcc  19200
aaatatattg aagtatatta ttccatagcc tttatttatt tatatattta ttatataaaa  19260
gctttatttg ttctaggttg ttcatgaaat atttttttgg ttttatctcc gttgtaagaa  19320
aatcatgtgc tttgtgtcgc cactcactat tgcagctttt tcatgcattg gtcagattga  19380
cggttgattg tatttttgtt ttttatggtt ttgtgttatg acttaagtct tcatctcttt  19440
atctcttcat caggtttgat ggttacctaa tatggtccat gggtacatgc atggttaaat  19500
taggtggcca actttgttgt gaacgataga attttttttta tattaagtaa actattttta  19560
tattatgaaa taataataaa aaaaatattt tatcattatt aacaaaatca tattagttaa  19620
tttgttaact ctataataaa agaaatactg taacattcac attacatggt aacatctttc  19680
caccctttca tttgtttttt gtttgatgac tttttttctt gtttaaattt atttcccttc  19740
ttttaaattt ggaatacatt atcatcatat ataaactaaa atactaaaaa caggattaca  19800
```

caaatgataa ataataacac aaatatttat aaatctagct gcaatatatt taaactagct 19860
atatcgatat tgtaaaataa aactagctgc attgatactg ataaaaaaat atcatgtgct 19920
ttctggactg atgatgcagt atacttttga cattgccttt attttatttt tcagaaaagc 19980
tttcttagtt ctgggttctt cattatttgt ttcccatctc cattgtgaat tgaatcattt 20040
gcttcgtgtc acaaatacaa tttagntagg tacatgcatt ggtcagattc acggtttatt 20100
atgtcatgac ttaagttcat ggtagtacat tacctgccac gcatgcatta tattggttag 20160
atttgatagg caaatttggt tgtcaacaat ataaatataa ataatgtttt tatattacga 20220
aataacagtg atcaaaacaa acagttttat ctttattaac aagattttgt ttttgtttga 20280
tgacgttttt taatgtttac gctttccccc ttcttttgaa tttagaacac tttatcatca 20340
taaaatcaaa tactaaaaaa attacatatt tcataaataa taacacaaat atttttaaaa 20400
aatctgaaat aataatgaac aatattacat attatcacga aaattcatta ataaaaatat 20460
tatataaata aaatgtaata gtagttatat gtaggaaaaa agtactgcac gcataatata 20520
tacaaaaaga ttaaaatgaa ctattataaa taataacact aaattaatgg tgaatcatat 20580
caaaataatg aaaaagtaaa taaaatttgt aattaacttc tatatgtatt acacacacaa 20640
ataataaata atagtaaaaa aaattatgat aaatatttac catctcataa gatatttaaa 20700
ataatgataa aaatatagat tattttttat gcaactagct agccaaaaag agaacacggg 20760
tatatataaa aagagtacct ttaaattcta ctgtacttcc tttattcctg acgtttttat 20820
atcaagtgga catacgtgaa gattttaatt atcagtctaa atatttcatt agcacttaat 20880
acttttctgt tttattccta tcctataagt agtcccgatt ctcccaacat tgcttattca 20940
cacaactaac taagaaagtc ttccatagcc ccccaagcgg ccgcatggga acggaccaag 21000
gaaaaacctt cacctgggaa gagctggcgg cccataacac caaggacgac ctactcttgg 21060
ccatccgcgg cagggtgtac gatgtcacaa agttcttgag ccgccatcct ggtggagtgg 21120
acactctcct gctcggagct ggccgagatg ttactccggt ctttgagatg tatcacgcgt 21180
ttggggctgc agatgccatt atgaagaagt actatgtcgg tacactggtc tcgaatgagc 21240
tgcccatctt cccggagcca acggtgttcc acaaaaccat caagacgaga gtcgagggct 21300
actttacgga tcggaacatt gatcccaaga atagaccaga gatctgggga cgatacgctc 21360
ttatctttgg atccttgatc gcttcctact acgcgcagct ctttgtgcct ttcgttgtcg 21420
aacgcacatg gcttcaggtg gtgtttgcaa tcatcatggg atttgcgtgc gcacaagtcg 21480
gactcaaccc tcttcatgat gcgtctcact tttcagtgac ccacaacccc actgtctgga 21540
agattctggg agccacgcac gactttttca acggagcatc gtacctggtg tggatgtacc 21600
aacatatgct cggccatcac ccctacacca acattgctgg agcagatccc gacgtgtcga 21660
cgtctgagcc cgatgttcgt cgtatcaagc ccaaccaaaa gtggtttgtc aaccacatca 21720
accagcacat gtttgttcct ttcctgtacg gactgctggc gttcaaggtg cgcattcagg 21780
acatcaacat tttgtacttt gtcaagacca atgacgctat tcgtgtcaat cccatctcga 21840
catggcacac tgtgatgttc tggggcggca aggctttctt tgtctggtat cgcctgattg 21900
ttcccctgca gtatctgccc ctgggcaagg tgctgctctt gttcacggtc gcggacatgg 21960
tgtcgtctta ctggctggcg ctgaccttcc aggcgaacca cgttgttgag gaagttcagt 22020
ggccgttgcc tgacgagaac gggatcatcc aaaaggactg ggcagctatg caggtcgaga 22080
ctacgcagga ttacgcacac gattcgcacc tctggaccag catcactggc agcttgaact 22140
accaggctgt gcaccatctg ttccccaacg tgtcgcagca ccattatccc gatattctgg 22200

```
ccatcatcaa gaacacctgc agcgagtaca aggttccata ccttgtcaag gatacgtttt  22260

ggcaagcatt tgcttcacat ttggagcact tgcgtgttct tggactccgt cccaaggaag  22320

agtaggcggc cgcgacacaa gtgtgagagt actaaataaa tgctttggtt gtacgaaatc  22380

attacactaa ataaaataat caaagcttat atatgccttc cgctaaggcc gaatgcaaag  22440

aaattggttc tttctcgtta tcttttgcca cttttactag tacgtattaa ttactactta  22500

atcatctttg tttacggctc attatatccg tacggatccg tcgacgg                22547
```

<210> SEQ ID NO 114
<211> LENGTH: 7085
<212> TYPE: DNA
<213> ORGANISM: Artificial Sequence
<220> FEATURE:
<223> OTHER INFORMATION: plamsid pKR72

<400> SEQUENCE: 114

```
gtacggatcc gtcgacggcg cgcccgatca tccggatata gttcctcctt tcagcaaaaa     60

acccctcaag acccgtttag aggccccaag gggttatgct agttattgct cagcggtggc    120

agcagccaac tcagcttcct ttcgggcttt gttagcagcc ggatcgatcc aagctgtacc    180

tcactattcc tttgccctcg gacgagtgct ggggcgtcgg tttccactat cggcgagtac    240

ttctacacag ccatcggtcc agacggccgc gcttctgcgg gcgatttgtg tacgcccgac    300

agtcccggct ccggatcgga cgattgcgtc gcatcgaccc tgcgcccaag ctgcatcatc    360

gaaattgccg tcaaccaagc tctgatagag ttggtcaaga ccaatgcgga gcatatacgc    420

ccggagccgc ggcgatcctg caagctccgg atgcctccgc tcgaagtagc gcgtctgctg    480

ctccatacaa gccaaccacg gcctccagaa gaagatgttg gcgacctcgt attgggaatc    540

cccgaacatc gcctcgctcc agtcaatgac cgctgttatg cggccattgt ccgtcaggac    600

attgttggag ccgaaatccg cgtgcacgag gtgccggact tcggggcagt cctcggccca    660

aagcatcagc tcatcgagag cctgcgcgac ggacgcactg acggtgtcgt ccatcacagt    720

ttgccagtga tacacatggg gatcagcaat cgcgcatatg aaatcacgcc atgtagtgta    780

ttgaccgatt ccttgcggtc cgaatgggcc gaacccgctc gtctggctaa gatcggccgc    840

agcgatcgca tccatagcct ccgcgaccgg ctgcagaaca gcgggcagtt cggtttcagg    900

caggtcttgc aacgtgacac cctgtgcacg gcgggagatg caataggtca ggctctcgct    960

gaattcccca atgtcaagca cttccggaat cgggagcgcg gccgatgcaa agtgccgata   1020

aacataacga tctttgtaga aaccatcggc gcagctattt acccgcagga catatccacg   1080

ccctcctaca tcgaagctga aagcacgaga ttcttcgccc tccgagagct gcatcaggtc   1140

ggagacgctg tcgaactttt cgatcagaaa cttctcgaca gacgtcgcgg tgagttcagg   1200

cttttccatg ggtatatctc cttcttaaag ttaaacaaaa ttatttctag agggaaaccg   1260

ttgtggtctc cctatagtga gtcgtattaa tttcgcggga tcgagatcga tccaattcca   1320

atcccacaaa aatctgagct taacagcaca gttgctcctc tcagagcaga atcgggtatt   1380

caacaccctc atatcaacta ctacgttgtg tataacggtc cacatgccgg tatatacgat   1440

gactggggtt gtacaaaggc ggcaacaaac ggcgttcccg gagttgcaca caagaaattt   1500

gccactatta cagaggcaag agcagcagct gacgcgtaca caacaagtca gcaaacagac   1560

aggttgaact tcatccccaa aggagaagct caactcaagc ccaagagctt tgctaaggcc   1620

ctaacaagcc caccaaagca aaaagcccac tggctcacgc taggaaccaa aaggcccagc   1680

agtgatccag ccccaaaaga gatctccttt gccccggaga ttacaatgga cgatttcctc   1740
```

```
tatctttacg atctaggaag gaagttcgaa ggtgaaggtg acgacactat gttcaccact   1800
gataatgaga aggttagcct cttcaatttc agaaagaatg ctgacccaca gatggttaga   1860
gaggcctacg cagcaggtct catcaagacg atctacccga gtaacaatct ccaggagatc   1920
aaataccttc ccaagaaggt taaagatgca gtcaaaagat tcaggactaa ttgcatcaag   1980
aacacagaga aagacatatt tctcaagatc agaagtacta ttccagtatg gacgattcaa   2040
ggcttgcttc ataaaccaag gcaagtaata gagattggag tctctaaaaa ggtagttcct   2100
actgaatcta aggccatgca tggagtctaa gattcaaatc gaggatctaa cagaactcgc   2160
cgtgaagact ggcgaacagt tcatacagag tcttttacga ctcaatgaca agaagaaaat   2220
cttcgtcaac atggtggagc acgacactct ggtctactcc aaaaatgtca aagatacagt   2280
ctcagaagac caaagggcta ttgagacttt tcaacaaagg ataatttcgg gaaacctcct   2340
cggattccat tgcccagcta tctgtcactt catcgaaagg acagtagaaa aggaaggtgg   2400
ctcctacaaa tgccatcatt gcgataaagg aaaggctatc attcaagatg cctctgccga   2460
cagtggtccc aaagatggac ccccacccac gaggagcatc gtggaaaaag aagacgttcc   2520
aaccacgtct tcaaagcaag tggattgatg tgacatctcc actgacgtaa gggatgacgc   2580
acaatcccac tatccttcgc aagacccttc ctctatataa ggaagttcat ttcatttgga   2640
gaggacacgc tcgagctcat ttctctatta cttcagccat aacaaaagaa ctcttttctc   2700
ttcttattaa accatgaaaa agcctgaact caccgcgacg tctgtcgaga agtttctgat   2760
cgaaaagttc gacagcgtct ccgacctgat gcagctctcg gagggcgaag aatctcgtgc   2820
tttcagcttc gatgtaggag ggcgtggata tgtcctgcgg gtaaatagct gcgccgatgg   2880
tttctacaaa gatcgttatg tttatcggca ctttgcatcg gccgcgctcc cgattccgga   2940
agtgcttgac attggggaat tcagcgagag cctgacctat tgcatctccc gccgtgcaca   3000
gggtgtcacg ttgcaagacc tgcctgaaac cgaactgccc gctgttctgc agccggtcgc   3060
ggaggccatg gatgcgatcg ctgcggccga tcttagccag acgagcgggt tcggcccatt   3120
cggaccgcaa ggaatcggtc aatacactac atggcgtgat ttcatatgcg cgattgctga   3180
tccccatgtg tatcactggc aaactgtgat ggacgacacc gtcagtgcgt ccgtcgcgca   3240
ggctctcgat gagctgatgc tttgggccga ggactgcccc gaagtccggc acctcgtgca   3300
cgcggatttc ggctccaaca atgtcctgac ggacaatggc cgcataacag cggtcattga   3360
ctggagcgag gcgatgttcg gggattccca atacgaggtc gccaacatct tcttctggag   3420
gccgtggttg gcttgtatgg agcagcagac gcgctacttc gagcggaggc atccggagct   3480
tgcaggatcg ccgcggctcc gggcgtatat gctccgcatt ggtcttgacc aactctatca   3540
gagcttggtt gacggcaatt tcgatgatgc agcttgggcg cagggtcgat gcgacgcaat   3600
cgtccgatcc ggagccggga ctgtcgggcg tacacaaatc gcccgcagaa gcgcggccgt   3660
ctggaccgat ggctgtgtag aagtactcgc cgatagtgga aaccgacgcc ccagcactcg   3720
tccgagggca aaggaatagt gaggtaccta aagaaggagt gcgtcgaagc agatcgttca   3780
aacatttggc aataaagttt cttaagattg aatcctgttg ccggtcttgc gatgattatc   3840
atataatttc tgttgaatta cgttaagcat gtaataatta acatgtaatg catgacgtta   3900
tttatgagat gggtttttat gattagagtc ccgcaattat acatttaata cgcgatagaa   3960
aacaaaatat agcgcgcaaa ctaggataaa ttatcgcgcg cggtgtcatc tatgttacta   4020
gatcgatgtc gaatcgatca acctgcatta atgaatcggc caacgcgcgg ggagaggcgg   4080
tttgcgtatt gggcgctctt ccgcttcctc gctcactgac tcgctgcgct cggtcgttcg   4140
```

gctgcggcga gcggtatcag ctcactcaaa ggcggtaata cggttatcca cagaatcagg 4200
ggataacgca ggaaagaaca tgtgagcaaa aggccagcaa aaggccagga accgtaaaaa 4260
ggccgcgttg ctggcgtttt tccataggct ccgcccccct gacgagcatc acaaaaatcg 4320
acgctcaagt cagaggtggc gaaacccgac aggactataa agataccagg cgtttccccc 4380
tggaagctcc ctcgtgcgct ctcctgttcc gaccctgccg cttaccggat acctgtccgc 4440
ctttctccct tcgggaagcg tggcgctttc tcaatgctca cgctgtaggt atctcagttc 4500
ggtgtaggtc gttcgctcca agctgggctg tgtgcacgaa ccccccgttc agcccgaccg 4560
ctgcgcctta tccggtaact atcgtcttga gtccaacccg gtaagacacg acttatcgcc 4620
actggcagca gccactggta acaggattag cagagcgagg tatgtaggcg gtgctacaga 4680
gttcttgaag tggtggccta actacggcta cactagaagg acagtatttg gtatctgcgc 4740
tctgctgaag ccagttacct tcggaaaaag agttggtagc tcttgatccg gcaaacaaac 4800
caccgctggt agcggtggtt tttttgtttg caagcagcag attacgcgca gaaaaaaagg 4860
atctcaagaa gatcctttga tcttttctac ggggtctgac gctcagtgga acgaaaactc 4920
acgttaaggg attttggtca tgacattaac ctataaaaat aggcgtatca cgaggccctt 4980
tcgtctcgcg cgtttcggtg atgacggtga aaacctctga cacatgcagc tcccggagac 5040
ggtcacagct tgtctgtaag cggatgccgg gagcagacaa gcccgtcagg gcgcgtcagc 5100
gggtgttggc gggtgtcggg gctggcttaa ctatgcggca tcagagcaga ttgtactgag 5160
agtgcaccat atggacatat tgtcgttaga acgcggctac aattaataca taaccttatg 5220
tatcatacac atacgattta ggtgacacta tagaacggcg cgccaagctt gttgaaacat 5280
ccctgaagtg tctcatttta ttttatttat tctttgctga taaaaaaata aaataaaaga 5340
agctaagcac acggtcaacc attgctctac tgctaaaagg gttatgtgta gtgttttact 5400
gcataaatta tgcagcaaac aagacaactc aaattaaaaa atttcctttg cttgtttttt 5460
tgttgtctct gacttgactt tcttgtggaa gttggttgta taaggattgg gacaccattg 5520
tccttcttaa tttaatttta ttctttgctg ataaaaaaaa aaatttcata tagtgttaaa 5580
taataatttg ttaaataacc aaaaagtcaa atatgtttac tctcgtttaa ataattgaga 5640
ttcgtccagc aaggctaaac gattgtatag atttatgaca atatttactt ttttatagat 5700
aaatgttata ttataataaa tttatataca tatattatat gttatttatt attattttaa 5760
atccttcaat attttatcaa accaactcat aatttttttt ttatctgtaa gaagcaataa 5820
aattaaatag acccacttta aggatgatcc aacctttata cagagtaaga gagttcaaat 5880
agtacccttt catatacata tcaactaaaa tattagaaat atcatggatc aaaccttata 5940
aagacattaa ataagtggat aagtataata tataaatggg tagtatataa tatataaatg 6000
gatacaaact tctctcttta taattgttat gtctccttaa catcctaata taatacataa 6060
gtgggtaata tataatatat aaatggagac aaacttcttc cattataatt gttatgtctt 6120
cttaacactt atgtctcgtt cacaatgcta aggttagaat tgtttagaaa gtcttatagt 6180
acacatttgt ttttgtacta tttgaagcat tccataagcc gtcacgattc agatgattta 6240
taataataag aggaaattta tcatagaaca ataaggtgca tagatagagt gttaatatat 6300
cataacatcc tttgtttatt catagaagaa gtgagatgga gctcagttat tatactgtta 6360
catggtcgga tacaatattc catgctctcc atgagctctt acacctacat gcattttagt 6420
tcatacttgc ggccgcagta tatcttaaat tctttaatac ggtgtactag gatattgaac 6480
tggttcttga tgatgaaaac ctgggccgag attgcagcta tttatagtca taggtcttgt 6540

-continued

```
taacatgcat ggacatttgg ccacggggtg gcatgcagtt tgacgggtgt tgaaataaac   6600
aaaaatgagg tggcggaaga gaatacgagt ttgaggttgg gttagaaaca acaaatgtga   6660
gggctcatga tgggttgagt tggtgaatgt tttgggctgc tcgattgaca cctttgtgag   6720
tacgtgttgt tgtgcatggc ttttggggtc cagttttttt ttcttgacgc ggcgatcctg   6780
atcagctagt ggataagtga tgtccactgt gtgtgattgc gtttttgttt gaattttatg   6840
aacttagaca ttgctatgca aaggatactc tcattgtgtt ttgtcttctt ttgttccttg   6900
gctttttctt atgatccaag agactagtca gtgttgtggc attcgagact accaagatta   6960
attatgatgg gggaaggata agtaactgat tagtacggac tgttaccaaa ttaattaata   7020
agcggcaaat gaagggcatg gatcaaaagc ttggatctcc tgcaggatct ggccggccgg   7080
atctc                                                               7085
```